United States Patent
Neiser

(10) Patent No.: US 11,293,311 B2
(45) Date of Patent: Apr. 5, 2022

(54) REFRIGERATION APPARATUS AND METHOD

(71) Applicant: Paul Neiser, Mountain View, CA (US)

(72) Inventor: Paul Neiser, Mountain View, CA (US)

( * ) Notice: Subject to any disclaimer, the term of this patent is extended or adjusted under 35 U.S.C. 154(b) by 0 days.

(21) Appl. No.: 16/509,491

(22) Filed: Jul. 11, 2019

(65) Prior Publication Data

US 2020/0018193 A1    Jan. 16, 2020

Related U.S. Application Data

(60) Provisional application No. 62/763,958, filed on Jul. 11, 2018, provisional application No. 62/764,272, filed on Jul. 24, 2018, provisional application No. 62/832,280, filed on Apr. 10, 2019, provisional application No. 62/920,065, filed on Apr. 10, 2019, provisional application No. 62/848,591, filed on May 16, 2019, provisional application No. 62/920,816, filed on May 16, 2019.

(51) Int. Cl.
*F01K 25/10*    (2006.01)
*F28D 20/02*    (2006.01)

(52) U.S. Cl.
CPC .............. *F01K 25/10* (2013.01); *F28D 20/02* (2013.01); *F25B 2400/24* (2013.01)

(58) Field of Classification Search
CPC ....... F01K 25/10; F28D 20/02; F25B 2400/24
See application file for complete search history.

(56) References Cited

U.S. PATENT DOCUMENTS

| | | | | | |
|---|---|---|---|---|---|
| 5,172,554 | A | * | 12/1992 | Swift | F25B 9/12 60/520 |
| 6,022,486 | A | * | 2/2000 | Tokai | F02G 1/0445 165/4 |
| 7,124,585 | B2 | * | 10/2006 | Kim | F01C 11/004 60/643 |
| 2006/0278373 | A1 | * | 12/2006 | Hsu | H01L 23/473 165/104.33 |

(Continued)

FOREIGN PATENT DOCUMENTS

| | | | |
|---|---|---|---|
| CN | 105307457 A | * | 2/2016 |
| CN | 105307457 A | | 2/2016 |

(Continued)

OTHER PUBLICATIONS

English Translation CN 105307457 A (Year: 2016).*

(Continued)

*Primary Examiner* — Shafiq Mian
(74) *Attorney, Agent, or Firm* — Schwegman Lundberg & Woessner, P.A.

(57) ABSTRACT

Provided is an apparatus and method for transferring or exchanging thermal energy between two thermal reservoirs, for converting energy from thermal energy into another form of energy, or for converting energy from another form of energy into thermal energy. A body force per unit mass generating apparatus can be employed to modify a specific heat capacity of a working material. A work exchange (Continued)

apparatus, such as a compressor expander, can be employed to do work on the working material, or allow the working material to do work on the work exchange apparatus.

58 Claims, 23 Drawing Sheets

(56) References Cited

U.S. PATENT DOCUMENTS

| | | | |
|---|---|---|---|
| 2007/0186560 A1* | 8/2007 | Schauwecker | F25B 21/00 |
| | | | 62/3.1 |
| 2012/0011101 A1 | 5/2012 | Geldon | |
| 2016/0216044 A1* | 7/2016 | Narine | F02C 6/16 |
| 2019/0032969 A1* | 1/2019 | Bartholome | F03G 7/0614 |
| 2020/0274345 A1* | 8/2020 | Li | H01B 7/29 |
| 2020/0348055 A1* | 11/2020 | Trindade Pereira | F28F 27/00 |

FOREIGN PATENT DOCUMENTS

| | | | | |
|---|---|---|---|---|
| CN | 112654824 A | 4/2021 | | |
| EP | 1818628 A2 | 8/2007 | | |
| JP | 2016044243 A | * 4/2016 | | |
| WO | WO-2017100851 A1 | * 6/2017 | ............ | H01B 9/008 |
| WO | WO-2020/014547 A1 | 1/2020 | | |

OTHER PUBLICATIONS

English Translation JP 2016044243 A (Year: 2016).*
CN 105307457 A English Translation (Year: 2016).*
"International Application Serial No. PCT/US2019/041496, International Search Report dated Dec. 6, 2019", 7 pgs.
"International Application Serial No. PCT/US2019/041496, Invitation to Pay Additional Fees dated Oct. 10, 2019", 15 pgs.
"International Application Serial No. PCT/US2019/041496, Written Opinion dated Dec. 6, 2019", 12 pgs.
"International Application Serial No. PCT/US2019/041496, International Preliminary Report on Patentability dated Jan. 21, 2021", 14 pgs.
"European Application Serial No. 19746278.1, Response filed Aug. 27, 2021 to Communication pursuant to Rules 161(1) and 162 EPC", 16 pgs.
"Chinese Application Serial No. 201980058332.6, Office Action dated Dec. 27, 2021", w/English Translation, 18 pgs.

* cited by examiner

REFRIGERATION APPARATUS AND METHOD

CLAIM OF PRIORITY

The present patent application is a non-provisional of, and claims the benefit of priority of US Provisional Patent Application Nos. 62/763,958 filed on Jul. 11, 2018; 62/764,272 filed on Jul. 24, 2018; 62/832,280 filed on Apr. 10, 2019; 62/920,065 filed on Apr. 10, 2019; 62/848,591 filed on May 16, 2019; and 62/920,816 filed on May 16, 2019; each of which is hereby incorporated by reference herein in its entirety.

FIELD

The invention relates to apparatuses and methods for transferring or exchanging thermal energy, for converting energy from thermal energy into another form of energy, or for converting energy from another form of energy into thermal energy.

BACKGROUND

Heat typically flows from a hot thermal reservoir to a cold thermal reservoir when these two thermal reservoirs are in thermal contact with each other. For example, when the bricks are in direct physical contact, i.e. when the surface of a hot brick placed against the surface of a cold brick, heat will flow from the hot brick to the cold brick. This heat can be transferred via conduction, for instance.

A conventional heat pump requires mechanical work to be done in order to transfer heat from a cold reservoir to a hot reservoir. For example, a conventional refrigerator consumes electricity in order to remove heat from the cold interior and deliver heat to the warm exterior, such as the room in which the refrigerator is located.

A conventional heat engine performs mechanical work by absorbing heat from a hot reservoir and transferring heat to a cold reservoir. In a marine steam engine, the working material absorbs heat from a hot reservoir in the boiler, and subsequently performs mechanical work, e.g. on a steam turbine, whereupon the steam transfers heat to a cold reservoir, e.g. the ocean, in the condenser.

In a conventional magnetic refrigerator, a magnetocaloric working material is exposed to an increased magnetic field strength, resulting in an adiabatic increase in the temperature of the working material, as described by the magnetocaloric effect. Following the increase in temperature, the working material is thermally coupled to a hot reservoir, and heat is allowed to flow from the working material into the hot reservoir. The heat flow can comprise thermal conduction, for example. The working material is subsequently thermally uncoupled from the hot reservoir, and the magnetic field strength within the working material is reduced, resulting in an adiabatic decrease in the temperature of the working material, as described by the magnetocaloric effect. The working material is subsequently thermally coupled to a cold reservoir, and heat is allowed to flow from the cold reservoir to the working material. The working material is thermally uncoupled from the cold reservoir, thus completing a thermodynamic cycle. In this manner heat can be removed from a cold reservoir and delivered to a hot reservoir, resulting in the refrigeration of the cold reservoir.

A conventional solid state electrical refrigerator is operated in a similar manner as a conventional magnetic refrigerator, with an electrocaloric effect and an electric field being used in place of a magnetocaloric effect and a magnetic field.

SUMMARY OF THE INVENTION

In a positive magnetocaloric effect, as used herein, an increase of the magnetic field strength within a working material can increase the temperature of the working material by reducing the specific heat capacity of the working material. Similarly, in a negative magnetocaloric effect, an increase of the magnetic field strength within a working material can decrease the temperature of the working material by increasing the specific heat capacity of the working material. Unless specified, the term "specific heat capacity" can refer to the specific heat capacity at constant pressure, or the specific heat capacity at constant volume.

In a positive electrocaloric effect, as used herein, an increase of the electric field strength within a working material can increase the temperature of the working material by reducing the specific heat capacity of the working material. Similarly, in a negative electrocaloric effect, an increase of the electric field strength within a working material can decrease the temperature of the working material by increasing the specific heat capacity of the working material.

In general, in accordance with some embodiments of the invention, an external body force per unit mass generating apparatus, of BFGA, can be employed to modify the specific heat capacity of a working material. A body force can be magnetic, electric, gravitational, or inertial in nature, for example.

In accordance with some embodiments of the invention, a thermodynamic apparatus comprises a body force generating apparatus configured to modify a specific heat capacity of a working material, as well as a work exchange apparatus, where the work exchange apparatus can comprise a compressor or expander, where a compressor can do work on the working material, and where a working material can do work on the expander.

In accordance with some embodiments of the invention, a thermodynamic cycle can comprise at least one artificial modification of the specific heat capacity of a working material and at least one compression or expansion of the working material by a compressor or an expander. An artificial modification refers to a modification of the specific heat capacity of the working material to a value above or below the specific heat capacity in a natural scenario. In the natural scenario the working material is considered in isolation of any BFGA apparatuses or any artificial modifications of its thermodynamic properties, and the working material in the natural scenario is at the same temperature and density as the working material in the state of artificially modified specific heat capacity. Note that in the natural scenario the specific heat capacity of a working material is a function of temperature. For example, the specific heat capacity of a diatomic ideal gas increases at large temperatures, which can be considered to be a natural modification of the specific heat capacity as opposed to an artificial modification. The natural specific heat capacity of a working material, as used herein, is the specific heat capacity in the natural scenario.

A compressor is a thermodynamic apparatus configured to do work on the working material. An expander is a thermodynamic apparatus configured to allow the working material to do work on the expander. For example, a compressor can comprise an axial or centrifugal compressor, a diverging duct, or a converging diverging duct, or a converging duct, a reciprocating piston, or a body force generating apparatus. For example, an expander can comprise an axial or centrifugal turbine, a converging duct, or a converging diverging duct, or a diverging duct, a reciprocating piston, or a body force generating apparatus.

Some embodiments of the invention comprise an apparatus configured to be able to artificially modify the specific heat capacity of a working material. In some embodiments the apparatus configured to be able to artificially modify the specific heat capacity of a working material comprises a BFGA.

In accordance with some embodiments of the invention, thermal energy can be converted directly into useful energy, such as mechanical work or electricity. For example, the specific heat capacity of a working material can be artificially increased, resulting in a reduction in temperature of the working material. In this example, the increase is due to an increase in the activation level of a BFGA. For instance, the reduction in temperature can be due to a negative magnetocaloric effect and an increase in the magnetic field strength within at least a portion of the working material. The working material can subsequently be compressed adiabatically by a compressor, such as an axial compressor. Following the compression, the specific heat capacity of the working material is reduced, resulting in an increase in the temperature of the working material. For example, the reduction can be due to a decrease in the activation level of a BFGA. For instance, the reduction can be due to a negative magnetocaloric effect and a decrease in the magnetic field strength within at least a portion of the working material. Subsequently, the working material is expanded by an expander, such as an axial turbine. The specific heat capacity at a given incremental change in specific volume during the expansion is configured to be smaller than the specific heat capacity at the given incremental change in specific volume during the compression for at least a portion of the expansion and compression, such that the temperature of the working material at a given incremental change in specific volume during the expansion is larger than the temperature of the working material at the given incremental change specific volume during the compression for at least a portion of the expansion and compression, where the portion is referred to as the "portion of interest". In the portion of interest the working material can do a net amount of work on the environment, i.e. the work done by the working material on the expander can be larger than the work done by the compressor on the working material during the portion of interest in this example. The pressure of the working material at a given incremental change in specific volume during the expansion can be larger than the pressure of the working material at the given incremental change specific volume during the compression for the portion of interest. Following the expansion heat can be transferred from an external heat source to the working material, and the working material can be returned to the original pressure, temperature and specific heat capacity, thus completing the thermodynamic cycle. In this simplified example, the heat transferred to the working material is equivalent to the net work done by the working material on the environment. In other embodiments the thermodynamic cycle can comprise other types of compressions or expansions, such as isothermal, isobaric, or polytropic compressions or expansions.

In some embodiments the specific heat capacity during a portion of interest of the expansion and compression at a given pressure can be lower than the natural specific heat capacity. In some embodiments the specific heat capacity during a portion of interest of the expansion and compression at a given pressure can be larger than the natural specific heat capacity at a given pressure or temperature. In some embodiments the specific heat capacity during a portion of interest of an expansion can be substantially equal to the natural specific heat capacity. In some embodiments the specific heat capacity during a portion of interest of a compression can be substantially equal to the natural specific heat capacity. In some embodiments the specific heat capacity during a portion of interest of the expansion can be smaller than the natural specific heat capacity, and the specific heat capacity during the same portion of interest of the compression can be larger than the natural specific heat capacity. For example, an increase in the specific heat capacity relative to a reference value can comprise an increase in the magnetic field strength within a working material and a negative magnetocaloric effect, or a decrease in the magnetic field strength within a working material and a positive magnetocaloric effect, where the increase and decrease in the field are relative to the field associated with the reference value of the specific heat capacity, ceteris paribus. In another example, a decrease in the specific heat capacity relative to a reference value can comprise a decrease in the electric field strength within a working material and a negative electrocaloric effect, or an increase in the electric field strength within a working material and a positive electrocaloric effect. In another example, an increase in the activation level of a BFGA can increase the average potential energy of objects within the working material, and thus increase the specific heat capacity of the working material.

In some embodiments of the invention, useful energy, such as electricity or mechanical work, can be converted into thermal energy. This is analogous to the aforementioned case in which thermal energy is converted into useful work, with the exception of the specific heat capacity during a portion of interest being lower during a compression compared to the specific heat capacity during the same portion of interest during an expansion, such that the temperature of the working material at the given incremental change in specific volume during the expansion is smaller than the temperature of the working material at the given incremental change specific volume during the compression for the portion of interest. In the portion of interest the external environment can do a net amount of work on the working material, i.e. the work done by the compressor on the working material can be larger than the work done by the working material on the expander in this example. In other words, the pressure of the working material at a given incremental change in specific volume during the expansion is smaller than the pressure of the working material at the given incremental change specific volume during the compression for the portion of interest. In a complete thermodynamic cycle, heat can be transferred from the working material to the environment. In a simplified example, the heat transferred from the working material to an external environment is equal in magnitude to the work done on the working material.

In accordance with some embodiments of the invention, thermal energy can be transferred from a cold reservoir to a hot reservoir. For example, a working material with an increased specific heat capacity can be compressed adiabatically by a compressor. The specific heat capacity of the working material can subsequently be reduced, resulting in an increase in the temperature of the working material. Heat can be subsequently be delivered to the hot reservoir. The working material can subsequently be expanded adiabatically by an expander.

Following the expansion, specific heat capacity of the working material can be increased, resulting in a decrease in the temperature of the working material. Heat can subsequently be delivered to the working material from a cold reservoir, completing the thermodynamic cycle. Note that the increase and decrease in the specific heat capacity is an increase or decrease relative to the specific heat capacity at a temporally preceding station within the thermodynamic cycle in this case. In this example, the heat delivered to the hot reservoir is equal in magnitude to the heat extracted from the cold reservoir. In an idealized, simplified scenario, there is no net work done by the environment on the working material, where the environment comprises the compressor and expander. Thus the cold reservoir can be efficiently refrigerated by the transfer of heat to a hot reservoir.

Embodiments of the invention can be employed in a wide variety of applications, such as the generation of thrust, the propulsion of an aircraft, the propulsion of a watercraft, the propulsion of a spacecraft, the propulsion of a land vehicle, the generation of electricity, the generation of power, the conversion of useful work into thermal energy, the increase in temperature of a working material, the conversion of thermal energy into useful work, the reduction in temperature of a working material, or the refrigeration of a cold reservoir, for example.

DETAILED DESCRIPTION OF THE INVENTION

Figure 1:
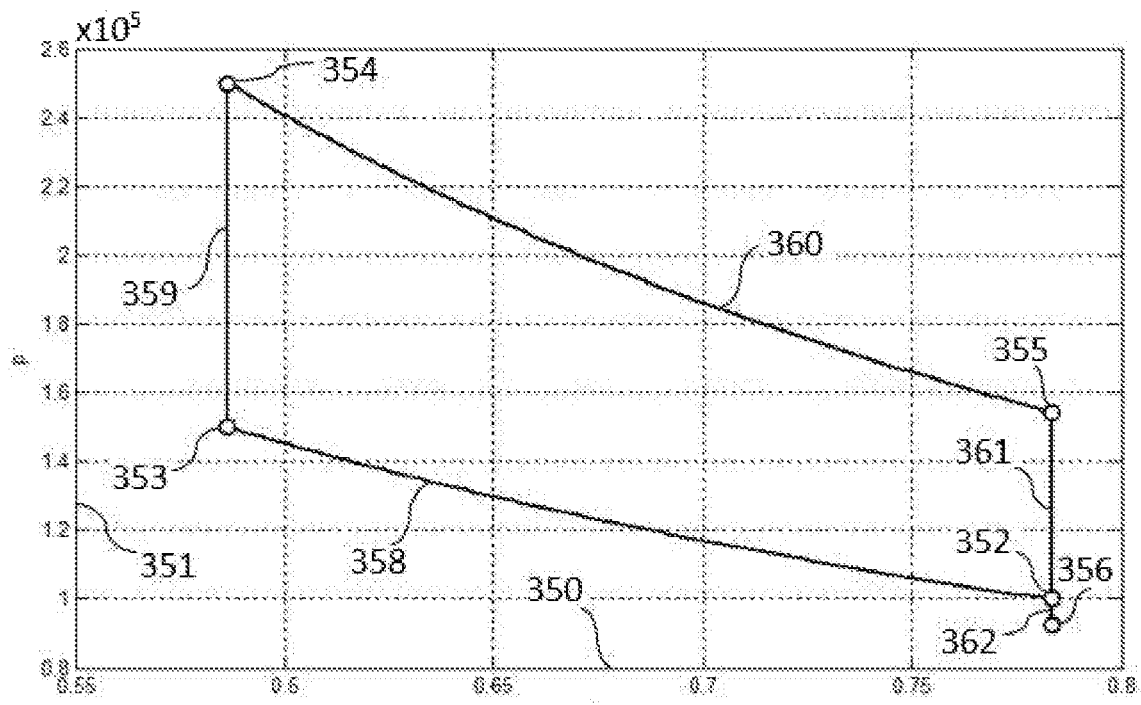
FIG. 1 shows a plot of pressure versus specific volume for a subset of embodiments of the invention for an example method of operation.

As used herein, a "working material" is a thermal medium, i.e. a medium which is capable of storing or transporting thermal energy. A working material can comprise a fluid such as a liquid or a gas, or a solid. The thermal energy can be transported or stored in the form of phonons, for example. The thermal energy can be transported or stored in the form of the kinetic or potential energy of individual objects located within the working material. For example, a portion of said thermal energy can be stored or transported in the form of the kinetic energy of individual nitrogen or oxygen molecules in air. The thermal energy can also be stored or transported via interatomic potential energy. The thermal energy can also be stored within an individual atom or molecule in the form of the kinetic or potential energy of electrons of an atom. The vacuum can also be considered to be a thermal medium, since it is capable of transporting and storing thermal energy. The energy can be transported or stored in the form of photons, for example.

An "object" is a component of a medium, i.e. a constituent part, or a distinct element, of a working material. An object can be described as a particle, such as a crystal, a dust particle, or an aerosol. An object can also be a molecule, such as an air molecule, a diatomic nitrogen molecule, a water molecule, or a large molecule such as Buckminsterfullerene. Other examples of objects are subatomic particles such as electrons, nuclei, neutrons, or protons. Objects can also be quasiparticles such as holes in a semiconductor. An object can also be a wave, such as a phonon or a photon. An object can also be a collection of smaller objects, as is the case for a molecule.

By default, the "baseline scenario" is a scenario in which the working material is at standard pressure and standard temperature, and otherwise undisturbed. For example, when the working material is air or water, the properties of the working material in the baseline scenario refer to the properties of air or water, respectively, at standard pressure and standard temperature.

In accordance with some embodiments of the invention, a working material is configured in a manner in which the specific heat capacity at constant volume can be modified by the activation of a body force generating apparatus, or "BFGA". The BFGA is configured to cause the average magnitude or direction of a body force per unit mass to change relative to a baseline scenario, where the body force per unit mass is acting on at least a portion of an object for at least a fraction of objects located within a working material. A portion of an object can be a portion of a molecule, such as an individual electron, or an individual atom, or an individual nucleus of a molecule.

Consider the following illustrative example. In a subset of embodiments of the invention, the BFGA is configured to apply a body force per unit mass on at least a portion of an object. For example, the BFGA can be configured to generate a magnetic field, and the individual objects in a working material can feature a net magnetic dipole. As a result of the external magnetic field applied to the working material by the BFGA in this example, the magnetic dipoles of the objects in the working material can experience a net magnetic moment, and, in a subset of embodiments, such as embodiments in which the magnetic field is not uniform, a net magnetic force. Note that a magnetic moment can be generated by a magnetic force which acts on a portion of the objects, e.g. the electrons or nuclei a molecule, where the line of action of the force does not pass through the center of mass of the molecule. In general, therefore, a magnetic force acts on at least a portion of the object as a result of the action of the BFGA. By modifying the strength and topography of the external magnetic field, the BFGA can modify the body force per unit mass acting on an object in the working material. Unless otherwise specified, the term "external magnetic field" used herein refers to any magnetic field external to an object, or external to a portion of an object. As such, an external magnetic field can also be generated by neighboring objects in a working material, or neighboring portions of an object, which are magnetized. For example, an external magnetic field acting on an electron spin in a working material can arise from the magnetic field produced by neighboring electron spins in the working material. This scenario is described in the Ising model, for instance. An external magnetic field acting on an electron spin can also arise from a permanent magnet, or a current flowing through a normally conducting or a superconducting wire, where the wire or the permanent magnet can be located outside of the working material in the vicinity of the working material, or embedded within the working material. The latter form of external field, i.e. a field generated by magnetic field generating apparatuses located outside of a working material, or embedded within a working material, is referred to as an "additional field". The former form of external field, i.e. the field generated by neighboring objects, or portions of objects, in the working material, is referred to as an "intrinsic field". Note that an additional field can induce an intrinsic field, or modify the magnitude or magnetic field strength of an intrinsic field. For example, an additional magnetic field can induce, or modify the strength of, an intrinsic magnetic field within a working material, which modifies the magnitude of the total external magnetic field perceived by an individual object in a working material, or modify the average magnitude of the body force per unit mass experienced by an object. The induction or the modification of the strength of an intrinsic magnetic field can occur paramagnetically, ferromagnetically, or diamagnetically, for example, and can be facilitated by the activation of a BFGA, for instance.

In other embodiments, the BFGA itself need not apply a force per unit mass on an object. For example, the activation of the BFGA can comprise the ionization of at least one object within a medium, which results in a modification in the average charge carried by said object, and a modification of the average magnitude of the interatomic forces acting on said object and adjacent objects. In this example the activation or action of the BFGA comprises the modification of the properties of the environment of an individual object, and/or the modification of the properties of an individual object, which results in a modification of the body force per unit mass experienced by an individual object. Analogous to the aforementioned additional magnetic field and intrinsic magnetic field acting on a magnetic dipole, the activation of a BFGA can generate or modify an additional electric field or an intrinsic electric field acting on an electrically charged or electrically polarized object. In this example, the application of an additional electric field by a BFGA can positively or negatively ionize objects, which in turn can modify the intrinsic electric field perceived by an object, or modify the average magnitude of the body force per unit mass experienced by an object. As discussed below, a body force per unit mass can be generated or modified by the activation of a BFGA in a wide variety of ways.

The BFGA is configured to modify the macroscopic thermodynamic properties of the working material, such as the specific heat capacity of the working material. The specific heat capacity can refer to the specific heat capacity at constant volume, or the specific heat capacity at constant pressure, or the ratio of specific heat capacities, for example. The ratio of the specific heat capacities is the ratio of the specific heat capacity at constant pressure to the specific heat capacity at constant volume. The specific heat capacity of a working material, such as the specific heat capacity at constant volume, is a function of the number of excited degrees of freedom, or "EDOF", as well as the degree of excitation, or "DE", of each degree of freedom. By changing the average magnitude or direction of a body force per unit mass acting on at least a portion of at least one object in a working material, the activation of the BFGA can be configured to modify the number of EDOF of at least one object in a working material, or the DE of at least one DOF of at least one object in a working material. In some embodiments, the modification is configured to increase the number of EDOF. In other embodiments, the modification is configured to reduce the number of EDOF. In some embodiments, the modification is configured to modify the DE of a DOF, where the modification can be an increase or decrease in the DE. The invention applies to any medium or working material which can be considered to comprise distinct objects, where the number of EDOF, or the degree of excitation of at least one EDOF, of at least one object within the working material can be modified by an EDOF modification apparatus, or by the activation or deactivation of a BFGA.

An excited degree of freedom, or "EDOF", is a degree of freedom of an object of a medium or working material which cannot be considered to have been frozen out, as described by quantum mechanics, for instance. For example, a diatomic oxygen molecule at room temperature can be considered to have five EDOF, comprising three EDOF associated with the translational kinetic energy of the motion of the center of mass of the molecule in the three directions of a Cartesian inertial frame, and two EDOF associated with the rotational kinetic energy of the rotation of the molecule about the two axes perpendicular to the long axis of the molecule and to each other. Note that the other DOF can be considered to be frozen out at room temperature in this scenario. These frozen DOF comprise the two DOF associated with the vibrational motion of the two atoms relative to each other in the interatomic potential, namely the translational kinetic DOF and the potential DOF. One can define a potential as the integral of the value of a body force per unit mass over a displacement relative to a specified reference point. Another frozen DOF is the rotational kinetic DOF associated with the rotation about the long axis of the molecule. This is a consequence of the allowed values of the energy associated with a DOF being quantized. An increase in the energy difference between adjacent energy states of a given DOF, or a reduction in the temperature of an object, can reduce the number of energy states accessible to an object within a given DOF, which can reduce the portion of the average energy of an object which is associated with the DOF, i.e. reduce the specific heat capacity of a DOF.

The temperature at which the expected energy associated with a DOF is non-negligible is denoted the "transition temperature" herein. At temperatures above the transition temperature of a specified DOF, the DOF can be considered to be an EDOF. Note that the expected energy of an object in a particular DOF increases gradually as the temperature of the medium is increased gradually beyond the transition temperature. At sufficiently large temperatures above the transition temperature, the expected energy of an object in a particular DOF approaches the energy predicted by the equipartition theorem. Thus, the "degree of excitation", or "DE", can be quantified in terms of the ratio of the actual expected energy of an object in a particular DOF at a particular temperature to the expected thermal energy associated with this DOF as predicted by the equipartition theorem. By default, as used herein, the transition temperature corresponds to the temperature at which the degree of excitation is 0.01. To summarize, as the temperature is increased from zero to the transition temperature of a given DOF, the DOF is considered to be "frozen out", as used herein. As the temperature is increased further to levels above the transition temperature, the degree of excitation of said DOF increases gradually from zero to a value which lies between zero and unity, and the DOF is considered to be an EDOF. As the temperature is increased further, the degree of excitation approaches unity, and the average energy in the EDOF approaches the energy predicted by the equipartition theorem for said DOF. Note that the equipartition theorem is a theory from classical physics.

Consider the aforementioned example in which the objects comprise permanent or induced magnetic dipoles, and in which the activation of the BFGA comprises a modification of the strength of the magnetic field within a working material. For simplicity, consider the case in which the externally applied field is substantially uniform in magnitude and direction throughout the working material. In general, and in other embodiments, the field strength and direction need not be uniform, provided that the field strength is of sufficient magnitude to achieve a desired DE of a given DOF. In this example, consider the working material to be a diatomic gas, such as oxygen. As mentioned, a diatomic gas at room temperature comprises approximately 5 EDOF, associated with three translational kinetic DOF, and two rotational kinetic DOF, where the rotation is about two axes perpendicular to the long axis of the molecule, and to each other. An object is a dioxygen molecule in this example.

In this case, an externally applied magnetic field can produce a moment about the center of mass of a molecule for which the magnetic dipole axis, or the polarization axis, or the net magnetic moment vector, or the net spin of an object, is not aligned with the magnetic field lines. This moment is produced by the body forces per unit mass acting on portions of the molecule, such as electrons and portions of electrons, at locations and orientations which result in the lines of action of the body forces not being coincident. Due to the moment acting on a molecule with a dipole axis not aligned with the externally applied field, a rotation of the dipole axis can be associated with work being done against or by the externally applied field, which can change the potential energy of the molecule. This rotation can be expressed in terms of a rotation about two axes perpendicular to each other and the dipole axis. Thus the externally applied electric or magnetic fields have added two vibrational modes to the DOF of the molecule. In effect, the BFGA is configured to excite two additional rotational potential DOF. The DE of these additional rotational potential DOF is a function of the geometry of the molecule and the temperature or average energy of the molecule. For simplicity, consider the hypothetical scenario in which the magnetic dipole axis comprises a substantial component parallel to the long axis of the molecule. In this case, the two existing rotational kinetic EDOF of the molecule, corresponding to a rotation about two axes perpendicular to the long axis of the molecule and to each other, are coincident with the two additional rotational potential DOF generated by the magnetic field applied externally by the BFGA. In some embodiments, the strength of the externally applied field can be configured in a manner in which the DE of two additional rotational potential DOF is increased to a value greater than the excitation threshold. In other words, the transition temperature of the two rotational potential DOF can be artificially reduced to a value below the current temperature of the working material. The magnetic field produced by the activation of the BFGA can be regulated to modify the DE of the additional rotational potential DOF in a manner in which the additional rotational potential DOF is excited, i.e. turned into an EDOF. For instance, as the magnetic field strength is increased from zero to a non-zero value, the activation of the BFGA can result in an increase of the total number of EDOF of the working material from 5 in the baseline scenario to 7. This can increase the specific heat capacity at constant volume and the specific heat capacity at constant pressure of a working material, and reduce the ratio of specific heat capacities.

In the hypothetical scenario in which the magnetic dipole axis comprises a substantial component perpendicular to the long axis of the molecule, the one of the two additional rotational potential DOF is parallel to the long axis of the molecule, and the other additional rotational potential DOF is perpendicular to the long axis of the molecule and to the dipole axis. Since the rotational kinetic DOF parallel to the long axis of the molecule is in a frozen out state in this example, the corresponding additional rotational potential DOF is also in a frozen out state. In this scenario, as the magnetic field strength is increased from zero to a non-zero value, the activation of the BFGA can be employed to increase the total number of EDOF of the working material from 5 in the baseline scenario to 6, for example.

For some embodiments, an externally applied magnetic field can also be employed to modify the DE of an existing DOF or EDOF. In continuation of the aforementioned example, consider a scenario in which the activation of the BFGA is configured in a manner in which the magnetic field strength within the working material is increased further, i.e. beyond the level at which the additional rotational potential DOF are excited, i.e. EDOF. When the magnetic field strength is sufficiently strong, the number of energy states available to, or reachable by, an object of a given average energy in the working material is reduced, where the energy states are in the affected rotational DOF, i.e. the DOF which are affected by the external magnetic field. The reduction in the number of energy levels available to the object can be considered to be due to an increase in the stiffness, or an increase in the spring constant, or an increase in the natural frequency, of the object in the affected DOF in a simplified model. In this simplified model the object in the affected rotational potential and corresponding kinetic DOF is treated as a rotational simple harmonic oscillator. In this model, the magnitude of the difference in energy between adjacent energy levels is proportional to the natural frequency, which in turn is proportional to the square root of the spring constant. For a given average total energy of an object, said increase in the magnitude of the energy difference between adjacent energy levels results in a reduction in the average number of energy levels occupied by, or available to, or reachable by, the object in the given DOF. This reduces the average energy of said object in the given DOF, which reduces the fraction of the total average energy of the object which is stored in, or associated with, the given DOF. An increase in the field strength of an externally applied magnetic field can thus reduce the degree of excitation of affected DOF, and, when the magnetic field is sufficiently strong, result in the freezing out of affected DOF. This can increase the transition temperature of an affected DOF, where the transition temperature can be below or above the temperature of the working material.

In the aforementioned example of an external magnetic field applied to a diatomic gas in which the magnetic dipole moment of the objects is parallel to the long axis. As mentioned, the magnetic field can increase the total number of EDOF of the working material from 5 in the baseline scenario to 7. When the magnetic field is increased even further, however, the DE of the two additional rotational potential DOF is reduced, which also reduces the DE of the corresponding rotational kinetic DOF. The reduction in the DE of an affected DOF can result in a reduction in the specific heat capacity at constant volume and constant pressure, and increase the ratio of specific heat capacities, ceteris paribus. As the magnetic field is increased further, the DE of the EDOF can be reduced to such an extent, that the total number of EDOF of the working material can be reduced from 7 to 3 due to the freezing out of the two additional rotational potential DOF and the two corresponding rotational kinetic DOF.

In another example, consider a working material which is a solid. The specific heat capacity of a solid can be considered to comprise a phonon contribution, an electronic contribution, a magnetic contribution, and a nuclear contribution. The phonon contribution is due to the lattice vibrations of the atoms in a solid. In a typical solid working material, the total number of DOF of objects, i.e. atoms or molecules in the solid, comprise three translational kinetic DOF and three associated translational potential DOF. The potential DOF arise from the interatomic or intermolecular forces acting between neighboring atoms or molecules of the solid working material. At sufficiently large temperatures, all six DOF are typically in an excited state. As the temperature is reduced to zero, the DE of these DOF gradually decreases to a value close to zero. The heat capacity of the nuclei, which can also comprise translational or rotational kinetic DOF, as well as translational or rotational potential DOF, also contributes to the overall heat capacity of a solid in the form of the aforementioned nuclear contribution. The heat capacity of electrons in a working material also contributes to the overall heat capacity of a solid. A portion of the electronic contribution to the heat capacity is described by Fermi-Dirac statistics, as illustrated in the Sommerfeld model, in which the heat capacity of electrons is approximately linear in temperature. The magnetic contribution to the heat capacity of a working material can comprise electron spins, electron orbital angular momentum, or the spins of atomic nuclei, for example. For example, consider ferromagnetic materials. These materials are ferromagnetic below the Curie temperature and paramagnetic above the Curie temperature. In such materials, the magnetic contribution to the heat capacity typically comprises two types of heat capacity. One type is the magnetic heat capacity of spin waves, which comprise magnons. This contribution to the heat capacity is non-negligible in the ferromagnetic regime, and generally decreases with decreasing temperature. Another type is the magnetic heat capacity due to individual spin DOF of magnetic dipoles, such as the spins of unpaired electrons. This contribution to the heat capacity can be approximated by the Ising model. In this model, the specific heat capacity of the objects is typically symmetric about the Curie temperature, and increases at an increasing rate with an increase in temperature below the Curie temperature, and decreases at a decreasing rate with an increase in temperature above the Curie temperature. As a result of the temperature dependence of these two types of magnetic specific heat capacity, the portion of the specific heat capacity which is associated with the magnetic spin DOF of objects in a ferromagnetic material is typically the largest at the Curie temperature. In some embodiments, the average operating temperature of a working material during nominal operations is in the vicinity of the average Curie temperature of the working material. In some embodiments average operating temperature is within 20% of the average Curie temperature. In other embodiments, the average operating temperature can be at any temperature relative to the Curie temperature of the working material, provided that the activation of a BFGA can result in a modification of the specific heat capacity at constant volume or constant pressure during nominal operations. Note that the Curie temperature is a function of pressure, and typically increases with increasing pressure. In some embodiments, the average operating temperature is lower than the temperature of the outside environment, such as outside environment 414. The outside environment can be the atmosphere of earth, for example. For example, the temperature of the outside environment can be 300 degrees Kelvin during nominal operation of one embodiment of the invention. In order to achieve a desired rate of heat to flow from the outside environment to the working material, the average temperature of the working material can be 200 degrees Kelvin. In this case, for some embodiments, the working material can comprise a ferromagnetic material for which the Curie temperature is between 160 and 240 degrees Kelvin, for example. One such material is Terbium with a Curie temperature of approximately 219 degrees Kelvin, for instance.

Note that the Curie temperature of a working material can be modified by doping and by an externally applied pressure, as mentioned. Thus, the Curie temperature of a working material can be modified to approximately match the average operating temperature of the working material, such that the component of the magnetic contribution to the specific heat capacity of the working material which can be modified by the activation of a BFGA is maximized. In other words, the Curie temperature can be specially configured by an external pressure bias, or by other mechanisms such as doping, in order to maximize the change in the specific heat capacity of the working material which can be facilitated by the activation of a BFGA. The pressure bias can be applied by the actuating apparatus, such as actuating apparatus 403, or by a separate actuating apparatus which is configured to modify the average pressure of the working material. The pressure bias can also be applied by the casing of the working material, such as casing apparatus 410. The pressure bias can be applied during the manufacturing process, for example. The casing can be considered to be pre-stressed or under an average stress during nominal operations in this case.

Although the magnetic component of the specific heat capacity is typically large at a phase transition, such as the transition between ferromagnetism and paramagnetism, the magnetic component is also typically non-negligible at temperatures above and below the Curie temperature. Therefore it is typically not essential that the average operating temperature of a working material be in close proximity to the average Curie temperature of the working material during nominal operations.

Note that the specific heat capacity of a working material need not comprise a non-negligible magnetic component at any temperature in the absence of a magnetic field. As mentioned, the modification of the activation level of the BFGA can induce a magnetic component in the specific heat capacity of the working material. In other words, a BFGA can contribute a magnetic component to the total heat specific heat capacity of a working material. A sufficiently strong magnetic field experienced by an object with a magnetic dipole in the working material can also modify non-magnetic contributions to the specific heat capacity of a working material. For instance, a sufficiently strong magnetic field can reduce the DE of rotational kinetic DOF of an object, as previously discussed.

Note that the selection of a suitable working materials for a given application comprises the theoretical or experimental evaluation of the performance of the material in that application, which is a function of a large number of material properties, such as the magnitude of the difference in the specific heat capacity at constant volume due to the activation of a BFGA during nominal operations. The selection of a suitable working material is not limited to, and need not comprise, the evaluation of the Curie temperature of a material. Similarly, the magnitude and sign of the magnetocaloric effect of a material at a given temperature is only a rough indication of the suitability of a working material for a specified application.

In this example, consider an embodiment in which the working material is a solid, a substantial portion of the heat capacity of which is provided by the magnetic spin of the objects, i.e. electrons, nuclei, and electron orbits. An example of such materials are ferromagnetic or paramagnetic materials such as iron, cobalt, or nickel. Such materials are particularly well suited for the modification of the specific heat capacities by the application or modification of an external magnetic field via the activation of a BFGA. As described in the previous paragraphs, the application of an external magnetic field can increase the DE of rotational potential DOF of magnetic dipoles, such as electron spins, for instance. When the external magnetic field strength is sufficiently strong, the external magnetic field can also reduce the DE of rotational potential DOF and any associated rotational kinetic DOF of objects, such as electrons, which feature a magnetic dipole. As the magnetic field is increased further, this can lead to the freezing out of affected DOF of these magnetic objects. As mentioned, the aforementioned freezing out of affected DOF by the application of a sufficiently strong magnetic field can lead to a reduction in the specific heat capacity at constant volume and constant pressure, and increase the ratio of specific heat capacities, ceteris paribus.

Note that, in general, the effect of an application of an external magnetic field need not be limited to rotational kinetic and potential DOF, but can also apply to other DOF, such as translational kinetic DOF of objects, such as electrons. The latter can be affected in scenarios in which the electron orbital angular momentum is affected by an externally applied magnetic field, as can be the case in diamagnetic materials, for example. In general, the activation of a BFGA can be employed in a subset of embodiments of the invention in order to modify the DE of at least one DOF of an object. The activation of the BFGA can comprise the modification of an intrinsic or additional magnetic field, which can facilitate the modification of the average magnitude or direction of a magnetic body force per unit mass acting on an object, which in turn can modify the DE of affected DOF, which can be employed to modify the magnetic component of the specific heat capacity of a working material, and thus modify the total specific heat capacity of a working material.

An example of the aforementioned reduction in the degree of excitation of DOF of objects in a working material as a result of a sufficiently strong externally applied magnetic field is also known as the magnetocaloric effect. This effect is employed in adiabatic demagnetization refrigeration, for example. As used herein, the "magnetocaloric effect" is used to refer to a modification of the specific heat capacity at constant volume of a working material as a result of the modification of a magnetic field within a working material, where the modification can refer to an increase or a decrease in specific heat capacity at constant volume as the magnetic field strength within the working material is increased. A positive signed magnetocaloric effect, as used herein, refers to a reduction in the specific heat capacity at constant volume associated with an increase in the magnetic field strength within the working material. Correspondingly, a negatively signed magnetocaloric effect, as used herein, refers to an increase in the specific heat capacity at constant volume associated with an increase in the magnetic field strength within the working material. Note that the magnetocaloric effect, as used in the literature, is typically associated with an effect which herein is referred to as a positively signed magnetocaloric effect.

A wide variety of working materials can be employed in embodiments of the invention in which the specific heat capacity of the working material is modified magnetically. As mentioned, the working material can comprise paramagnetic or ferromagnetic materials, as well as diamagnetic materials or ferrimagnetic materials. In general, any material in which the total or combined specific heat capacity comprises a magnetic contribution or a magnetic component can be employed as a working material or a component thereof by a subset of embodiments of the invention. Some materials in which the specific heat capacity comprises a large magnetic component are known in the field of magnetic refrigeration. For example, $Gd_5Si_2Ge_2$ as well as other materials such as $PrNi_5$ are known to exhibit a magnetocaloric effect, as described by https://en.wikipedia.org/wiki/Magnetic_refrigeration, accessed Jan. 20, 2019. As mentioned, ferromagnetic materials such as iron, cobalt, nickel, or gadolinium are also suitable working materials. Paramagnetic materials such as lithium, sodium, aluminium, gaseous and liquid oxygen, and ferromagnetic materials above the Curie temperature can also be employed as working materials. In the presence of a sufficiently strong magnetic field generating apparatus, diamagnetic materials such as water, graphite, nitrogen or carbon dioxide can also be employed as working materials.

Note that a working material need not be a solid, as in the preceding example, but can also be a fluid such as a liquid or a gas. For example, the working material can comprise gaseous lithium, or oxygen. In some embodiments, the working material can comprise an active material and a passive material. The active material is by definition a material of which the specific heat capacity can be modified by the activation of a BFGA. The passive material is a material which need not experience a change in the specific heat capacity by the activation of a BFGA. The active material can be embedded in the passive material. For instance, the active material can be a small particle, a dust particle, an aerosol, or a crystal. In a subset of passive materials, the active material can also be dissolved in the passive material. In some embodiments the active material can be iron or gadolinium, and the passive material can be air, water, or a hydrocarbon, such as oil, for example.

In some embodiments, solid particles, such as dust particles or aerosols, can be suspended in a liquid. The working material comprise a colloid, for example. In some embodiments, solid particles or liquid particles can be suspended in a gas.

In some embodiments, the active material can be bonded to other materials, such as ligands, in order to maintain a separation between separate objects of the active material. This can prevent the atoms or molecules of the active material from bonding to each other, and thus separate themselves from the passive material. For instance, this can prevent the iron atoms from forming a solid, and thus become separated from the liquid or gaseous passive material. Thus a desired phase of the active material can be maintained relative to the reference scenario in which the active material is not bonded to ligands with everything else being constant. A desired phase can be a fluid phase, for example. A working material which is a fluid can be advantageous to a working material which is a solid in some embodiments. For example, the rate of heat transfer between the working material and a second material, such as an outside reservoir, can be improved in embodiments employing forced convection. In such embodiments, the working material can be pumped from an interior chamber, such as interior chamber 401, through a separate heat exchanger between stations 356 and 352 on the thermodynamic cycle shown in FIG. 1. The pumping of the working material through the heat exchanger in forced convection, the use of a specially configured heat exchanger, as well as the use of an otherwise solid active material of desirable magnetocaloric properties, can improve the rate of heat transfer between an outside environment 414 and the working material. This in turn can increase the power produced by such an embodiment compared to an embodiment in which the working material only consists of a solid active material, ceteris paribus.

The use of ligands to maintain the separation between an atom or molecule of an active material and the passive material, or adjacent atoms or molecules of an active material, can also increase the number of DOF available to the objects of the active material. For example, when compared to the baseline scenario of the active material, the bonding of ligands to the active material can provide the active material with additional rotational kinetic and potential DOF associated with the rotation of the atom or molecule and the orientation of a permanent or induced magnetic dipole of the atom or molecule in a magnetic field. This can further increase the magnitude of the change of the specific heat capacity of a working material in response to an activation of a BFGA.

In addition to the aforementioned benefits of a working material which is in a fluid phase, there can be benefits to a working material which is in a gaseous phase. A working material in a gaseous phase typically features a larger compressibility, which can improve the efficacy or the efficiency of the actuation apparatus, such as actuating apparatuses 403. The increased compressibility can increase the stroke length and reduce the average and peak magnitude of the force on piston 404 during nominal operations, for instance. This can reduce losses due to structural deformation, reduce the amount of bulk material, and reduce wear and tear on the actuation apparatus and other affected components. This can also increase the number of suitable actuator types which can be employed in an embodiment of the invention. The increased selection of suitable actuator types can increase the efficiency of the actuation apparatus, and reduce its complexity and cost.

FIGS. 3A-H show a cross-sectional view of one embodiment of the invention at different points in time for an example method of operation.

In FIGS. 3A-H, interior region 401 comprising a working material. As mentioned, a working material can comprise a gas. A working material can also comprise a liquid. A working material can also comprise a solid. A working material can also comprise a solid embedded in a fluid, such as solid crystals suspended in a gas or in a liquid, or atoms of an otherwise solid material bonded to ligands and thus suspended in a fluid.

In FIGS. 3A-H the working material comprises objects which carry a net magnetic dipole during at least a portion of a thermodynamic cycle, such as the thermodynamic cycle shown in FIG. 1, during nominal operations. The magnetic dipole of an object such as a molecule can comprise contributions from the orbital angular momentum of electrons, the spin of electrons, or the spin or angular momentum of nuclei, for example.

The magnetic dipole of an object can be a permanent dipole, for instance. A permanent magnetic dipole can arise from the alignment of the spins of the electrons in a molecule, as exemplified by the molecules in paramagnetic materials, such as gaseous or liquid oxygen molecules, by the molecules in ferromagnetic materials, such as iron, cobalt, or nickel molecules. Note that ferromagnetic materials become paramagnetic above the Curie temperature. A permanent magnetic dipole can also arise from the orbital angular momentum of electrons, as exemplified by singlet oxygen, for which all electron spins are paired.

The magnetic dipole of an object can also be an induced dipole, which is induced by an externally applied magnetic field. An induced magnetic dipole can arise from the modification of the orbital angular momentum of electrons by the externally applied magnetic field, as exemplified by the molecules in diamagnetic materials, such as silicon or germanium. An induced magnetic dipole can also arise from the modification of the alignment of spins of the electrons in a molecule by the externally applied magnetic field. Note that the net magnetic dipole of an object such as a molecule can comprise both permanent and induced components.

In FIGS. 3A-H the specific heat capacity at constant volume of the working material comprises a non-negligible magnetic component. In general, the working material is configured in a manner in which the magnitude of the specific heat capacity at constant volume of the working material is a function of the level of activation of a BFGA during at least a portion of the thermodynamic cycle during nominal operations. In other words, the modification of the level of activation of a BFGA can be employed to modify the specific heat capacity at constant volume of the working material during at least a portion of the thermodynamic cycle during nominal operations.

For simplicity and clarity of description the working material in FIGS. 3A-H and FIG. 1 can comprise a paramagnetic gas such air or oxygen. The gas is treated as an ideal gas for simplicity. The principles of the invention described in the context of FIG. 1 and FIGS. 3A-H also apply to embodiments in which the working material is a liquid or a solid. Such embodiments are within the scope of the invention and will not be described in further detail. Note that, for other working materials the magnetocaloric properties of the working material can be more pronounced compared to the working materials being described in the context of FIGS. 3A-H and FIG. 1. In other words, in practice, other working materials can be better suited for a given application than the working materials described in the context of the examples shown in FIGS. 3A-H and FIG. 1, since these examples are intended to illustrate the principles of operation. Suitability can be a function of the degree to which the modification of the level of activation of a BFGA can be employed to modify the specific heat capacity at constant volume of the working material during at least a portion of the thermodynamic cycle during nominal operations, for example. Other candidates for working materials have been described in the previous paragraphs, or can be readily selected for a given application by those with ordinary skill in the art.

In FIGS. 3A-H the interior region 401 with interior surface 402 is cylindrical in shape, with a circular cross-section when viewed along the horizontal direction, which is parallel to the edge at the bottom of the page. This direction is also referred to as the X-direction. The Y-direction is in the plane of the page and perpendicular to the X-direction. In other embodiments the cross-sectional geometry of the interior region can be elliptical. In other embodiments, the cross-sectional geometry of interior region can be annular or ring-shaped. In other embodiments the cross-sectional geometry can be square or rectangular, for example. In some such embodiments, the rectangular or square cross-sectional geometry features rounded corners.

A casing apparatus 410 is configured to provide structural support to the interior chamber 401 and the remainder of the embodiment 400. The bulk material 411 of casing apparatus 410 can comprise a metal such as aluminium, or iron. The bulk material 411 can also comprise composite materials such as fiberglass or carbon fiber.

A compression apparatus is configured to do be able to do work on the working material. In the simplified embodiment 400 illustrated in FIGS. 3A-H, the compression apparatus is embodied by an actuating apparatus 403 comprising a piston head 404 and a piston shaft 407, both of which have a circular cross-section when viewed along the X-direction. In other embodiments, the compression apparatus can comprise turbomachinery such an axial compressor or centrifugal compressor. In some embodiments, the compression apparatus can also comprise a duct configured to decelerate and compress the free stream fluid flow.

An expansion apparatus is configured to allow the working material to do work on the expansion apparatus. In the simplified example illustrated in FIGS. 3A-H, the expansion apparatus is also embodied by actuating apparatus 403. In other embodiments, the expansion apparatus can comprise turbomachinery such an axial turbine or centrifugal turbine. In some embodiments, the expansion apparatus can also comprise a duct configured to accelerate and expand the working material.

Actuating apparatus 403 also comprises an actuator 409, which is configured to do work on the piston shaft 407, and allow the piston shaft 407 to do work on the actuator.

There are a wide variety of actuator types and architectures which can facilitate the relative motion between the piston and the casing apparatus 410. For example, the actuating apparatus 403 can be a hydraulic actuator. The pumping of the hydraulic fluid can be provided by an electric pump, for instance. Such actuators are employed in the actuation of aircraft control surfaces, for example. The pump can also be configured in a manner in which the expansion of the working material and the corresponding retraction of the piston 404 and piston shat 407 into slot 408 and the corresponding displacement of the hydraulic fluid can do mechanical work on the pump. In other words, the pump can be configured to be operated as a turbine in some embodiments. The pump can be of a reciprocating piston type, for example, where the crankshaft is driven by a conventional rotational electric motor, and where the fluid to be compressed or expanded is the hydraulic fluid. When the pump is being operated as a turbine, the hydraulic fluid can do work on the crankshaft of the pump, and thus deliver mechanical power to the electric motor. In this operating mode, the electric motor can be operated as an electric generator, converting mechanical work done by the hydraulic fluid on the pump into electrical energy. Thus the actuating apparatus 403 can be configured to do work on the working material, and allow the working material to do work on the actuating apparatus 403. In other embodiments, the aforementioned pump of hydraulic fluid can comprise a linear electric motor as opposed to a rotary electric motor, where the linear motor is configured to induce translating motion of the shaft of a hydraulic piston. The linear motor can be configured to both do work on the shaft, and allow the shaft to do work on the linear motor. A wide variety of other configurations or types of hydraulic actuator can be employed. For example, the hydraulic pump can be a rotary pump, such as a cycloidal gerotor pump, as opposed to a reciprocating piston pump.

In other embodiments, an electric actuator can be employed. For example, a rotary electric motor can be configured to drive a jackscrew, which in turn can induce a translating motion of piston head 404 in the X-direction in a direct drive configuration. The electric motor can be configured to be able to do mechanical work on the piston 404 and thereby on the working material. The electric motor can be configured to be able to allow the piston and thereby on the working material to do work on the electric motor. In this configuration, the electric motor can be considered to operate as an electric generator, which converts mechanical work into electrical energy. This electrical energy can be stored in an electrical storage unit, such as a battery, a capacitor, or an inductor. The electrical energy can also be delivered to an electrical circuit, such as a microchip, a computer, a smartphone, or an antenna. In some such embodiments, a friction brake or a clutch can be employed to prevent the rotation of the screw when the piston is desired to be stationary relative to the casing apparatus 410. In some such embodiments, a torsional spring, such as a spiral spring, can be employed to apply a torque bias on the screw. The bias can be configured in a manner in which the efficiency of the electric motor is maximized. For example, the average torque of the torsional spring can be configured to approximately match the average total torque which needs to be applied to the screw during nominal operations. This can reduce the average magnitude of the torque applied to the screw by the electric motor during translation of the piston 404, which can improve the efficiency of the electric motor during nominal operations. In some embodiments, a rotary electric motor can be mechanically coupled to the shaft 407 of piston 404 via a gear train. The gear train can comprise planetary gears, for example. The gear train can be configured to increase the torque and reduce the angular rate of rotation as the power of the electric motor is delivered to the piston head 404 in some embodiments, such as embodiments in which the stiffness of the working material is large, or the compressibility is low, as can be the case for liquid or solid working materials. In the case in which the working material is compressible, as can be the case for gaseous working materials, the gear train can be configured to reduce the torque and increase the angular rate of rotation throughout the mechanical coupling from the electric motor to shaft 407. The gear train can also be configured to convert the rotary motion of the electric motor into translational motion of shaft 407. This can be accomplished by a rack and pinion gear set, or the rotation of the aforementioned jackscrew, for example.

In another example, a linear electric motor can be employed to do work on shaft 407 in a direct drive configuration. For example, the shaft 407 can comprise permanent magnets in a Halbach array, and actuator 409 can comprise electromagnets, where the electromagnets are configured to induce a magnetic field which translates in the X-direction, resulting in a force on and a translation of shaft 407 and piston head 404 along the X-axis. The electric motor can be configured to be able to do mechanical work on the piston 404 and thereby on the working material. The electric motor can be configured to be able to allow the piston and thereby on the working material to do work on the electric motor. In this configuration, the electric motor can be considered to operate as an electric generator, which converts mechanical work into electrical energy. As in the aforementioned rotary case, a linear spring can be located in slot 408 and configured to apply a force on shaft 407. The linear spring can be configured in a manner in which the average efficiency of the linear electric motor is maximized. For example, the average force applied to shaft 407 by such a linear spring can be approximately equal to the average total force applied by shaft 407 on piston head 404 during nominal operations. This can reduce the average magnitude of the force applied to the shaft 407 by the linear electric motor during translation of the piston 404, which can improve the efficiency of the electric motor during nominal operations.

In some embodiments, the actuating apparatus 403 can comprise a magnetic cored solenoid actuator. For instance, the armature of the solenoidal actuator can be rigidly connected to shaft 407 of piston 404, and be configured to do work on the piston during the movement of the piston in the negative X-direction, and allow the piston to do mechanical work on the armature, where at least a portion of the mechanical work is converted into magnetic energy and subsequently into electrical energy in the electrical windings of the solenoid by a magnetically induced electromotive force.

In other embodiments, the actuating apparatus 403 can employ piezoelectric materials, such as lead zirconate titanate, or PZT, for example. For example, a piezoelectric actuator can be employed in a direct coupling configuration in which the piezoelectric actuator material is in direct contact with the working material. Due to the typically small strains which arise in piezoelectric materials due to the application of an external electric field, a direct drive configuration is suited for a working material with a low compressibility or large stiffness, as can be the case for solid or liquid working materials. In a direct drive configuration, the piezoelectric material is both the actuator 409 and the piston 404. In other words, the piezoelectric material can occupy a portion of the volume enclosed by casing 410, and be configured to expand and contract as a result of an externally applied electric field, and thus do work on the surrounding working material and allow the surrounding working material to do work on the piezoelectric material. Note that, in general, the piezoelectric material can occupy any portion of the volume enclosed by casing 410, i.e. bulk material 411, and can, in general, take any shape within that volume. Note that the stiffness of bulk material 411 needs to be sufficiently large in order to reduce performance losses due to elastic structural deformations of bulk material 411 to acceptable levels. In expanding the piezoelectric material by increasing an externally applied voltage, work can be done on the working material, for example. In this case, electrical energy is converted into mechanical work by the actuation of the piezoelectric material. Similarly, by reducing the voltage applied to the piezoelectric material, the working material can be allowed to do work on the piezoelectric material. In this case, mechanical work is converted into electrical energy. The electrical energy can be delivered to the piezoelectric material and recovered from the piezoelectric material by a suitably configured electrical circuit. Such a circuit can comprise voltage converters, transistors, and capacitors, for example, and such circuits are well known in the field of piezoelectric actuators and piezoelectric energy harvesting, for instance.

In other embodiments, the piezoelectric material need not be employed in a direct coupling configuration. For example, translating or rotating piezoelectric motors can be configured to do work on the working material, and allow the working material to do work on the piezoelectric motors. These motors can be mechanically coupled to the piston 404 in a similar manner as the aforementioned linear and rotating electrical motors, for example. The translational or rotary piezoelectric motors can employ vibrations or resonance effects in order to induce rotation or translation of a shaft, such as shaft 407, or the shaft of a gear train, for example. In another example, piezo stepping motors can induce a rotation or translation of said shaft. In another example, a piezoelectric actuator can be coupled to a piston 404 via mechanical linkages which can be configured to convert a small displacement of a piezoelectric actuator at a large force into a larger displacement of the piston along the X-direction at a smaller force. The mechanical linkages can comprise flexible joints which are configured to deform elastically, or sliding or rotary joints, such as joints comprising ball bearings.

In some embodiments, the actuating apparatus 403 can employ piezomagnetic materials, such as $Fe_2O_3$ or uranium dioxide. In piezomagnetic materials a change in the strain, or a change in shape, of the piezomagnetic material can be generated by a modification of the magnetic field within the material. The piezomagnetic material can be configured to do mechanical work on the working material via the application of a magnetic field to the piezomagnetic material. Similarly, the working material can do work on the piezomagnetic material by deforming the piezomagnetic material. The deformation of the piezomagnetic material can induce a magnetic field, the energy of which can be converted into electrical energy, where the conversion can be performed via an electromagnet, for example. Thus a piezomagnetic material can be operated in similar fashion as a piezoelectric material, as previously described.

In FIGS. 3A-H the BFGA comprises a magnetic field generating apparatus 415 configured to modify the strength of the magnetic field within interior chamber 401. In the depicted embodiment, the magnetic field generating apparatus comprises several circular electrical conductors, or wires, such as wires 416, 417, 419, or 420. The magnetic field generating apparatus 415 can also be described as a solenoidal electromagnet in this simplified embodiment. Each wire, such as wire 417, is a superconducting wire in this embodiment. In other embodiments, the wires can be normally conducting, such as copper wires or silver wires. In such embodiments, the power losses due to electrical resistance of current flow within the wires comprise a thermal component, such as the component due to Joule heating. In some embodiments, at least a portion of the thermal energy generated within the wires due to their electrical resistance can be transferred to the working material within the interior chamber 401, where the transfer of thermal energy can occur via thermal conduction, for example. In this manner, a portion of the thermal energy generated in the wires of the magnetic field generating apparatus can be delivered to the working material, and thus contribute to the total thermal energy delivered to the working material throughout one thermodynamic cycle during nominal operations. When the thermodynamic cycle is configured to convert thermal energy into useful energy, such as electrical or mechanical energy, a portion of the electrical power lost in the wires of the magnetic field generating apparatus can be recovered. In such embodiments it can be advantageous for the portion of the bulk material 411 between the wires, such as wire 416, and the working material inside interior chamber 401, to feature a large thermal conductivity. This can enhance the rate of heat flow from the wires to the working material in interior chamber 401, and thus reduce the rate of heat flow from the wires to the outside environment 414. Thus the fraction of electrical power lost to electrical resistance in the wires, such as wire 417 or wire 420, which can be delivered to the working material and recovered by embodiment 400 can be increased. In some embodiments, such as embodiments in which the magnetic field generating apparatus comprises superconducting electrical conductors, it can be desirable for the temperature of the electrical conductors to be maintained below the superconducting transition temperature, also referred to as the "critical temperature" in this context. In such embodiments, apparatus 400 can be configured in a manner in which the maximum temperature of the working material throughout a thermodynamic cycle during nominal operations is lower than the critical temperature of the superconductors. In some embodiments it is sufficient for the average temperature of the working material throughout a thermodynamic cycle during nominal operations to be lower than the critical temperature. In this manner, the working material and the associated thermodynamic cycle can be configured to maintain the temperature of the superconductor below the critical temperature. The working material can thus be employed as a heat sink or a refrigerator for the electrical conductor. For example, the average temperature of the working material can be 100 degrees Kelvin throughout a thermodynamic cycle during nominal operations, and the electrical conductors can be made of a material such as the bismuth strontium calcium copper oxide, or BSCCO, superconductor Bi-2223, which features a critical temperature of approximately 108 degrees Kelvin, as indicated by https://en.wikipedia.org/wiki/Bismuth_strontium_calcium_copper_oxide, accessed Apr. 8, 2019.

In other embodiments, the magnetic field generating apparatus can comprise permanent magnets. For example, the magnetic field within the working material within the interior chamber 401 can be modified by changing the closest distance of separation between a permanent magnet of the magnetic field generating apparatus and the working material. To that end, a permanent magnet can be translated or rotated in a manner in which said distance of separation can be modified. Consider the following example in which the magnetic field generating apparatus comprises an array of permanent magnets arranged in circumferential fashion around the interior chamber 401. The magnetic field generating apparatus and bulk material 411 are configured in a manner in which magnetic fields of the magnetic field generating apparatus can extend into the working material in interior chamber 401 when desired. For instance, permanent magnets can be arranged in a Halbach array around interior chamber 401. The magnetic field generating apparatus can also comprise an annular slot in which the annular array of permanent magnets can be moved along the X-direction. An actuator can be configured to move the array of permanent magnets through the slot in the positive or negative X-direction. The slot can be of sufficient length, such that the array of permanent magnets can be moved a sufficient distance from the interior chamber 401 such that the strength of the magnetic field within the working material in interior chamber 401 can be modified by a desired amount. For instance, when the magnetic field strength within the working material is desired to be reduced to a minimum, the array of permanent magnets can be moved through the annular slot by the actuator in the positive X-direction, i.e. to the right of the page, to a position corresponding to the maximum attainable distance from the working material inside interior chamber 401. In other embodiments, the permanent magnets can be moved in the negative X-direction. The maximum distance is provided by the size constraints of embodiment 400 along the X-direction, for example. When the magnetic field strength within the working material is desired to be increased to a maximum, the array of permanent magnets can be moved through the annular slot by the actuator in the negative X-direction, to a position immediately adjacent to the interior chamber 401, i.e. to a position coincident with the wires, such as wire 416 or wire 417 or wire 420, of magnetic field generating apparatus 415 shown in FIGS. 3A-H. Thus, by moving the array of permanent magnets relative to the working material in interior chamber 401, the magnetic field strength within the working material can be modified, regulated, and controlled. Compared to normally conducting electromagnets, and for a given and feasible magnetic field strength, the use of permanent magnets can reduce the electrical losses associated with the generation of a magnetic field. Note that, in this comparison, the magnetic field in the electromagnet is generated via current flow through electrical conductors with a non-zero electrical resistivity.

In some embodiments in which the magnetic field generating apparatuses comprise permanent magnets, several identical apparatuses, such as apparatus 400, can be arranged in an array. For example, a first apparatus can be configured in a similar manner to the apparatus shown in FIG. 3A, where the magnetic field generating apparatus comprises an annular array of permanent magnets arranged in an annular slot within bulk material 411 and encompassing the cylindrical interior chamber 401. The aforementioned magnetic field generating apparatus comprising permanent magnets can be considered to take the place of the solenoidal coils or wires, such as wire 417 or wire 420, of the magnetic field generating apparatus 415 shown in FIGS. 3A-H. At least one second apparatus can be configured substantially identically to the first apparatus and can be located immediately adjacent to the first apparatus in the positive X-direction, where the second apparatus is a mirror image of the first apparatus about the YZ-plane, where the plane is at the interface between the second apparatus and the first apparatus. In other words, the actuating apparatus 409 of the first apparatus is located adjacent to the actuating apparatus of the second apparatus. The annular slot comprising the annular array of permanent magnets can extend continuously from the first apparatus through to the second apparatus, allowing the permanent magnet array to be moved by an actuator through the slot from the first apparatus to the second apparatus. The thermodynamic cycles of the first and second apparatuses can be configured to be out of phase by one half period, or by 180 degrees. In this manner, the desired reduction of the magnetic field strength within the interior chamber of the first apparatus and the sliding of the permanent magnet array along the positive X-direction away from the interior chamber of the first apparatus and towards the interior chamber of the second apparatus can be coordinated with the desired increase of the magnetic field strength within the interior chamber of the second apparatus. Similarly, a desired decrease in the magnetic field strength in the interior chamber of the second apparatus can in this manner be coordinated to coincide with a desired increase in the magnetic field strength in the interior chamber of the first apparatus. By allowing the permanent magnet array to perform a useful function, i.e. the increase of the magnetic field strength within the interior chamber of the second apparatus, throughout the period of time within a thermodynamic cycle of the first apparatus within which the strength of the magnetic field in the interior chamber of the first apparatus is intended to be reduced or minimized, the power density of an embodiment of the invention, i.e. the combination of the first and second apparatus, can be increased. The power density can refer to the net work done by an embodiment of the invention per unit time and per unit volume of the embodiment.

In some such embodiments, the shaft 407 of the actuator 409 of the first apparatus can be rigidly connected to, and indistinguishable from, the corresponding shaft of the second apparatus. In other words, the actuator 409 can be configured to actuate both the piston head 404 of the first apparatus and the piston head of the second apparatus. Note that the thermodynamic cycles of the first and second apparatus are 180 degrees out of phase, such that a compression of the working material in the interior chamber 401 of the first apparatus can coincide with an expansion of the working material in the interior chamber of the second apparatus, and vice versa. The mechanical coupling between the actuators of the first apparatus and the second apparatus can provide a mechanical bias to the driving elements of the actuators, such as the shaft 407. This bias can perform a similar purpose as the aforementioned mechanical bias provided by the linear and torsional springs, i.e. increase the efficiency of the actuator during nominal operations, and reduce the wear and tear on the actuating elements.

In other such embodiments, the actuator of the first apparatus need not share common actuating components, such as a drive shaft, with an actuator of the second apparatus. This can be the case in which a mechanical coupling of actuating components of an actuator is not possible, as is the case in which piezoelectric actuators are coupled directly to the working material in the interior chambers of the associated first and second apparatuses, for example. In such embodiments, bulk material 411 can form a separating wall between the first apparatus and the second apparatus in order to provide a mechanical ground for the associated actuating apparatuses.

In other embodiments, the array of permanent magnets can be translated relative to the interior chamber 401 of a first apparatus in the Y-direction as opposed to the X-direction. For example, the cross-section of interior region 401 in the X-direction can be rectangular or square in shape. In some embodiments, an array of permanent magnets can be arranged on all four sides. Consider the scenario in which an array of permanent magnets is arranged on each of only two sides of the rectangular cross-section, such as on the sides facing in the positive and negative Y-direction. When a reduction in the magnetic field strength within the interior region 401 is desired, the array of permanent magnets on the side of the casing 410 facing in the positive Y-direction can be moved by an actuator in the positive Y-direction, and the array of permanent magnets on the side of the casing 410 facing in the negative Y-direction can be moved by an actuator in the negative Y-direction. The accompanying increase of the distance of separation between the permanent magnets and the working material in the interior region can reduce the magnetic field strength inside the working material, as desired. Similarly, when an increase in the magnetic field strength within the interior region 401 is desired, the array of permanent magnets on the side of the casing 410 facing in the positive Y-direction can be moved by an actuator in the negative Y-direction, and the array of permanent magnets on the side of the casing 410 facing in the negative Y-direction can be moved by an actuator in the positive Y-direction. The accompanying decrease of the distance of separation between the permanent magnets and the working material in the interior region can increase the magnetic field strength inside the working material, as desired. In this manner the magnetic field generating apparatus can change the location of permanent magnets relative to the working material in an interior region, and thus modify the strength of the magnetic field within the working material.

In FIGS. 3A-H the individual circular electrical conductors, such as wire 416, 417, or 420, are shown in cross-section, and are embedded in bulk material 411. As mentioned, the electrical conductors shown in cross-sectional view in FIGS. 3A-H form a solenoid. In other words, they are electrically connected in series and form an annular spiral around cylindrical interior chamber 401 and the working material contained therein. The magnetic susceptibility of bulk material 411 is configured to allow the majority of the magnetic field lines of the solenoid 415 to pass through the working material in interior chamber 401. For example, the magnetic reluctance of bulk material 411 can be sufficiently large compared to the reluctance of the working material, such that a large fraction of the magnetic field lines pass through the working material. The electrical conductors can be electrically insulated from bulk material 411 by an insulating material such as plastic or glass in the case in which the bulk material 411 is electrically conductive, as is the case for Aluminium. The electrical conductors are electrically insulated from adjacent electrical conductors in similar fashion in order to maintain the solenoidal arrangement of the conductors. In the majority of the working material in interior region 401 the magnetic field lines comprise a substantial component along the X-direction when a current is flowing through the magnetic field generating apparatus 415, as is typically the case for the magnetic field generated by a solenoid. Note that the direction of the magnetic field within the working material is substantially irrelevant to the operation or the performance of the depicted embodiment, provided that the magnetic field strength within the working material is sufficiently large to modify the specific heat capacity of the working material.

An electrical circuit and an electrical power supply is electrically connected to the electrical conductors in the solenoid of magnetic field generating apparatus 415. The power supply can comprise a battery, a capacitor, or an electric generator. The supply of electrical energy to the magnetic field generating apparatus can also be provided by the actuating apparatus of an embodiment of the invention, such as the actuating apparatus 403 of the same embodiment 400 which comprises said magnetic field generating apparatus. When an increase in the magnetic field strength within the working material in the interior region 401 is desired, the electrical circuit connected to the solenoid of the magnetic field generating apparatus 415 can be configured to increase the magnitude of the current flowing through the electrical conductors, such as conductor 416, of the solenoid. This can increase the strength of the magnetic field produced by the solenoid and the magnetic field generating apparatus, and thus increase the strength of the magnetic field within the working material. Similarly, when a decrease in the magnetic field strength within the working material in the interior region 401 is desired, the electrical circuit connected to the solenoid of the magnetic field generating apparatus 415 can be configured to reduce the magnitude of the current flowing through the electrical conductors, such as conductor 416, of the solenoid.

In other embodiments, the magnetic field generating apparatus can comprise an electromagnet comprising electrical conductors wound around a paramagnetic or ferromagnetic material. Such electromagnets are found in conventional brushless DC electric motors, for example. The paramagnetic or ferromagnetic material can be soft iron, for example. The paramagnetic or ferromagnetic material can be employed to greatly amplify the strength of the magnetic field generated by the electromagnet compared to the scenario in which the electromagnet does not contain such materials. In some such embodiments, the ferromagnetic or paramagnetic cores, as well as the electrical conductors wound around these cores, can be configured to generate a magnetic circuit surrounding the interior region 401, where the magnetic circuit can be configured in a similar manner as the magnetic circuit in a Halbach array. In other words, the arrangement of the magnetic poles of permanent magnets in a conventional Halbach array can be replicated by the arrangement of the magnetic poles of the electromagnets comprising solenoids with paramagnetic or ferromagnetic cores. In this fashion, the strength of the magnetic field within the working material can be maximized for a given total magnetic flux in the magnetic circuit. In this manner, the magnetic field can also be contained within outside surface 413 of apparatus 400, or shielded from the outside environment 414, which can reduce interference effects with other electrical devices, such as sensors, located in outside environment 414 in the vicinity of embodiment 400.

The principle of operation of a subset of embodiments is described by the thermodynamic cycle shown in FIG. 1, as well as the configurations of embodiment 400 shown in FIGS. 3A-H.

Figure 3A:
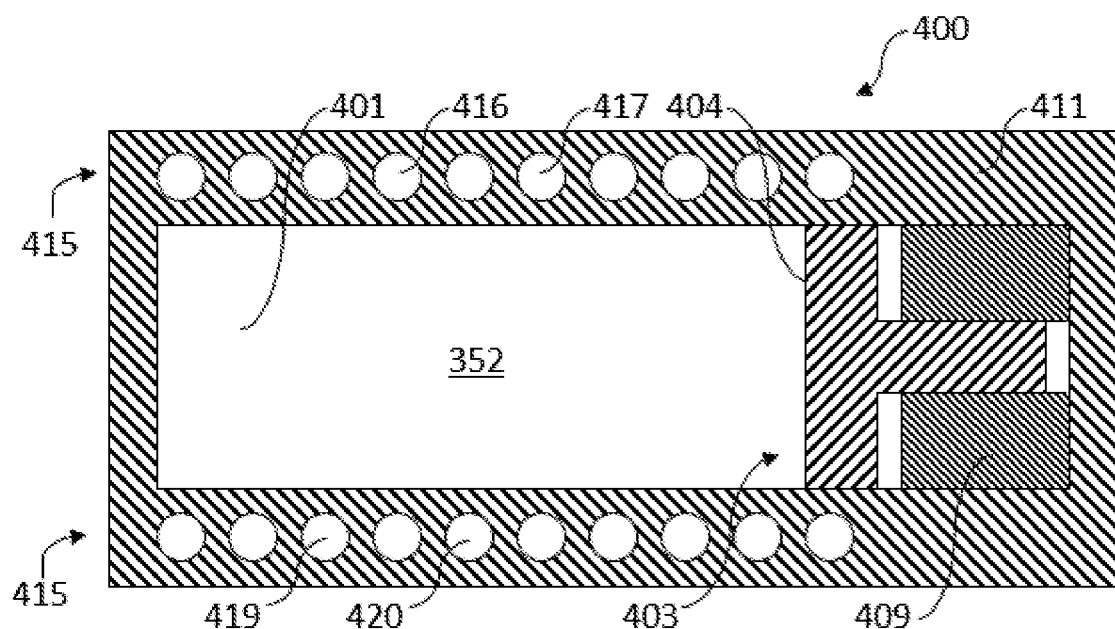
FIGS. 3A-H show a cross-sectional view of another embodiment of the invention at different points in time for an example method of operation.

In FIG. 3A, the thermodynamic state of the working material corresponds to the state of the working material at station 352 in FIG. 1. The actuating apparatus 403 is in a fully retracted position, and the working material is in a state of maximum volume, where the volume is provided by the configuration and the size of the interior region 401. The magnetic field generating apparatus is configured to minimize the strength of the magnetic field within the working material at station 352 in this example. For embodiment 400 shown in FIG. 3A-H, this corresponds to a zero or negligible electrical current flowing through the electrical conductors of the solenoid of the magnetic field generating apparatus 415, resulting in a zero or negligible additional magnetic field strength throughout the working material. This configuration of the magnetic field generating apparatus 415 is also denoted the "OFF" configuration.

Figure 3B:
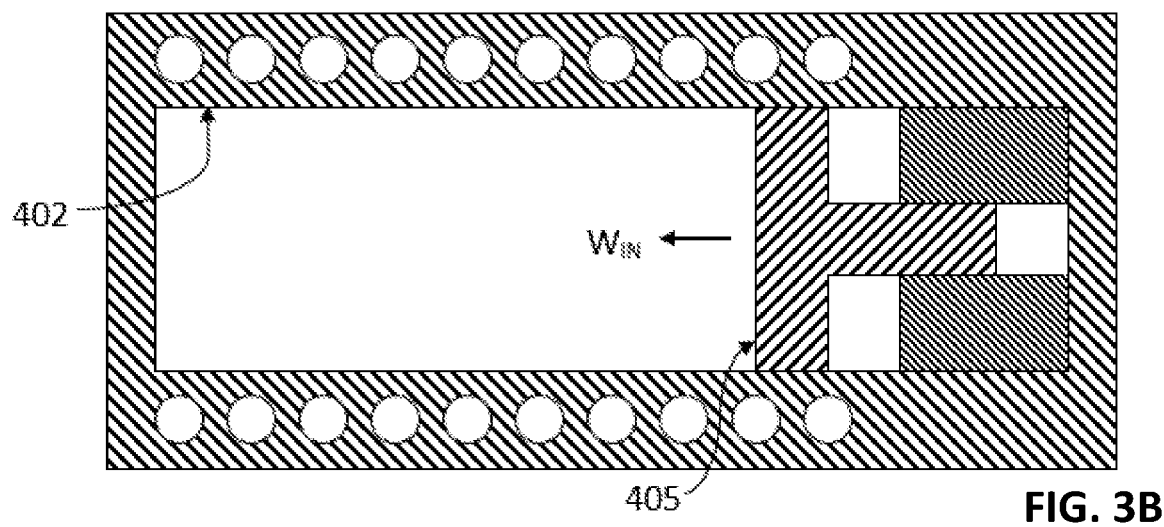

In FIG. 3B, the thermodynamic state of the working material corresponds to the state of the working material between stations 352 and 353 in FIG. 1. Between stations 352 and 353, the working material is being compressed by the actuating apparatus 403, which does mechanical work on the working material, as indicated by the label "WIN" in FIG. 3B. The movement of interior surface 405 of piston 404 reduces the volume of the interior chamber 401 which compresses the working material contained therein. In this particular example, the working material is compressed adiabatically, i.e. without an exchange of heat with the outside environment 414. Throughout this compression, the magnetic field of the magnetic field generating apparatus remains in an OFF configuration. In FIG. 1, the compression of the working material is modeled as the compression of an ideal gas for simplicity. In other embodiments, the compression of the working material can also be an isothermal compression, or an isobaric compression, for example. Note that a compression refers to a reduction in the specific volume of the working material. In some embodiments, the pressure can also reduce during the compression of the working material. In some embodiments, heat can be removed from the working material during the compression, where the heat can be removed via thermal conduction, for example. In other embodiments, heat can be added to the working material during the compression.

Figure 3C:
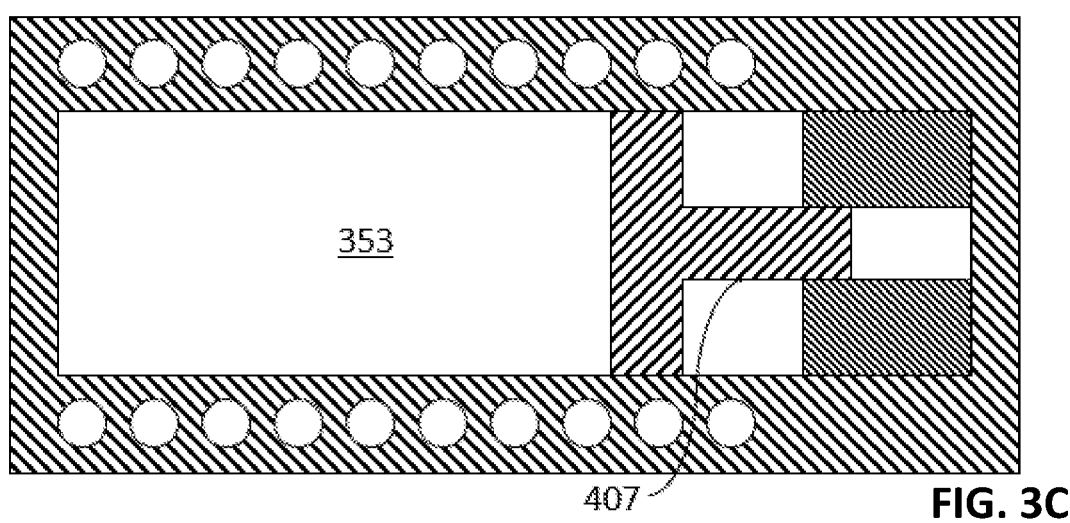

In FIG. 3C, the thermodynamic state of the working material corresponds to the state of the working material at station 353 in FIG. 1. The actuating apparatus 403 is in a fully extended position, and the working material is in a state of minimum volume, where the minimum volume is provided by the stroke length of the actuating apparatus 403 and the maximum volume of the interior region 401. At station 353, the magnetic field of the magnetic field generating apparatus is in an OFF configuration.

Figure 3D:
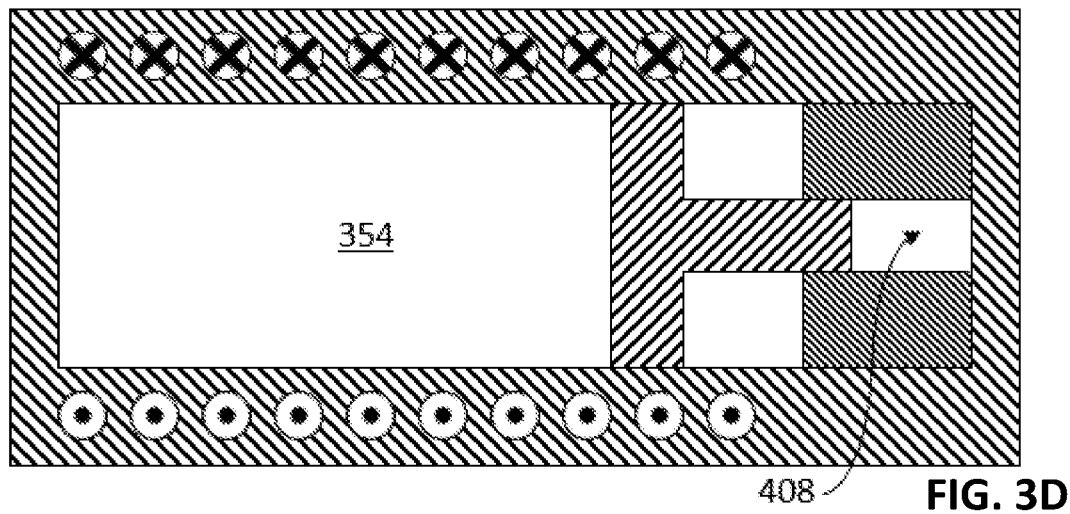

In FIG. 3D, the thermodynamic state of the working material corresponds to the state of the working material at station 354 in FIG. 1. The volume of the working material at state 354 and state 353 is identical in this example. Between station 353 and station 354, the magnetic field generating apparatus is configured to increase the strength of the magnetic field within the working material to a desired value, denoted the "active value", which is greater than zero. For embodiment 400, this corresponds to a non-zero electrical current flowing through the electrical conductors of the solenoid of the magnetic field generating apparatus 415, resulting in a non-zero additional magnetic field strength throughout the working material. This configuration of the magnetic field generating apparatus 415 is also denoted the "ON" configuration. In this example, the magnitude of the electrical current flow, or the strength of the magnetic field within the working material can be considered to be the "activation level" of the BFGA, i.e. of the magnetic field generating apparatus 415 in this case. As indicated, there is an electrical current flowing through the magnetic field generating apparatus 415, where the current flow is into the page through the electrical conductors located in the positive Y-direction of the centroid of the cylindrical interior region 401, and out of the page through the electrical conductors located in the negative Y-direction of the centroid. In other embodiments the current can flow in the other direction. In this example, the increase in the magnetic field strength within the working material between station 353 and station 354 is associated with a positive magnetocaloric effect, resulting in a reduction of the specific heat capacity at constant volume of the working material and a corresponding increase in the temperature and pressure of the working material, as shown in FIG. 1. As previously described, the pairing of a kinetic and potential DOF of an object can be modeled as a harmonic oscillator in a simplified model. The increase of the magnetic field strength in the working material can increase stiffness of an harmonic oscillator affected by a magnetic field by increasing the magnitude of the magnetic body force or torque per unit mass acting on objects of the working material for a given displacement or angle of rotation of the object relative to an equilibrium position. This can increase the spacing between energy levels on the energy spectrum of affected DOF, and reduce the number of energy levels reachable by an object of a given average energy within an affected DOF. In this manner, an increase in the magnetic field strength in the working material can lead to a net reduction of the DE of the affected DOF of the objects in the working material. For example, when the magnetic field strength is sufficiently strong, several previously active DOF, such as rotational potential or kinetic DOF of objects, can be frozen out by the activation of the BFGA, i.e. the magnetic field generating apparatus 415, as previously described. The reduction of the DE of DOF of objects of the working material reduces the specific heat capacity at constant volume of a working material.

The reduction in the specific heat capacity at constant volume occurs adiabatically in the simplified example embodiment shown in FIGS. 3A-H, i.e. without the exchange of heat between the working material and the outside environment. As mentioned, the reduction in the specific heat capacity at constant volume is associated with an increase in the temperature of the working material. Note that the increase in temperature occurs at a larger pressure than the pressure at station 352. The increase in temperature at a larger pressure can be considered to be analogous to the increase in temperature at a larger pressure which occurs in an Otto cycle, a Diesel cycle, or a Brayton cycle, for example. The increase in temperature comprises a transfer of heat within the working material, where the transfer of heat is from each DOF of an object which experience a reduction in its degree of excitation to all other DOF of an object in the working material. In other words, as a result of the activation of the BFGA, i.e. the activation of the magnetic field generating apparatus 415 in this case, embodiments of the invention are capable of transferring heat to the DOF of an object in a working material without requiring a separate thermal reservoir at a sufficiently large temperature. Note that in a conventional thermodynamic cycle which performs work, there is a source of heat, such as the heat generated by the combustion of fuel, or the burning of coal, which is delivered to the working material. In the thermodynamic cycle employed by embodiments of the invention, the source of heat is provided by the working material per se, i.e. by the energy stored in the DOF of objects in the working material which experience a reduction in the DE due to the activation of the BFGA. The transfer of heat from the DOF which experience a reduction in the DE to the other DOF can be facilitated by photons, for example, where the photons are emitted due to the interaction between the objects and the magnetic field within the working material. The energy can also be transferred by other energy carriers or energy transfer mechanisms, such as by collisions between objects, phonons, lattice vibrations, or magnons, for example.

In other embodiments, the reduction in the specific heat capacity at constant volume, or the specific heat capacity at constant pressure, can also occur at constant pressure, as is the case for the Brayton cycle. In other embodiments, the reduction in the specific heat capacity can also comprise a change in pressure as well as a change in volume. In some embodiments, the change in the specific heat capacities need not occur adiabatically, but can comprise heat flow into or out of the working material, provided that the thermodynamic cycle, such as the thermodynamic cycle shown in FIG. 1, performs nominally, where nominal performance can refer to the cycle producing an acceptable or the desired amount of work when employed as an engine or a net positive work producing apparatus, for example.

Figure 3E:
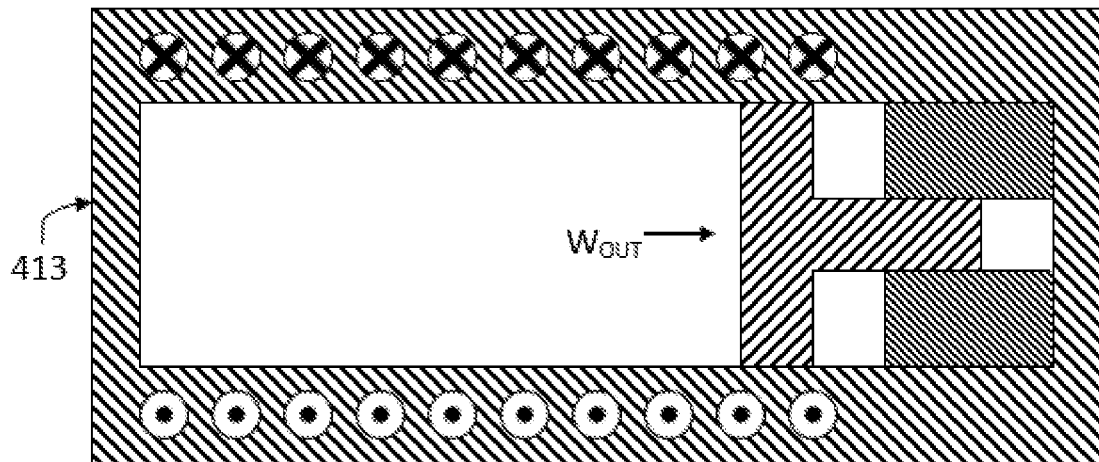

In FIG. 3E, the thermodynamic state of the working material corresponds to the state of the working material between stations 354 and 355 in FIG. 1. Between stations 354 and 355, the working material is expanding and doing work on the actuating apparatus 403, as indicated by the label "WOUT" in FIG. 3E. The movement of interior surface 405 of piston 404 increases the volume of the interior chamber 401 which expands the working material contained therein. In this particular example, the working material is expanded adiabatically, i.e. without an exchange of heat with the outside environment 414. Throughout this expansion, the magnetic field of the magnetic field generating apparatus remains in an ON configuration. In FIG. 1, the expansion of the working material is modeled as the expansion of an ideal gas for simplicity. In some embodiments, the strength of the magnetic field within the working material can be modified throughout this expansion in order to maintain or generate a desired specific heat capacity at constant volume of the working material throughout the expansion. As described in the context of the compression in FIG. 3B, the expansion shown in FIG. 3E need not be adiabatic, but can be isothermal or otherwise polytropic, or of other suitable form, where suitability is determined by an appropriate level of performance and efficiency of the thermodynamic cycle.

Figure 3F:

In FIG. 3F, the thermodynamic state of the working material corresponds to the state of the working material at station 355 in FIG. 1. The actuating apparatus 403 is in a fully retracted position, and the volume of the working material is identical to the volume at station 352. At station 355, the magnetic field of the magnetic field generating apparatus is in an ON configuration. Note that, due to the smaller specific heat capacity at constant volume of the working material throughout the expansion between stations 354 and 355 compared to the specific heat capacity at constant volume of the working material throughout the compression between stations 352 and 353, the change in temperature and pressure during the expansion is larger in magnitude compared to the scenario in which the specific heat capacities at constant volume are identical for both the compression and the expansion.

Figure 3G:

In FIG. 3G, the thermodynamic state of the working material corresponds to the state of the working material at station 356 in FIG. 1. The volume of the working material at state 356 and state 355 is identical in this example. Between station 355 and station 356, the magnetic field generating apparatus is configured to decrease the strength of the magnetic field within the working material back to the OFF configuration, i.e. the configuration at station 353, or 352. As mentioned, in the depicted simplified example, the OFF configuration corresponds to the configuration in which there is no current flowing through the electrical conductors of magnetic field generating apparatus 415. Between station 355 and station 356, the specific heat capacity at constant volume of the working material is reduced, and returned to the value of the specific heat capacity at constant volume at stations 352 and 353. As a result, the temperature and pressure at station 356 are lower than the temperature and pressure at station 355. The reduction in temperature is due to the increase in the DE of DOF of objects in the working material, and a corresponding flow of heat from other DOF into the DOF which experience an increase in the DE. This process can be considered to be the reverse of the reduction of the specific heat capacity at constant volume between station 353 and 354. Note that the pressure, and hence the temperature, at station 356 in FIG. 1 is also lower than the pressure, and hence the temperature, at station 352 in FIG. 1.

Figure 3H:
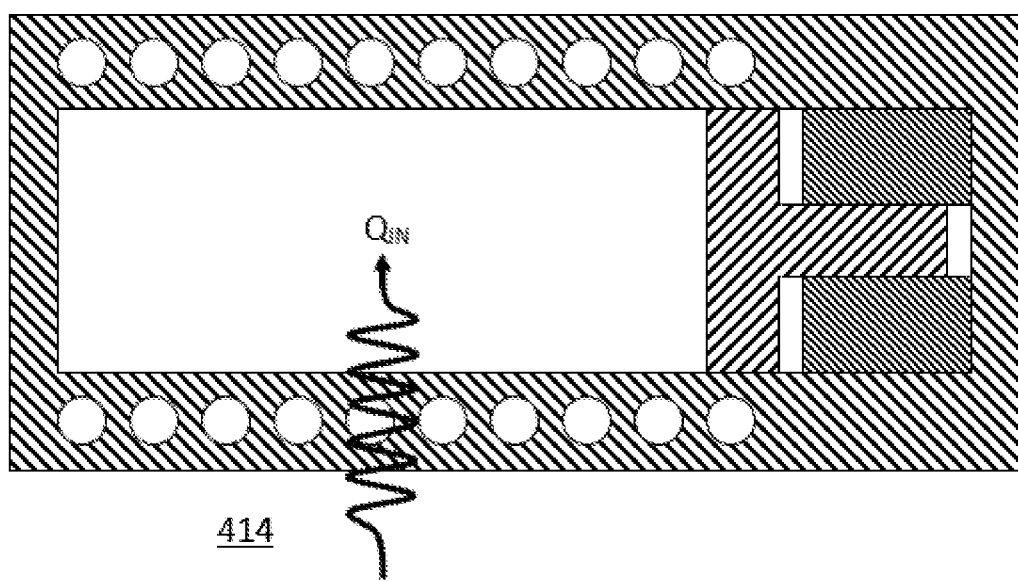

In FIG. 3H, the thermodynamic state of the working material corresponds to the state of the working material between stations 356 and 352 in FIG. 1. The volume of the working material at state 356 and state 352 is identical in this example. Between stations 356 and 352, the working material is heated via heat flow "QIN" by the outside environment 414 such that the temperature of the working material at the completion of the heating process matches the temperature at station 352. The heat flow QIN can be delivered from outside environment 414 to the working material in interior chamber 401 via thermal conduction through bulk material 411, for example. In some embodiments, at least a portion of bulk material 411 can be configured to feature a larger thermal conductivity in order to facilitate a sufficiently larger rate of heat flow between the outside environment 414 and the working material. Note that said rate of heat flow is also a function of the interface area between the outside environment 414 and the working material, as well as the difference in temperature between the outside environment 414 and the working material. Thus, in order to maximize the rate of heat flow between the outside environment 414 and the working material, the area of thermal contact between the outside environment 414 and the working material as well as the temperature difference between the outside environment 414 and the working material can be maximized. For example, the temperature of the working material can be 90 degrees Kelvin, and the temperature of the outside environment can be 300 degrees Kelvin. In the case in which the interior chamber 401 is rectangular in shape, the heat transfer between the working material and the outside environment 414 can be configured to occur across a planar side of the rectangle which features one of the largest surface areas. As mentioned, in some embodiments, the working material can be pumped through a separate heat exchanger specially configured to facilitate a large rate of heat flow between the outside environment 414 and the working material via forced convection. In other embodiments such as embodiments in which the working material is a solid and not conducive to pumping, a dedicated thermal fluid and a separate heat exchanger can be employed to increase the rate of heat transfer between the outside environment 414 and the working material via forced convection. In other such embodiments, the thermal material in the outside environment, such as the water in a water reservoir in the outside environment 414, or the air in the atmosphere in the outside environment 414, can be pumped of flow naturally through a heat exchanger in order to increase the rate of heat transfer between the outside environment 414 and the working material via forced or natural convection. In some embodiments, the heat transfer between the working material and the outside environment 414 can comprise thermal radiation.

In the idealized case portrayed in FIG. 1 and FIGS. 3A-H, the working material is performing net mechanical work on the actuating apparatus 403. In other words, the magnitude of "WOUT" is larger than the magnitude of "WIN". This is also evident from FIG. 1, where there is a net area enclosed by a clockwise thermodynamic cycle. The actuating apparatus is configured in a manner in which a sufficiently large portion of WOUT is recovered and converted into useful energy, such as electrical energy, such that the total energy consumed by the actuating apparatus is smaller than the total energy delivered by the actuating apparatus in useful form. The source of the energy for the net mechanical work performed by the working material is the heat absorbed by the working material from the outside environment 414 during a thermodynamic cycle during nominal, steady operations. For the particular cycle shown in FIG. 1, the net mechanical work performed by the working material throughout one thermodynamic cycle is equal to the net heat absorbed by the working material between station 356 and stations 352.

In some embodiments, outside environment 414 comprises the atmosphere of earth, for example. Outside environment 414 can also be a separate thermal reservoir. Outside environment 414 can comprise the interior chamber of a refrigerator, for example. Outside environment 414 can comprise an electronic circuit in some embodiments. For example, the heat produced by an electronic circuit can be delivered from the outside environment 414 through outside surface 413, through bulk material 411, and through interior surface 402 to the interior region 401 via thermal conduction. The heat can be produced via resistive losses in the electronic circuit, as is the case for Joule heating, for example. In such applications, the embodiment, such as the embodiment shown in FIGS. 3A-H can be employed to cool a computer chip or a microprocessor, such as a microprocessor in a computer or a smartphone, for example. In some embodiments, the mechanical power extracted by from the working material by the actuating apparatus 403 can be converted into electrical power via the actuating apparatus 403 or a separate electric generator, and used to power an electronic circuit, such as a smartphone or a computer in some embodiments. In such an application, an embodiment of the invention can be considered to operate as a conventional battery. An apparatus configured in accordance with the invention, such as apparatus 400, can be considered to be a thermal battery, wherein the thermal energy within the working material, and any other material in thermal contact with the working material, can be converted into useful electrical work. Embodiments of the invention can therefore also be considered for applications involving power generation or consumption.

An embodiment of the invention can also be employed to transfer heat from a cold reservoir to a hot reservoir while consuming less amount of work than an equivalent vapor compression refrigerator, for example. In some such embodiments the thermodynamic cycle is identical to the thermodynamic cycle shown in FIG. 1, with the exception that a heat "QOUT" is removed from the working material at station 354, before the working material is expanded adiabatically but after the specific heat capacity at constant volume has been reduced by the modification of the activation level of the BFGA. As a result of the removal of heat QOUT, the pressure at the station prior to the expansion, denoted station 354B, is lower than the pressure at station 354, but larger than the pressure at station 353. In such as embodiments the amount of work extracted by actuating apparatus 403 during the adiabatic expansion between stations 354B and the new station 355 is equal in magnitude to the work consumed by the actuating apparatus 403 during the adiabatic compression between stations 352 and station 353. In other words, WIN is equal to WOUT, and no net mechanical work is performed by the actuating apparatus 403 or on or by the working material. To that end, the pressure at the new station 355 is lower than the pressure at station 352. In other words, the pressure versus specific volume lines for the adiabatic compression and the adiabatic expansion intersect in the case of an ideal gas. Thus, in accordance with the first law of thermodynamics, all of the heat QIN absorbed by the working material from a cold reservoir at the cold temperature of station 352, where the heat is absorbed between new station 356 and station 352, can be delivered by the working material to a hot reservoir at the hot temperature of station 354B, where the heat is delivered between station 354 and 354B. Thus heat can be transferred from a cold reservoir to a hot reservoir without requiring any net external mechanical work. Such an embodiment of the invention can thus be considered to be a temperature amplification apparatus, or a heat transfer apparatus. Thus an embodiments of the invention can be employed in applications requiring refrigeration, or transfer of heat from a cold reservoir to a hot reservoir. In some embodiments of the invention, the heat QOUT can also be delivered to a conventional heat engine, which is configured to convert at least a portion of the heat QOUT into useful mechanical or electrical work. Examples of conventional heat engines are an aircraft ramjet engine, an aircraft turbofan engine, a helicopter turboshaft engine, or an internal combustion engine of a car, truck, ship or train, for example. In such embodiments, the aforementioned hot reservoir which receives heat QOUT from the working material can be considered to be the combustion chamber of the aforementioned heat engines, for example. The heat QOUT can be exchanged between the working material and the hot reservoir or the cold reservoir via thermal conduction, forced or natural convection, or radiation, for example. In some embodiments, all of the heat QOUT, or a significant fraction thereof, can also be converted into mechanical work by another embodiment of the invention configured to convert thermal energy into useful mechanical or electrical work, as described herein.

In other embodiments, at least a portion of heat QOUT can also be removed from the working material before the specific heat capacity at constant volume has been reduced, or during the reduction. In other embodiments, the at least a portion of QIN can be delivered to the working material before the specific heat capacity at constant volume has been increased, or during the increase.

In other embodiments heat can be transferred from a hot reservoir to a cold reservoir, as opposed to from a cold reservoir to a hot reservoir, using a thermodynamic cycle of the type described in the preceding paragraphs. In some applications, and for some embodiments, such a thermodynamic cycle can be employed to transfer heat from a hot reservoir to a cold reservoir at a faster rate than normal thermal conduction between the hot and cold reservoirs, for example.

The principles of the invention can also be applied to other types of BFGA and other types of working material. In FIG. 1 and FIGS. 3A-H, the working material exhibits a positive magnetocaloric effect. In other embodiments, the BFGA can be employed to elicit both a positive and a negative magnetocaloric effect, or just a negative magnetocaloric effect. In such embodiments, the BFGA can comprise a magnetic field generating apparatus, and can be configured to increase the specific heat capacity at constant volume at the start of the thermodynamic cycle at a first station, such as station 352, via a negative magnetocaloric effect. In other words, the activation of the BFGA can increase the strength of the magnetic field within the working material, which can increase the specific heat capacity via a negative magnetocaloric effect, resulting in a reduction in the temperature between the first and second station. This can occur at constant volume or constant pressure, for example. Between the second station and the third station, the working material can be compressed adiabatically, or otherwise, in similar fashion as the working material in FIG. 1 throughout adiabatic compression 358. Note that the BFGA remains active throughout this compression, such that the specific heat capacity at constant volume of the working material remains substantially the same as the specific heat capacity at constant volume at the second station in this simplified example.

In the case in which the working material exhibits only a negative magnetocaloric effect, the level of activation of the BFGA can be returned to the level of activation of the BFGA at the first station between the third station and the fourth station, which returns the specific heat capacity of the working material to substantially the same heat capacity of the working material at the first station. For example, the change in the level of activation of the BFGA can reduce the strength of the magnetic field within the working material, which can decrease the specific heat capacity via a negative magnetocaloric effect, resulting in an increase in the temperature between the third and fourth stations. This can occur at constant volume or constant pressure, for example. In this case, the subsequent adiabatic expansion of the working material at substantially unchanged specific heat capacity between the fourth station and the fifth station, and the subsequent addition of heat to the working material from the outside environment at constant volume or constant pressure between the fifth and the first station, can complete a thermodynamic cycle.

In the case in which the working material also exhibits a positive magnetocaloric effect, the level of activation of the BFGA can be modified to induce said effect between the third station and the fourth station. For example, the change in the level of activation of the BFGA can further increase the strength of the magnetic field within the working material, which can decrease the specific heat capacity via a conventional, positive magnetocaloric effect, resulting in an increase in the temperature between the third and fourth stations. A subsequent adiabatic expansion of the working material at substantially unchanged specific heat capacity between the fourth station and the fifth station, and the subsequent return of the activation level of the BFGA to the activation level of the BFGA at the first station and the associated return of the specific heat capacity to substantially the level of the specific heat capacity at the first station between the fifth station and the sixth station, and the subsequent addition of heat to the working material from the outside environment at constant volume or constant pressure between the sixth station and the first station, can complete a thermodynamic cycle.

As explained previously, a negative magnetocaloric effect can arise from the introduction of, or a change in the DE of, of an additional potential DOF associated with the body force per unit mass generated by the magnetic field acting on an object in the working material, for instance. The additional potential DOF can be rotational potential DOF, for example. In this case, the rotation can refer to the rotation of a magnetic dipole about a local magnetic field direction, which can introduce two additional rotational potential DOF. When the magnetic field strength is increased further, the DE of these additional rotational potential DOF, as well as the DE of the corresponding rotational kinetic DOF, can be reduced. The aforementioned scenario is an example of the aforementioned positive magnetocaloric effect which cancels and then exceeds the magnitude of the previously applied negative magnetocaloric effect between the third and fourth stations via a further increase in the magnetic field strength.

Note that, in some embodiments, the specific heat capacity at constant volume can change throughout a compression or expansion. This change can be due to variation of the specific heat capacities with temperature, or a variation of the magnetocaloric effect with temperature, for example.

In some embodiments, a positive or negative magnetocaloric effect can be combined with a positive or negative electrocaloric effect in order to maximize the magnitude of the difference in the specific heat capacities of a working material in a thermodynamic cycle.

As mentioned, the principles of the invention, such as the addition and removal of heat from a subset of DOF of objects of a working material via the change in the level of activation of a BFGA as opposed to heat sources or heat sinks external to the working material, can be employed in a wide variety of thermodynamic cycles, and thermodynamic apparatuses. Such apparatuses, with the exception of conventional magnetic or electric refrigeration, are deemed to be within the scope of the invention, and typically comprise a compression or expansion of the working material. Such thermodynamic cycles can comprise isothermal compression or expansion, isobaric compression or expansion, polytropic compression or expansion, or heat delivery from the working material to the outside environment, or heat absorption from the outside environment to the working material, for example.

FIG. 1 shows a plot of pressure 351 versus specific volume 350 of a working material for a subset of exemplary embodiments of the invention for an example method of operation.

As mentioned, the working material in FIG. 1 is modeled as an ideal gas for simplicity and clarity of description and is not intended to limit the scope of the invention. In other embodiments, the working material can be a different type of gas, such as a real gas, such as air, dinitrogen, dioxygen, carbon dioxide, helium, or argon. The working material can also comprise a different type of fluid, such as a liquid such as water, liquid nitrogen, or liquid dioxygen. The working material can also comprise a solid.

In the case in which the working material is a solid or a liquid, the vertical axis 351 can describe the stress applied to the working material along an axis of the working material, and the horizontal axis 350 can describe the corresponding strain of the working material. For example, the stress can be the axial stress along a specified axis of the working material, and the strain can be the strain along the same axis. The stress can also be the principal stress along a principal axis of the working material, and the strain can be the corresponding principal strain.

FIG. 1 describes a simplified thermodynamic cycle for illustrative purposes. The thermodynamic cycle comprises stations 352, 353, 354, 355, and 356. Following an adiabatic compression 358 between stations 352 and 353, the specific heat capacity at constant volume is reduced 359 by the modification of the activation level of a BFGA between stations 353 and station 354. In the simplified cycle shown in FIG. 1, the specific heat capacity at constant volume is maintained at substantially a constant value throughout the adiabatic expansion 360 between station 354 and station 355. Between station 355 and station 356, the activation level of the BFGA is modified once more, resulting in an increase 361 of the specific heat capacity at constant volume to approximately the same value at station 352. Note that between stations 352, 353, 354, 355, and 356 a net amount of mechanical work has been performed by the working material. The source of the energy of this net mechanical work is provided by the internal energy of the working material. In order to return to the original temperature at station 352, therefore, the working material absorbs heat 362 from an external heat source. The external heat source can be provided by the outside environment of the working material via thermal conduction, natural or forced convection, or thermal radiation, for example. This completes a thermodynamic cycle which is configured to convert thermal energy into useful mechanical work.

In other embodiments, the thermodynamic cycles can be different to the cycle shown in FIG. 1. For example, the working material can absorb heat from the outside environment throughout the entirety of the thermodynamic cycle. In such a cycle, during nominal operations, the temperature at the completion of the increase 361 of the specific heat capacity at constant volume is equal to the temperature at station 352, i.e. at the start of the cycle. In other words, the delivery of external heat need not occur after the completion of the increase 361 of the specific heat capacity a constant volume. This can reduce the duration of time required for the completion of a thermodynamic cycle, and can improve the power output of an embodiment of the invention. In another example, the working material can be at a sufficiently low temperature relative to the outside environment at station 353, such that the working material can absorb a substantial amount of the total heat required from the outside environment during one thermodynamic cycle at station 353, prior to the reduction of the specific heat capacity at constant volume. In this manner, the amount of work performed, and the amount of heat absorbed from the environment, throughout a single thermodynamic cycle is increased, ceteris paribus.

In another example, the working material can cycle through several "open" thermodynamic cycles, where an open cycle refers to a cycle in which the total heat delivered to the working material is smaller than the net amount of work done by the working material throughout the cycle. For example, an open cycle can comprise the cycle between stations 352, 353, 354, 355, and 356. In this open cycle, no heat is absorbed from the outside environment. As a result, the temperature at the end of the open cycle, at station 356, is not equal to the temperature at the start of the open cycle, at station 352. When several open cycles are carried out sequentially, the temperature of the working material reduces with each iteration of the open cycle. In this manner, the temperature of the working material can be reduced to the proximity of absolute zero, or zero degrees Kelvin, provided that the BFGA is configured to modify the specific heat capacity of the working material throughout the relevant range of temperatures of the working material. The sequential application of open cycles can also be employed during the startup phase of a nominal operating condition. For example, the working material can be at the same temperature as the outside environment at the start of the startup phase. After the first open cycle, the temperature of the working material is slightly lower than the temperature of the outside environment, but larger than the temperature of the working material at this point in the thermodynamic cycle during nominal operations. In order to reduce the average temperature of the working material to the average operating temperature during nominal operations, therefore, the working material can perform several open cycles. As mentioned, it can be desirable to reduce the average temperature of the working material to a sufficiently low temperature relative to the outside environment in order to increase the rate of heat transfer from the outside environment to the working material and thereby increase the power output of the working material. A lower temperature working material can also facilitate superconductivity in any adjacent and suitably configured electrical conductors located in the vicinity of the working material.

The thermodynamic cycle described in FIG. 1 can be employed to describe the operation of apparatus 400 shown in FIGS. 3A-H, and apparatus 370 shown in FIGS. 2A-H.

As mentioned, a wide variety of BFGA apparatuses and methods can be employed to modify the specific heat capacities of a working material. For example, in some embodiments, an externally applied electric field can be employed to modify the DE of an existing DOF or EDOF.

The principles underlying the modification of the DE of a DOF with an electric body force or torque per unit mass are analogous to the principles in the case in which a magnetic body force or torque per unit mass is employed.

FIGS. 2A-H show a cross-sectional view of one embodiment of the invention at different points in time for an example method of operation. The principles of operation of the embodiment 370 shown in FIGS. 2A-H are similar to the principles of the embodiment shown in FIG. 3A-H, and will therefore not be described in the same detail herein. The thermodynamic cycle shown in FIGS. 2A-H is also described by the thermodynamic cycle shown in FIG. 1.

In FIGS. 2A-H there is an interior region 371 comprising a working material. A working material can comprise a gas such as air, nitrogen, oxygen, or carbon dioxide, for example. A working material can also comprise a liquid, or a solid. A working material can exhibit a positive electrocaloric effect, i.e. an increase in temperature due to an increase in the magnitude of an electric field within the working material and an associated decrease in the specific heat capacity at constant volume of the working material due to a reduction in the DE of DOF of objects in the working material. In other embodiments, the working material can exhibit a negative electrocaloric effect, i.e. an decrease in temperature due to an increase in the magnitude of an electric field within the working material and an associated increase in the specific heat capacity at constant volume of the working material due to an increase in the DE of DOF of objects in the working material. A working material can also exhibit a positive and negative electrocaloric effect. For example, with increasing electric field strength within the working material, the working material can exhibit a negative electrocaloric effect followed by a positive electrocaloric effect which can exceed in the negative electrocaloric effect of the working material in terms of the magnitude of the change of the specific heat capacity at constant volume. An example of a solid material which exhibits a positive electrocaloric effect is the widely used piezoelectric material PZT, or lead zirconate titanate. A variety of other materials which exhibit an electrocaloric effect are known in the art.

A working material can also comprise a solid particles, such as small solid crystals, located in a gas or in a liquid. A working material can also comprise atoms of an otherwise solid material bonded to ligands and thus suspended in a fluid. A working material can also comprise several different types of molecules, such as sodium molecules dissolved in water, or water molecules embedded in air.

For simplicity, FIGS. 2A-H and FIG. 1, the working material in interior region 371 is configured to exhibit a positive electrocaloric effect.

In FIGS. 2A-H the working material comprises objects which carry a net electric dipole during at least a portion of a thermodynamic cycle, such as the thermodynamic cycle shown in FIG. 1, during nominal operations. The electric dipole of an object, such as a molecule, can comprise contributions from the distribution of electric charge within the object, as well as contributions from a net electric charge on an object, such as an ion. The electric dipole can be an induced dipole, as is the case for polarization of a neutral atom or molecule, or a permanent dipole. A permanent electric dipole can arise from the alignment of the atoms in a molecule, as is the case for a water or steam molecule. An induced electric dipole can be induced in a molecule by the presence of an external electric field, as is the case of an oxygen or nitrogen molecule. Note that a diatomic molecule typically features a preferred direction of polarization, where the preferred direction is typically along the long axis of the molecule. As a result, when the angle between the long axis of the molecule and the direction of the electric field is less than ninety degrees and larger than zero, there can be a moment or a body torque per unit mass acting on the molecule as a result of the preferential polarization of the molecule by the electric field along the long axis of the molecule, or along a principal polarization axis. Note that the body torque per unit mass can be considered to arise from the body forces per unit mass acting on the molecule, where the lines of action of the body forces do not pass through the center of mass of the molecule. Note that an electric dipole can be considered to be analogous to a magnetic dipole in regards to its contribution to the specific heat capacity of a working material, and its interaction with an external electric field. As described in the context of an external magnetic field, an external electric field refers to the field external to an object, and can comprise "intrinsic" contributions, such as contributions from neighboring atoms or ions, as well as "additional" contributions, such as contributions from an external electric field generating apparatus, such as electric field generating apparatus 387. Note that the modification of the activation level of a BFGA can modify the intrinsic component of the electric field, or the extrinsic component of the electric field. For example, the BFGA can be configured to ionize at least a portion of the working material, thus changing the magnitude of the intrinsic electric field. The ionization of the working material is particularly attractive in the case in which the working material is gaseous, since the ionization can add three additional translational potential DOF to the objects in the working material by increasing the strength and range of the interatomic forces, where the three translational potential DOF complement the existing three translational kinetic DOF of the center of mass of the molecule or atom of the gas. The ionization can also add two rotational potential DOF to complement the existing two rotational kinetic DOF of a diatomic molecule. The ionization can also modify the DE of the vibrational modes of a molecule, i.e. the translational kinetic and potential DOF associated with the interatomic spacing of atoms in a molecule.

Note that the working material can also be ionized in the case in which the working material is a solid. For example, in doped semiconductors subject to an electric field a depletion region can form. This is exemplified by the depletion region at pn-junctions in diodes, or the depletion region within the charged plates or charged electrical contacts in a junction field effect transistor, or JFET. For example, the working material can comprise a doped semiconductor material. When the BFGA apparatus, i.e. the electrical field generating apparatus, is activated, and charge is allowed to accumulate in the first conductor 385 and the second conductor 386, as shown in FIG. 2D, the mobile charge carriers within the working material can form depletion regions. In this case, the depletion region refers to both a depletion of electrons in a positively charged depletion region, and a depletion of holes, or an accumulation of electrons, in a negatively charged depletion region. The negatively charged depletion region forms in the proximity of the positively charged first conductor 385 and the positively charged depletion region forms in the proximity of the negatively charged second conductor 386. The positive and negative depletion region can extent a sufficient distance into the working material along the Y-direction, where the distance can be on the order of hundreds of micrometers. Several conductors, such as conductors 385, and 386, can be located within or embedded within a working material in order to ensure that a sufficient portion of the working material comprises positively or negatively charged depletion regions. The ionization of portions of the working material can modify the interatomic potentials, and thus modify the stiffness of the interatomic harmonic oscillators. As mentioned, this can modify the DE of the interatomic vibrational potential and kinetic DOF of the working material. For example, the ionization of the working material, or the forming of depletion regions within the working material, can increase the stiffness of interatomic potentials, and reduce the DE of the affected DOF, which can reduce the specific heat capacity of the working material.

In FIGS. 2A-H the specific heat capacity at constant volume of the working material can be modified by the modification of the magnitude of an electric field within the working material. As in the embodiment shown in FIGS. 3A-H, and described in FIG. 1, the working material is configured in a manner in which the magnitude of the specific heat capacity at constant volume of the working material is a function of the level of activation of a BFGA during at least a portion of the thermodynamic cycle during nominal operations. In other words, the modification of the level of activation of a BFGA can be employed to modify the specific heat capacity at constant volume of the working material during at least a portion of the thermodynamic cycle during nominal operations.

For simplicity and clarity of description the working material in FIGS. 2A-H and FIG. 1 can comprise a diatomic gas such as oxygen or nitrogen. The gas is treated as an ideal gas for simplicity. The principles of the invention described in the context of FIG. 1 and FIGS. 2A-H also apply to embodiments in which the working material is a liquid or a solid. Note that, for other working materials the electrocaloric properties of the working material can be more pronounced compared to the working materials being described in the context of FIGS. 2A-H and FIG. 1. In other words, in practice, other working materials can be better suited for a given application than the working materials described in the context of the examples shown in FIGS. 2A-H and FIG. 1, since the examples are intended to illustrate the principles of operation. Suitability can be a function of the degree to which the modification of the level of activation of a BFGA can be employed to modify the specific heat capacity at constant volume of the working material during at least a portion of the thermodynamic cycle during nominal operations, for example. Other candidates for working materials have been described in the previous paragraphs, or can be readily selected for a given application by those with ordinary skill in the art.

In FIGS. 2A-H the interior region 371 with interior surface 372 is cylindrical in shape, with a circular cross-section when viewed along the horizontal direction, which is parallel to the edge at the bottom of the page. This direction is also referred to as the X-direction. The Y-direction is in the plane of the page and perpendicular to the X-direction. In other embodiments the cross-sectional geometry of the interior region can be elliptical. In other embodiments, the cross-sectional geometry of interior region can be annular or ring-shaped. In other embodiments the cross-sectional geometry can be square or rectangular, for example. In some such embodiments, the rectangular or square cross-sectional geometry features rounded corners.

A casing apparatus 380 is configured to provide structural support to the interior chamber 371 and the remainder of the embodiment 370. The bulk material 381 of casing apparatus 380 can comprise a metal such as aluminium, or iron. The bulk material 381 can also comprise composite materials such as fiberglass or carbon fiber.

A compression apparatus is configured to do be able to do work on the working material. In the simplified embodiment 370 illustrated in FIGS. 2A-H, the compression apparatus is embodied by an actuating apparatus 373 comprising a piston head 374 and a piston shaft 377, both of which have a circular cross-section when viewed along the X-direction. In other embodiments, the compression apparatus can comprise turbomachinery such an axial compressor or centrifugal compressor. In some embodiments, the compression apparatus can also comprise a duct configured to decelerate and compress the free stream fluid flow.

An expansion apparatus is configured to allow the working material to do work on the expansion apparatus. In the simplified example illustrated in FIGS. 2A-H, the expansion apparatus is also embodied by actuating apparatus 373. In other embodiments, the expansion apparatus can comprise turbomachinery such an axial turbine or centrifugal turbine. In some embodiments, the expansion apparatus can also comprise a duct configured to accelerate and expand the working material.

Actuating apparatus 373 also comprises an actuator 379, which is configured to do work on the piston shaft 377, and allow the piston shaft 377 to do work on the actuator. The actuating apparatus 373 can be configured in a similar manner as the actuating apparatus 403. As described in the context of actuating apparatus 403, there are a wide variety of actuator types and architectures which can facilitate the relative motion between the piston and the casing apparatus 380. As described in the context of actuating apparatus 403, actuating apparatus 373 can be hydraulic, solenoidal, rotary electric, linearly electric, or piezoelectric, for example.

In FIGS. 2A-H the BFGA comprises an electric field generating apparatus 387 configured to modify the strength of the electric field within interior chamber 351. The BFGA is located adjacent to interior region 371. The BFGA is configured to be able to apply at least one body force per unit mass on objects, e.g. atoms or molecules, of the working material. The magnitude of this body force can be regulated by a separate electronic circuit in this embodiment. The BFGA comprises a first conductor 385 and a second conductor 386, both of which can be charged electrostatically. The charging process can comprise the application of a voltage difference across the first conductor 385 and the second conductor 386. This voltage difference can be supplied by a battery, or by the actuating apparatus 373 and associated electronic circuitry, such as associated capacitors or batteries, for example. The electrical conductors 385 and 386 is electrically insulated from the working material in the case in which the working material is conductive. The collections of charge is also electrically insulated from the bulk material 381 in the case in which the bulk material 381 is conductive. Electrical conductors, such as insulated copper wires, connect first conductor 385 to the voltage source, as well as second conductor 386 to the voltage source. These electrical conductors are not shown. In between first conductor 385 and the interior region 371, as well as between second conductor 386 and the interior region 371, bulk material 381 is configured to not be conducting to electricity. In effect, first conductor 385 and second conductor 386 can be considered to be the opposite plates of a capacitor, with the dielectric in between these plates comprising the working material as well as the relevant portion of bulk material 381 between first conductor 385 and second conductor 386. In the embodiment shown, first conductor 385 and second conductor 386 are configured in a manner in which the majority of electric field lines pass through the working material when the first conductor 385 and second conductor 386 are oppositely charged. To that end, the first conductor 385 and second conductor 386 can comprise several insulated conductors. These conductor can be wires, for instance, and can be arranged parallel to the X-axis within first conductor 385. This can serve to prevent or diminish any undesirable redistribution of charge within first conductor 385 and second conductor 386. When viewed along the X-direction, the cross-section of first conductor 385 ranges from the 10 o'clock position to the 2 o'clock position about the central axis of the cylindrical interior region 371. Note that the first conductor 385 is otherwise annular in shape and axially symmetric about said central axis in this simplified embodiment. Similarly, the second conductor ranges from the 4 o'clock position to the 8 o'clock position. In other embodiments, the arc length of first conductor 385 and second conductor 386 can range through 180 degrees. In embodiments in which the interior region 371 is annular in shape, the cross-sectional area of interior region 371 when viewed along the X-direction is described by the area contained within two concentric circles of different radii. In such embodiments, the cross-sectional area of first conductor 385 when viewed along the X-direction describes similar annular area located outside of the annular cross-section of interior region 371, and the cross-sectional area of second conductor 385 describes similar annular area located inside of the annular cross-section of interior region 371.

In embodiments in which the interior region 371 is square in shape, with boundaries parallel to the Y-axis or the Z-axis, the cross-sectional area of first conductor 385 when viewed along the X-direction is described by a rectangle, with boundaries parallel to the Y-axis or the Z-axis, and with length along the Z-axis substantially equal to the length of the interior region 371 along the Z-axis. In some embodiments, the extent of first conductor 385 along the Z-axis can be larger or smaller than the length of interior region 371 along the Z-axis. Second conductor 386 is configured symmetrically to first conductor 385, where the plane of symmetry is parallel to the XZ-plane and coincident with the centroid of interior region 371. In other embodiments, second conductor 386 need not be symmetric with first conductor 385.

In other embodiments, the first conductor can be located within the piston head 374, and the second conductor can be located within bulk material 381 on the opposing side of interior region 371, i.e. in the negative X-direction of the piston head 374. A wide variety of other configurations of the BFGA are within the scope of the invention.

The principle of operation of a subset of embodiments is described by the thermodynamic cycle shown in FIG. 1, as well as the configurations of embodiment 370 shown in FIGS. 2A-H.

Figure 2A:
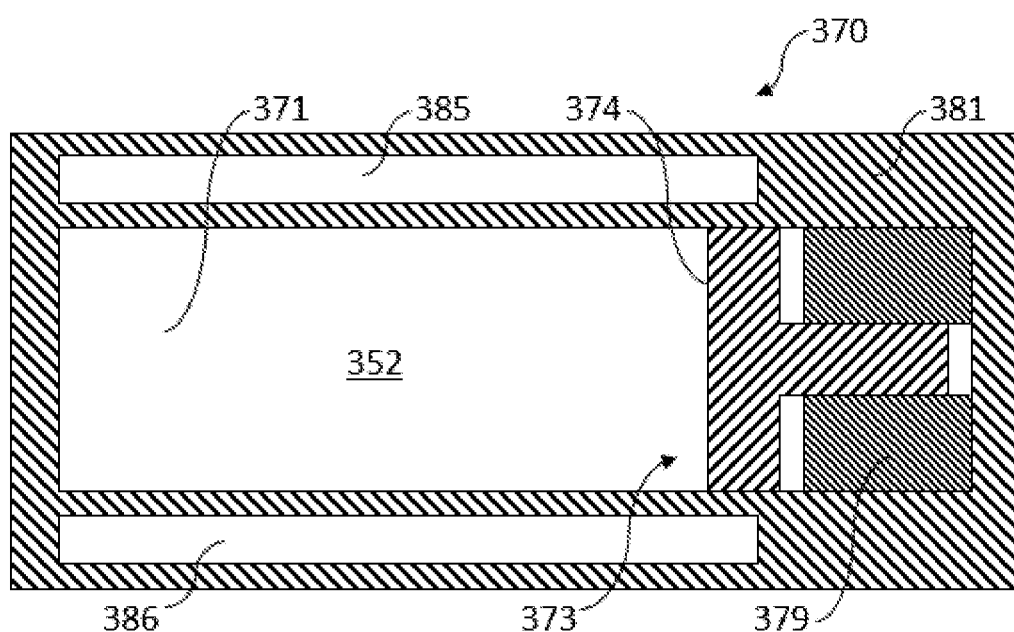
FIGS. 2A-H show a cross-sectional view of one embodiment of the invention at different points in time for an example method of operation.

In FIG. 2A, the thermodynamic state of the working material corresponds to the state of the working material at station 352 in FIG. 1. The actuating apparatus 373 is in a fully retracted position, and the working material is in a state of maximum volume, where the volume is provided by the configuration and the size of the interior region 371. The electric field generating apparatus is configured to minimize the strength of the electric field within the working material at station 352 in this example. For embodiment 370 shown in FIG. 2A-H, this corresponds to a zero or negligible net electrical charge on first conductor 385 and second conductor 386, resulting in a zero or negligible additional electric field strength throughout the working material. This configuration of the electric field generating apparatus 387 is also denoted the "OFF" configuration.

Figure 2B:
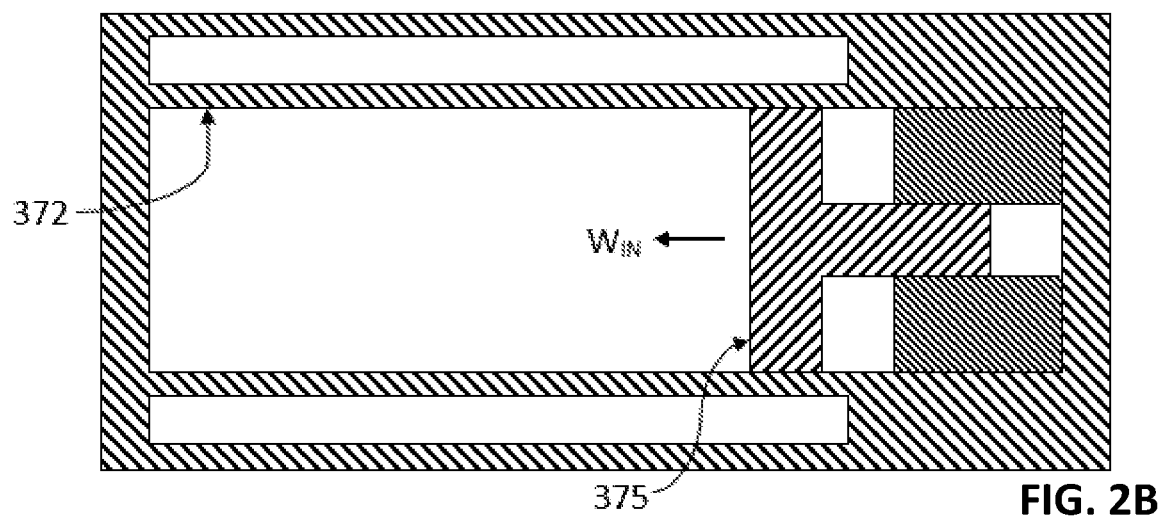

In FIG. 2B, the thermodynamic state of the working material corresponds to the state of the working material between stations 352 and 353 in FIG. 1. Between stations 352 and 353, the working material is being compressed by the actuating apparatus 373, which does mechanical work on the working material, as indicated by the label "WIN" in FIG. 2B. The movement of interior surface 375 of piston 374 reduces the volume of the interior chamber 371 which compresses the working material contained therein. In this particular example, the working material is compressed adiabatically, i.e. without an exchange of heat with the outside environment 384. Throughout this compression, the electric field of the electric field generating apparatus remains in an OFF configuration. In FIG. 1, the compression of the working material is modeled as the compression of an ideal gas for simplicity.

Figure 2C:
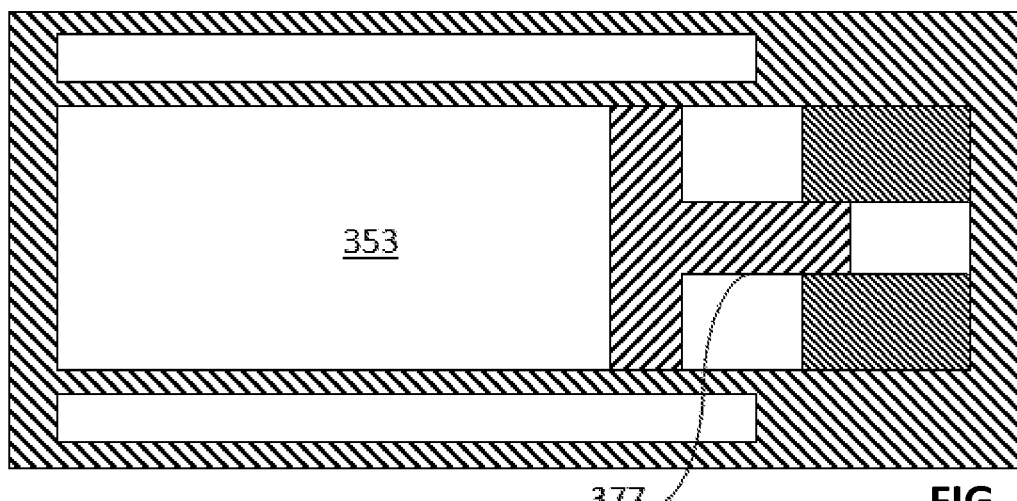
Figure 2D:
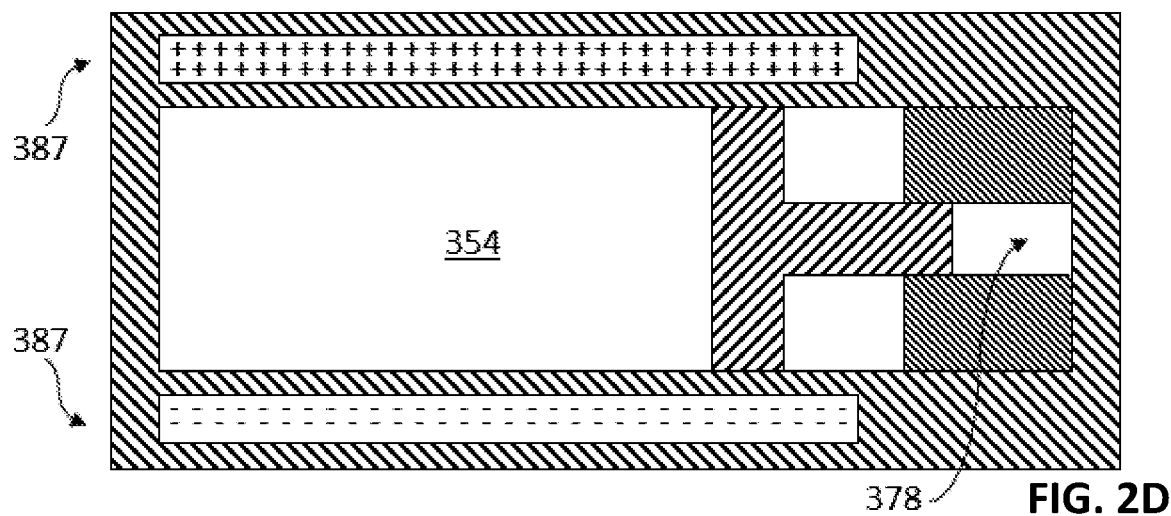

In FIG. 2C, the thermodynamic state of the working material corresponds to the state of the working material at station 353 in FIG. 1. The actuating apparatus 373 is in a fully extended position, and the working material is in a state of minimum volume, where the minimum volume is provided by the stroke length of the actuating apparatus 373 and the maximum volume of the interior region 371. At station 353, the electric field of the electric field generating apparatus is in an OFF configuration.

In FIG. 2D, the thermodynamic state of the working material corresponds to the state of the working material at station 354 in FIG. 1. The volume of the working material at state 354 and state 353 is identical in this example. Between station 353 and station 354, the electric field generating apparatus is configured to increase the strength of the electric field within the working material to a desired value, denoted the "active value", which is greater than zero. For embodiment 370, this corresponds to a non-zero net positive electrical charge within the first conductor 385 and a net negative charge within the second conductor 386, as indicated. This results in a non-zero additional electric field strength throughout the working material. This configuration of the electric field generating apparatus 387 is also denoted the "ON" configuration. In this example, the magnitude of the strength of the electric field within the working material can be considered to be the "activation level" of the BFGA, i.e. of the electric field generating apparatus 387 in this case. In this example, the increase in the electric field strength within the working material between station 353 and station 354 is associated with a positive electrocaloric effect, resulting in a reduction of the specific heat capacity at constant volume of the working material and a corresponding increase in the temperature and pressure of the working material, as shown in FIG. 1. As previously described, the pairing of a kinetic and potential DOF of an object can be modeled as a harmonic oscillator in a simplified model. The increase of the electric field strength in the working material can increase stiffness of an harmonic oscillator affected by an electric field by increasing the magnitude of the electric body force or torque per unit mass acting on objects of the working material for a given displacement or angle of rotation of the object relative to an equilibrium position. This can increase the spacing between energy levels on the energy spectrum of affected DOF, and reduce the number of energy levels reachable by an object of a given average energy within an affected DOF. In this manner, an increase in the electric field strength in the working material can lead to a net reduction of the DE of the affected DOF of the objects in the working material. For example, when the electric field strength is sufficiently strong, several previously active DOF, such as rotational potential or kinetic DOF of objects, can be frozen out by the activation of the BFGA, i.e. the electric field generating apparatus 387, as previously described. The reduction of the DE of DOF of objects of the working material reduces the specific heat capacity at constant volume of a working material.

The reduction in the specific heat capacity at constant volume occurs adiabatically in the simplified example embodiment shown in FIGS. 2A-H, i.e. without the exchange of heat between the working material and the outside environment. As mentioned, the reduction in the specific heat capacity at constant volume is associated with an increase in the temperature of the working material. Note that the increase in temperature occurs at a larger pressure than the pressure at station 352. The increase in temperature at a larger pressure can be considered to be analogous to the increase in temperature at a larger pressure which occurs in other thermodynamic cycles, such as the Otto cycle, as described in the context of FIGS. 3A-H.

Figure 2E:
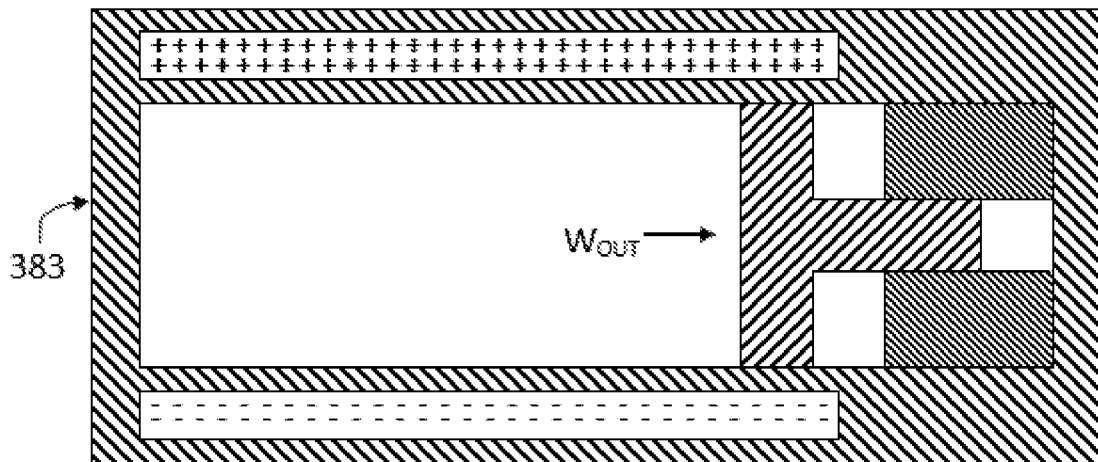

In FIG. 2E, the thermodynamic state of the working material corresponds to the state of the working material between stations 354 and 355 in FIG. 1. Between stations 354 and 355, the working material is expanding and doing work on the actuating apparatus 373, as indicated by the label "WOUT" in FIG. 2E. The movement of interior surface 375 of piston 374 increases the volume of the interior chamber 371 which expands the working material contained therein. In this particular example, the working material is expanded adiabatically, i.e. without an exchange of heat with the outside environment 384. Throughout this expansion, the electric field of the electric field generating apparatus remains in an ON configuration. In FIG. 1, the expansion of the working material is modeled as the expansion of an ideal gas for simplicity. In some embodiments, the strength of the electric field within the working material can be modified throughout this expansion in order to maintain or generate a desired specific heat capacity at constant volume of the working material throughout the expansion.

Figure 2F:
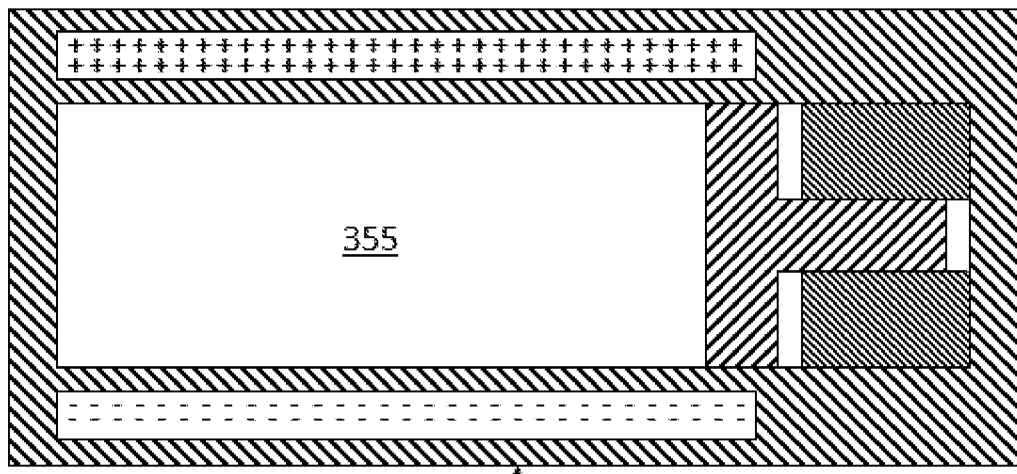

In FIG. 2F, the thermodynamic state of the working material corresponds to the state of the working material at station 355 in FIG. 1. The actuating apparatus 373 is in a fully retracted position, and the volume of the working material is identical to the volume at station 352. At station 355, the electric field of the electric field generating apparatus is in an ON configuration. Note that, due to the smaller specific heat capacity at constant volume of the working material throughout the expansion between stations 354 and 355 compared to the specific heat capacity at constant volume of the working material throughout the compression between stations 352 and 353, the change in temperature and pressure during the expansion is larger in magnitude compared to the scenario in which the specific heat capacities at constant volume are identical for both the compression and the expansion.

Figure 2G:
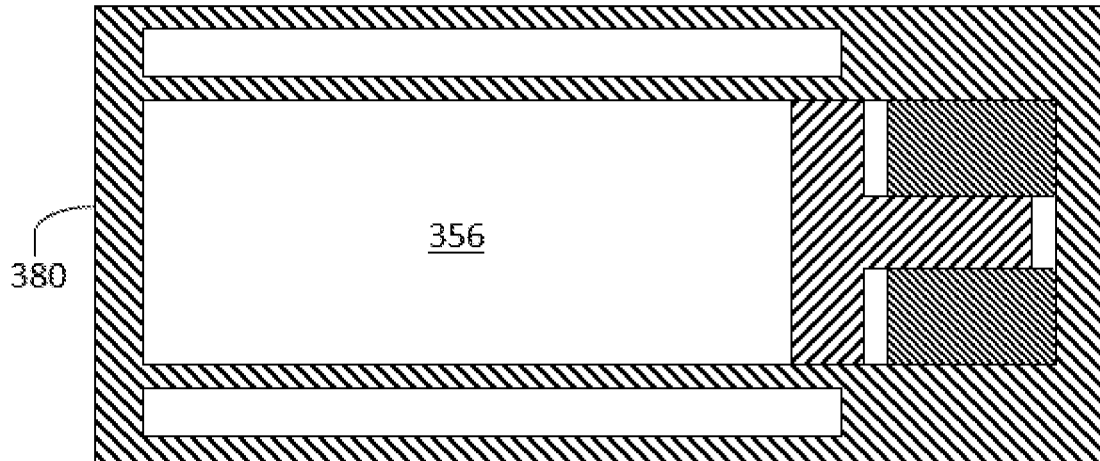

In FIG. 2G, the thermodynamic state of the working material corresponds to the state of the working material at station 356 in FIG. 1. The volume of the working material at state 356 and state 355 is identical in this example. Between station 355 and station 356, the electric field generating apparatus is configured to decrease the strength of the electric field within the working material back to the OFF configuration, i.e. the configuration at station 353, or 352. As mentioned, in the depicted simplified example, the OFF configuration corresponds to the configuration in which there is no net charge in the electrical conductors 385 and 386 of the electric field generating apparatus 387. Between station 355 and station 356, the specific heat capacity at constant volume of the working material is reduced, and substantially returned to the value of the specific heat capacity at constant volume at stations 352 and 353. As a result, the temperature and pressure at station 356 are lower than the temperature and pressure at station 355. The reduction in temperature is due to the increase in the DE of DOF of objects in the working material, and a corresponding flow of heat from other DOF into the DOF which experience an increase in the DE. This process can be considered to be the reverse of the reduction of the specific heat capacity at constant volume between station 353 and 354. Note that the pressure, and hence the temperature, at station 356 in FIG. 1 is also lower than the pressure, and hence the temperature, at station 352 in FIG. 1.

Figure 2H:
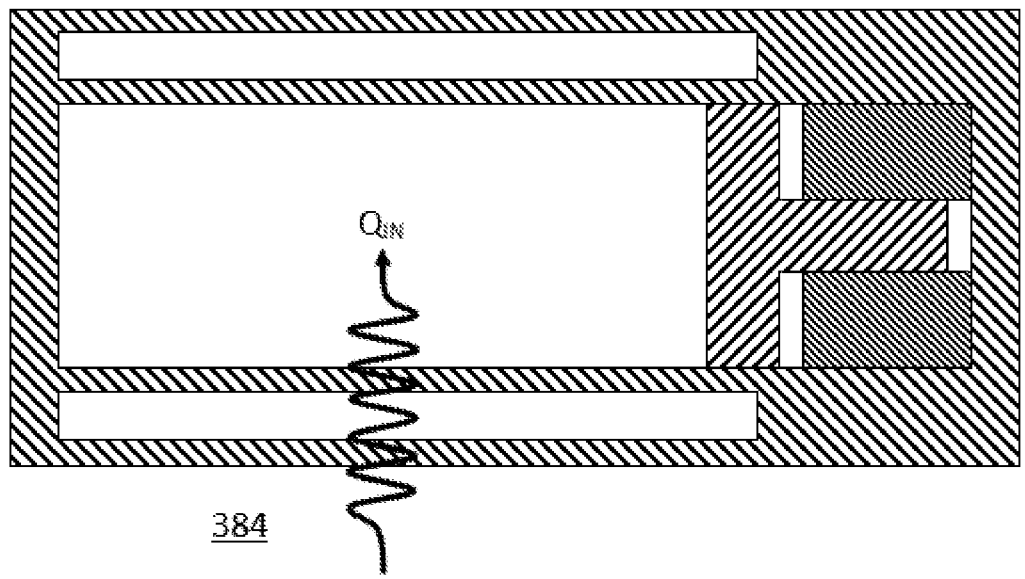

In FIG. 2H, the thermodynamic state of the working material corresponds to the state of the working material between stations 356 and 352 in FIG. 1. The volume of the working material at state 356 and state 352 is identical in this example. Between stations 356 and 352, the working material is heated via heat flow "QIN" by the outside environment 384 such that the temperature of the working material at the completion of the heating process matches the temperature at station 352. The heat flow QIN can be delivered from outside environment 384 to the working material in interior chamber 371 via thermal conduction through bulk material 381, for example, as described in the context of FIGS. 3A-H.

In the idealized case portrayed in FIG. 1 and FIGS. 2A-H, the working material is performing net mechanical work on the actuating apparatus 373. In other words, the magnitude of "WOUT" is larger than the magnitude of "WIN". As described in the context of FIGS. 3A-H, The source of the energy for the net mechanical work performed by the working material is the internal energy of the working material, which is replenished by the heat absorbed by the working material from the outside environment 384 during a thermodynamic cycle during nominal, steady operations. For the particular cycle shown in FIG. 1, the net mechanical work performed by the working material throughout one thermodynamic cycle is equal to the net heat absorbed by the working material between station 356 and stations 352.

In some embodiments, outside environment 384 comprises the atmosphere of earth, for example. Outside environment 384 can also be a separate thermal reservoir. Outside environment 384 can comprise the interior chamber of a refrigerator, for example. Outside environment 384 can comprise an electronic circuit in some embodiments, as described in more detail in the context of FIGS. 3A-H.

Figure 5A:
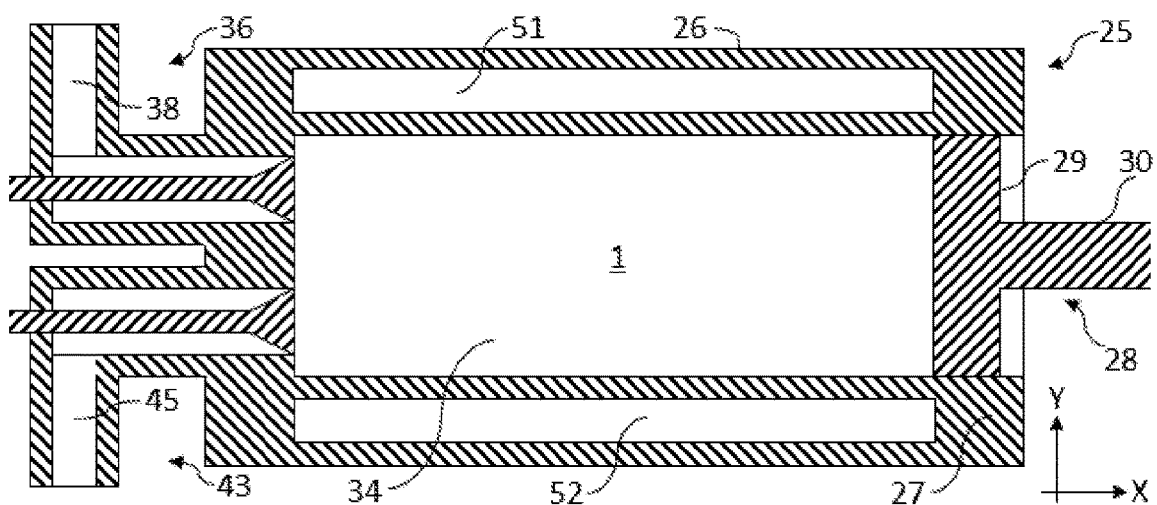
FIGS. 5A-N show a cross-sectional view of one embodiment of the invention at different points in time for an example method of operation.
Figure 5B:
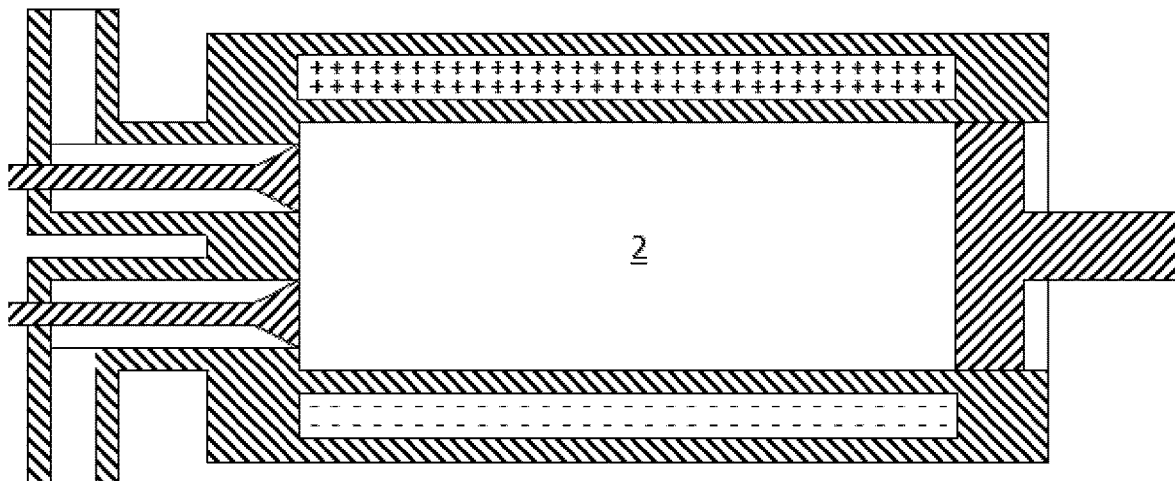
Figure 5C:
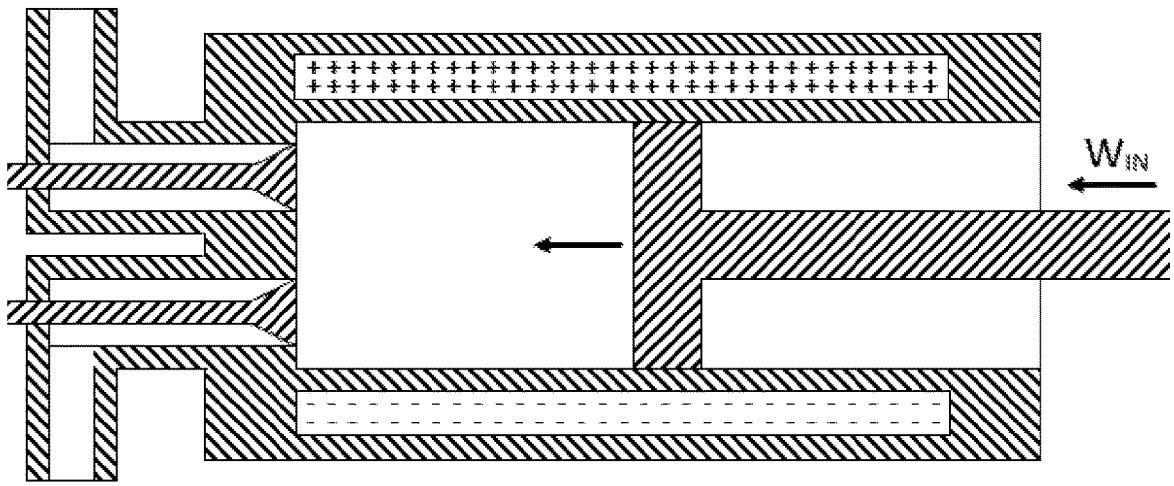
Figure 5D:
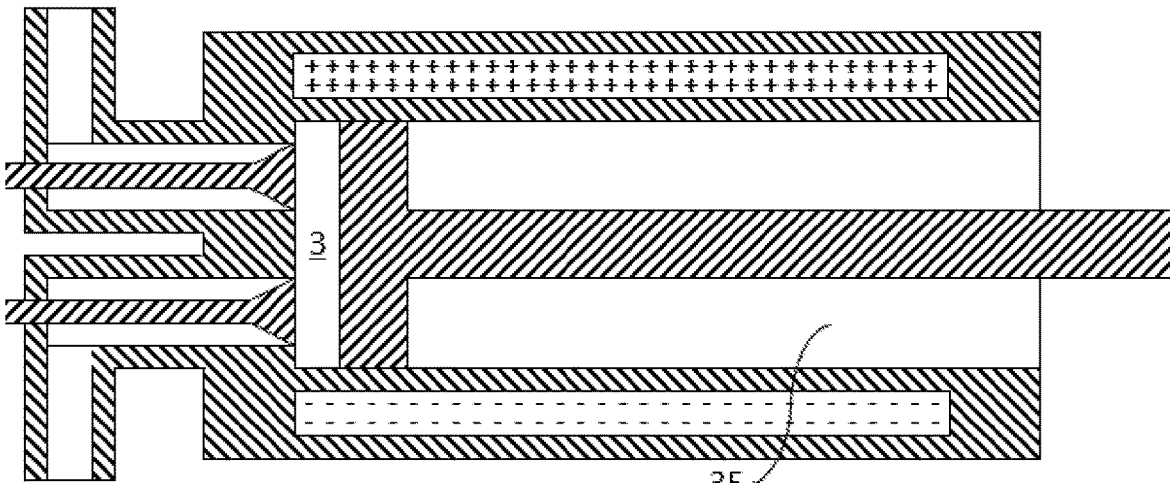
Figure 5E:
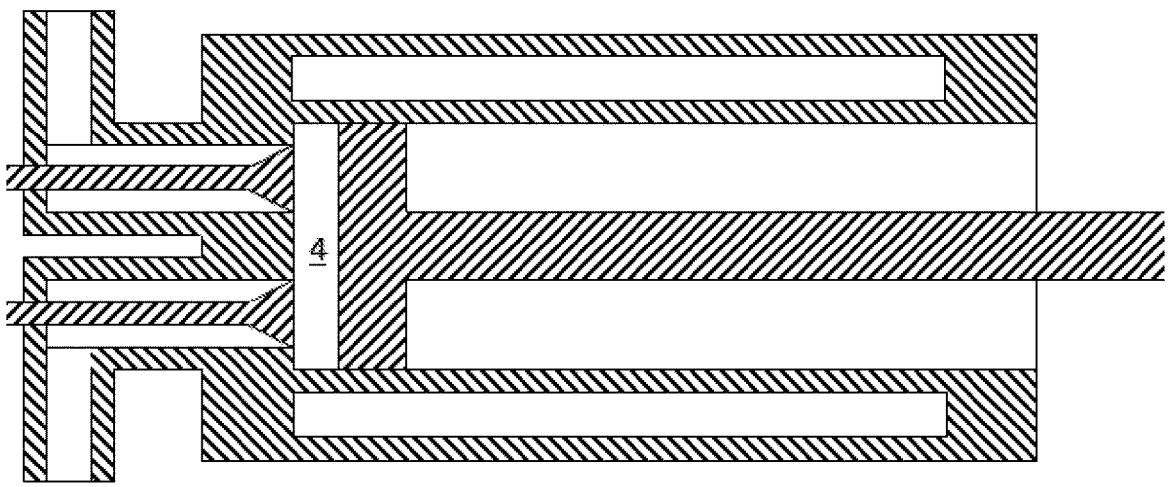
Figure 5F:
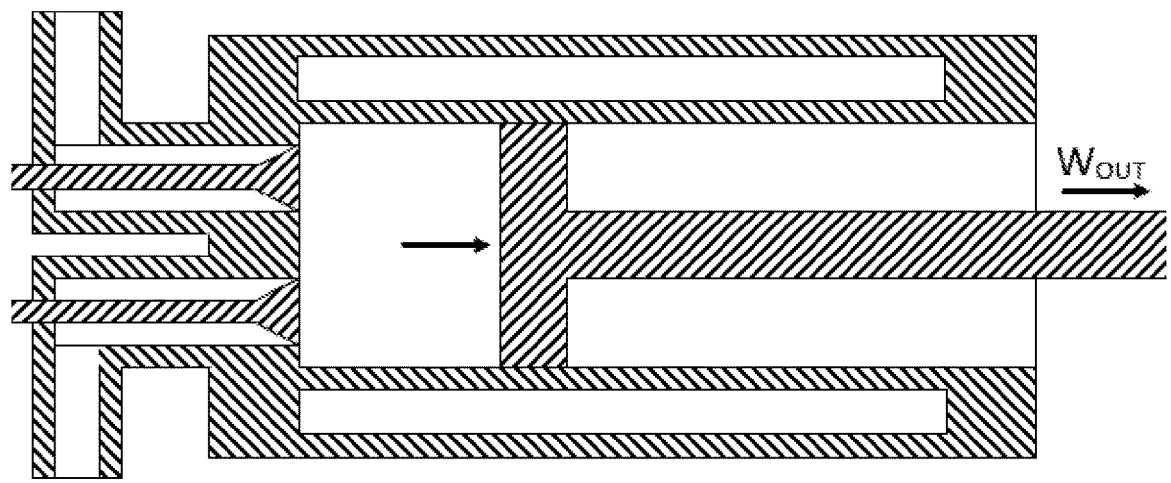
Figure 5G:
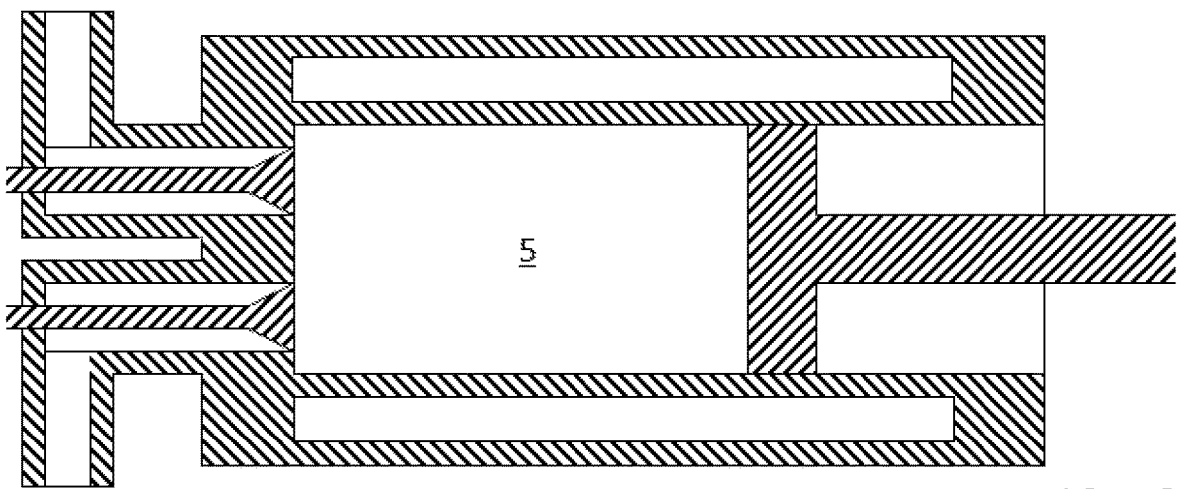
Figure 5H:
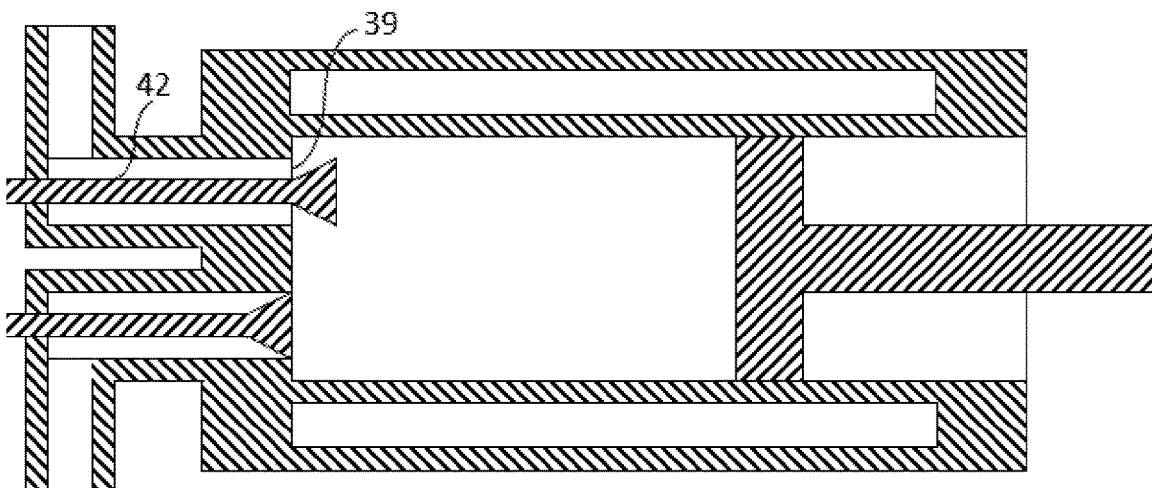
Figure 5I:
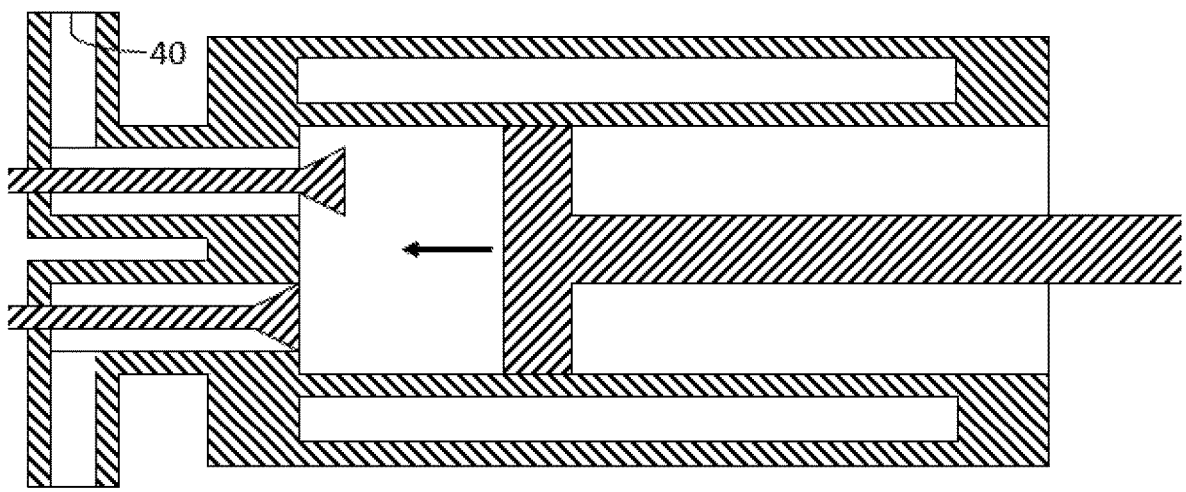
Figure 5J:
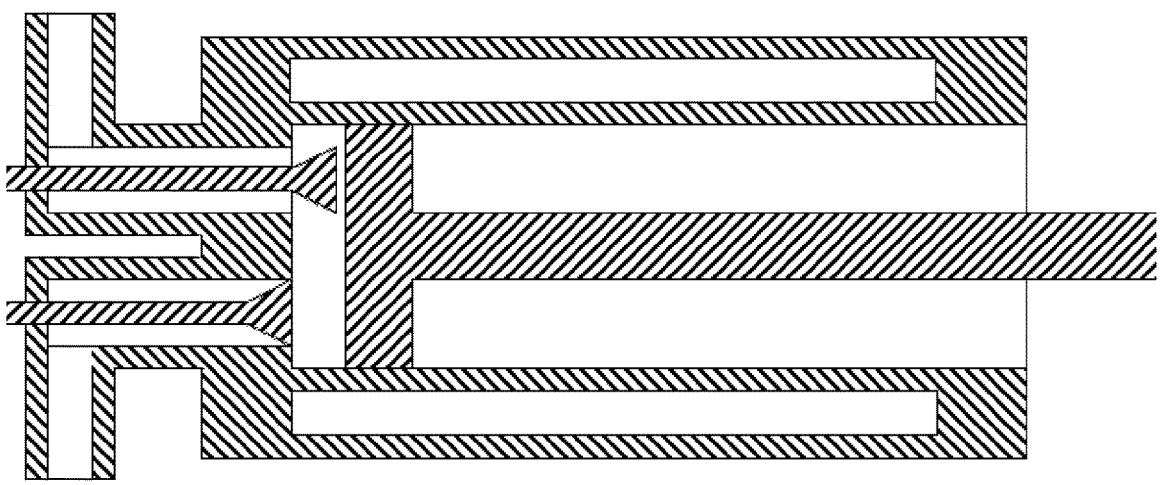
Figure 5K:
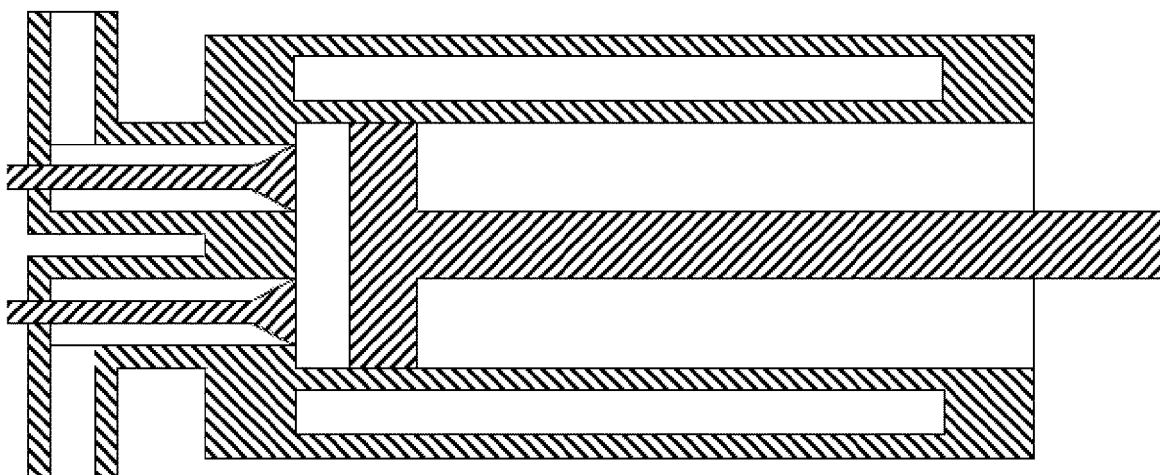
Figure 5L:
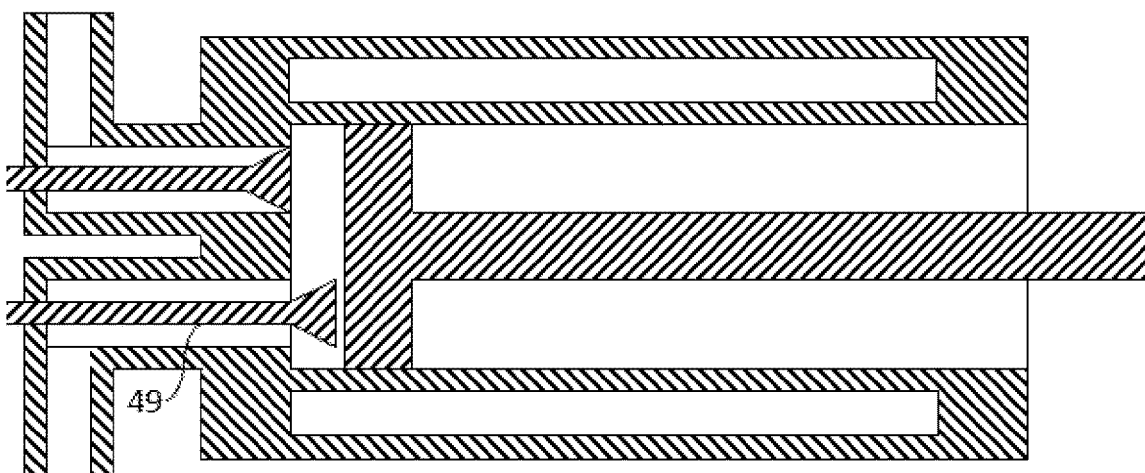
Figure 5M:
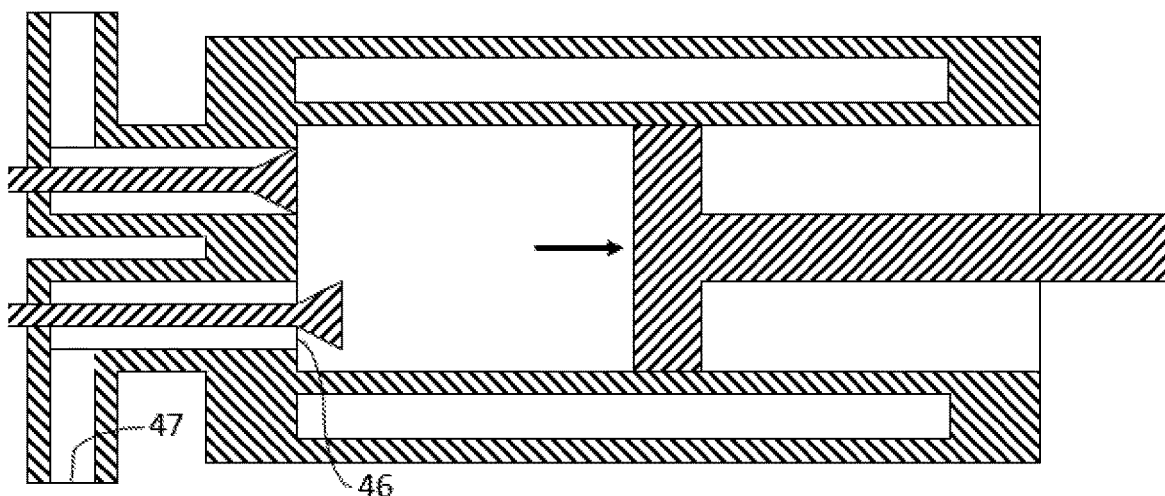
Figure 5N:
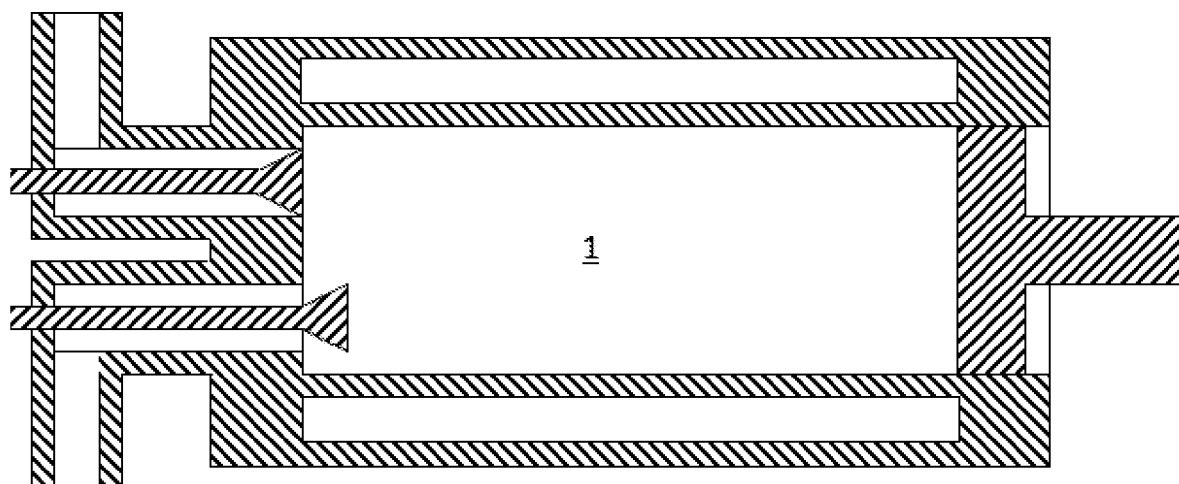

FIGS. 5A-N show a cross-sectional view of one embodiment of the invention at different points in time for an example method of operation.

There is an interior region 34 comprising a working material. A working material can be a gas, such as air, helium, or nitrogen, for example. A working material can also be a liquid such as water. In the embodiment shown in FIG. 4 and FIGS. 5A-N, the working material is treated as an ideal gas for simplicity.

The interior region is cylindrical in shape, with a circular cross-section when viewed along the X-direction. In other embodiments, the cross-sectional geometry of interior region can be annular or ring-shaped. In other embodiments the cross-sectional geometry can be square or rectangular, for example.

In the simplified embodiment shown, the pressure in the outside region 35 is assumed to be substantially constant throughout nominal operations. In other embodiments this need not be the case. Outside region 35 can be the atmosphere, for example. Outside region 35 can also be a separate reservoir.

A casing apparatus 26 is configured to provide structural support to the interior chamber 34 and the remainder of the embodiment 25. The bulk material 27 of casing apparatus 26 can comprise a metal such as aluminium, or iron. The bulk material 27 can also comprise composite materials such as fiberglass or carbon fiber.

A compression apparatus is configured to do work on the working material. In the simplified embodiment 25 illustrated in FIGS. 5A-N, the compression apparatus is embodied by a piston apparatus 28 comprising a piston head 29 and a piston shaft 30, both of which have a circular cross-section when viewed along the X-direction. In other embodiments, the compression apparatus can comprise turbomachinery such an axial compressor or centrifugal compressor. In some embodiments, the compression apparatus can also comprise a duct configured to decelerate the free stream fluid flow.

An expansion apparatus is configured to allow the working material to do work on the embodiment of the invention. In the simplified example illustrated in FIGS. 5A-N, the expansion apparatus is also embodied by a piston apparatus 28. In other embodiments, the expansion apparatus can comprise turbomachinery such an axial turbine or centrifugal turbine. In some embodiments, the expansion apparatus can also comprise a duct configured to accelerate the working material.

An inlet apparatus is configured to allow working material to flow into interior region 34. In the simplified embodiment 25, the inlet apparatus is embodied by inlet pipe apparatus 43 with an interior channel 45. In other embodiments, the inlet apparatus can be embodied by a duct, for instance.

An exit apparatus is configured to allow working material to flow out of interior region 34. In the simplified embodiment 25, the exit apparatus is embodied by exit pipe apparatus 36 with an interior channel 38. In other embodiments, the exit apparatus can be embodied by a duct, for instance.

A body force per unit mass generating apparatus, or "BFGA", is located adjacent to interior region 34. The BFGA is configured to be able to apply at least one body force per unit mass on objects, e.g. atoms or molecules, of the working material. The magnitude of this body force can be regulated in this embodiment. The BFGA comprises a first conductor 51 and a second conductor 52, both of which can be charged electrostatically. The charging process can comprise the application of a voltage difference across the first conductor 51 and the second conductor 52. This voltage difference can be supplied by a battery, for example. The first conductor 51 and the second conductor 52 are electrically insulated from each other as well as portions of bulk material 27 of casing apparatus 26. Electrical conductors, such as insulated copper wires, connect first conductor 51 to the voltage source, as well as second conductor 52 to the voltage source. These electrical conductors are not shown. In between first conductor 51 and the interior region 34, as well as between second conductor 52 and the interior region 34, bulk material 27 is configured to not be conducting to electricity. In effect, first conductor 51 and second conductor 52 can be considered to be the opposite plates of a capacitor, with the dielectric in between these plates comprising the working material as well as the relevant portion of bulk material 27 between first conductor 51 and second conductor 52. In the embodiment shown, first conductor 51 and second conductor 52 are configured in a manner in which the majority of electric field lines pass through the working material when the first conductor 51 and second conductor 52 are oppositely charged. To that end, the first conductor 51 and second conductor 52 can comprise several insulated conductors. These conductor can be wires, for instance, and can be arranged parallel to the X-axis within first conductor 51. This can serve to prevent or diminish any undesirable redistribution of charge within first conductor 51 and second conductor 52. When viewed along the X-direction, the cross-section of first conductor 51 ranges from the 10 o'clock position to the 2 o'clock position about the central axis of the cylindrical interior region 34. Note that the first conductor 51 is otherwise axially symmetric about said central axis in this simplified embodiment. Similarly, second conductor ranges from the 4 o'clock position to the 8 o'clock position. In other embodiments, the arc length of first conductor 51 and second conductor 52 can range through 180 degrees. In embodiments in which the interior region 34 is annular in shape, the cross-sectional area of interior region 34 when viewed along the X-direction is described by the area contained within two concentric circles of different radii. In such embodiments, the cross-sectional area of first conductor 51 when viewed along the X-direction describes similar annular area located outside of the annular cross-section of interior region 34, and the cross-sectional area of second conductor 51 describes similar annular area located inside of the annular cross-section of interior region 34.

In embodiments in which the interior region 34 is square in shape, with boundaries parallel to the Y-axis or the Z-axis, the cross-sectional area of first conductor 51 when viewed along the X-direction is described by a rectangle, with boundaries parallel to the Y-axis or the Z-axis, and with length along the Z-axis substantially equal to the length of the interior region 34 along the Z-axis. In some embodiments, the extent of first conductor 51 along the Z-axis can be larger or smaller than the length of interior region 34 along the Z-axis. Second conductor 52 is configured symmetrically to first conductor 51, where the plane of symmetry is parallel to the XZ-plane and coincident with the centroid of interior region 34. In other embodiments, second conductor 52 need not be symmetric with first conductor 51.

In other embodiments, the first conductor can be located within the piston head 29, and the second conductor can be located within the opposing face of interior region 34, i.e. in the negative X-direction of the piston head 29. In such embodiments, the inlet and exit apparatuses can be located at the other faces of interior region 34, i.e. in the positive and negative Y-direction of interior region 34 as opposed to the negative X-direction as shown in FIG. 5A. A wide variety of other configurations of the BFGA are within the scope of the invention.

Figure 4:
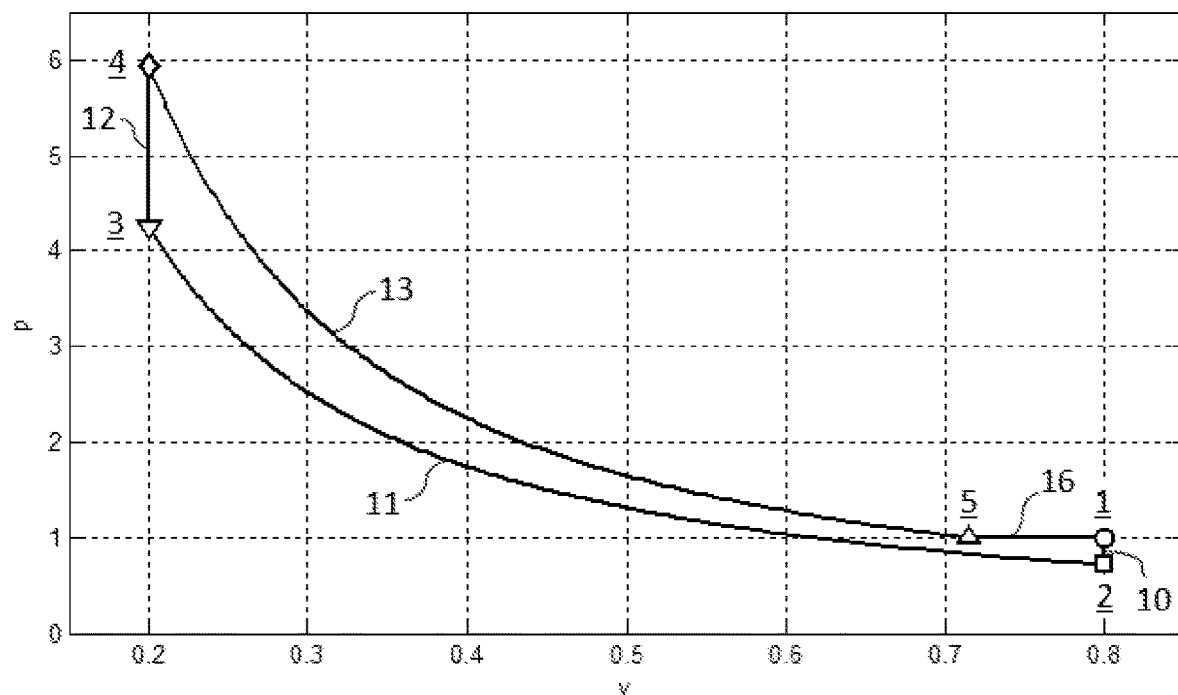
FIG. 4 shows a plot of pressure versus specific volume for a subset of embodiments of the invention for an example method of operation.

The configuration shown in FIG. 5A corresponds to the configuration of the working material at station 1 shown in FIG. 4. In this configuration the BFGA is does not exert a substantial body force on any objects within working material. Thus the BFGA can be considered to be turned off, i.e. the first conductor 51 and the second conductor 52 are neutrally charged.

The configuration shown in FIG. 5B corresponds to the configuration of the working material at station 2 shown in FIG. 4. In this configuration the BFGA can be considered to have been turned on, with the first conductor 51 being positively electrostatically charged, and the second conductor 52 being negatively electrostatically charged, as indicated. As mentioned, this can be accomplished by electrically connecting the positive and negative terminals of a battery to the first conductor 51 and the second conductor 52, respectively, for example. Other methods of electrostatically charging the first conductor 51 and the second conductor 52 are available. For example, a different voltage source, such as an electric generator or a capacitor can be employed.

In accordance with some embodiments of the invention, and as explained below, the net effect of the BFGA being activated is the increase of the specific heat capacities at constant volume and constant pressure of the working material. Since the volume of the working material is kept constant throughout the activation of the BFGA, the increase in the specific heat capacity at constant volume corresponds to a decrease in the temperature and pressure of the working material, as indicated by station 2 in FIG. 4. In effect, the transition from station 1 to station 2 can be described as an isochoric decompression 10. In other embodiments or other methods of operation, the transition from station 1 to station 2 can be described as an isobaric reduction in specific volume, for example. In other embodiments or methods of operation, the pressure and specific volume can change in any direction. For example, work can be done on the working material by a compression or expansion apparatus, or heat or mass can be added or removed from the working material. In the simplified embodiment shown in FIG. 4 and FIGS. 5A-B, no heat, work, or mass is exchanged with the environment. Note that, in other embodiments, the activation of the BFGA can decrease the specific heat capacities. In such embodiments, the BFGA is deactivated, or the activation level lof the BFGA is reduced, throughout the transition from station 1 to station 2, such that the specific heat capacities at station 2 are larger than the specific heat capacities at station 1.

The configuration shown in FIG. 5C corresponds to the adiabatic compression 11 of the working material between station 2 and station 3 shown in FIG. 4. Throughout this process, the compression apparatus does work on the working material. An actuator moves the piston apparatus 28 into the casing apparatus 26, reducing the volume of interior region 34 and increasing the pressure of the working material. This actuator can be an electric motor or a second embodiment connected to the first embodiment 25 via a crankshaft. Note that the BFGA remains activated in throughout this process. In some embodiments, it is necessary to reduce the magnitude of the activation of the BFGA in the vicinity of the decreasing interior region 34 throughout the compression in order to avoid an arc discharge, i.e. the breakdown of the dielectric comprising the working material and portions of the bulk material 27. In other embodiments or methods of operation, the compression process between stations 2 and 3 need not be adiabatic, but can be isothermal, or otherwise polytropic, for example.

The configuration shown in FIG. 5D corresponds to the configuration of the working material at station 3 shown in FIG. 4.

The configuration shown in FIG. 5E corresponds to the configuration of the working material at station 4 shown in FIG. 4. In this configuration the BFGA can be considered to have been turned off. In other words, the BFGA can be considered to have returned to the original configuration at station 1 in regards to the effect of the BFGA on the working material. In other embodiments, this need not be the case, i.e. the BFGA can be at an activation level between the activation level at station 1 and station 3. In general, the BFGA at station 4 can be configured in a manner in which the specific heat capacities at station 4 are lower than the specific heat capacities at station 3. In the embodiment shown in FIG. 5E and FIG. 4, the specific heat capacities at station 4 are identical to the specific heat capacities at station 1. As before, the transition from station 3 to station 4 can be considered to be an isochoric compression 12, with no heat, mass, or work exchanged with the surroundings. Note that the surroundings of the working material also comprise the BFGA. In the embodiment shown in FIGS. 5A-N, the change in the activation level of the BFGA is assumed to release, consume or require a negligible amount of energy, and do a negligible amount of work on the working material, and vice versa. Note that, in other embodiments, the change in the level of activation of the BFGA can consume or release energy. A portion of this energy can be lost irreversibly. As will be discussed below, at least a portion of the energy released in these processes can be recovered and stored in a battery or other energy storage device and reused at a later point in time, or reused immediately.

The configuration shown in FIG. 5F corresponds to the adiabatic expansion 13 of the working material between station 4 and station 5 shown in FIG. 4. Throughout this process, the working material does work on the expansion apparatus. A generator recovers the work done by the fluid on the piston apparatus 28, increasing the volume of interior region 34 and decreasing the pressure of the working material. This generator can be an electric generator or a second embodiment connected to the first embodiment 25 via a crankshaft. Note that the BFGA remains deactivated in throughout this process. Since the heat capacities are lower for adiabatic expansion 13 compared to adiabatic compression 11, the ratio of specific heats is larger for adiabatic expansion 13. In other embodiments or methods of operation, the expansion process between stations 4 and 5 need not be adiabatic, but can be isothermal, or otherwise polytropic, for example.

The configuration shown in FIG. 5G corresponds to the configuration of the working material at station 5 shown in FIG. 4.

The configuration shown in FIG. 5G corresponds to the configuration of the working material at station 5 shown in FIG. 4. Note that the temperature and specific volume of working material at station 5 is lower than the temperature and specific volume of the working material at station 1 while the pressure is the same. Throughout the transition from station 1 to station 5, the temperature of working material has been reduced while the pressure has not been changed overall. Therefore embodiments of the invention can be employed in applications in which the refrigeration of a working material is desired.

The configuration shown in FIG. 5H indicates the configuration of the embodiment 25 following the opening of interior opening 39 of exit pipe apparatus 36 by the movement of valve shaft 42 in the positive X-direction. Note that the temperature and pressure of the working material within exit pipe apparatus 36 is substantially equal to the temperature and pressure of the working material at station 5.

The configuration shown in FIG. 5I indicates the expulsion of working material out of interior opening 39 of exit pipe apparatus 36 by the action of the compression apparatus, i.e. the movement of piston apparatus 28 in the negative X-direction. Throughout this process, the pressure within interior region 34 remains substantially constant in this simplified example.

The configuration shown in FIG. 5J indicates the configuration of the embodiment 25 at the conclusion of the expulsion of the working material out of interior opening 39 of exit pipe apparatus 36.

The configuration shown in FIG. 5K indicates the configuration of the embodiment 25 following the closure of interior opening 39 of exit pipe apparatus 36 by the movement of valve shaft 42 in the negative X-direction.

The configuration shown in FIG. 5L indicates the configuration of the embodiment 25 following the opening of interior opening 46 of inlet pipe apparatus 43 by the movement of valve shaft 49 in the positive X-direction. Note that the temperature and pressure of the working material within inlet pipe apparatus 43 is substantially equal to the temperature and pressure of the working material at station 1.

The configuration shown in FIG. 5M indicates the drawing of working material through interior opening 46 of inlet pipe apparatus 43 by the action of the compression apparatus, i.e. the movement of piston apparatus 28 in the positive X-direction. Throughout this process, the pressure within interior region 34 remains substantially constant in this simplified example.

The configuration shown in FIG. 5N indicates the configuration of the embodiment 25 following the return of the piston apparatus 28 to the configuration of station 1.

The configuration shown in FIG. 5A indicates the configuration of the embodiment 25 following the closure of interior opening 46 of inlet pipe apparatus 43 by the movement of valve shaft 42 in the negative X-direction.

The reconfiguration shown in FIGS. 5H-N describes the reduction in the volume of interior region 34 and the expulsion of working material out of interior region 34 at constant pressure into a second thermal reservoir, and the drawing of working material into interior region 34 from a first reservoir. In some embodiments, the first reservoir and the second reservoir are identical, i.e. one and the same. In some embodiments, the working material can be air, and the first and second reservoir can be the atmosphere of earth. Between station 5 and station 1 in FIG. 4, the working material can be heated isobarically, as indicated by isobaric expansion 16 in FIG. 4. This heating process can occur in the second reservoir, for instance.

FIGS. 5A-N thus describe the cycle similar to a four-stroke reciprocating engine. In other embodiments or methods of operation, a configuration and operation similar to a two-stroke reciprocating engine can be used. Other embodiments can be configured and operated like a turboshaft engine following the same principles of the simplified embodiment shown in FIGS. 5 A-N and described herein. Other embodiments can be configured and operated like other turbomachinery, such as turbofan engines or ramjets.

In some embodiments, the apparatus shown in FIGS. 5A-N can be operated continuously, since the configuration following the configuration shown in FIG. 5N corresponds to the configuration shown in FIG. 5A.

A number of thermodynamic apparatuses or reservoirs can be connected to exterior opening 40 of exit pipe apparatus 36 and exterior opening 47 of inlet pipe apparatus 43. For example, the atmosphere can be located beyond exterior openings 40 and 47. Alternatively, a connecting pipe can connect exterior opening 40 to exterior opening 47. Said connecting pipe can pass through a heat exchanger and absorb heat from a separate reservoir. The separate reservoir can be the interior of a refrigerator, for example. In some embodiments, a compressor such as an axial compressor, a centrifugal compressor, or compressor of the reciprocating type can be located upstream of exterior opening 47. In some embodiments, a turbine such as an axial turbine, a centrifugal turbine, or generator of the reciprocating type can be located downstream of exterior opening 40. In some embodiments, a compressor such as an axial compressor, a centrifugal compressor, or compressor of the reciprocating type can be located downstream of exterior opening 40. In some embodiments, a turbine such as an axial turbine, a centrifugal turbine, or generator of the reciprocating type can be located upstream of exterior opening 47. In some embodiments, a heat exchanger can be located downstream of exterior opening 40 or upstream of exterior opening 47. In some embodiments, an internal combustion engine of the reciprocating type can be located downstream of exterior opening 40. In some embodiments, a turboshaft engine can be located downstream of exterior opening 40. Embodiments of the invention can be used to pre-cool fluid entering a combustion engine, where the combustion engine can be of any type, such as the reciprocating or turbojet type. This can reduce the peak temperature or improve the efficiency of such combustion engines. The thermodynamic cycle presented in FIG. 4 produces a net mechanical work output. This mechanical work can also be converted into electrical energy by means of an electric generator. Embodiments of the invention can therefore also be considered for applications involving power generation or consumption. When the thermodynamic cycle is run in reverse, with the initial station being similar to station 5 in FIG. 4, an embodiment of the invention can be used to convert mechanical work into heat.

In some embodiments, the transition from station 1 to station 5 can be repeated several times before the working material is expelled from interior region 34 into exit pipe apparatus 36. In some embodiments, the working material at station 5 can be expelled from a first embodiment and drawing into a second embodiment. In other words, station 1 of a second embodiment can be identical to station 5 of a first embodiment. Thus several embodiments of the invention can be connected in series In accordance with some embodiments of the invention, the temperature of a working material is modified by a modification apparatus. In accordance with some embodiments of the invention, the modification apparatus modifies or applies a body force per unit mass acting on objects or portions of objects of the working material to modify the macroscopic thermodynamic properties of the working material, such as the specific heat capacity of the working material. The specific heat capacity can refer to the specific heat capacity at constant volume, or the specific heat capacity at constant pressure, or the ratio of specific heat capacities, for example. As mentioned, a body force per unit mass can be generated or modified by a wide variety of methods. In accordance with some embodiments of the invention, this change in the body force per unit mass is used to modify the number of excited degrees of freedom, or "EDOF", of at least one object in a working material, or the degree of excitation of at least one EDOF of at least one object in a working material. In some embodiments, the modification is configured to increase the number of EDOF. In other embodiments, the modification is configured to reduce the number of EDOF. In some embodiments, the modification is configured to modify the degree of excitation of a DOF, where the modification can be an increase or decrease in the degree of excitation.

An object of a working material can be an individual gas molecule in the case in which the working material is a gas, for instance. A working material can also be described as a medium. The term "medium" used herein describes any material which is capable of containing, carrying, transporting, or transferring an object of interest. A medium can be a gas, liquid, solid, for example. By default, a medium refers to the collection of all objects which interact with a specified apparatus. The term "object" used herein describes any component of a medium. An object can be described as a particle, such as a collection of molecules, such as a dust particle, or a large molecule such as Buckminsterfullerene, or a single molecule, such as a water molecule. Other examples of objects are subatomic particles such as electrons or protons. An object can also be described as a wave, such as a photon, or phonon. The invention applies to any medium or working material which can be considered to comprise distinct objects, where the number of EDOF, or the degree of excitation of at least one EDOF, of at least one object within the working material can be modified by an EDOF modification apparatus.

An excited degree of freedom, or "EDOF", is a degree of freedom of an object of a medium or working material which cannot be considered to have been frozen out, as described by quantum mechanics, for instance. For example, a diatomic oxygen molecule at room temperature can be considered to have five EDOF, comprising three EDOF associated with the translational kinetic energy of the motion of the center of mass of the molecule in the three directions of a Cartesian inertial frame, and two EDOF associated with the rotational kinetic energy of the rotation of the molecule about the two axes perpendicular to the long axis of the molecule and to each other. Note that the other DOF can be considered to be frozen out at room temperature in this scenario. These frozen DOF comprise the two DOF associated with the vibrational motion of the atoms in the interatomic potential, namely the translational kinetic DOF and the potential DOF. One can define a potential as the integral of the value of a body force per unit mass over a displacement relative to a specified reference point. Another frozen DOF is the rotational kinetic DOF associated with the rotation about the long axis of the molecule. This is a consequence of the allowed values of the energy associated with a DOF being quantized. An increase in the energy difference between energy states, or a reduction in the temperature of an object, can reduce the number of energy states accessible to an object, which can reduce the average energy associated with the DOF, i.e. reduce the specific heat capacity of a DOF.

The temperature at which the expected energy associated with a DOF is non-negligible is denoted the "transition temperature" herein. At temperatures above the transition temperature of a specified DOF, the DOF can be considered to be an EDOF. Note that the expected energy of an object in a particular DOF increases gradually as the temperature of the medium is increased gradually beyond the transition temperature. At sufficiently large temperatures above the transition temperature, the expected energy of an object in a particular DOF approaches the energy predicted by the equipartition theorem. Thus, the "degree of excitation", or "DE", can be quantified in terms of the ratio of the actual expected energy of an object in a particular DOF at a particular temperature to the expected thermal energy associated with this DOF as predicted by the equipartition theorem. By default, the transition temperature corresponds to the temperature at which the degree of excitation is 0.01.

There are several ways in which the number of EDOF, or the DE of a DOF, can be modified by embodiments of the invention.

For example, consider a working material comprising at least one polarized molecule, where the polarization can be magnetic or electric, and where the polarization can be permanent or induced by an externally applied electric or magnetic field. In this case, an externally applied electric or magnetic field can produce a moment about the center of mass of a molecule for which the polarization axis is not aligned with the field. This moment is produced by the body forces per unit mass acting on portions of the molecule at locations and orientations which result in the lines of action of the body forces not being coincident. In some embodiments, for simplicity, the externally applied field can be substantially uniform in magnitude and direction throughout the working material. In other embodiments, this need not be the case. Due to the moment acting on a polarized molecule with a polarization axis not aligned with the externally applied field, a rotation of the polarization axis can change the potential energy of the molecule. This rotation can be expressed in terms of a rotation about two axes perpendicular to each other and the polarization axis. Thus the externally applied electric or magnetic fields have added two vibrational modes to the DOF of the molecule. Since the kinetic DOF of these vibrational modes are excited by default in this scenario, only two additional DOF are added, namely the DOF associated with the rotational potential energy of the polarized molecule. In effect, the BFGA is configured to create or modify a rotational potential. In some embodiments, the strength of the externally applied field can be configured in a manner in which two additional DOF are excited, i.e. turned into EDOF, or in a manner in which the DE of two EDOF is modified. The increased DE of the DOF can increase the specific heat capacities of a working material, and reduce the ratio of specific heat capacities. This particular method of modifying the specific heat capacities is employed in the embodiments shown in FIGS. 5A-N. Correspondingly, the working material in FIGS. 5A-N comprises at least one polarizable, polyatomic molecule, the DE of the DOF of which can be modified in the aforementioned manner. For example the working material can be air. Note that air comprises diatomic nitrogen and oxygen, for example.

For some embodiments, an externally applied electric or magnetic field can also be employed to modify the DE of an existing DOF or EDOF. For example, a modification of the strength of an externally applied field can change the shape or size of an object, such as a polyatomic or diatomic molecule. For instance, the increase or decrease of the strength of an externally applied electric field can increase or decrease the distance of separation between atoms of a diatomic molecule. In some embodiments, a modification of the externally applied field can modify the stiffness of the interatomic vibrational mode in the molecule. This can be the case when the interatomic potential is a non-parabolic, i.e. a non-Hookean, function of the distance of separation relative to the equilibrium distance of separation between the atoms, for example. The change in the distance of separation or the change in the stiffness can be configured to change the transition temperature of the DOF associated with the interatomic vibrational mode, which in turn can modify the DE of the DOF of the vibrational mode. A modified DE of a DOF can also modify the specific heat capacities of a working material.

In another example, a BFGA can be used to modify the DE of at least one existing translational DOF, or create and modify the DE of a new translational DOF. For instance, a BFGA apparatus can be configured to create a translational vibrational mode to an existing translational DOF. For instance, neutrally charged objects contained within the working material can be temporarily ionized. Several methods are available to accomplish this. For example, in a field desorption method, localized electric fields with a sufficiently strong magnitude are able to remove an electron from a molecule. These localized electric fields can be generated by an electric field amplification apparatus, or "EFAA". The EFAA can comprise carbon nanotubes or a conductor, such as metal, with fine protrusions on the surface, where the thin protrusions can be generated using chemical etching, for example. When connected to an external voltage source such as a battery, these EFAA can be configured to produce a localized electric field of sufficient strength to ionize adjacent molecules in the working material. In some embodiments, a capacitor is placed between the external voltage source and the EFAA. The electrons removed from the monatomic or polyatomic molecules of the working material by the strong electric field in the vicinity of the EFAA can in this case be stored in said capacitor. The electrons can thus be returned to the working material when desired by reducing the external voltage applied to the capacitor.

In some embodiments, the combined ionization and neutralization process irreversibly consumes a negligible amount of external energy. In other embodiments, there are net energy losses associated with the ionization and neutralization process due to thermal losses, resistive losses, tunneling losses, for example. Several methods are available to mitigate such losses. For example, an electric motor or generator can be placed between the capacitor and the EFAA, or the battery and the capacitor. Thus any current flow as a result of a neutralization process can be converted into useful work or electrical energy, which can be used or stored in a battery or capacitor for later use, where the later use case can comprise a subsequent ionization process. In some embodiments, at least a portion of the energy released during a neutralization or ionization process can be recovered by an energy recovery or storage mechanism such as an electric motor, a battery, a capacitor, or inductor, and subsequently applied to an ionization or neutralization process, or be used to do useful work, for instance.

Consider the following example in the context of the method described in FIG. 4. In some embodiments, such as the aforementioned embodiments involving the ionization of objects within the working material, the ionization of the working material can increase the pressure of the working material even though the specific heat capacities is increased. The increase in pressure arises from the electrostatic repulsive forces between equally charged objects of the ionized working material. Throughout the ionization process, i.e. the change in the activation level of the BFGA, the BFGA increases the potential energy of the objects of the working material, and thus does work on the working material, resulting in the increase in pressure of the working material despite the increase in the specific heat capacities. This is different to the case shown in FIG. 4, where the change in the activation level of the BFGA between stations 1 and 2 is assumed to not do work on the working material, and to not transfer heat or mass between the working material and the outside environment, resulting in a decrease in pressure. The work consumed by the BFGA, i.e. done by the BFGA on the working material, during the ionization process is denoted the "additional work A".

In addition to the work consumed by the BFGA during the ionization process, the subsequent compression of the ionized working material can consume more work than the depicted adiabatic compression 11 from station 2 to station 3 in FIG. 4. The difference in the work done on the ionized working material during the adiabatic compression process and the work done on the neutral working material during the adiabatic compression 11 between stations 2 and 3 shown in FIG. 4 is denoted the "additional work B". Note that additional work B is done by the compression apparatus on the working material. At least a portion of the sum of the additional work A and additional work B can be recovered during the subsequent reduction in the level of activation of the BFGA. The compression of the working material has increased the charge density within interior region 34. In other words, the additional work B is stored in the form of potential energy within interior region 34. This larger electrical potential energy within interior region 34 due to additional work B, combined with the original potential energy associated with additional work A, can be used to do electrical work during the deionization process. For instance, the current flow during the deionization or neutralization process can be used to drive an electric generator. This electrical work is less than or equal to the sum of the aforementioned additional work A and B. In this manner, at least a portion the additional work consumed by the BFGA and the compression apparatus can be recovered during the deionization process.

Note that an aforementioned ionization apparatus can be described as a body force per unit mass inducing apparatus. For generality, however, such an apparatus will also be described as a BFGA even though the body force per unit mass is acting between individual objects of the working material as a consequence of the action of the ionization apparatus. Apart from the aforementioned field desorption method, a wide variety of other ionization apparatuses and method are available, such as photoionization, electron capture ionization, or electron bombardment ionization. The latter mechanism is present in glow discharge tubes, for instance.

As a result of the ionization, previously neutral molecules in the working material are charged. In some embodiments, as a result of the ionization, the molecules are negatively charged on average, while in other embodiments the molecules are positively charged on average. In some embodiments, the molecules are neutrally charged on average. For example, the working material can comprise positively charged ions and free electrons. The working material can be described as a plasma, in some embodiments. Note that a plasma can also be neutrally charged on average. Due to the charge of individual objects and the infinite range of the Coulomb potential in the working material, there are non-negligible body forces per unit mass acting between objects. The ionization apparatus can be configured in a manner in which these body forces result in a translational potential energy, which can add three vibrational modes to the DOF of a working material. Since in this example scenario the three translational kinetic DOF of these vibrational modes are already excited in the case in which the objects are neutrally charged, these additional vibrational modes can contribute three additional EDOF to the working material, namely the three DOF associated with the translational potential DOF of the vibrational modes of the interatomic or intermolecular or interobject potential. In other embodiments the objects in the working material can be electrically charged prior to interacting with the ionization apparatus. The ionization apparatus can be configured to increase or decrease the amount of charge of an object of the working material in this case. Note that the term "ionization" as used herein denotes the modification of the amount of charge of an object. The modification of the amount of charge of an object in the working material can modify the stiffness associated with the interatomic or intermolecular or interobject potential. As mentioned, the change in stiffness can change the transition temperature associated with the corresponding translational potential DOF of the objects, which can change the DE of these DOF. The creation of new EDOF, the elimination or neutralization of existing EDOF, or the modification of the DE of existing DOF can be employed by embodiments of the invention to artificially and deliberately modify the specific heat capacities of a working material.

The aforementioned example comprises the creation or modification of the interobject translational potential, i.e. the introduction or modification of a body force per unit mass acting between the centers of masses of objects within the working material. In these or other embodiments, there can be an interobject rotational potential. This is can be the case in which the ionization of an object coincides with the polarization of an object, for instance. In this case the ionized object can carry a permanent polarization, such as a water molecule. As mentioned, an ionized object can also be separately polarized by an externally applied field.

In some embodiments, a translational potential can be established between an external apparatus and an object in the working material. In this case, the external apparatus and the apparatus containing the working material, i.e. the casing apparatus, are configured in a manner in which the aforementioned translational potential of an object can vary a sufficient amount within the mean free path of an object within the working material. This ensures that the energy of an object in the translational potential at an instant in time can be considered to be a microscopic DOF of the individual object as opposed to a macroscopic state of a portion of the working material, i.e. a large collection of adjacent objects. To that end, the BFGA can be inserted into or placed within the working material in a manner in which the a sufficient spatial variation of the potential energy of an object of the working material interacting with the BFGA occurs on a length scale less than or equal to the order of magnitude of the mean free path of an object in the working material.

In another example, the BFGA can comprise several thin, parallel cylindrical tubes located within the working material. The cylindrical tubes are uniformly spaced, with their central axes intersecting the nodes of a square pattern on a plane perpendicular to the central axes. The distance of separation of cylindrical tubes perpendicular to the long axes is on the order of a mean free path of an object of the working material. Embedded within the cylindrical tubes there are insulated collections of charge, which are configured to exert a body force per unit mass on objects of the working material in their vicinity. A charge collection can be a conductor such as a metal such as copper, which is surrounded by insulating material such as glass or plastic. The cylindrical tubes can be carbon nanotubes or electrical wires, for instance. In some embodiments, the body force per unit mass can be configured to attract objects to the surface of the cylindrical tubes. Thus the BFGA can be considered to be configured to adsorb or attract objects of the working material. In the case in which the objects are polarizable or polarized molecules, the charge collections embedded within the cylindrical tubes along the length of the cylindrical tubes result in a radially decreasing electrical field strength, which can polarize and/or attract the polarized molecules to the surface of the cylindrical tubes. Note that the aforementioned radial decrease is measured relative to the central axis of a cylindrical tube. The charge collections within a cylindrical tube can have the same charge polarity and density in some embodiments. The charge collections of adjacent cylinders can have opposite polarity in some embodiments, such that the net charge of the BFGA is substantially zero. In some embodiments, the net charge of a BFGA need not be zero, and the charge polarity of adjacent cylindrical tubes can be identical. Since the spacing between the cylindrical tubes of the BFGA is on the order of the mean free path of an object in the working material, the body force per unit mas and the associated potential well has added at least two translational vibrational modes to the objects in the working material. More specifically, the two translational potential DOF associated with the vibrational modes along the two axes perpendicular to the long axes of the cylindrical tubes and to each other have been added to the total number of DOF of objects within the working material. In some embodiments, for some configuration or applications, this can increase the number of EDOF or modify the DE of existing DOF of objects of the working material.

In some embodiments, the collections of charge within the cylindrical tubes can also be configured to produce a spatially periodically varying potential field along the length of the cylindrical tube, where the period is on the order of the mean free path of an object in the working material. For example, in the case in which the objects are polarizable molecules, a cylindrical tube can comprise several insulated charge collections along the length of the cylindrical tube, where the charge polarity of adjacent charge collections alternates along the length of the tube. In this manner an electric field strength gradient is produced along the length of the tube, which modifies the strength and alternated the direction of the body force per unit mass acting on an object traveling along the length of the cylindrical tube. This results in a periodically varying potential field experienced by an object travelling along the length of a cylindrical tube. The amplitude and spatial variation of this potential field can be configured to add a translational potential DOF associated with the vibrational mode along the axis along the length of the cylindrical tube. In some embodiments, the amount of charge in a charge collection can be modified in time. In this manner, the number of EDOF or the DE of DOF of objects in the working material can be deliberately modified in time. In other embodiments, the cylindrical tubes can be inserted and removed from the working material. In a subset of such embodiments, the volume of the working material can be kept constant during the insertion or removal of the BFGA.

In some embodiments, the aforementioned body force per unit mass and associated potential field need not be generated by dedicated collections of charge. Instead, existing forces such as Van der Waals forces acting between the molecules of the BFGA and the objects of the working material can be employed to generate a desired potential field. For instance, there can be Van der Waals or dipole-dipole interaction forces between molecules of the aforementioned cylindrical tubes and objects of the working material. The spacing between the cylindrical tubes can be configured in a manner in which a sufficient portion of objects in the working material are located within the potential field associated with these interactions, and a sufficient variation of the potential energy of an object is capable of occurring within a mean free path of an object within the working material. In some embodiments, the spacing between adjacent cylindrical tubes can be small to such a degree, that the DE of translational kinetic DOF is reduced, i.e. the transition temperature of the three translational kinetic DOF associated with the translation of an object in the three orthogonal Cartesian directions is increased.

The previous paragraphs have described how a BFGA can be employed by embodiments of the invention in order to artificially and deliberately modify the number of EDOF, or the DE of existing DOF, of objects in a working material.

There are numerous ways in which aforementioned body forces per unit mass can be generated. A body force can arise from the existence of a physical or conventional potential field gradient. One such example is the force which arises from the gradient of an electric potential. For example, the elements of a medium can be configured to be electrically charged. In the context of a medium, the term "elements" refers to the constituent parts of the medium, such as sub-molecular particles, molecules, or a distinct or specified collection of molecules, for example. In the case of a gas, the molecules could be positively or negatively charged ions, for instance. The medium can also comprise a collection of mobile electrons or holes. Note that this collection can be contained in a solid, such as electrons contained in a metal conductor, or it can be described as a gas. By applying an electric field in a reservoir, body forces per unit mass can be generated on the electrically charged elements of the medium inside the reservoir. For example, in the case in which the objects are negatively charged, an electric field can be generated by embedding positive charges within an insulating material at, or in proximity of, the medium containing the negatively charged objects, i.e. the working material. These positive charges generate an attractive body force per unit mass on the negatively charged, mobile objects.

For other embodiments it can be impossible or inconvenient to use, procure, or create a medium with mobile electrical charges. In this case, elements of the medium can be polarized by applying an electric field, such as air molecules, or these elements can already have an intrinsic polarization, as in the case of polar molecules, such as water molecules. When placed in an electric field gradient, these polarized elements can experience a body force. Note that the magnitude of said force depends on the orientation of the polarization axis relative to the electric field, amongst other parameters. Thus an electric field can be configured to generate body forces per unit mass on the polar elements in the medium in a reservoir, as well as polarize elements in the medium, if necessary. A suitable electric field can be applied in a myriad of ways, such as the aforementioned embedding of static electric charges within an insulating material, where the location and the magnitude of the charges are configured to produce the desired electric field gradient. For example, alternating positive and negative insulated, static charge collections can be placed at, or in proximity of the working material.

Magnetism can also be employed to generate body forces. The medium can comprise diamagnetic, paramagnetic, or ferromagnetic elements. When magnetized, the individual elements in the medium can form magnetic dipoles, or these elements can already have an intrinsic magnetic dipole, such as an electron. When these magnetic dipoles are placed in a magnetic field with a non-zero curl or gradient, they can experience a body force. Note that the magnitude of the body force is a function of the orientation of the magnetic dipole relative to the local magnetic field, amongst other parameters. Thus an external magnetic field can be configured to generate body forces per unit mass on the magnetized elements in the medium in a reservoir, as well as magnetize the elements in the medium, if necessary. The magnetic field can be generated by ferromagnets other at least instantaneously magnetized elements, or by an electrical current flowing through an electromagnet, amongst other methods.

The body forces per unit mass can also arise from inertial effects. For instance, a working material can be subject to an acceleration in an inertial frame. This results in an acceleration of the elements of the working material, i.e. objects, relative to the reservoir containing the working material. The acceleration has the same effect as a body force per unit mass acting on the elements of the medium relative to the reservoir. Inertial forces can be generated by linear acceleration, i.e. motion of the reservoir along a straight line in the inertial frame. Inertial forces can also be generated by angular acceleration, i.e. motion of the reservoir along a curved path. In general, inertial forces can be generated by any accelerating motion in an inertial frame. Note that the centripetal acceleration varies linearly with radius in this embodiment. If a substantially uniform body force per unit mass of medium is desired, the depicted apparatus can be located at a larger radius, where the radial dimension of the apparatus is only a fraction of said radius. For example, a reservoir can be subject to a large inertial acceleration, which can give rise to a large effective body force per unit mass acting on object of the medium. When the body force is large enough, and the density of objects in the reservoir is small enough, the inertial body force per unit mass can give rise to a vibrational mode or translational potential DOF associated with individual objects in the reservoir. In this case, for some embodiments, the potential DOF can add one additional EDOF, or change the DE of an existing DOF, where the DOF is associated with the potential energy of an object of the working material moving along the direction parallel to the direction of the body force per unit mass. In some embodiments the DE of more than one DOF can be modified in this manner.

Embodiments employing other types of body forces per unit mass, or combinations thereof, are within the spirit and scope of the invention.

As mentioned, by changing the DE of at least one DOF of at least one object in the working material, the specific heat capacity at constant volume or the specific heat capacity at constant pressure can be modified. For an isolated reservoir at constant volume, a change in the specific heat capacity at constant volume can change the temperature of the working material, ceteris paribus, as well as the ratio of the specific heat capacity at constant pressure to the specific heat capacity at constant volume. In accordance with some embodiments of the invention, this change in temperature can be employed to reduce the temperature of a working material. This reduction in temperature can be employed to in applications involving refrigeration, for instance.

Figure 6:
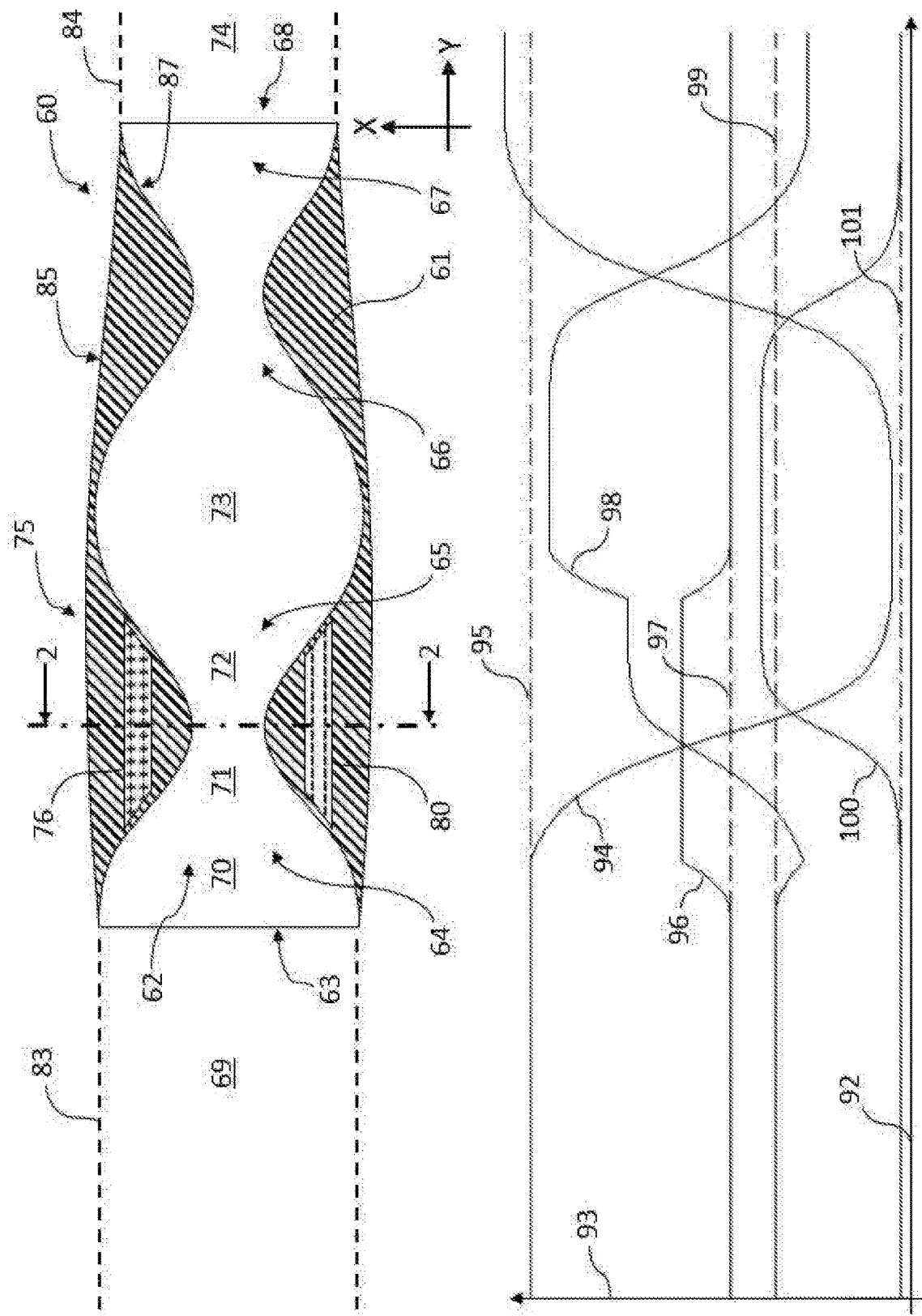
FIG. 6 is a cross-sectional view of some embodiments of the invention, as well as a plot of the approximate values of physical parameters as a function of the position along the Y-direction.

FIG. 6 is a cross-sectional view of some embodiments of the invention. The embodiment 60 shown is cylindrically symmetric about an axis parallel to the Y-axis and coincident with the center of embodiment 60. Outside surface 85 is therefore the shape of a tapered cylinder.

Embodiment 60 comprises a channel 62 with inside surface 87 located between a first opening 63 and a second opening 68, where the channel comprises a first contraction 64, a first expansion 65, a second contraction 66, and a second expansion 67. The cross-sectional geometry of channel 62 is circular when viewed along the Y-direction. Note that the terms "contraction" and "expansion" refer to the magnitude of the radius of the axially symmetric channel. Note that the channel radius or geometry can change in a different manner as a function of position along the Y-axis, or be configured differently, for other embodiments, or other operating conditions. For example, in other embodiments, the cross-sectional geometry of channel 62 can be annular or ring-shaped. In other embodiments the cross-sectional geometry of channel 62 or outside surface 85 can be square or rectangular. In some embodiments, the cross-sectional geometry of channel 62 can change from square to circular in the positive Y-direction, for example.

Bulk material 61 can comprise a metal such as aluminium or titanium. Bulk material 61 can also comprise ceramics. In some embodiments, bulk material 61 comprises composites, such as carbon fiber or fiberglass. Bulk material 61 can also comprise electrical insulators such as glass.

Note that the apparatus contained within inside surface 87 and outside surface 85 does not have to be a solid material, but can contain open spaces in order to not unnecessarily increase the mass or cost of embodiment 60.

In FIG. 6, embodiment 60 moves with constant velocity magnitude and direction relative to a working material. The velocity direction of the upstream working material relative to embodiment 60 is aligned with the Y-axis on average, i.e. directed from the left of the page to the right of the page. For clarity of description, the velocity magnitude and direction of the upstream working material relative to embodiment 60 is assumed to be constant in space and time. In other modes of operation, the upstream relative velocity magnitude and direction need not be constant in space or time. For example, the upstream relative velocity magnitude can increase or decrease as a function of time.

A working material can be a gas, such as air, helium, or nitrogen, for example. A working material can also be a liquid such as water. Note that water is compressible, although it is often treated as incompressible. In the embodiment shown in FIGS. 6-18, the working material is treated as an ideal gas for simplicity. In FIG. 6 and FIG. 10, the working material is treated as a diatomic ideal gas for clarity of description. In the embodiments in FIGS. 6-18, the working material can be any suitable material, where the conditions for suitability are explained below.

The working material upstream of embodiment 60, such as at station 69, is moving faster relative to embodiment 60 than the speed of sound in the working material in the configuration shown in FIG. 6. Both the first contraction 64 and the first expansion 65 of channel 62 are configured to compress the working material flowing through channel 62 in the positive Y-direction. The first throat is defined to be the portion of channel 62 with the smallest cross-sectional area of channel 62 between first contraction 64 and first expansion 65 when viewed along the Y-direction. The average speed of the working material relative to embodiment 60 at the first throat is approximately equal to the speed of sound within working material at that location. Upstream, such as at station 71 or 70, the average relative speed is larger than the speed of sound, and further downstream, such as at station 72, the average relative speed is smaller than the speed of sound within the working material in this embodiment. In some embodiments, there can be a shock wave located between the first throat and station 72. In other words, the relative flow speed of the working material downstream of the first throat can be faster than the speed of sound within the working material, where the relative flow speed is reduced to a speed slower than the speed of sound throughout the shock wave. The compression of working material between stations 71 and 72 can be described as a substantially adiabatic compression in this embodiment. In other embodiments, the compression can comprise heat transfer from or to the working material. In other embodiments, this compression can at least in part be carried out by an axial compressor, such as an axial compressor found in conventional jet engines. In other embodiments, this compression can at least in part be carried out by a centrifugal compressor, for instance. In some such embodiments, the working material upstream of the embodiment can move relative to the embodiment at a speed slower than the speed of sound in the working material. Both the second contraction 66 and the second expansion 67 of channel 62 are configured to expand the working material flowing through channel 62 in the positive Y-direction. The second throat is defined to be the portion of channel 62 with the smallest cross-sectional area of channel 62 between second contraction 66 and second expansion 67 when viewed along the Y-direction. The average speed of the working material relative to embodiment 60 at the second throat is approximately equal to the speed of sound within working material at that location. Upstream, such as at station 73, the average relative speed is smaller than the speed of sound, and downstream, such as at station 74, the average relative speed is larger than the speed of sound within the working material in this embodiment. The expansion of working material between stations 73 and 74 can be described as a substantially adiabatic expansion in this embodiment. In other embodiments, the expansion can comprise heat transfer from or to the working material. In other embodiments, this expansion can at least in part be carried out by an axial turbine, such as an axial turbine found in conventional jet engines. In other embodiments, this expansion can at least in part be carried out by a centrifugal turbine, for instance. In some such embodiments, the working material downstream of the embodiment can move relative to the embodiment at a speed slower than the speed of sound in the working material.

Dashed lines 83 and 84 indicate stagnation streamlines which are incident on the leading edge or originate at the trailing edge of embodiment 60. Streamlines 83 and 84 are therefore part of a streamsurface, or streamtube, which separate working material flowing around embodiment 60 from working material flowing through channel 62 of embodiment 60. In this embodiment, the steamtube is circular when viewed along the Y-direction.

A body force per unit mass generating apparatus, or "BFGA", 75 is located adjacent to channel 62. BFGA 75 is configured to be able to apply at least one body force per unit mass on objects, e.g. atoms or molecules, of the working material. The magnitude of this body force can be regulated in this embodiment. The BFGA 75 comprises a first charge collection 76 and a second charge collection 80. In the configuration shown, first charge collection 76 is positively charged, and second charge collection 80 is negatively charged. In other embodiments, the polarity of the charge in the charge collections can be reversed, i.e. a first charge collection is negatively charged, and a second charge collection is positively charged. In some embodiments, the polarity of the charge in both charge collections is identical, i.e. both collections of charge can be positively charged, or both collections of charge can be negatively charged. In some such embodiments, the first charge collection is indistinguishable from the second charge collection. In such embodiments, the strength of the electric field within channel 62 is sufficiently strong in the proximity of the charge collections such that the specific heat capacities of the working material within channel 62 take the desired values.

In the embodiment shown in FIG. 6, the amount of charge in a charge collection can be regulated by charging or discharging, or reducing the charge in a charge collection. In such embodiments, the charge collections can comprise conductors which are able to facilitate the accumulation of charge, or the reduction in the amount of charge contained within the conductor. In some instances in time the amount of charge in a charge collection can be configured to be zero in some of such embodiments. The charging process can comprise the application of a voltage difference across the first charge collection 76 and the second charge collection 80. This voltage difference can be supplied by a battery, for example. The first charge collection 76 and the second charge collection 80 are electrically insulated from each other as well as from portions of bulk material 61. Electrical conductors, such as insulated copper wires, connect first charge collection 76 to the voltage source, as well as second charge collection 80 to the voltage source. These electrical conductors are not shown. In between first charge collection 76 and the channel 62, as well as between second charge collection 80 and the channel 62, bulk material 61 is an electrical insulator. In effect, first charge collection 76 and second charge collection 80 can be considered to be the opposite plates of a capacitor, with the dielectric in between these plates comprising the working material as well as the relevant portion of bulk material 61 between first charge collection 76 and second charge collection 80. In the embodiment shown, first charge collection 76 and second charge collection 80 are configured in a manner in which the majority of electric field lines pass through the working material within channel 62 when the first charge collection 76 and second charge collection 80 are oppositely charged. To that end, the first charge collection 76 and second charge collection 80 can comprise several insulated conductors. These conductors can be wires, for instance, and can be arranged parallel to the Y-axis within first charge collection 76. This can serve to prevent or diminish any undesirable redistribution of charge within first charge collection 76 and second charge collection 80.

In accordance with some embodiments of the invention, and as explained below, the effect of the BFGA 75 during nominal operations is the increase of the specific heat capacity at constant pressure of the working material in channel 62 in the proximity of BFGA 75. In the embodiment and method of operation shown in FIG. 6, for simplicity, the pressure of the working material is constant throughout the increase or decrease of the specific heat capacity at constant pressure of the working material. The increase in the specific heat capacity at constant pressure corresponds to a decrease in the temperature and an increase in the density of the working material. In FIG. 6, this increase in the specific heat capacity at constant pressure occurs between stations 70 and 71. Between stations 71 and 72 the specific heat capacity at constant pressure is substantially constant in this embodiment. Between stations 72 and 73 the specific heat capacity at constant pressure is reduced to the original value at station 70 or station 69.

In effect, the transition from station 70 to station 71 can be described as an isobaric compression. In other embodiments, or other boundary conditions, or other methods of operation, the pressure need not be constant throughout the change in the specific heat capacities. For example, the pressure can increase or decrease during the increase or decrease of the specific heat capacity at constant pressure. For example, work can be done on the working material by a compression or expansion apparatus, such as a duct or a contraction or expansion of channel 62 or an axial turbine or compressor, or heat or mass can be added or removed from the working material. In the simplified embodiment shown in FIG. 6, no heat, or mass is exchanged between the working material within channel 62 and the remainder of embodiment 60.

The BFGA is configured to change the temperature of a working material due to the interaction of the working material with the body force per unit mass generated by the BFGA. To explain the concept, consider a scenario in which the density of the working material is constant throughout the activation of the BFGA, i.e. the increase in the body force per unit mass acting on an object, e.g. an atom or molecule, of the working material. In this scenario, no work, heat, or mass is exchanged between the working material and the environment. The body force per unit mass generated by a BFGA can be configured to increase the average potential energy of an object within a working material. The increase in the average potential energy of an object increases the specific heat capacity of the working material. Since the total energy within the working material is constant throughout the activation of the BFGA in this scenario, the increase in the average potential energy of an object reduces the average kinetic energy of the object in the working material. This corresponds to a decrease in the pressure of the working material, and explains the decrease in the temperature of the working material in this isochoric scenario, i.e. in the scenario in which the density or specific volume is constant. In this manner, the BFGA can increase the specific heat capacity of the working material and reduce the temperature.

Thus, the activation of the BFGA can be considered to artificially cool the working material. Similarly, the deactivation of the BFGA in this scenario can be considered to artificially heat the working material. The magnitude of the average potential energy of an object within the working material can be regulated by the BFGA. Since no energy is exchanged with the outside environment in this scenario, the average potential energy, or the potential energy "reservoir", of an object can be configured to be an artificial heat sink or an artificial heat source by the action of the BFGA.

In accordance with some embodiments of the invention, the activation level of the BFGA controls the strength of the body force per unit mass, which in turn regulates the average potential energy of the objects within the working material, which can be employed to control the temperature of the working material over a range of initial temperatures of the working material.

Note that, in the isobaric scenario shown in FIG. 6, work is done on the working material throughout the activation of the BFGA, and the density is increased while the temperature is decreased.

Note that, for simplicity, the change in the activation level of the BFGA is assumed to consume no work in the embodiment shown in FIG. 6 and FIG. 10. The activation of a BFGA can consume work in some embodiments. In some such embodiments, at least a portion of this work can be recovered during the deactivation of the BFGA.

As will be explained later, the activation of the BFGA can also reduce the specific heat capacity of a working material in some embodiments or some configurations. In this case the roles of the activation and deactivation of the BFGA are reversed compared to the alternate scenarios.

In other embodiments, the amount of charge contained within a charge collection is constant in time. In such embodiments, a charge collection can comprise electrons, ions or other charged particle embedded within an electrical insulator. In some such embodiments, a separate voltage source for regulating the amount of charge in a charge collection is not required.

In other embodiments, the first and second charge collections can be located in containers positioned within the central channel upstream and downstream of the first throat. For example, positively charged containers can be located approximately at station 71 and negatively charged containers can be located approximately at station 72. In some embodiments, the containers are insulated and streamlined.

In some embodiments the charge collections are not electrically insulated from the working material. In other words, the conductors or the charged plates of the charge collections can be in direct physical contact with the working material.

FIG. 6 also shows a plot of the approximate values of physical parameters as a function of the position along the Y-direction.

The horizontal axis 92, parallel to the Y-axis, indicates the position in the Y-direction at which the corresponding physical parameter is measured. The vertical axis 93, parallel to the X-axis, shows the value of the physical parameter. Note that the scale of vertical axis 93 is different for different physical parameters, i.e. different lines shown in the plot.

Line 94 shows the variation of the magnitude of the average velocity of the working material relative to the embodiment 60 as a function of position in the Y-direction. Line 95 shows the value of magnitude of the average velocity of the working material relative to the embodiment 60 at station 69 for reference. Note that the magnitude of the average velocity of the working material relative to the embodiment 60 at station 74 is larger than at station 69.

Line 96 shows the variation of the specific heat capacity at constant pressure of the working material as a function of position in the Y-direction. Line 97 shows the value of the specific heat capacity at constant pressure at station 69 for reference Line 98 shows the variation of the temperature of the working material as a function of position in the Y-direction. Line 99 shows the value of the temperature at station 69 for reference. Note that the temperature at station 74 is lower than at station 69. Embodiment 60 can therefore be considered to cool or refrigerate the working material flowing through channel 62.

Line 100 shows the variation of the static pressure of the working material as a function of position in the Y-direction. Line 101 shows the value of the static pressure at station 69 for reference.

Some embodiments of the invention produce a net mechanical work output. In the embodiment shown, the mechanical work is used to accelerate the working material, as indicated by the larger average relative speed 94 of working material at station 74 compared to station 69. The associated thrust force can be employed to cancel at least a portion of the drag force acting on embodiment 60 and any apparatus connected thereto due to the motion through the working material. In such applications, embodiment 60 can be operated in a similar fashion as a conventional ramjet.

The mechanical work can also be converted into electrical energy by means of an electric generator. For example, embodiment 60 can be rigidly connected to a support arm, which is rigidly connected to the drive shaft of an electric generator, where the shaft axis is parallel to the X-axis, and the center of embodiment 60 is offset relative to the shaft axis in the YZ-plane in a manner in which the thrust force on embodiment 60 applies a moment about the shaft axis. Embodiments of the invention can therefore also be considered for applications involving power generation or consumption. In another, similar configuration, embodiments of the invention can also be rigidly connected to the tips of conventional propeller, such as a helicopter main rotor, a conventional fixed wing aircraft propeller, or a ship propeller. Embodiments of the invention can therefore be employed to provide at least a portion of the torque required to propel propeller blades through the working material.

Figure 7:
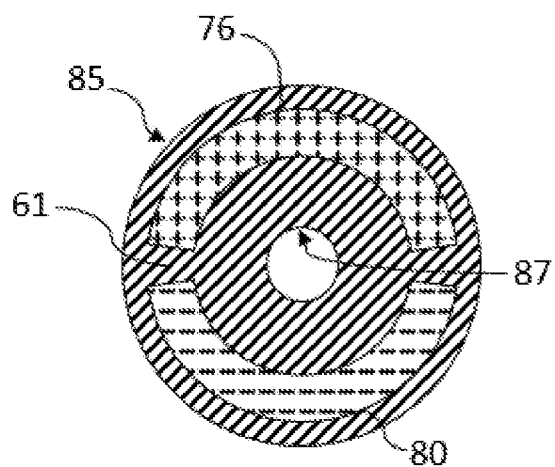
FIG. 7 is a cross-sectional view of the embodiment shown in FIG. 6 when viewed along the Y-direction.

FIG. 7 shows a cross-sectional view of embodiment 60 shown in FIG. 6 when viewed along the Y-direction. First charge collection 76 is arranged in an annular arc around channel 62, with second charge collection 80 mirroring firsts charge collection 76 in a plane parallel to the YZ-plane and coincident with the central axis of channel 62.

Figure 8:
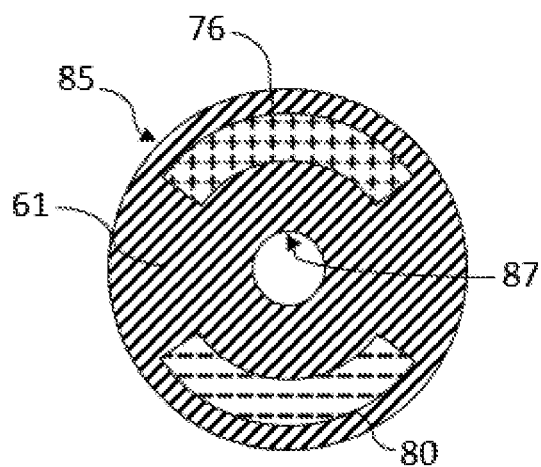
FIGS. 8-9 show cross-sectional views of embodiments of the invention similar to the embodiment shown in FIG. 6 when viewed along the Y-direction.

FIG. 8 shows a cross-sectional view of another embodiment of the invention. The embodiment shown in FIG. 8 has the same or similar cross-section when viewed along the Z-direction as embodiment 60 shown in FIG. 6. The angular range of the first charge collection 76 and the second charge collection 80 is smaller in FIG. 8 than it is in FIG. 7.

Figure 9:
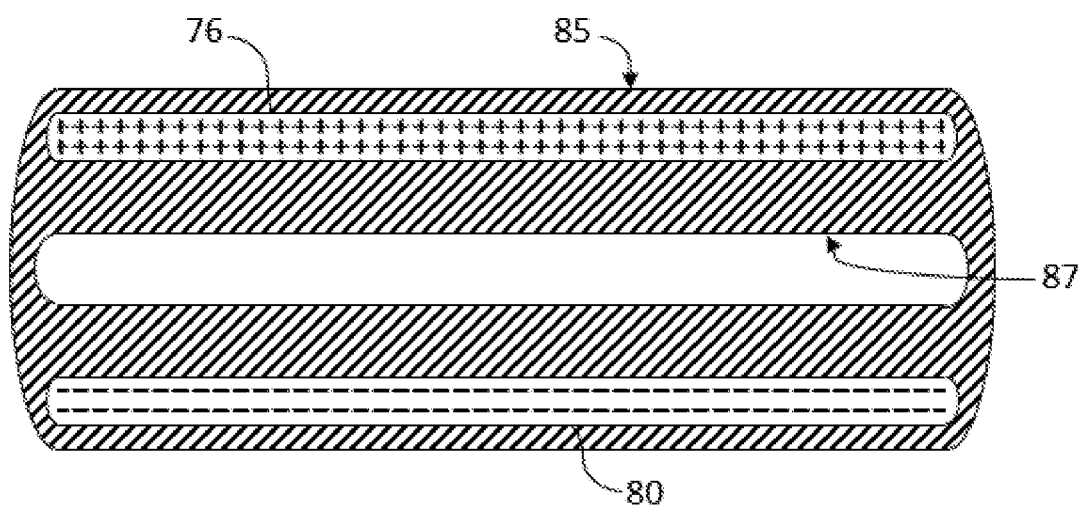
Figure 10:
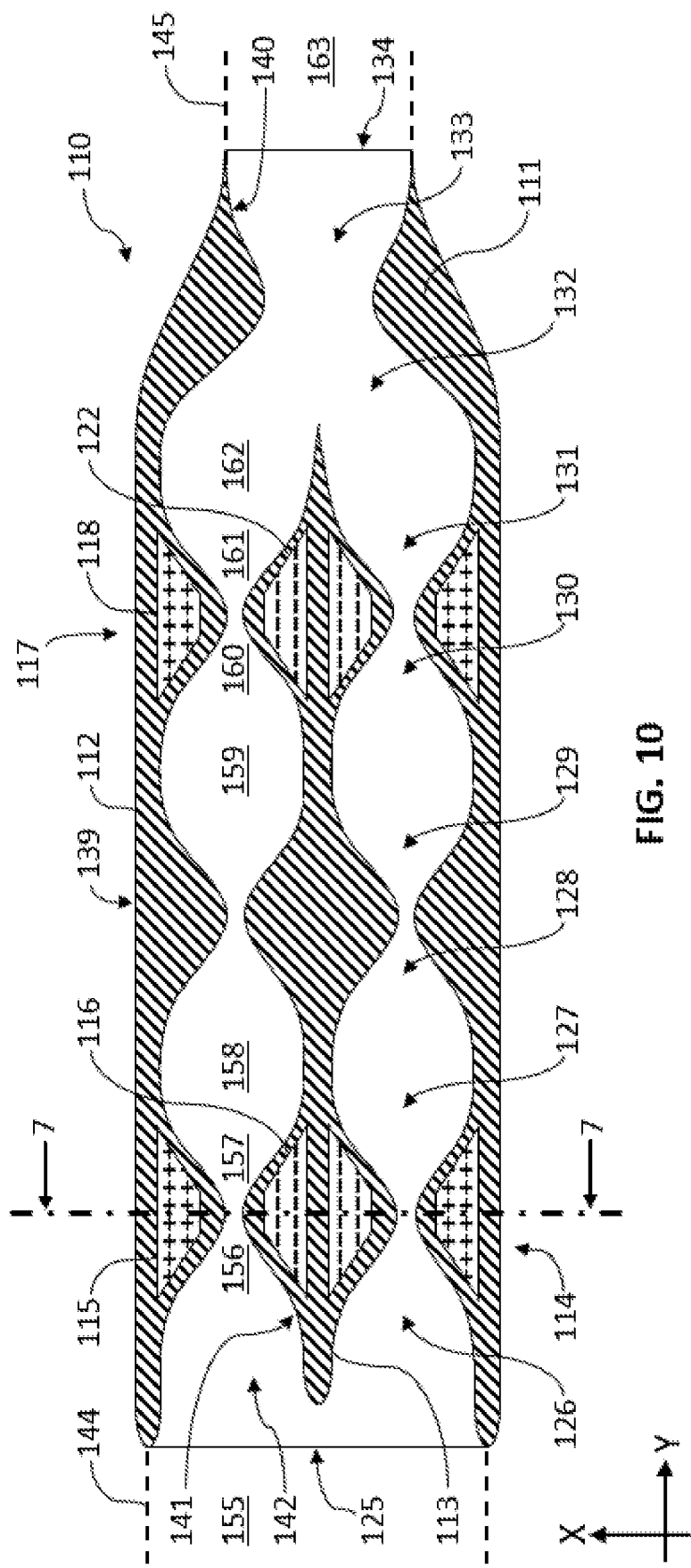
FIG. 10 is a cross-sectional view of some embodiments of the invention.

FIG. 9 shows a cross-sectional view of another embodiment of the invention. The embodiment shown in FIG. 9 has the same or similar cross-section when viewed along the Z-direction as embodiment 60 shown in FIG. 6. The outside surface 85 and the inside surface 87 describe a rectangular shape in this example.

FIG. 10 shows a cross-sectional view of another embodiment of the invention. Some features of the apparatus shown in FIG. 10, as well as some of the principles of operation of the apparatus share similarities with the apparatus shown in the other figures, and FIG. 6 in particular, and will therefore not be described in the same detail in the context of FIG. 10, and vice versa. The embodiment 110 shown is cylindrically symmetric about an axis parallel to the Y-axis and coincident with the center of embodiment 110. Outside surface 139 is therefore the shape of a tapered cylinder.

Embodiment 110 comprises an annular channel 142 with an inside apparatus 113 and an outside apparatus 112, as well as an exterior inside surface 140 and an interior inside surface 141 located between a first opening 125 and a second opening 134, where the channel 142 comprises a first stage, comprising first contraction 126, first expansion 127, second contraction 128, and second expansion 129, as well as a second stage, comprising third contraction 130, third expansion 131, fourth contraction 132, and fourth expansion 133. Other embodiments of the invention can comprise three such stages. Yet other embodiments can comprise four such stages. Other embodiments can comprise a larger number of stages.

Bulk material 111 can comprise a suitable material similar to bulk material 61.

In FIG. 10, embodiment 110 moves with constant velocity magnitude and direction relative to a working material. The velocity direction of the upstream working material relative to embodiment 110 is aligned with the Y-axis on average, i.e. directed from the left of the page to the right of the page. For clarity of description, the velocity magnitude and direction of the upstream working material relative to embodiment 110 is assumed to be constant in space and time. In other modes of operation, the upstream relative velocity magnitude and direction need not be constant in space or time.

The working material upstream of embodiment 110, such as at station 155, is moving faster relative to embodiment 110 than the speed of sound in the working material in the configuration shown in FIG. 10. Both the first contraction 126 and the first expansion 127 of channel 142 are configured to compress the working material flowing through channel 142 in the positive Y-direction. The first throat is defined to be the portion of channel 142 with the smallest cross-sectional area of channel 142 between first contraction 126 and first expansion 127 when viewed along the Y-direction. The average speed of the working material relative to embodiment 110 at the first throat is approximately equal to the speed of sound within the working material at that location. Upstream, such as at station 156 or 155, the average relative speed is larger than the speed of sound, and further downstream, such as at station 157, the average relative speed is smaller than the speed of sound within the working material in this embodiment. As explained in the context of embodiment 60, in some embodiments, there can be a shock wave located between the first throat and station 158. The compression of working material between stations 156 and 157 can be described as a substantially adiabatic compression in this embodiment.

Both the second contraction 128 and the second expansion 129 of channel 142 are configured to expand the working material flowing through channel 142 in the positive Y-direction. The second throat is defined to be the portion of channel 142 with the smallest cross-sectional area of channel 142 between second contraction 128 and second expansion 129 when viewed along the Y-direction. The average speed of the working material relative to embodiment 110 at the second throat is approximately equal to the speed of sound within the working material at that location. Upstream, such as at station 158, the average relative speed is smaller than the speed of sound, and downstream, such as at station 159, the average relative speed is larger than the speed of sound within the working material in this embodiment. The expansion of working material between stations 158 and 159 can be described as a substantially adiabatic expansion in this embodiment. Since the properties of the working material at station 159 are similar to the properties of the working material at station 155, a second stage can be connected to the end of the first stage, where the second stage is configured in a similar manner as the first stage. Similarly, a number of consecutive stages can be connected to the end of the second stage, forming a cascade of stages.

Both the third contraction 130 and the third expansion 131 of channel 142 are configured to compress the working material flowing through channel 142 in the positive Y-direction. The third throat is defined to be the portion of channel 142 with the smallest cross-sectional area of channel 142 between third contraction 130 and third expansion 131 when viewed along the Y-direction. The average speed of the working material relative to embodiment 110 at the third throat is approximately equal to the speed of sound within the working material at that location. Upstream, such as at station 159 or 160, the average relative speed is larger than the speed of sound, and further downstream, such as at station 161, the average relative speed is smaller than the speed of sound within the working material in this embodiment. As explained in the context of embodiment 60, in some embodiments, there can be a shock wave located between the third throat and station 161. The compression of working material between stations 160 and 161 can be described as a substantially adiabatic compression in this embodiment.

Both the fourth contraction 132 and the fourth expansion 133 of channel 142 are configured to expand the working material flowing through channel 142 in the positive Y-direction. The fourth throat is defined to be the portion of channel 142 with the smallest cross-sectional area of channel 142 between fourth contraction 132 and fourth expansion 133 when viewed along the Y-direction. The average speed of the working material relative to embodiment 110 at the fourth throat is approximately equal to the speed of sound within the working material at that location. Upstream, such as at station 162, the average relative speed is smaller than the speed of sound, and downstream, such as at station 163, the average relative speed is larger than the speed of sound within the working material in this embodiment. The expansion of working material between stations 162 and 163 can be described as a substantially adiabatic expansion in this embodiment.

Dashed lines 144 and 145 indicate stagnation streamlines which are incident on the leading edge or originate at the trailing edge of embodiment 110. Streamlines 144 and 145 are therefore part of a streamsurface, or streamtube, which separate working material flowing around embodiment 110 from working material flowing through channel 142 of embodiment 110. In this embodiment, the steamtube is circular when viewed along the Y-direction.

Note that the first and second stage of embodiment 110 is configured in a similar manner as embodiment 60 shown in FIG. 6. Correspondingly, a first BFGA 114 and second BFGA 117 are located adjacent to channel 142. First BFGA 114 and second BFGA 117 are configured to be able to apply at least one body force per unit mass on objects, e.g. atoms or molecules, of the working material. The magnitude of this body force can be regulated in this embodiment. First BFGA 114 comprises a first annular charge collection 115 and a second annular charge collection 116. In some embodiments, second charge collection 116 is circular in cross-section when viewed along the Y-direction. In the configuration shown, first charge collection 115 is positively charged, and second charge collection 116 is negatively charged. Similarly, second BFGA 117 comprises a first annular charge collection 118 and a second annular charge collection 122.

In principle, embodiment 110 can be considered to consist of a first stage similar to embodiment 60 and a second stage similar to embodiment 60 connected in series, where the station of the first stage which is similar to station 74 of embodiment 60 is equivalent to the station of the second stage which is similar to station 69 of embodiment 60. This can further increase the magnitude of the temperature difference of the working material between station 163 and station 155 for embodiment 110 compared to the magnitude of the temperature difference of the working material between station 74 and station 69 for embodiment 60. Note that each stage can comprise an axial turbine or compressor, for example, as discussed in the context of embodiment 60.

Figure 11:
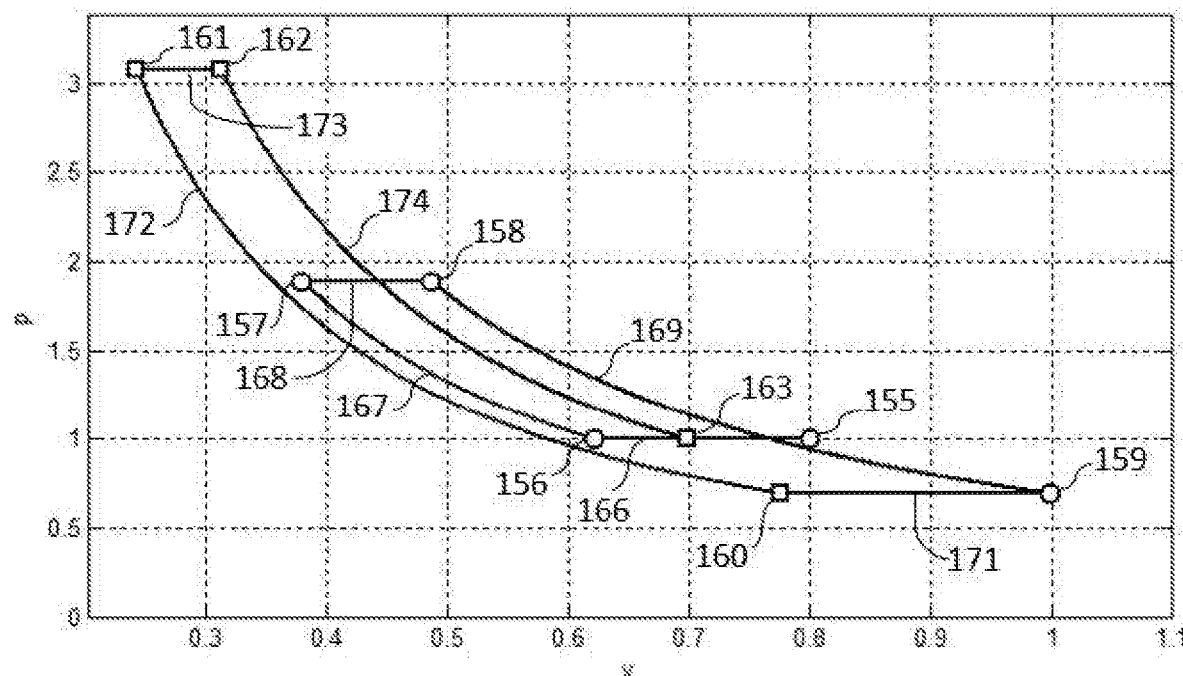
FIG. 11 shows a plot of pressure versus specific volume for a subset of embodiments of the invention for an example method of operation.

FIG. 11 shows a plot of pressure versus specific volume for a subset of embodiments of the invention for an example method of operation. For instance, FIG. 11 can describe an example method of operation of an embodiment similar to embodiment 110 shown in FIG. 10. Embodiment 110 will thus be used to explain the method of operation shown in FIG. 11, and vice versa. As objects of the working material are subjected to an electric field of the BFGA of sufficient strength, the specific heat capacity at constant pressure of the working material is increased in this embodiment. This is due to the polarized nature of the objects of the working material, the geometry and other material properties of objects of the working material, as well as the body forces exerted on objects of the working material by the BFGA, as will be explained below. As a consequence of the increase in the specific heat capacity at constant pressure, the temperature and specific volume of the working material is reduced. Due to the geometry of the channel 142, the pressure remains constant throughout this process in embodiment 110 for this method of operation. Accordingly, the transition from station 155 to station 156 is an isobaric compression 166. As mentioned, the transition from station 156 to station 157 is an adiabatic compression 167. Note that the specific heat capacity at constant pressure remains substantially constant throughout the adiabatic compressions or expansions shown in FIG. 11. As objects of the working material move from station 157 to station 158, they are no longer subjected to an electric field strength of sufficient magnitude. As a result, the specific heat capacity at constant pressure of the working material is decreased throughout the transition from station 157 to station 158. At station 158 the specific heat capacity at constant pressure is substantially equal to the specific heat capacity at constant pressure at station 155. Similar to the transition from station 155 to station 156, the transition from station 157 to station 158 can be described as an isobaric expansion 168 in this embodiment. In other embodiments, the transition from station 157 to station 158 need not be similar to the transition from station 155 to station 156. For example, the transition from station 157 to station 158 can be an isochoric compression in some embodiments. The transition from station 158 to station 159 is an adiabatic expansion 169. Station 159 marks the end of the first stage and the beginning of the second stage. Thus, the transition from station 159 to station 160 is an isobaric compression 171. The transition from station 160 to station 161 is an adiabatic compression 172. The transition from station 161 to station 162 is an isobaric expansion 173. The transition from station 162 to station 163 is an adiabatic expansion 174. In some embodiments, the working material at station 163 returns substantially isobarically to station 155. When the thermodynamic cycle is run in reverse, with the initial station being similar to station 163, the following station being similar to station 162, and the penultimate station being similar to station 155, an embodiment of the invention can be used to convert mechanical work into heat.

Note that the values along the axes of FIG. 11 are arbitrary, and are not intended to limit the invention to a specific working material or method of operation. Other thermodynamic cycles employing the artificial and deliberate modification of the specific heat capacities at constant volume or pressure are within the scope of the invention.

Figure 12:
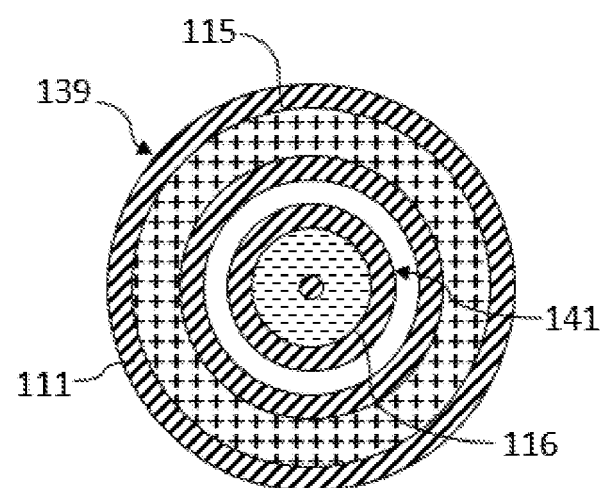
FIG. 12 shows a cross-sectional view of the embodiment shown in FIG. 10 when viewed along the Y-direction.

FIG. 12 shows a cross-sectional view of the embodiment shown in FIG. 10 when viewed along the Y-direction. As indicated, first charge collection 115 and second charge collection 116 have an annular cross-section when viewed along the Y-direction/

Figure 13:
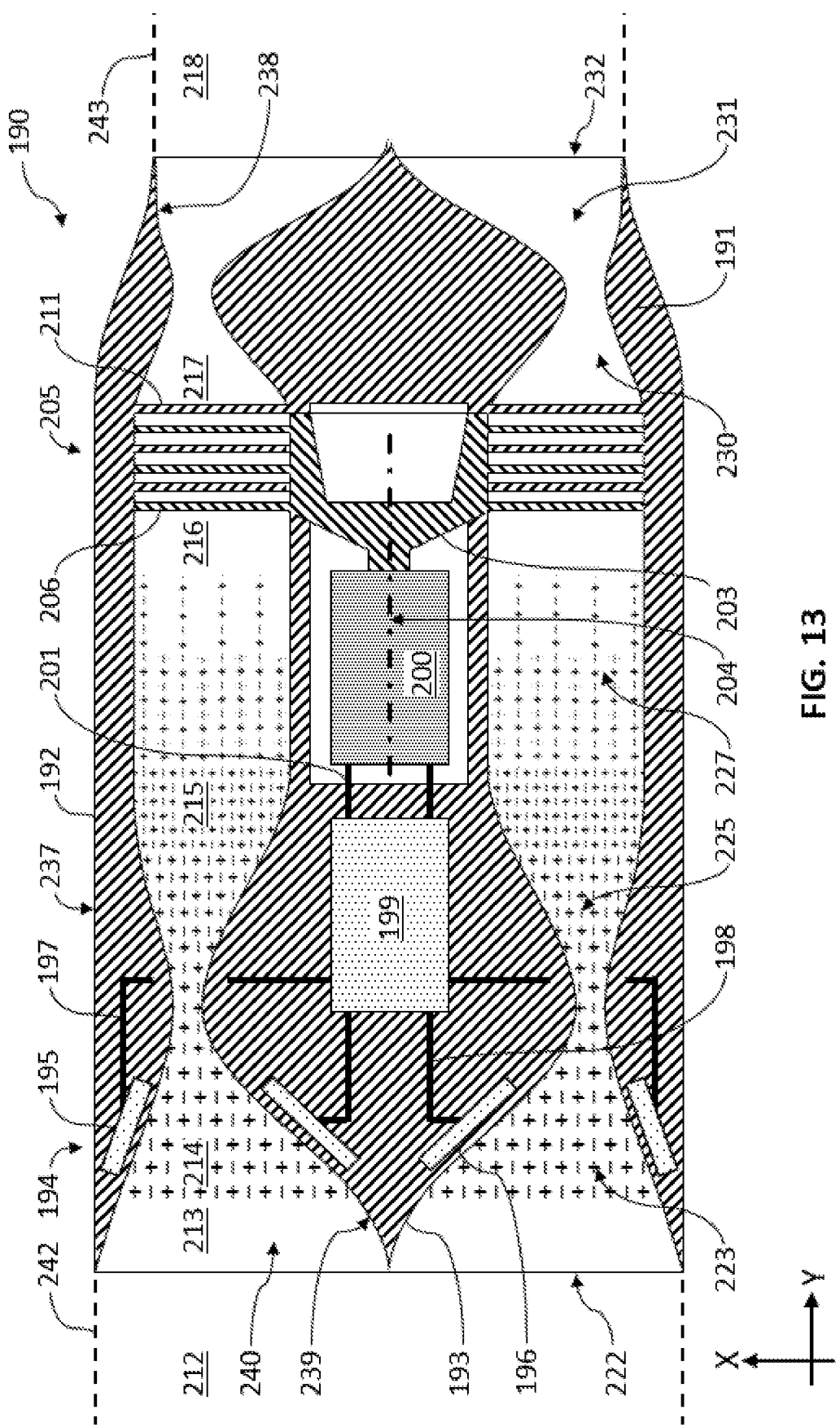
FIG. 13 is a cross-sectional view of some embodiments of the invention.

FIG. 13 shows a cross-sectional view of another embodiment of the invention. Some features of the apparatus shown in FIG. 13, as well as some of the principles of operation of the apparatus share similarities with the apparatus shown in the other figures, and FIG. 14 in particular, and will therefore not be described in the same detail in the context of FIG. 13, and vice versa.

The embodiment 190 shown is cylindrically symmetric about an axis parallel to the Y-axis and coincident with the center of embodiment 190. Outside surface 237 is therefore the shape of a tapered cylinder.

Embodiment 190 comprises an annular channel 240 with an inside apparatus 193 and an outside apparatus 192, as well as an exterior inside surface 238 and an interior inside surface 239 located between a first opening 222 and a second opening 232, where the channel 240 comprises a first contraction 223, a first expansion 225, a region of constant cross-sectional area 227 of channel 240 when viewed in the Y-direction, an axial turbine 205, a second contraction 230, and a second expansion 231.

Bulk material 191 can comprise a suitable material similar to bulk material 61.

In FIG. 13, embodiment 190 moves with constant velocity magnitude and direction relative to a working material. The velocity direction of the upstream working material relative to embodiment 190 is aligned with the Y-axis on average, i.e. directed from the left of the page to the right of the page. For clarity of description, the velocity magnitude and direction of the upstream working material relative to embodiment 190 is assumed to be constant in space and time. In other modes of operation, the upstream relative velocity magnitude and direction need not be constant in space or time.

The working material upstream of embodiment 190, such as at station 212, is moving faster relative to embodiment 190 than the speed of sound in the working material in the configuration shown in FIG. 13. Both the first contraction 223 and the first expansion 225 of channel 240 are configured to compress the working material flowing through channel 240 in the positive Y-direction. The first throat is defined to be the portion of channel 240 with the smallest cross-sectional area of channel 240 between first contraction 223 and first expansion 225 when viewed along the Y-direction. The average speed of the working material relative to embodiment 190 at the first throat is approximately equal to the speed of sound within the working material at that location. Upstream, such as at stations 212, 213, or 214, the average relative speed is larger than the speed of sound, and further downstream, such as at station 215, the average relative speed is smaller than the speed of sound within the working material in this embodiment. As explained in the context of embodiment 60, in some embodiments, there can be a shock wave located between the first throat and station 215. The compression of working material between stations 214 and 215 can be described as a substantially adiabatic compression in this embodiment.

The turbine 205, the second contraction 230 and the second expansion 231 of channel 240 are all configured to expand the working material flowing through channel 240 in the positive Y-direction. The second throat is defined to be the portion of channel 240 with the smallest cross-sectional area of channel 240 between second contraction 230 and second expansion 231 when viewed along the Y-direction. The average speed of the working material relative to embodiment 190 at the second throat is approximately equal to the speed of sound within working material at that location. Upstream, such as at station 216, the average relative speed is smaller than the speed of sound, and downstream, such as at station 218, the average relative speed is larger than the speed of sound within the working material in this embodiment. The expansion of working material between stations 216 and 218 can be described as a substantially adiabatic expansion in this embodiment.

Dashed lines 242 and 243 indicate stagnation streamlines which are incident on the leading edge or originate at the trailing edge of embodiment 190. Streamlines 242 and 243 are therefore part of a streamsurface, or streamtube, which separate working material flowing around embodiment 190 from working material flowing through channel 240 of embodiment 190. In this embodiment, the steamtube is circular when viewed along the Y-direction.

Turbine 205 comprises three stages, where each stage comprises a disc of rotor blades, such as first rotor disc 206 of the first stage, and a non-rotating disc of stator blades, such as third stator disc 211 of the third stage, where the stator disc is located downstream of the corresponding rotor disc of a stage. The stator discs are rigidly attached to the outside apparatus 192. The rotor discs are rigidly attached to the drive shaft 203. The drive shaft rotates about rotation axis 204 and drives an electric generator 200. In this embodiment, the electric generator 200 is rigidly attached to inside apparatus 193, which in turn is rigidly attached to outside apparatus 192.

In other embodiments, a turbine stage can comprise a counter-rotating pair of rotor discs. In such embodiments, the rotor discs rotating in first direction can drive a first electric generator and the rotor discs rotating in the second direction can drive a second electric generator. In some embodiments, each rotor disc can drive a separate electric generator. In some embodiments, at least one electric generator can be located in the outside apparatus 192. In some embodiments, such as the embodiment shown, at least one electric generator can be located in the inside apparatus 193. In some embodiments, an electric generator can be located downstream of a rotor disc. A wide variety of other embodiments, configurations and arrangements are within the scope of the invention.

The turbine 205 is configured to extract mechanical work from the slow moving, high pressure working material between station 216 and station 217. The mechanical work is converted into electrical energy by the electric generator 200, and passed to a power electronics apparatus 199 via electrical conductors, such as electrical conductor 201.

The power electronics apparatus 199 is configured to supply power to the ionization apparatus 194. Depending on the type of ionization apparatus 199 employed, the power electronics apparatus 199 can comprise a DC-DC voltage converter, or a DC-AC converter, for example. The power electronics apparatus 199 can also comprise an energy storage apparatus such as a battery, a capacitor, or an inductor.

The power electronics apparatus 199 can comprise an external power source or sink. In other words, in some embodiments, only a fraction of the power supplied by the electric generator 200 is supplied to the ionization apparatus 194. Similarly, only a fraction of the power supplied to the ionization apparatus 194 is provided by the electric generator 200 in some embodiments. Note that the aforementioned fractions can be zero. In some embodiments, there is no turbine 205 or electric generator 200 associated with embodiment 190, and the power required by the ionization apparatus 194 is supplied by a separate power source. Note that the separate power source can be configured to extract power from the working material. The separate power source can also supply power from a different power supply, such as a battery or fuel.

An ionization apparatus 194 is configured to ionize the working material. In this embodiment, the resulting plasma is substantially neutrally charged. In FIG. 13, the plasma can be described as a nonthermal plasma. In other embodiments, this need not be the case.

In FIG. 13, dielectric barrier discharge is employed to ionize the working material. A first conductor 195 is embedded within outside apparatus 192. First conductor 195 is axially symmetric about axis 204, and can comprise a conducting material such as a metal such as copper. An electrical conductor 197 electrically connects first conductor 195 to power electronics apparatus 199. A second conductor 196 is embedded within inside apparatus 193. Second conductor 196 is axially symmetric about axis 204, and can comprise a conducting material. An electrical conductor 198 electrically connects second conductor 196 to power electronics apparatus 199. In this embodiment, both the first conductor 195 and the second conductor 196 are electrically insulated from the working material in channel 240 by a dielectric. The dielectric is specially configured in a manner in which an electrical potential difference between the first conductor 195 and the second conductor 196 generated by the power electronics apparatus 199 results in the ionization of the working material. The dielectric can be a mica sheet, an electrical resistor, or a semiconductor, for example. In some embodiments, the aforementioned electrical potential difference can vary periodically in time. In some embodiments, the aforementioned electrical potential difference can be constant in time during nominal operations. In some embodiments, the magnitude of the root mean square electrical potential difference can be controlled by the power electronics apparatus 199. The power electronics apparatus 199 is configured to control the fraction of atoms or molecules of the working material which pass through channel 240 per unit time.

A wide variety of other configurations for dielectric barrier discharge ionization are available. For example, first conductor 195 can be in direct physical contact with working material.

In other embodiments, other ionization methods can be employed. For example, the working material can be ionized by electron bombardment. This approach is also employed in conventional glow discharge tubes. In some embodiments, the working material is ionized by photoionization. The working material can be ionized by a laser beam, for instance. In another example, the working material can be ionized by a helicon antenna. The helicon antenna can be located in the first contraction 223, in the vicinity of first opening 222. Resonance effects within the plasma can be used to enhance the ionization effect. There are a wide variety of apparatuses and methods available for ionizing a working material.

The ionization of an atom or molecule of the working material consumes energy, i.e. the ionization energy. This energy is provided by the power electronics apparatus 199, and any associated energy supplies.

As a result of the ionization, there are body forces per unit mass acting between the individual ions and free electrons of the ionized working material. The body forces can be electromagnetic in nature. For a sufficient strength of said body force per unit mass, and a sufficiently small distance of separation between adjacent atoms or molecules of the working material, the average potential energy of an object of the working material can be increased. In other words, the body forces per unit mass between atoms, molecules, ions, or electrons of the working material can lead to a potential energy associated with objects within the working material. In some embodiments, this potential energy is translational in nature, i.e. associated with the distance of separation between adjacent objects within the working material. In some embodiments, the potential energy is rotational in nature, i.e. associated with the orientation of a particular object within the working material with respect to the local electric or magnetic field. In this manner, at least one rotational or translational potential DOF can be added to an object of the working material. This can increase the average potential energy of an object of the working material, and reduce the temperature of the working material compared to a configuration in which the average potential energy is lower. In other words, the DE of existing DOF, or new EDOF, are created for the objects within the working material. This can increase the specific heat capacity at constant pressure or the specific heat capacity at constant volume of the ionized working material compared to the original configuration of the working material at station 212. For example, consider a working material comprising diatomic molecules. The ionization apparatus is configured to, on average, remove or add an odd number of electrons from a molecule. In this manner, the molecule is not only charged, but also polarized. In this case, two rotational potential DOF as well as three translational potential DOF can be excited by the action of the ionization apparatus. In FIG. 13, the atoms and molecules within working material at station 212 and 218 are substantially neutrally charged. In other embodiments, the magnitude of the charge carried by an object of the working material at station 212 can be substantially non-zero on average.

The ionization apparatus 194 is configured in a manner in which the working material remains ionized throughout at least a portion of the first contraction 223 and the first expansion 225 in some embodiments. In the embodiment shown, the neutralization or deionization of the plasma occurs within constant region 227. This process involves the absorption of free electrons by the ions of working material, and results in the transfer of the ionization energy to the atoms or molecules of the working material. The release of the ionization energy as well as the reduction in the specific heat capacities increases the temperature of the working material. At least a portion of the energy transferred to the working material during the ionization process and during the deionization process can be recovered by turbine 205 in this embodiment.

In other embodiments, at least a fraction of said energy transferred to the working material can be recovered from the working material electromagnetically, for example, using conventional direct energy conversion. A wide variety of direct energy conversion methods and apparatuses are available. For example, in some embodiments, a circumferential magnetic field about axis 204 downstream of station 215 and upstream of station 217 can be directed in a counterclockwise direction when viewed along the positive Y-direction. The magnetic field can be configured to direct positively charged ions to a circumferential third conducting plate, where the third conducting plate can be located on exterior inside surface 238, and direct negatively charged ions or electrons to a circumferential fourth conducting plate, where the fourth conducting plate can be located on interior inside surface 239. As a result of the magnetic field and the flow of ionized working material in the positive Y-direction, the Lorentz force directs positive charges in a radially outwards direction, and negative charges in the radially inwards direction. This is similar in principle to the Hall Effect. As a result of the accumulation of positive charges in the proximity of the third conductor in constant region 227 and negative charges in the proximity of the fourth conductor in constant region 227, there is a potential difference between the third conductor and the fourth conductor. By allowing current to flow between said third and fourth conductors, this potential difference can be converted into a power source. As a result of the current flow, the working material is deionized or neutralized as it flows in the positive Y-direction past the third and fourth conductors. At least a portion of this power can be used by the power electronics apparatus 199 to ionize the working material between stations 213 and station 214, for instance. Amongst other parameters, the strength of the magnetic field can be configured in a manner in which a sufficient portion of deionizations occur via the electrodes as opposed to via natural collisions of electrons and ions within the working material.

In some embodiments, the energy of the photons emitted during deionization is converted into electricity by the photoelectric effect. In some embodiments, the photons emitted during the deionization between stations 215 and 216 can be transferred to the working material between stations 213 and stations 214 via a waveguide, such that the deionization photons are used to ionize at least a portion of the working material between stations 213 and 214.

In some embodiments, inside apparatus 193 and outside apparatus 192 can also comprise magnetic field generating apparatuses. In some embodiments, the magnetic field generating apparatuses are configured to confine the plasma within channel 240. For example, the magnetic field lines can be configured to be substantially parallel to the streamlines of the working material flowing through channel 240. For instance, the magnetic field generating apparatuses can be superconducting current loops. In some embodiments, these current loops can be arranged parallel to the XZ-plane and with centers coincident with a line which is coincident with and parallel to axis 204. At least one current loop can be located in the proximity of first throat within inside apparatus 193, and at least one current loop can be located in the proximity of the first throat within outside apparatus 192, where the current of these two current loops is moving in opposite directions.

In some embodiments, the magnetic field is sufficiently strong, such that a reduced number of charged particles interact with the interior inside surface 239 or exterior inside surface 238 for at least a portion of the first contraction 223 or first expansion 225 compared to the scenario in which there is no externally applied magnetic field. This can reduce frictional losses as well as heat losses, for instance. The magnetic field can also be employed to regulate and control the rate of neutralization or deionization of ions.

Figure 14:
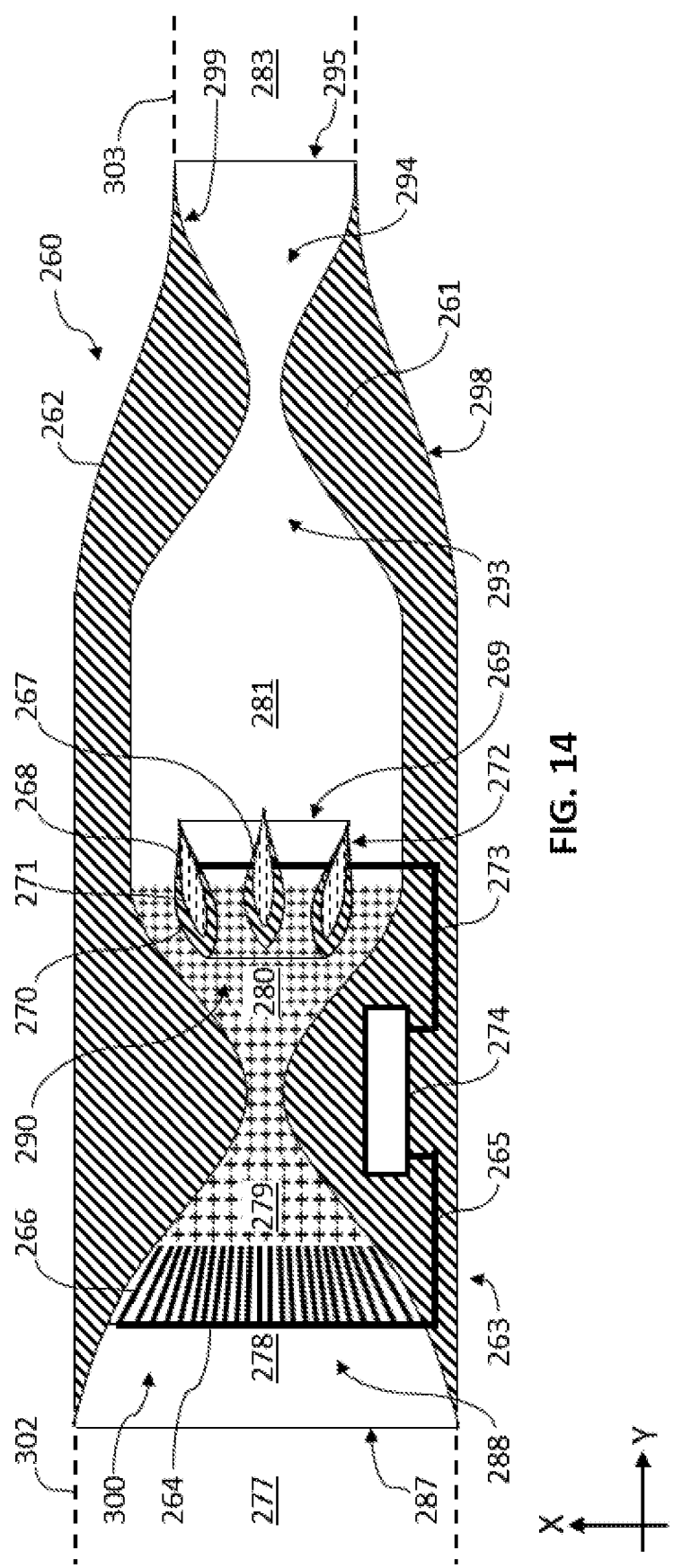
FIG. 14 is a cross-sectional view of some embodiments of the invention.

FIG. 14 shows a cross-sectional view of another embodiment of the invention. Some features of the apparatus shown in FIG. 14, as well as some of the principles of operation of the apparatus share similarities with the apparatus shown in the other figures, and FIG. 13 in particular, and will therefore not be described in the same detail in the context of FIG. 14, and vice versa.

The embodiment 260 shown is cylindrically symmetric about an axis parallel to the Y-axis and coincident with the center of embodiment 260. Outside surface 298 is therefore the shape of a tapered cylinder.

Embodiment 260 comprises an outside casing 262 bounded by outside surface 298 and inside surface 299. A channel 300 is located between a first opening 287 and a second opening 295, and comprises a first contraction 288, a first expansion 290, a region of constant cross-sectional area when viewed in the Y-direction, a second contraction 293, and a second expansion 294.

Bulk material 261 can comprise a suitable material similar to bulk material 61.

In FIG. 14, embodiment 260 moves with constant velocity magnitude and direction relative to a working material during nominal operations. The velocity direction of the upstream working material relative to embodiment 260 is aligned with the Y-axis on average, i.e. directed from the left of the page to the right of the page. For clarity of description, the velocity magnitude and direction of the upstream working material relative to embodiment 260 is assumed to be constant in space and time. In other modes of operation, the upstream relative velocity magnitude and direction need not be constant in space or time.

The working material upstream of embodiment 260, such as at station 277, is moving faster relative to embodiment 260 than the speed of sound in the working material in the configuration shown in FIG. 14. Both the first contraction 288 and the first expansion 290 of channel 300 are configured to compress the working material flowing through channel 300 in the positive Y-direction. The first throat is defined to be the portion of channel 300 with the smallest cross-sectional area of channel 300 between first contraction 288 and first expansion 290 when viewed along the Y-direction. The average speed of the working material relative to embodiment 260 at the first throat is approximately equal to the speed of sound within the working material at that location. Upstream, such as at stations 277, 278, or 279, the average relative speed is larger than the speed of sound, and further downstream, such as at station 280, the average relative speed is smaller than the speed of sound within the working material in this embodiment. The compression of working material between stations 279 and 280 can be described as a substantially adiabatic compression in this embodiment.

The second contraction 293 and the second expansion 294 of channel 300 are both configured to expand the working material flowing through channel 300 in the positive Y-direction. The second throat is defined to be the portion of channel 300 with the smallest cross-sectional area of channel 300 between second contraction 293 and second expansion 294 when viewed along the Y-direction. The average speed of the working material relative to embodiment 260 at the second throat is approximately equal to the speed of sound within working material at that location. Upstream, such as at station 281, the average relative speed is smaller than the speed of sound, and downstream, such as at station 283, the average relative speed is larger than the speed of sound within the working material in this embodiment. The expansion of working material between stations 281 and 283 can be described as a substantially adiabatic expansion in this embodiment.

Dashed lines 302 and 303 indicate stagnation streamlines which are incident on the leading edge or originate at the trailing edge of embodiment 260. Streamlines 302 and 303 are therefore part of a streamsurface, or streamtube, which separate working material flowing around embodiment 260 from working material flowing through channel 300 of embodiment 260. In this embodiment, the steamtube is circular when viewed along the Y-direction.

An ionization apparatus 263 is configured to ionize the working material. In this embodiment, the resulting plasma is substantially positively charged. In FIG. 14, field ionization is employed to ionize the working material. In this process, localized electric fields with a sufficiently strong magnitude are able to remove an electron from a monatomic or polyatomic molecule. These localized electric fields can be generated by an electric field amplification apparatus, or "EFAA". The EFAA can comprise a conductor, such as metal, with fine protrusions on the surface, where the thin protrusions can be generated using chemical etching, for example. In FIG. 14, an upstream EFAA 264 comprises an array of very thin, electrically conducting protrusions, such as protrusion 266 as well as an electrical conductor 265 connecting each protrusion to the power electronics apparatus 274. In the depicted embodiment, each protrusion, such as protrusion 266, is a carbon nanotube. Each protrusion is rigidly connected to a support apparatus within channel 300, which in turn is rigidly connected to outside casing 262. The EFAA is configured in a manner in which a substantial portion of molecules of the working material pass through the vicinity of at least one protrusion in the process of flowing through channel 300 between stations 278 and station 279. When connected to a voltage source such as a battery, the protrusions of EFAA 264 can be configured to produce a localized electric field of sufficient strength to ionize molecules of the working material in the vicinity of the protrusions. In FIG. 14, the EFAA 264 is positively charged, resulting in the transfer of electrons from the working material to the EFAA 264.

In other embodiments, the EFAA need not be located within channel 300. For instance, EFAA can be located on inside surface 299 of first contraction 288, with protrusions reaching from inside surface 299 into channel 300. In some embodiments, a field ionization apparatus is used in conjunction with a different ionization apparatus. For example, a field ionization apparatus can be used in conjunction with an electron bombardment apparatus. For instance, an alternating electric field generated within channel 300, in the vicinity of station 279, for instance, can be employed to accelerate free electrons. In subsequent collisions with neutral molecules new ions can be created, or the charge of existing ions can be increased.

As a result of the ionization, there are body forces per unit mass acting between the individual ions of the ionized working material. The body forces can be electromagnetic in nature. Since the ionized molecules of the working material are positively charged, there are repulsive electrostatic forces acting between the ions, for instance. Note that, in some embodiments, there can also be body forces per unit mass acting between ionized molecules of the working material and polarized, neutral molecules of the working material. For a sufficient strength of said body force per unit mass, and a sufficiently small distance of separation between adjacent atoms or molecules of the working material, the average potential energy of an object of the working material can be increased. In other words, the body forces per unit mass between atoms, molecules, ions, or electrons of the working material can lead to a potential energy associated with objects within the working material. In some embodiments, this potential energy is translational in nature, i.e. associated with the distance of separation between adjacent objects within the working material. In some embodiments, the potential energy is rotational in nature, i.e. associated with the orientation of a particular object within the working material with respect to the local electric or magnetic field. In this manner, at least one rotational or translational potential DOF can be added to an object of the working material. This can increase the average potential energy of an object of the working material, and reduce the temperature of the working material compared to a configuration in which the average potential energy is lower. In other words, the DE of existing DOF, or new EDOF, are created for the objects within the working material. This can increase the specific heat capacity at constant pressure or the specific heat capacity at constant volume of the ionized working material compared to the original configuration of the working material at station 277. As before, consider a working material comprising diatomic molecules. The ionization apparatus is configured to, on average, remove an odd number of electrons from a molecule. In this manner, the molecule is not only charged, but also polarized. In this case, two rotational potential DOF as well as three translational potential DOF can be excited by the action of the ionization apparatus.

The power electronics apparatus 274 is configured to supply power to the ionization apparatus 263. Depending on the type of ionization apparatus 274 employed, the power electronics apparatus 274 can comprise a DC-DC voltage converter, for example. A DC-DC voltage converter can be employed to increase the electric field strength in the vicinity of a protrusion of EFAA 264 to a sufficient magnitude to ionize molecules of the working material in the vicinity of the protrusion. The power electronics apparatus 274 can also comprise an energy source or energy storage apparatus, such as a battery, a capacitor, or an inductor. By applying an artificial electric field across EFAA 264 and cathode 272 within channel 300 by means of an external voltage supply such as a battery, power electronics apparatus 274 can ionize objects within the working material in the vicinity of EFAA 264.

Due to the removal of electrons from the working material by EFAA 264, the working material between station 279 and 280 is positively charged. The compression of the positively charged working material by first contraction 288 and first expansion 290 results in a larger density of positive charges at station 280 than at station 279.

In embodiment 260, at least of a portion of the increase in pressure associated with the electrostatic repulsion of positive charges of the working material is cancelled by collections of negative charge, such as negative charge collection 271. In embodiment 260, the negative charge collections are at least partially insulated from the positively charged working material by an insulating material, such as insulating material 270. The insulating material can be a glass or ceramic, for example. The negative charge collections exert an attractive electrostatic body force per unit mass on the positive ions of the working material. This body forcer per unit mass can be configured to mitigate and cancel any deceleration of the positive ions of the working material moving from station 279 to the higher positive charge concentration at station 280.

The negative charge collections in this embodiment are arranged as follows. An outside charge collection apparatus 268 is a circular duct which is axially symmetric about an axis parallel to the Y-axis, with trailing edge 269. An inside charge collection apparatus 267 is in the shape of a teardrop, and is also axially symmetric about the same axis as charge collection apparatus 268 and outside casing 262.

Located along the trailing edge of outside charge collection apparatus 268 and the trailing point of inside charge collection apparatus 268 there is a conductor or an electrode in direct physical or electrical contact with the working material. This electrode is negatively charged. The cathode 272 of outside charge collection apparatus 268 is located on the radially inward and outward pointing trailing surface of outside charge collection apparatus 268, as indicated in FIG. 14.

Cathode 272 is electrically connected to power electronics apparatus 274 by an electrical conductor 273, thus completing the electrical circuit between the anode, i.e. EFAA 264, and cathode 272. Electrons are released from cathode 272 into the working material, where they deionize or neutralize the positively charged ions in the working material.

In embodiment 260, the negative charge collections are part of the electrical circuit between EFAA 264 and cathode 272. The negative charge collections can in this case be considered to be formed by the capacitance between the positively charged ions of the working material and the free electrons transferred from the initially neutral working material the EFAA 264 in the deionization process between stations 278 and 279. The insulating material, such as insulating material 270, can be considered to form the dielectric between the positive and negative collections of charge of the capacitor, and the capacitor can be considered to be connected in parallel with the electrical resistance of the neutral working material between cathode 272 and the positively charged ions at station 280.

In other embodiments, the negative charge collections, or additional, separate negative charge collections, are electrically insulated from the electrical circuit between EFAA 264 and cathode 272 as well as the working material in channel 300. In some such embodiments, the amount of charge in a charge collection can be regulated by an external voltage source, such as a battery, similar to second charge collection 80 in FIG. 6. In some embodiments, negative charge collections can be additionally or alternatively embedded within outside casing 262 in the vicinity of first expansion 290 or first contraction 288.

In some embodiments, there are no dedicated insulated negative charge collections. Note that the fraction of molecules within the working material which are ionized after interacting with EFAA 264, as well as the change in the density of the positively charged ions between station 279 and station 280, can be configured in a manner in which the flow through channel 300 does not unstart. In some such embodiments, the active electrical circuit contained within power electronics apparatus 274 can be considered to be a simple electrical conductor during nominal operations. Due to the absence of the negative charge collections, the ionization and compression of the positively charged working material between station 279 and station 280 by the interior surface 299 of outside apparatus 262 consumes an additional amount of work compared to the theoretical, adiabatic compression of a neutrally charged ideal gas. This additional work can be considered to be stored in the potential energy between the positively charged ions of the working material. The ionization energy required by EFAA 264 can be provided by at least a portion of this additional work. This portion of the additional work is also referred to as additional work A, as will be discussed later. The compression between station 279 and station 280 increases the density of charge at station 280 compared to station 279, and results in an electrical potential difference between the anode, i.e. EFAA 264, and cathode 272. In some embodiments, this potential difference is sufficient for ionizing the working material in the vicinity of EFAA 264. In other embodiments, the potential difference between EFAA 264 and cathode 272 can be amplified by a DC-DC converter within power electronics apparatus 274, for example. The ionization energy is the energy required to move an electron from a molecule of the working material, as well as away from the collection of positively charged ions, and into EFAA 264 and electrical conductor 265. During the ionization process, an electron moves to a lower electrical potential energy. Any electrical resistance the electron experiences in the process results in a transfer of electrical energy of the electron into another form of energy, such as photons, phonons, or thermal energy of molecules of the working material with which the electron collides. It is assumed that a substantial portion of this electrical energy released by the electron during the ionization process results in an increased thermal energy of the working material at station 281. In this embodiment, therefore, a substantial portion of additional work A is converted into thermal energy by the time an element of the working material reaches station 281.

During the deionization process, a substantial portion of the remainder of the additional work, i.e. additional work B, is assumed to be transferred to the working material in the form of thermal energy in this embodiment. Despite the reduction in the potential energy difference between electrons in electrical conductor 265 and ions at station 280 compared to the potential energy difference between electrons within not-yet-ionized molecules of working material at station 278 and ions at station 280, there is still a large potential difference between electrons in electrical conductor 265 and ions at station 280. This potential difference is converted into heat due to the resistivity of the working material to the electric current flowing through the working material during the deionization process. The aforementioned potential energy difference results in the acceleration of electrons prior to colliding with neutral or ionized molecules of the working material. Thus, the electrical energy of the electrons due to the potential energy difference is transferred to the molecules of the working material in inelastic collisions prior to or during the deionization of individual ions. In this embodiment, therefore, a substantial portion of additional work B is converted into thermal energy by the time an element of the working material reaches station 281.

The conversion of a substantial portion of additional work A and B into thermal energy can be facilitated by the following considerations, for example. Outside casing 262 can be configured to be a good electrical and thermal insulator. Any photons emitted in the ionization or deionization process can absorbed by the working material at station 281, or absorbed and re-emitted as thermal radiation by inside surface 299 of some embodiments. A negligible amount of electrical energy can be lost within electrical conductors 265 and 275, as well as power electronics apparatus 274. For instance, electrical conductors 265 and 275 can be superconductors.

The conversion of a substantial portion of additional work A and B into thermal energy results in an increase in the temperature of the neutral working material at station 281 compared to the scenario in which the working material is theoretically treated as an ideal gas with controllable specific heat capacities. At least a portion of this thermal energy can be thermodynamically converted into useful mechanical work by the expansion and acceleration of the working material between stations 281 and 283. As a result, at least a portion of the mechanical additional work A and B done on the working material by outside apparatus 262 during the compression of the working material between stations 279 and 280 is recovered by the conversion of a substantial portion of this additional work into thermal energy, and the subsequent thermodynamic conversion of a substantial portion of this thermal energy into mechanical work done by the working material on the outside apparatus 262 during the expansion of the working material between stations 281 and 283. The remaining mechanical work required to satisfy the additional work requirements is also provided by the expansion of the working material between stations 281 and 283. In some such embodiments, a net refrigeration of the working material can nevertheless be achieved.

In the above example, the electrical potential energy difference between station 278 and 280 and associated electrical current of electrons can be considered to result in the heating of the working material, with a portion of this heat being recovered thermodynamically. In other words, the majority of the voltage drop associated with said ionization current occurs due to the resistivity of the working material. In other embodiments, at least a portion of the voltage drop associated with said ionization current can occur across an electric motor located between electrical conductor 265 and electrical conductor 273, i.e. along the electron path between anode 264 and cathode 272. Said electric motor can drive an axial compressor, which can be configured to compress the working material before deionization. In some embodiments, the axial compressor can be configured to compress the working material after deionization. In the latter case, the axial compressor can be configured within embodiment 260 in a similar manner as axial turbine 205 is configured within embodiment 190 in FIG. 13. In some embodiments, the compressor can be of a centrifugal type, or of a reciprocating piston type.

In some embodiments, outside apparatus 262 can also comprise electric field generating apparatuses. In some embodiments, the electric field generating apparatuses are configured to confine the positively charged ions within channel 300. For example, the negative collections of charge can be located within bulk material 261 of outside apparatus 262 in the vicinity of channel 300 throughout first contraction 288 and the first expansion 290. These negative collections of charge can be arranged in annular fashion around channel 300.

In some embodiments, the electric field of these negative collections of charge is sufficiently strong, such that a reduced number of positively charged ions interact with the inside surface 299 for at least a portion of the first contraction 288 or first expansion 290 compared to the scenario in which there is no such externally applied electric field. This can reduce frictional losses as well as heat losses due to the flow of working material relative to inside surface 299, for instance.

Figure 15:
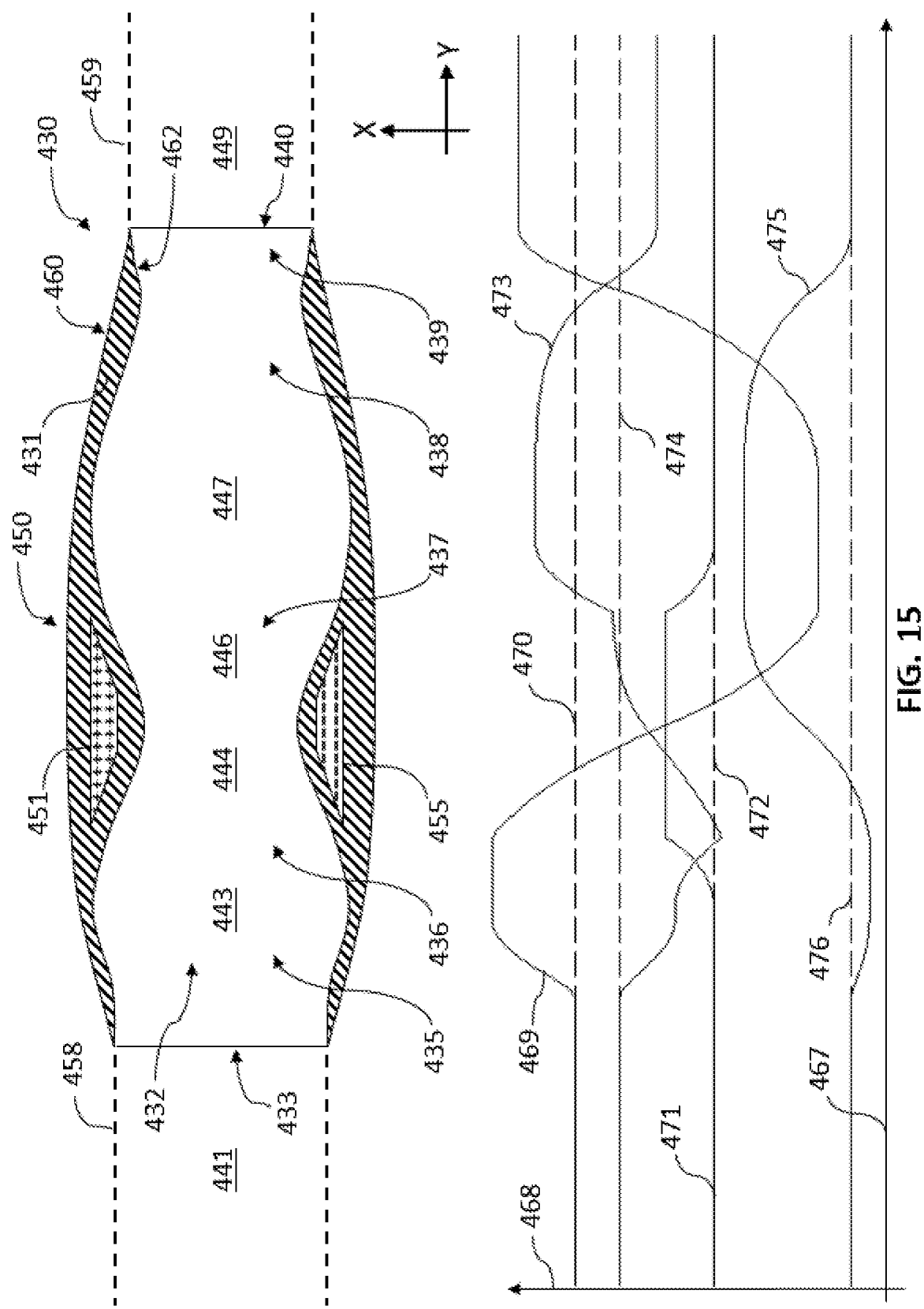
FIG. 15 is a cross-sectional view of some embodiments of the invention.

FIG. 15 is a cross-sectional view of one embodiment of the invention. With the exception of BFGA 450, embodiment 430 shown is cylindrically symmetric about an axis parallel to the Y-axis and coincident with the center of embodiment 430. Outside surface 460 is therefore the shape of a revolute body, or a cylinder with variable radii along the Y-axis.

Embodiment 430 comprises a channel 432 with inside surface 462 located between a first opening 433 and a second opening 440, where the channel comprises a first expansion 435, a first contraction 436, a second expansion 437, a second contraction 438, and a third expansion 439. The cross-sectional geometry of channel 432 is circular when viewed along the Y-direction. Note that the terms "contraction" and "expansion" refer to the magnitude of the radius of the axially symmetric channel. Note that the channel radius or geometry can change in a different manner as a function of position along the Y-axis, or be configured differently, for other embodiments, or other operating conditions. For example, in other embodiments, the cross-sectional geometry of channel 432 can be annular or ring-shaped. In other embodiments the cross-sectional geometry of channel 432 or outside surface 460 can be square or rectangular. In some embodiments, the cross-sectional geometry of portions of channel 432 can change from square to circular along the length of the channel, i.e. in the positive or negative Y-direction, for example.

Bulk material 431 can comprise a metal such as aluminium, titanium, or steel. Bulk material 431 can also comprise ceramics. In some embodiments, bulk material 431 comprises composites, such as carbon fiber or fiberglass. Bulk material 431 can also comprise electrical insulators such as glass.

Note that the apparatus contained within inside surface 462 and outside surface 460 does not have to be a solid material, but can contain open or hollow spaces in order to not unnecessarily increase the mass or cost of embodiment 430. Some embodiments can comprise complex geometry found in conventional turbofan or ramjet engines. For example, a hollow space can be located between inside surface 462 and outside surface 460, where a surface can comprise solid metal or composite skin, and where the otherwise hollow enclosed space can comprise structural support material such as frames or stringers found in conventional semimoncoque constructions. In some embodiments, a large portion of bulk material 431 can comprise a solid material, as indicated in FIG. 15. For instance, bulk material 431 can be machined out of a solid block of metal, or an annular cylinder, using computer numerical controlled (CNC) mills. In some embodiments, portions of bulk material 431 can also be manufactured using additive manufacturing techniques, such as selective laser sintering (SLS).

In FIG. 15, embodiment 430 moves with constant velocity magnitude and direction relative to a working material. The free stream velocity direction of the upstream working material relative to embodiment 430 is aligned with the Y-axis on average, i.e. directed from the left of the page to the right of the page. For clarity of description, the velocity magnitude and direction of the upstream working material relative to embodiment 430 is assumed to be constant in space and time. In other modes of operation, the upstream relative velocity magnitude and direction need not be constant in space or time. For example, the upstream relative velocity magnitude can increase or decrease as a function of time. When embodiment 430 is employed as an aircraft engine, for example, the upstream relative velocity magnitude and direction can change during nominal operations, such as during takeoff, climb, cruise, descent, and landing, for instance, as is the case for conventional aircraft engines or propulsion systems.

A working material can be a gas, such as air, helium, or nitrogen, for example. A working material can also be a liquid such as water. In the embodiment shown in FIG. 15 the working material is treated as an ideal gas for simplicity. In FIG. 15, the working material is treated as a diatomic ideal gas for clarity of description. In the embodiments in FIG. 15, the working material can be any suitable material, where the conditions for suitability are explained below.

The working material upstream of embodiment 430, such as at station 441, is moving faster relative to embodiment 430 than the speed of sound in the working material upstream of embodiment 430 in the configuration shown in FIG. 15. The magnitude of the velocity of the working material relative to embodiment 430 can be smaller than the magnitude of the velocity of the working material relative to the embodiment shown in FIG. 6. The first expansion 435 is configured to expand the working material flowing through channel 432 in the positive Y-direction. Both the first contraction 436 and the second expansion 437 of channel 432 are configured to compress the working material flowing through channel 432 in the positive Y-direction. The first throat is defined to be the portion of channel 432 with the smallest cross-sectional area of channel 432 between first contraction 436 and second expansion 437 when viewed along the Y-direction. The average speed of the working material relative to embodiment 430 at the first throat is approximately equal to the speed of sound within the working material at that location. Upstream, such as at station 441, 443 or 444, the average relative speed is larger than the speed of sound, and further downstream, such as at station 446, the average relative speed is smaller than the speed of sound within the working material at said locations in this particular mode of operation. In some embodiments, there can be a shock wave located between the first throat and station 446. In other words, the relative flow speed of the working material downstream of the first throat can be faster than the speed of sound within the working material, where the relative flow speed is reduced to a speed slower than the speed of sound throughout the shock wave prior to station 446. The presence of a shock wave at a location downstream of the first throat, but close to the first throat, can avoid an engine unstart due to variations or anisotropies in the free stream flow, such as irregularities caused by turbulence. The positioning of the shock wave at a channel cross-sectional area which is only slightly larger than the cross-sectional area of the first throat can reduce the strength of the shock, and thus improve the efficiency of the engine.

The expansion of the working material between stations 441 and 443 increases the average speed of the working material flowing through channel 432. This expansion can be described as a substantially adiabatic expansion in this simplified example. The compression of the working material between stations 444 and 446 can be described as a substantially adiabatic compression in this embodiment. In other embodiments, the compression can comprise heat transfer from or to the working material. In other embodiments, this compression can at least in part be carried out by an axial compressor, such as an axial compressor found in conventional jet engines. In other embodiments, this compression can at least in part be carried out by a centrifugal compressor, for instance. In order to reduce wave drag associated with the rotor blades of the compressor, an axial or centrifugal compressor is preferably located in a portion of subsonic fluid flow through channel 432, such as between the first throat and station 446, or between the first throat and station 447.

Both the second contraction 438 and the third expansion 439 of channel 432 are configured to expand and accelerate the working material flowing through channel 432 in the positive Y-direction. The second throat is defined to be the portion of channel 432 with the smallest cross-sectional area of channel 432 between second contraction 438 and third expansion 439 when viewed along the Y-direction. The average speed of the working material relative to embodiment 430 at the second throat is approximately equal to the speed of sound within the working material at that location. Upstream, such as at station 447, the average relative speed is smaller than the speed of sound, and downstream, such as at station 449, the average relative speed is larger than the speed of sound within the working material in this embodiment. The expansion of working material between stations 447 and 449 can be described as a substantially adiabatic expansion in this embodiment. In other embodiments, the expansion can comprise heat transfer from or to the working material. In other embodiments, this expansion can at least in part be carried out by an axial turbine, such as an axial turbine found in conventional jet engines, such as turbojet engines, turbofan engines, or turboshaft engines. In other embodiments, this expansion can at least in part be carried out by a centrifugal turbine, for instance. In order to reduce wave drag associated with the rotor blades of the turbine, an axial or centrifugal turbine is preferably located in a portion of subsonic fluid flow through channel 432, such as between station 447 and the second throat. In some such embodiments, the working material downstream of the embodiment can move relative to the embodiment at a speed slower than the speed of sound in the working material. In other words, there need not be a third expansion 439 of channel 432 for embodiments in which an axial or centrifugal turbine, or an equivalent apparatus, is located between station 447 and the second throat, such that the second throat is also the second opening 440, and such that the average flow speed downstream of the second opening is subsonic relative to apparatus 430. Note that, in such embodiments, the second opening equivalent to second opening 440 can be larger than second opening 440, and the average flow speed downstream of the equivalent second opening can be smaller than the average flow speed at station 449. In effect, a portion of the thermal energy contained within the working material at station 447 can be converted into useful mechanical shaft work by a conventional axial or centrifugal turbine, resulting in a smaller average flow speed downstream of the equivalent second opening. For example, the drive shaft of an axial turbine can be used to power an electric generator configured to convert at least a portion of the shaft work into electrical energy. In another example, the drive shaft of an axial turbine can be mechanically coupled to a fan of a turbofan engine, or a propeller of a turboprop engine. In some embodiments, the mechanical coupling can comprise gear trains, such as planetary gears. The details of such configurations as well as their applications are well known in the art of conventional aircraft turbines or power turbines.

In configurations in which embodiments of the invention are employed as power turbines in conventional electrical power plants, the free stream velocity is typically very small or close to zero. This scenario is similar to the scenario shown in FIG. 17. As is clear from the aforementioned discussion in the context of the embodiment shown in FIG. 15, an axial or centrifugal turbine can be located between station 567 and station 569, or between station 566 and station 569. In some embodiments, the turbine comprise an open rotor, such as the open rotor of a conventional wind power plant used to convert wind energy into electricity, where the open rotor can be located downstream of the second opening, such as second opening 560, of the channel, such as channel 552, and configured to decelerate the working material in similar fashion as a wind turbine decelerates a bulk air flow. As described herein, other types of apparatuses can be employed to convert the thermal energy of the working material, such as the thermal energy of the working material at station 567 or at station 569, into useful work, such as electricity or mechanical work. For instance, a body force generating apparatus can be employed to expand the working material and recover mechanical or electrical energy in the process. For example, the working material can be configured to do work against gravitational or inertial body forces, and the resulting potential or kinetic energy can be converted into electricity via an electrical generator, for instance. As mentioned, the working material can also be ionized, and a direct energy conversion method can be employed to decelerate the expanding ionized working material using electromagnetic body forces, thereby converting thermal energy into electrical power. In another example, the thermal energy of the working material can be converted into electricity or mechanical work by a thermoelectric generator. The thermoelectric generator can employ the Peltier effect, for example. In a subset of embodiments, this conversion can occur substantially isochorically.

Note that the concepts, configurations, principles and applications described in the context of FIG. 15 also apply to other embodiments of the invention, such as the embodiments shown in FIG. 16, FIG. 17, FIG. 8, FIG. 10, FIG. 9, and FIG. 1, and will therefore not be described in the same detail in the context of the other figures, and vice versa.

Dashed lines 458 and 459 indicate stagnation streamlines which are incident on the leading edge or originate at the trailing edge of embodiment 430. Streamlines 458 and 459 are therefore part of a streamsurface, or streamtube, which separate working material flowing around embodiment 430 from working material flowing through channel 432 of embodiment 430. In this embodiment, the steamtube is circular when viewed along the Y-direction. Note that the increase in the cross-sectional area of outside surface 460 of embodiment 430 in supersonic free stream flow is typically associated with wave drag acting on the outside surface 460 of the working material due to shock waves forming in the working material flowing around embodiment 430. In this case the increase in the cross-sectional area of outside surface 460 is in part a result of the increase in the cross-sectional area of channel 432 within the first expansion 435.

A body force per unit mass generating apparatus, or "BFGA", 450 is located adjacent to channel 432. BFGA 450 is configured to be able to apply at least one body force per unit mass on objects, e.g. atoms or molecules, of the working material. The magnitude of this body force can be regulated in this embodiment. The BFGA 450 comprises a first charge collection 451 and a second charge collection 455. In the configuration shown, first charge collection 451 is positively charged, and second charge collection 455 is negatively charged. In other embodiments, the polarity of the charge in the charge collections can be reversed, i.e. a first charge collection is negatively charged, and a second charge collection is positively charged. In some embodiments, the polarity of the charge in both charge collections is identical, i.e. both collections of charge can be positively charged, or both collections of charge can be negatively charged. In some such embodiments, the first charge collection is indistinguishable from the second charge collection. In such embodiments, the strength of the electric field within channel 432 is sufficiently strong in the proximity of the charge collections such that the specific heat capacities of the working material within channel 432 take the desired values.

In the embodiment shown in FIG. 15, the amount of charge in a charge collection can be regulated by charging or discharging, or reducing the charge in a charge collection. In such embodiments, the charge collections can comprise conductors which are able to facilitate the accumulation of charge, or the reduction in the amount of charge contained within the conductor. In some instances in time the amount of charge in a charge collection can be configured to be zero in some of such embodiments. The charging process can comprise the application of a voltage difference across the first charge collection 451 and the second charge collection 455. This voltage difference can be supplied by a battery or a capacitor, for example. The first charge collection 451 and the second charge collection 455 are electrically insulated from each other as well as from portions of bulk material 431. Electrical conductors, such as insulated copper wires, connect first charge collection 451 to the voltage source, as well as second charge collection 455 to the voltage source. These electrical conductors are not shown. In between first charge collection 451 and the channel 432, as well as between second charge collection 455 and the channel 432, bulk material 431 is an electrical insulator. In effect, first charge collection 451 and second charge collection 455 can be considered to be the opposite conducting plates of a capacitor, with the dielectric in between these plates comprising the working material as well as the relevant portion of bulk material 431 between first charge collection 451 and second charge collection 455. In the embodiment shown, first charge collection 451 and second charge collection 455 are configured in a manner in which the majority of electric field lines pass through the working material within channel 432 when the first charge collection 451 and second charge collection 455 are oppositely charged. To that end, the first charge collection 451 and second charge collection 455 can comprise several insulated conductors. These conductors can be wires, for instance, and can be arranged parallel to the Y-axis within first charge collection 451. This can serve to prevent or diminish any undesirable redistribution of charge within first charge collection 451 and second charge collection 455.

In accordance with some embodiments of the invention, and as explained below, the effect of the BFGA 450 during nominal operations is the increase of the specific heat capacity at constant pressure of the working material in channel 432 in the proximity of BFGA 450. In the embodiment and method of operation shown in FIG. 15, for simplicity, the pressure of the working material is constant throughout the increase or decrease of the specific heat capacity at constant pressure of the working material. The increase in the specific heat capacity at constant pressure corresponds to a decrease in the temperature and an increase in the density of the working material. In FIG. 15, this increase in the specific heat capacity at constant pressure occurs between stations 443 and 444. Between stations 444 and 446 the specific heat capacity at constant pressure is substantially constant in this embodiment. Between stations 446 and 447 the specific heat capacity at constant pressure is reduced to the original value at station 443 or station 441. The increase of the specific heat capacity of the working material for the embodiment shown in FIG. 15 can be considered to be a negative electrocaloric effect. As used herein, a "negative electrocaloric effect" refers to a reduction in temperature of a working material, such as a solid, a liquid, a gas, or a plasma, as a result of an increase in the specific heat capacity of the working material, where the increase is at least in part due to a change in the activation level of a BFGA, where the change in the activation level comprises increasing the electric field strength experienced by an object of interest in the working material, and where the specific heat capacity can refer to the specific heat capacity at constant pressure, or the specific heat capacity at constant volume. As used herein, a "positive electrocaloric effect" refers to an increase in temperature of a working material, as a result of a decrease in the specific heat capacity of the working material, where the increase is at least in part due to a change in the activation level of a BFGA, where the change in the activation level comprises increasing the electric field strength experienced by an object of interest in the working material, and where the specific heat capacity can refer to the specific heat capacity at constant pressure, or the specific heat capacity at constant volume. The positive electrocaloric effect is similar to the conventional electrocaloric effect described in the literature. An example of a solid material which exhibits a positive, or conventional, electrocaloric effect is the widely used piezoelectric material PZT, or lead zirconate titanate. A variety of other materials which exhibit an electrocaloric effect are known in the art.

In effect, the transition from station 443 to station 444 can be described as an isobaric compression, or an isobaric reduction in volume. In other embodiments, or other boundary conditions, or other methods of operation, the pressure need not be constant throughout the change in the specific heat capacities. For example, the pressure can increase or decrease during the increase or decrease of the specific heat capacity at constant pressure. For example, work can be done on the working material by a compression or expansion apparatus, such as a duct or a contraction or expansion of channel 432 or an axial turbine or compressor, or heat or mass can be added or removed from the working material. In the simplified embodiment shown in FIG. 15, no heat, or mass is exchanged between the working material within channel 432 and the remainder of embodiment 430. In another example, the increase or decrease of the specific heat capacity can occur in an isochoric process at constant volume. In another example, the increase or decrease of the specific heat capacity can occur in a polytropic process.

The BFGA is configured to change the temperature of a working material due to the interaction of the working material with the body force per unit mass generated by the BFGA. The body force per unit mass generated by a BFGA can be configured to increase the average potential energy of an object within a working material. The increase in the average potential energy of an object increases the specific heat capacity of the working material. Since the total energy within the working material is constant throughout the activation of the BFGA in this scenario, the increase in the average potential energy of an object reduces the average kinetic energy of the object in the working material. This corresponds to a decrease in the temperature of the working material, and explains the decrease in the density of the working material in an isobaric scenario. In this manner, the BFGA can increase the specific heat capacity of the working material and reduce the temperature.

The magnitude of the average potential energy of an object within the working material can be regulated by the BFGA. Since no energy is exchanged with the outside environment in this scenario, the average potential energy, or the potential energy "reservoir", of an object can be configured to be an artificial heat sink or an artificial heat source by the action of the BFGA.

In accordance with some embodiments of the invention, the activation level of the BFGA controls the strength of the body force per unit mass, which in turn regulates the average potential energy of the objects within the working material, which can be employed to control the specific heat capacity of the working material.

Note that, in the isobaric scenario shown in FIG. 15, work is done on the working material throughout the activation of the BFGA, and the density is increased while the temperature is decreased adiabatically, i.e. without an exchange of heat with a thermal reservoir other than the working material.

Note that, for simplicity, the change in the activation level of the BFGA is assumed to consume no work in the embodiment shown in FIG. 15. The activation of a BFGA can consume work in some embodiments. In some such embodiments, at least a portion of this work can be recovered, where the recovery can occur during the deactivation of the BFGA, or during the conversion of thermal energy into useful energy such as mechanical or electrical work.

In other embodiments, the amount of charge contained within a charge collection is constant in time. In such embodiments, a charge collection can comprise electrons, ions or other charged particle embedded within an electrical insulator. In some such embodiments, a separate voltage source for regulating the amount of charge in a charge collection is not required.

In other embodiments, the first and second charge collections can be located in containers positioned within the central channel upstream and downstream of the first throat. For example, positively charged containers can be located approximately at station 444 and negatively charged containers can be located approximately at station 446. In some embodiments, the containers are electrically insulated and streamlined.

In some embodiments the charge collections are not electrically insulated from the working material. In other words, the conductors or the charged plates of the charge collections can be in direct physical contact with the working material.

FIG. 15 also shows a plot of the approximate values of physical parameters of the working material within channel 432 as a function of position along the Y-direction.

The horizontal axis 467, parallel to the Y-axis, indicates the position along the Y-direction at which the corresponding physical parameter is measured. The vertical axis 468, parallel to the X-axis, shows the value of the physical parameter. Note that the scale of vertical axis 468 is different for different physical parameters, i.e. different lines shown in the plot. In the free stream the working material is approximately at standard pressure and temperature, at natural specific heat capacity at constant pressure, and at free stream flow speed.

Line 469 shows the variation of the magnitude of the average velocity of the working material relative to the embodiment 430 as a function of position in the Y-direction. Line 470 shows the value of the magnitude of the average velocity of the working material relative to the embodiment 430 at station 441 for reference. Note that the magnitude of the average velocity of the working material relative to the embodiment 430 at station 449 is larger than at station 441.

Line 471 shows the variation of the specific heat capacity at constant pressure of the working material as a function of position along the Y-direction. Line 472 shows the value of the specific heat capacity at constant pressure at station 441 for reference.

Line 473 shows the variation of the temperature of the working material as a function of position in the Y-direction. Line 474 shows the value of the temperature at station 441 for reference. Note that the temperature at station 449 is lower than at station 441. Embodiment 430 can therefore be considered to cool or refrigerate the working material flowing through channel 432.

Line 475 shows the variation of the static pressure of the working material as a function of position in the Y-direction. Line 476 shows the value of the static pressure at station 441 for reference.

Some embodiments of the invention produce a net mechanical work output. In the embodiment shown, the mechanical work is used to accelerate the working material, as indicated by the larger average relative speed 469 of working material at station 449 compared to station 441. The associated thrust force can be employed to cancel at least a portion of the drag force acting on embodiment 430 and any apparatus, such as the remainder of an aircraft, connected thereto due to the motion through the working material. In such applications, embodiment 430 can be operated in a similar fashion as a conventional ramjet.

The mechanical work can also be converted into electrical energy by an electric generator. For example, embodiment 430 can be coupled to a support arm, which is coupled to the drive shaft of an electric generator, where the shaft axis is parallel to the X-axis, and the center of embodiment 430 is offset relative to the shaft axis in the YZ-plane in a manner in which the thrust force on embodiment 430 in the negative Y-direction applies a moment about the shaft axis. Embodiments of the invention can therefore also be considered for applications involving power generation or consumption. In another, similar configuration, embodiments of the invention can also be rigidly connected to the tips of conventional propeller, such as a helicopter main rotor, a conventional fixed wing aircraft propeller, or a ship propeller. Embodiments of the invention can therefore be employed to provide at least a portion of the torque required to propel propeller blades through a fluid.

Some embodiments of the invention can alternatively or additionally employ a positive electrocaloric effect to modify the specific heat capacity at constant pressure of the working material in channel 432. For example, when the electric field strength within the working material is sufficiently strong, the degree of excitation, or DE, of potential DOF, and associated kinetic DOF can be reduced. When the field strength is increased further, said DOF which are affected by the electric field strength can be frozen out. The reduction in the DE can result in a net decrease in the specific heat capacity at constant pressure of the working material to a value below the free stream value of the specific heat capacity. This reduction of the specific heat capacity can be configured to occur between station 446 and station 447. Note that the first compression between station 443 and 446 need not comprise a specific heat capacity which is larger than the free stream value in this configuration. In other words, the specific heat capacity between stations 443 and 446, or between stations 441 and 446, can be equal to the specific heat capacity in the free stream for embodiments in which there is a reduction in the specific heat capacity throughout the at least one expansion of the working material. Note that, in the case in which the specific heat capacity is also increased by a first BFGA 450 and compared to the case in which the first BFGA 450 is inactive, the equivalent of station 446 is further upstream, but still downstream of the first throat, in order to allow for a larger decrease in the specific heat capacity from a value which is larger than the free stream value to a value which is smaller than the free stream value, as opposed to from a value which is equal to the free stream value to the same value which is smaller than the free stream value. This decrease of the specific heat capacity prior to the expansion of the working material is analogous to the increase in the specific heat capacity between station 443 and station 444 prior to the compression of the working material. Subsequently the specific heat capacity can remain at a value which is lower than the free stream value of the specific heat capacity throughout the expansion of the working material through the convergent divergent nozzle surrounding the second throat. In some embodiments, the specific heat capacity can remain substantially constant in this segment of channel 432. This is analogous to the specific heat capacity which is larger than the free stream value of the specific heat capacity throughout the compression of the working material through the convergent divergent duct surrounding the first throat between station 444 and station 446. Following the expansion of the working material through the second contraction 438 and the third expansion 439, the specific heat capacity can increase again. In some embodiments, this increase can occur between the second throat and the second opening 440. In other embodiments, this increase can occur downstream of the second opening. Note that the increase can occur isobarically in some embodiments. This is increase analogous to the decrease in the specific heat capacity between station 446 and station 447.

In other embodiments, an increase in the specific heat capacity, such as the increase between station 443 and 446 relative to the free stream value, can be followed by a decrease of the specific heat capacity to a value below the free stream value between station 446 and a station after the second throat, as described in the previous paragraph, which can be followed by an increase in the specific heat capacity to a value above the free stream value, which is similar to the increase between station 443 and 446, which can be followed by a return of the specific heat capacity to the free stream value, similar to the decrease between station 446 and 447, which can be followed by an expansion of the working material through a converging diverging duct, or just a converging duct in the case in which the exit velocity is subsonic, which is similar to the expansion of the working material between station 447 and station 449 in FIG. 15.

In the following paragraphs, the aforementioned other embodiment will be described in more detail. The working material flowing through a channel of such an embodiment of the invention can experience an increase in the specific heat capacity to a value larger than the free stream value of the specific heat capacity, where the increase can be facilitated by an increase in the activation level of a BFGA in the proximity of the working material at that location in the channel of the embodiment, such as channel 432 of embodiment 430. Note that the increase in the activation level of the BFGA is an increase relative to the working material flowing through the channel. The activation level of the BFGA relative to embodiment 430 need not change in time during nominal operations. It is sufficient for the working material to flow into a region in which the activation level of the BFGA increases. In other words, the activation level of the BFGA relative to embodiment 430, e.g. the amount of charge per unit volume within a first charge collection 451 or a second charge collection 455 need not be a function of time during nominal operations, i.e. the amount of charge per unit volume can remain constant in time during nominal operations. A working material flowing through channel 432 in the positive Y-direction from the free stream into the force field, such as the electric field of a BFGA, will perceive or experience an increase in the activation level of a BFGA relative to the working material, i.e. an increase in the electric field strength, when the charge per unit volume within a BFGA is constant in time. In some embodiments, or for other modes of operation of the same embodiments, the activation level of a BFGA relative to embodiment 430, e.g. the amount of charge per unit volume within a BFGA, can also change in time. As mentioned in the context of the other figures, the increase in the activation level of the BFGA relative to the working material can add rotational potential DOF to polarized diatomic molecules of a working material. For instance, two rotational potential DOF can be added to the two existing rotational kinetic DOF about axes perpendicular to the long axes of the diatomic molecules. This can increase the specific heat capacity at constant pressure of the working material. This effect can also be described as a negative electrocaloric effect in this example.

The aforementioned increase in the specific heat capacity can be followed by a first compression of the working material at substantially constant specific heat capacity, where the heat capacity is larger than the free stream value, and where the compression can comprise an interaction with a converging diverging duct, or a centrifugal or axial compressor, for example. The compression can also comprise an interaction with a body force per unit mass generating apparatus, where at least a portion of the body force acting on the objects of interest, such as the molecules, in a working material comprises a component in a direction which opposes the direction of the bulk flow of the working material. The body force in this case can be gravitational or inertial in nature, for example. The body force can also be electric or magnetic in nature. In some embodiments, the body force used in a compression or an expansion of a bulk flow can also be employed in the modification of the specific heat capacity of the working material. In other words, in general, a BFGA, such as BFGA 450, can be employed to both compress and increase the specific heat capacity of a working material, or to both expand and decrease the specific heat capacity of a working material in some embodiments.

The aforementioned first compression can be followed by a further increase in the activation level of a BFGA relative to the working material in the proximity of the working material at that location in the channel of the embodiment, such as channel 432 of embodiment 430. Said increase can reduce the DE of any affected potential DOF and any associated kinetic DOF, for instance. In the aforementioned simplified example, the two additional rotational potential DOF as well as their associated rotational kinetic DOF can experience a reduction in their DE by the increase in the activation level of the BFGA relative to the working material. In sufficiently strong levels of activation of the BFGA, these DOF can be frozen out. This can lead to a reduction in the specific heat capacity at constant pressure of the working material to a value below the free stream value. This effect can also be described as a positive or conventional electrocaloric effect in this example, where an increase in the activation level of the BFGA relative to the working material increases the temperature due to a decrease in the specific heat capacity of the working material.

The aforementioned decrease in the specific heat capacity can be followed by a first expansion of the working material at substantially constant specific heat capacity, where the heat capacity is smaller than the free stream value, and where the expansion can comprise an interaction with a converging diverging duct, or a centrifugal or axial turbine, for example. The expansion can also comprise an interaction with a body force per unit mass generating apparatus, where at least a portion of the body force acting on the objects of interest, such as the molecules, in a working material comprises a component in a direction which is aligned with the direction of the bulk flow of the working material.

The aforementioned first expansion of the working material can be followed by a decrease in the level of activation of a BFGA relative to the working material, and an associated increase in the specific heat capacity of the working material from a value below the free stream value to a value above the free stream value of the specific heat capacity. The resulting value of the specific heat capacity can be substantially equal to the value of the specific heat capacity during the first compression, or prior to the first expansion, for example. The decrease of the activation level of the BFGA relative to the working material can increase the DE of the aforementioned rotational potential and kinetic DOF. The level of activation of the BFGA is non-zero compared to the free stream level of activation of the BFGA, resulting in a specific heat capacity which is larger than the free stream value. This is due to the unfreezing or thawing of affected potential DOF and associated kinetic DOF. This effect can be described as a positive or conventional electrocaloric effect, where a decrease in the activation level of the BFGA relative to the working material decreases the temperature due to an increase in the specific heat capacity of the working material.

The aforementioned increase of the specific heat capacity can be followed by a second compression of the working material at substantially constant specific heat capacity, where the heat capacity is larger than the free stream value, and where the compression can comprise an interaction with a converging diverging duct, or a centrifugal or axial compressor, or a body force generating apparatus, as described in the context of the first compression.

The second compression can be followed by a decrease in the level of activation of a BFGA relative to the working material and a decrease in the DE of the affected potential DOF, such as the rotational potential DOF in this example. This can decrease the specific heat capacity at constant pressure to a value substantially equal to the free stream value. The decrease in the specific heat capacity with a decreasing level of activation of a BFGA can be described as a negative electrocaloric effect.

The aforementioned decrease in the specific heat capacity can be followed by a second expansion of the working material at substantially constant specific heat capacity, where the heat capacity is substantially equal to the free stream value, and where the expansion can comprise an interaction with a converging diverging duct, or a centrifugal or axial turbine, for example. The expansion can also comprise an interaction with a body force per unit mass generating apparatus, where at least a portion of the body force acting on the objects of interest, such as the molecules, in a working material comprises a component in a direction which is aligned with the direction of the bulk flow of the working material. In the case in which the exit speed of the bulk flow of the working material is slower than the speed of sound of the working material at the exit, or at the second opening, the second expansion can comprise a converging nozzle as opposed to a converging diverging nozzle.

In other embodiments, or in alternative modes of operation, of the embodiment described in the preceding paragraphs, there can be an expansion of the working material prior to the increase in the specific heat capacity and subsequent first compression. In other words, there can be a first expansion before the first compression, and a renaming of the first and second expansion of the previous paragraphs into a second and third expansion, respectively. The first expansion preceding the first compression can be similar in function as the first expansion of the working material which occurs in the first expansion 435 of the channel 432 in FIG. 15 between station 441 and station 443.

Note that in the aforementioned embodiment the activation level of the BFGA relative to the working material increases and subsequently decreases throughout the channel, such as channel 432. The activation level of the BFGA relative to the working material and also relative to the embodiment or relative to the channel thus changes smoothly and continuously along the length of the channel. Thus both the increase and the subsequent larger decrease of the specific heat capacities due to an increasing activation level of a BFGA can be associated with a compression and subsequent expansion of the working material. This can improve the utilization of the channel and increase the power or thrust per unit length of the channel or per unit activation level of the BFGA.

Figure 16:
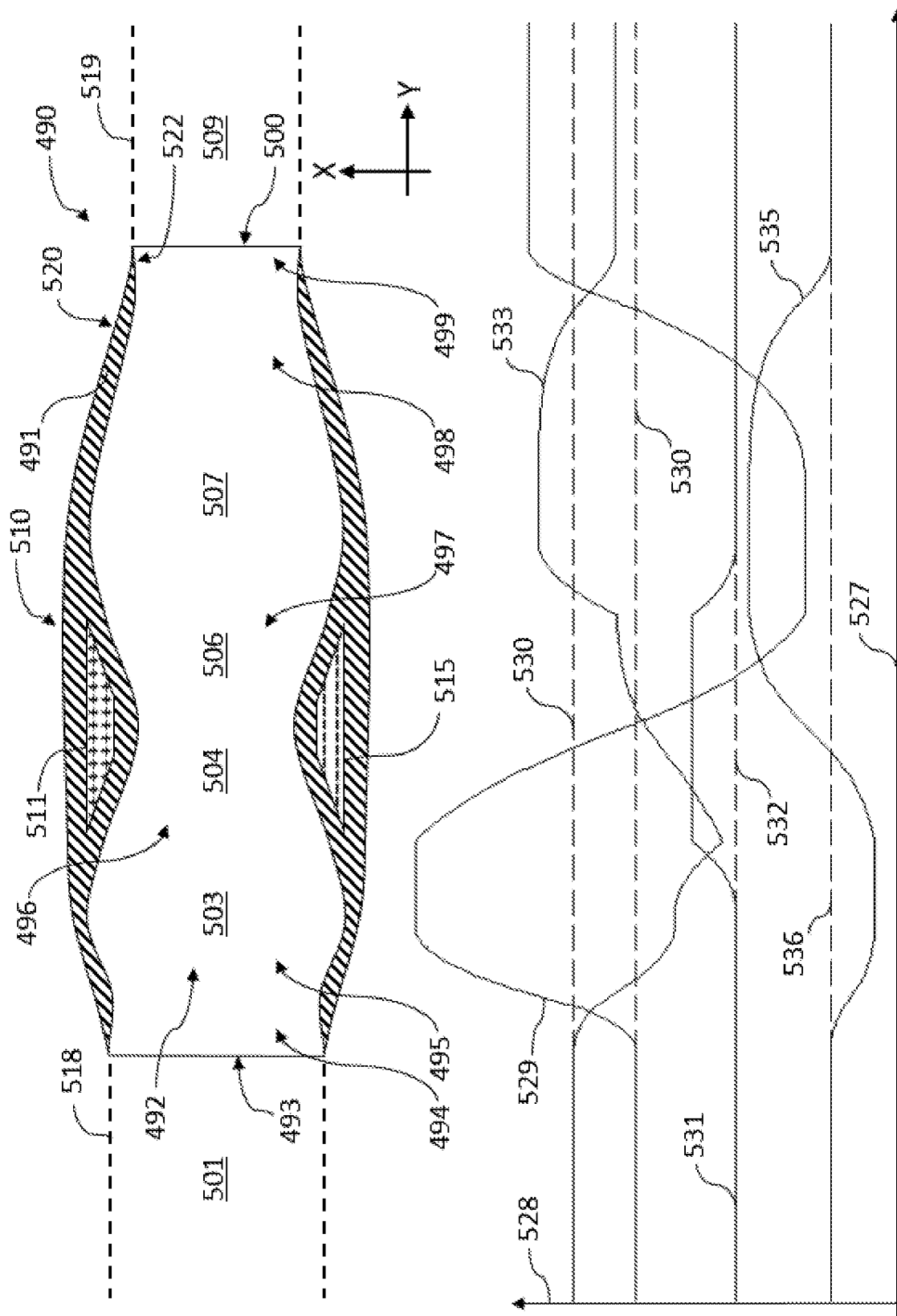
FIG. 16 is a cross-sectional view of some embodiments of the invention.
Figure 17:
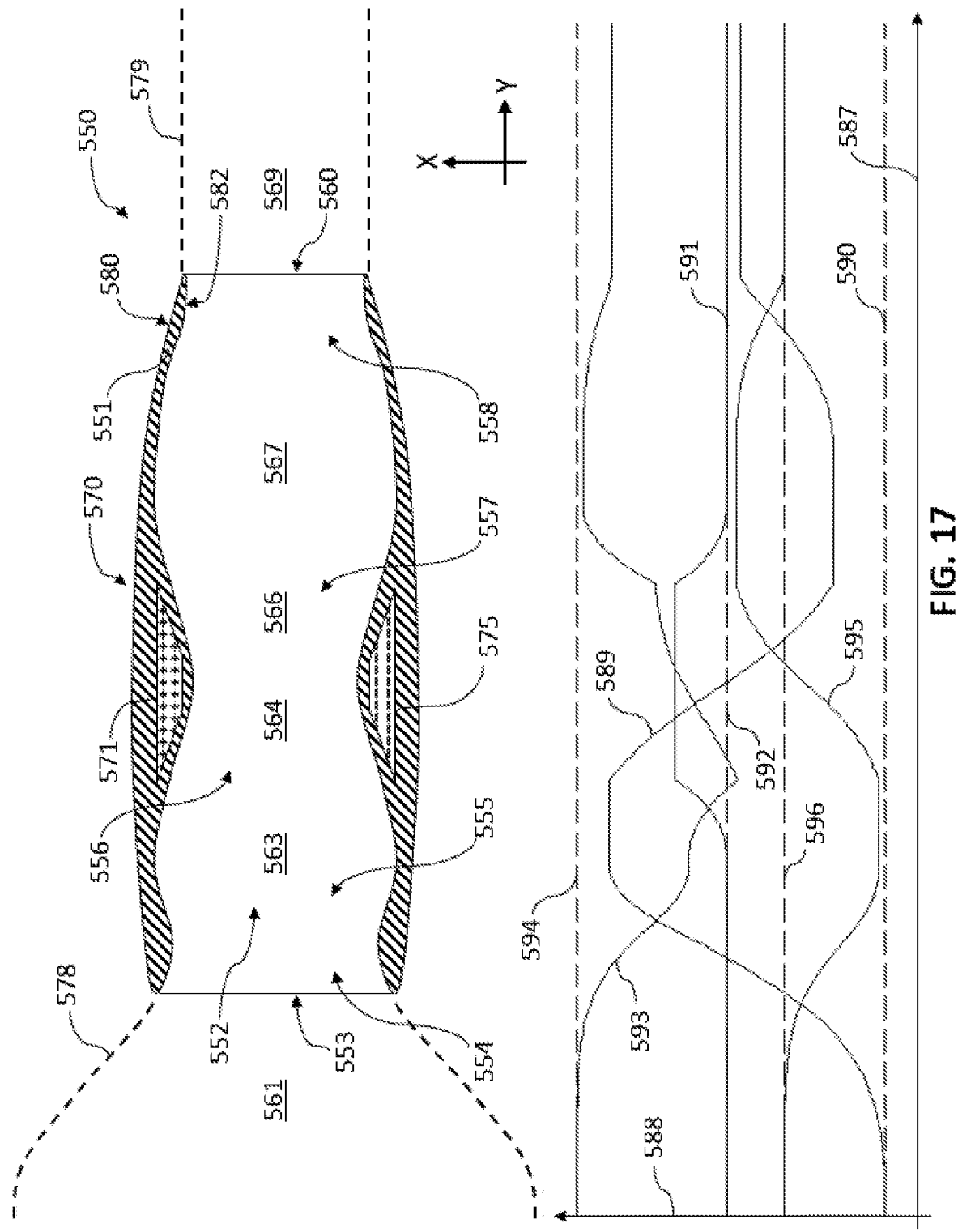
FIG. 17 is a cross-sectional view of some embodiments of the invention.

In other embodiments this benefit can offset by the benefit of a larger change in the specific heat capacity of the working material, such as a change in the specific heat capacity upstream of the first opening, or throughout the first expansion prior to the first compression, or throughout the expansion upstream of the second opening, or an expansion downstream of the second opening. For example, the first expansion preceding the first compression, and/or the expansion immediately upstream of the second opening, can also comprise a working material at a specific heat capacity which is lower than the specific heat capacity in the free stream. In other words, a BFGA can be configured to also reduce the specific heat capacity of the working material throughout at least a portion of the aforementioned expansion of the working material, i.e. the first expansion preceding the first compression, and/or the expansion immediately upstream of the second opening. In other words, all expansions of the working material which occur within the reach of any BFGA associated with an embodiment of the invention, such as embodiment 430, can be subject to a specific heat capacity which is lower than the specific heat capacity of the free stream for some embodiments. Similarly, as mentioned, all compressions of the working material which occurs within the reach of any BFGA associated with an embodiment of the invention, can be subject to a specific heat capacity which is larger than the specific heat capacity of the free stream for some embodiments. The reach of a BFGA can extend upstream of a first opening, extend into the interior of a channel, such as channel 432, and extend downstream of a second opening, for example. The first expansion preceding the first compression can be employed in embodiments operating at subsonic free stream flow speeds, and low supersonic free stream flow speeds, as indicated by FIG. 15, FIG. 16, and FIG. 17. At larger supersonic free stream flow speeds, there need not be a benefit to a pre-expansion, as shown in FIG. 15, compared to the configuration in which there is no pre-expansion, as shown in FIG. 6, where the benefit can refer to thrust or power output of the engine or the embodiment.

As described in the context of FIG. 10, other embodiments can be configured to sequentially and successively expanding and compressing the working material flowing through an embodiment, where BFGAs are employed to modify the specific heat capacity of the working material. For embodiments in which the objects is the production of thrust or the generation of power, the specific heat capacity of the working material can be configured to be larger than the free stream value during at least one portion of a compression of the working material, and/or smaller than the free stream value during at least one portion of an expansion of the working material. For example, a working material interacting with an embodiment of the invention can temporally sequentially experience an expansion at a free stream specific heat capacity, a compression at a larger than free stream specific heat capacity, an expansion at a lower than free stream specific heat capacity, a compression at a larger than free stream specific heat capacity, an expansion at a lower than free stream specific heat capacity, a compression at a larger than free stream specific heat capacity, an expansion at a lower than free stream specific heat capacity, a compression at a larger than free stream specific heat capacity, an expansion at a lower than free stream specific heat capacity, a compression at a larger than free stream specific heat capacity, and an expansion at a free stream specific heat capacity. The changes in the specific heat capacity can be configured to occur in between successive compressions and expansions, and can be facilitated by changing the activation level of at least one BFGA relative to the working material. Note that the compressions and expansions are successive in time, and need not necessarily occur sequentially in space. For example, a working material can be located within a chamber throughout an interaction within an embodiment of an invention, and the compressions and expansions can be performed by a piston configured to reduce or increase the volume of the chamber. Following the last expansion, the working material can be expelled into the free stream at atmospheric pressure, where the expulsion can be through a valve, and/or through a second opening. Note that the expulsion typically occurs at ambient atmospheric pressure in the case in which the working material is expulsed into the atmosphere. In another example, a working material interacting with an embodiment of the invention can temporally sequentially experience an expansion at a lower than free stream specific heat capacity, a compression at a larger than free stream specific heat capacity, an expansion at a lower than free stream specific heat capacity, a compression at a larger than free stream specific heat capacity, and an expansion at a lower than free stream specific heat capacity. The changes in the specific heat capacity can be configured to occur in between successive compressions and expansions, or prior to the first compression, or following the last expansion, and can be facilitated by changing the activation level of at least one BFGA relative to the working material. In another example, a working material interacting with an embodiment of the invention can temporally sequentially experience a compression at free stream specific heat capacity, and an expansion at a lower than free stream specific heat capacity. In another example, a working material interacting with an embodiment of the invention can temporally sequentially experience an expansion at free stream specific heat capacity, a compression at larger than free stream specific heat capacity, and an expansion at free stream specific heat capacity, as shown in FIG. 15, FIG. 16, and FIG. 17. In another example, a working material interacting with an embodiment of the invention can temporally sequentially experience a compression at larger than free stream specific heat capacity, and an expansion at free stream specific heat capacity, as shown in FIG. 6. In another example, a working material interacting with an embodiment of the invention can temporally sequentially experience a compression at larger than free stream specific heat capacity, an expansion at free stream specific heat capacity, a compression at larger than free stream specific heat capacity, an expansion at free stream specific heat capacity, a compression at larger than free stream specific heat capacity, and an expansion at free stream specific heat capacity. In another example, a working material interacting with an embodiment of the invention can temporally sequentially experience a compression at free stream specific heat capacity, an expansion at a lower than free stream specific heat capacity, a compression at free stream specific heat capacity, and an expansion at a lower than free stream specific heat capacity. In another example, a working material interacting with an embodiment of the invention can temporally sequentially experience a compression at free stream specific heat capacity, an expansion at a lower than free stream specific heat capacity, a compression at free stream specific heat capacity, an expansion at a lower than free stream specific heat capacity, and a compression at free stream specific heat capacity.

Note that, in other embodiments, other types of BFGA can be employed to manipulate the specific heat capacity of the working material. For example, a BFGA can be configured to ionize the working material by converting the atoms or molecules within a working material into positively or negatively charged ions. For instance, in the case in which the working material is a gas, a BFGA can be configured to ionize the molecules in the working material and convert the working material at least partially into a cold plasma, or a nonthermal plasma. In such a plasma the fraction of molecules which are ionized exceeds the fraction of molecules which are ionized due to the temperature and pressure of the gas per se. In other words, the degree of ionization is larger than the natural degree of ionization which can be theoretically expected within a working material at the given temperature and pressure of the gas. The degree of ionization is a measure of both the fraction of molecules which are ionized as well as the average amount of charge per object of interest, where the object of interest can refer to an atom, a molecule, or a free electron. In some embodiments a BFGA can be configured to interact with the working material in a manner in which the degree of ionization of the working material exceeds the natural degree of ionization of a working material at the same temperature and pressure. Note that, in some embodiments, the a BFGA can also be configured to interact with the working material in a manner in which the degree of ionization of the working material is lower than the natural degree of ionization of a working material at the same temperature and pressure. For example, the degree of ionization of a working material at a large enough temperature to be naturally at least partially ionized can be reduced by an artificially generated excess of electrons. By modifying the degree of ionization of a working material to a value above or below the natural, theoretical, or undisturbed, degree of ionization of the working material at the same temperature and pressure, the specific heat capacity of the working material can be modified compared to the natural specific heat capacity.

The modification of the specific heat capacity due to a change in the degree of ionization can be the result of several effects. For example, an increase in the degree of ionization of a working material can increase the range and the average magnitude of interatomic or intermolecular forces, where the average is calculated over time. Note that the range of Coulomb interaction between electric charges is infinite. This can increase the average potential energy of an object of interest, such as an atom, molecule, or free electron. Note that intermolecular forces can arise from the interaction between a neutral object, such as a neutral atom or molecule, and another neutral object. Such interactions can comprise a dipole-dipole interaction or Van der Waals interactions. Intermolecular forces can also arise from interactions between charged objects, such as positively or negatively charged ions, or free electrons, and neutral objects. Intermolecular forces can also arise from interactions between at least two charged objects, such as positively or negatively charged ions, or free electrons. Such interactions can comprise Coulomb interactions between equally or oppositely charged objects. In some embodiments, such as in embodiments comprising monatomic molecules, the increase in the range and average magnitude of interatomic forces can add three translational potential DOF to the already existing three translational kinetic DOF. In other words, the degree of excitation of three additional translational potential DOF can be increased due to an artificial increase in the degree of ionization. This can artificially increase the specific heat capacity of the working material. Similarly, in the case in which the gas is naturally ionized due to a sufficiently large temperature, an artificial reduction in the degree of ionization can reduce the degree of excitation of any additional potential DOF. This can artificially decrease the specific heat capacity of a working material. In some embodiments, such as in embodiments comprising diatomic molecules, the increase in the degree of ionization of a working material can increase the degree of excitation of three translational potential and two rotational potential DOF, for example. Note that this effect is particularly enhanced at large densities, where the average distance of separation between adjacent objects is sufficiently low. Note that a nonthermal plasma at very large densities can in theory be considered to be analogous to a solid material, such as a metal, such as Aluminium. The number of DOF of such a solid material comprises three translational kinetic DOF and three translational potential DOF, corresponding to a total of 6 EDOF when the DE of each DOF is unity. In such a solid material, and, to a lesser extent, in a plasma, the interatomic forces can contribute several potential DOF in the form of vibrational modes. In a simplified model of a vibrational mode comprising a paired potential and kinetic rotational or translational DOF, the behavior of objects, i.e. the atoms, molecules, or free electrons, can be modeled as a simple harmonic oscillator. The modification of the degree of ionization of a working material can thus be employed to modify the specific heat capacity of a working material.

There are a wide variety of methods for modifying the degree of ionization of a working material. For example, a working material can be ionized via dielectric barrier discharge. As mentioned in the context of FIG. 13 and FIG. 14, a working material can also be ionized via a helicon antenna, via field ionization, photoionization, or electron bombardment. Recall that in electron bombardment, an electrical potential difference is produced across a working material. At sufficiently large voltages, this can induce a flow of electrons through the working material, which lead to collisions between the electrons and molecules, which in turn can ionize the molecules in the working material. The flow of electrons can take the form of dark discharge, glow discharge, or arc discharge, for instance. In some embodiments employing electron bombardment, an external magnetic field can be used to confine or to at least temporarily trap at least a portion of free electrons. The local magnetic field lines can be perpendicular to the local electric field lines within the working material, which can temporarily trap free electrons and induce a drifting motion in a direction perpendicular to the electric field and the magnetic field, also known as ExB drift. This deflecting, delaying, trapping or concentrating of electrons can increase the collision frequency between electrons and molecules of the working material, and improve the efficiency of ionization. This principle is employed in Hall-effect thrusters, for example.

Note that an ionization apparatus can also comprise a combination of any of the aforementioned ionization apparatus types or ionization methods. An ionization apparatus can also comprise other ionization methods or other types of ionization apparatus, a wide variety of which are known in the art.

In the context of the embodiment shown in FIG. 15, the ionization apparatus can be located between stations 443 and 444, or upstream of station 443, and be configured to ionize at least a portion of the working material between stations 443 and 444. As a result of the ionization, the specific heat capacity of the working material can be increased. As discussed previously, the increase can comprise an increase in the degree of excitation of three translational potential DOF, for example. In some embodiments, such as embodiments in which the working material comprises diatomic or polyatomic molecules, the ionization can also polarize the molecules. The presence of local electric fields produced by adjacent ions or an externally applied electric field, such as an electric field used in the ionization process or used in the acceleration or deceleration of the bulk flow of the working material, can induce an increase in the degree of excitation of at least one rotational potential DOF. In the case of diatomic molecules, for example, the degree of excitation of two rotational potential DOF about axes perpendicular to the long axis of the molecule and perpendicular to each other can be increased in this scenario. The ionization process can thus contribute 5 additional potential DOF to the existing 5 kinetic DOF in this idealized scenario, which can increase the specific heat capacity of the working material.

The geometry of the channel 432, as well as the arrangement of the ionization apparatus along the length of the channel, can be configured in a manner in which the working material deionizes approximately between stations 446 and 447 in this exemplary embodiment. The deionization can be the result of natural recombination of free electrons with positively charged ions to form neutral molecules within the working material. In a non-thermal plasma, absence of an ionization apparatus, there is typically a tendency to return to the natural degree of ionization. In order to maintain a desired degree of ionization which exceeds the natural degree of ionization throughout the working material between stations 443 and stations 447, therefore, some embodiments can comprise an ionization apparatus which can interact with the working material between stations 443 and stations 447, for instance. Note that the ionization apparatus which is configured to initiate the ionization of the working material can be of a different architecture or of a different type than the portion of the ionization apparatus which is configured to maintain a desired degree of ionization. For example, the working material can be ionized via dielectric barrier discharge and the degree of ionization can be maintained via electromagnetic waves, such as microwaves, or via photoionization.

Once the degree of ionization of the working material has at least partially returned to a natural degree of ionization at the given temperature of the working material, the working material can be expanded through a converging diverging nozzle, as shown in FIG. 15. In this manner, an embodiment which employs ionization to modify the specific heat capacity of the working material can be configured in a similar manner as the embodiment 430 shown in FIG. 15. Note the similarity in principle with the embodiments shown in FIG. 13 and FIG. 14. Note that the ionization apparatus is synonymous with a body force generating apparatus, or BFGA, as used herein. The increase of the activation level of the ionization apparatus increases the degree of ionization of the working material, and thus increases the average magnitude and duration of body forces acting on the working material. In this case the body forces acting on a molecule in a working material in this case are at least partially provided by neighboring molecules. The change in the activation level of an ionization apparatus is synonymous with the change in the activation level of a BFGA as used herein. The aforementioned examples illustrate how different types of BFGA can be employed to artificially modify the specific heat capacity of a working material. Apparatuses employing other types of BFGA are also within the scope of the invention.

As mentioned in the context of FIG. 13, the energy consumed by the ionization apparatus can be provided by an external power source. Said energy can also be provided by a thermodynamic apparatus which is configured to extract thermal energy from the working material and convert at least a portion of said thermal energy into a useful form of energy, such as mechanical work or electricity. For instance, an axial turbine can be located within channel 432 and configured to convert at least a portion of the thermal energy of the working material into useful mechanical work, which in turn can be converted into electrical work via an electric generator mechanically coupled to the turbine. The turbine can be located downstream of station 447, or in the vicinity of station 447. Note that the flow between the first and second throat is subsonic.

In other embodiments, a thermoelectric generator, such as a generator employing the Peltier effect, can be employed to convert a portion of the thermal energy of the working material in channel 432 into electricity. A thermoelectric generator can be located at station 447, for example. Note that the peak temperature within channel 432 is in the vicinity of station 447. In the case in which a heat sink is required by the thermoelectric generator, the heat sink can be located in the vicinity of station 443 or station 444 and configured to deliver heat to the working material in channel 432. Note that the minimum temperature within channel 432 is approximately in the vicinity of station 444. The heat sink of a thermoelectric generator can also be located downstream of the second opening and configured to deliver heat to the working material in the vicinity of station 449. The heat sink can also be located in the free stream of the working material, and configured to deliver heat to the working material at free stream temperatures. In the case in which the embodiment of the invention, such as embodiment 430, is configured to provide thrust to an aircraft, the heat sink can be thermally coupled to the outside surface of the aircraft, such as the skin of the fuselage, wings, engine nacelles, or empennage. Although the temperature is larger in the free stream than at station 443 or 444, the larger area of the outside surface of an aircraft, or other vehicle interacting with the working material, can increase the heat flux through the thermoelectric generator and thus increase the net electrical power produced.

Note that the energy consumed in an ionization process is delivered as heat or thermal energy to the working material following a deionization process. This thermal energy can be considered to be separately provided, additional energy, which can be extracted from the working material without incurring excessive performance penalties compared to the embodiment shown in FIG. 15. In some embodiments, all of the energy consumed by the ionization apparatus in the ionization of the working material is provided by a thermodynamic energy conversion apparatus which is configured to extract thermal energy from the working material. In some embodiments, the theoretical maximum conversion efficiency of thermal energy into useful energy, such as electricity, by the thermodynamic energy conversion apparatus can be 100%.

In other embodiments, other types of BFGA can be employed. For example, a BFGA can comprise a magnetic field generating apparatus.

Consider an example in which the objects comprise permanent or induced magnetic dipoles, and in which the activation of the BFGA comprises a modification of the strength of the magnetic field within a working material. For simplicity, consider the case in which the externally applied field is substantially uniform in magnitude and direction throughout the working material. In general, and in other embodiments, the field strength and direction need not be uniform, provided that the field strength is of sufficient magnitude to achieve a desired DE of a given DOF. In this example, consider the working material to be a diatomic gas, such as oxygen. As mentioned, a diatomic gas at room temperature comprises approximately 5 EDOF, associated with three translational kinetic DOF, and two rotational kinetic DOF, where the rotation is about two axes perpendicular to the long axis of the molecule, and to each other. An object is a dioxygen molecule in this example.

In this case, an externally applied magnetic field can produce a moment about the center of mass of a molecule for which the magnetic dipole axis, or the polarization axis, or the net magnetic moment vector, or the net spin of an object, is not aligned with the magnetic field lines. This moment is produced by the body forces per unit mass acting on portions of the molecule, such as electrons and portions of electrons, at locations and orientations which result in the lines of action of the body forces not being coincident. Due to the moment acting on a molecule with a dipole axis not aligned with the externally applied field, a rotation of the dipole axis can be associated with work being done against or by the externally applied field, which can change the potential energy of the molecule. This rotation can be expressed in terms of a rotation about two axes perpendicular to each other and the dipole axis. Thus the externally applied electric or magnetic fields have added two vibrational modes to the DOF of the molecule. In effect, the BFGA is configured to excite two additional rotational potential DOF. The DE of these additional rotational potential DOF is a function of the geometry of the molecule and the temperature or average energy of the molecule. For simplicity, consider the hypothetical scenario in which the magnetic dipole axis comprises a substantial component parallel to the long axis of the molecule. In this case, the two existing rotational kinetic EDOF of the molecule, corresponding to a rotation about two axes perpendicular to the long axis of the molecule and to each other, are coincident with the two additional rotational potential DOF generated by the magnetic field applied externally by the BFGA. In some embodiments, the strength of the externally applied field can be configured in a manner in which the DE of two additional rotational potential DOF is increased to a value greater than the excitation threshold. In other words, the transition temperature of the two rotational potential DOF can be artificially reduced to a value below the current temperature of the working material. The magnetic field produced by the activation of the BFGA can be regulated to modify the DE of the additional rotational potential DOF in a manner in which the additional rotational potential DOF is excited, i.e. turned into an EDOF. For instance, as the magnetic field strength is increased from zero to a non-zero value, the activation of the BFGA can result in an increase of the total number of EDOF of the working material from 5 in the baseline scenario to 7. This can increase the specific heat capacity at constant volume and the specific heat capacity at constant pressure of a working material, and reduce the ratio of specific heat capacities.

In the hypothetical scenario in which the magnetic dipole axis comprises a substantial component perpendicular to the long axis of the molecule, one of the two additional rotational potential DOF is parallel to the long axis of the molecule, and the other additional rotational potential DOF is perpendicular to the long axis of the molecule and to the dipole axis. Since the rotational kinetic DOF parallel to the long axis of the molecule is in a frozen out state in this example, the corresponding additional rotational potential DOF is also in a frozen out state. In this scenario, as the magnetic field strength is increased from zero to a non-zero value, the activation of the BFGA can be employed to increase the total number of EDOF of the working material from 5 in the baseline scenario to 6, for example.

For some embodiments, an externally applied magnetic field can also be employed to modify the DE of an existing DOF or EDOF. In continuation of the aforementioned example, consider a scenario in which the activation of the BFGA is configured in a manner in which the magnetic field strength within the working material is increased further, i.e. beyond the level at which the additional rotational potential DOF are excited, i.e. EDOF. When the magnetic field strength is sufficiently strong, the number of energy states available to, or reachable by, an object of a given average energy in the working material is reduced, where the energy states are in the affected rotational DOF, i.e. the DOF which are affected by the external magnetic field. The reduction in the number of energy levels available to the object can be considered to be due to an increase in the stiffness, or an increase in the spring constant, or an increase in the natural frequency, of the object in the affected DOF in a simplified model. In this simplified model the object in the affected rotational potential and corresponding kinetic DOF is treated as a rotational simple harmonic oscillator. In this model, the magnitude of the difference in energy between adjacent energy levels is proportional to the natural frequency, which in turn is proportional to the square root of the spring constant. For a given average total energy of an object, said increase in the magnitude of the energy difference between adjacent energy levels results in a reduction in the average number of energy levels occupied by, or available to, or reachable by, the object in the given DOF. This reduces the average energy of said object in the given DOF, which reduces the fraction of the total average energy of the object which is stored in, or associated with, the given DOF. An increase in the field strength of an externally applied magnetic field can thus reduce the degree of excitation of affected DOF, and, when the magnetic field is sufficiently strong, result in the freezing out of affected DOF. This can increase the transition temperature of an affected DOF, where the transition temperature can be below or above the temperature of the working material.

In the aforementioned example of an external magnetic field applied to a diatomic gas in which the magnetic dipole moment of the objects is parallel to the long axis. As mentioned, the magnetic field can increase the total number of EDOF of the working material from 5 in the baseline scenario to 7. When the magnetic field is increased even further, however, the DE of the two additional rotational potential DOF is reduced, which also reduces the DE of the corresponding rotational kinetic DOF. The reduction in the DE of an affected DOF can result in a reduction in the specific heat capacity at constant volume and constant pressure, and increase the ratio of specific heat capacities, ceteris paribus. As the magnetic field is increased further, the DE of the EDOF can be reduced to such an extent, that the total number of EDOF of the working material can be reduced from 7 to 3 due to the freezing out of the two additional rotational potential DOF and the two corresponding rotational kinetic DOF.

In another example, consider a working material which is a solid. The specific heat capacity of a solid can be considered to comprise a phonon contribution, an electronic contribution, a magnetic contribution, and a nuclear contribution. The phonon contribution is due to the lattice vibrations of the atoms in a solid. In a typical solid working material, the total number of DOF of objects, i.e. atoms or molecules in the solid, comprise three translational kinetic DOF and three associated translational potential DOF. The potential DOF arise from the interatomic or intermolecular forces acting between neighboring atoms or molecules of the solid working material. At sufficiently large temperatures, all six DOF are typically in an excited state. As the temperature is reduced to zero, the DE of these DOF gradually decreases to a value close to zero. The heat capacity of the nuclei, which can also comprise translational or rotational kinetic DOF, as well as translational or rotational potential DOF, also contributes to the overall heat capacity of a solid in the form of the aforementioned nuclear contribution. The heat capacity of electrons in a working material also contributes to the overall heat capacity of a solid. A portion of the electronic contribution to the heat capacity is described by Fermi-Dirac statistics, as illustrated in the Sommerfeld model, in which the heat capacity of electrons is approximately linear in temperature. The magnetic contribution to the heat capacity of a working material can comprise electron spins, electron orbital angular momentum, or the spins of atomic nuclei, for example. For example, consider ferromagnetic materials. These materials are ferromagnetic below the Curie temperature and paramagnetic above the Curie temperature. In such materials, the magnetic contribution to the heat capacity typically comprises two types of heat capacity. One type is the magnetic heat capacity of spin waves, which comprise magnons. This contribution to the heat capacity is non-negligible in the ferromagnetic regime, and generally decreases with decreasing temperature. Another type is the magnetic heat capacity due to individual spin DOF of magnetic dipoles, such as the spins of unpaired electrons. This contribution to the heat capacity can be approximated by the Ising model. In this model, the specific heat capacity of the objects is typically symmetric about the Curie temperature, and increases at an increasing rate with an increase in temperature below the Curie temperature, and decreases at a decreasing rate with an increase in temperature above the Curie temperature. As a result of the temperature dependence of these two types of magnetic specific heat capacity, the portion of the specific heat capacity which is associated with the magnetic spin DOF of objects in a ferromagnetic material is typically the largest at the Curie temperature. In some embodiments, the average operating temperature of a working material during nominal operations is in the vicinity of the average Curie temperature of the working material. In some embodiments average operating temperature is within 20% of the average Curie temperature. In other embodiments, the average operating temperature can be at any temperature relative to the Curie temperature of the working material, provided that the activation of a BFGA can result in a modification of the specific heat capacity at constant volume or constant pressure during nominal operations. Note that the Curie temperature is a function of pressure, and typically increases with increasing pressure. In some embodiments, the average operating temperature is lower than the temperature of the outside environment, such as outside environment 414. The outside environment can be the atmosphere of earth, for example. For example, the temperature of the outside environment can be 300 degrees Kelvin during nominal operation of one embodiment of the invention. In order to achieve a desired rate of heat to flow from the outside environment to the working material, the average temperature of the working material can be 200 degrees Kelvin. In this case, for some embodiments, the working material can comprise a ferromagnetic material for which the Curie temperature is between 160 and 240 degrees Kelvin, for example. One such material is Terbium with a Curie temperature of approximately 219 degrees Kelvin, for instance.

Note that the Curie temperature of a working material can be modified by doping and by an externally applied pressure, as mentioned. Thus, the Curie temperature of a working material can be modified to approximately match the average operating temperature of the working material, such that the component of the magnetic contribution to the specific heat capacity of the working material which can be modified by the activation of a BFGA is maximized. In other words, the Curie temperature can be specially configured by an external pressure bias, or by other mechanisms such as doping, in order to maximize the change in the specific heat capacity of the working material which can be facilitated by the activation of a BFGA. The pressure bias can be applied by the actuating apparatus, such as actuating apparatus 403, or by a separate actuating apparatus which is configured to modify the average pressure of the working material. The pressure bias can also be applied by the casing of the working material, such as casing apparatus 410. The pressure bias can be applied during the manufacturing process, for example. The casing can be considered to be pre-stressed or under an average stress during nominal operations in this case.

Although the magnetic component of the specific heat capacity is typically large at a phase transition, such as the transition between ferromagnetism and paramagnetism, the magnetic component is also typically non-negligible at temperatures above and below the Curie temperature. Therefore it is typically not essential that the average operating temperature of a working material be in close proximity to the average Curie temperature of the working material during nominal operations.

Note that the specific heat capacity of a working material need not comprise a non-negligible magnetic component at any temperature in the absence of a magnetic field. As mentioned, the modification of the activation level of the BFGA can induce a magnetic component in the specific heat capacity of the working material. In other words, a BFGA can contribute a magnetic component to the total heat specific heat capacity of a working material. A sufficiently strong magnetic field experienced by an object with a magnetic dipole in the working material can also modify non-magnetic contributions to the specific heat capacity of a working material. For instance, a sufficiently strong magnetic field can reduce the DE of rotational kinetic DOF of an object, as previously discussed.

Note that the selection of a suitable working materials for a given application comprises the theoretical or experimental evaluation of the performance of the material in that application, which is a function of a large number of material properties, such as the magnitude of the difference in the specific heat capacity at constant pressure due to the activation of a BFGA during nominal operations. The selection of a suitable working material is not limited to, and need not comprise, the evaluation of the Curie temperature of a material.

In this example, consider an embodiment in which the working material is a solid, a substantial portion of the heat capacity of which is provided by the magnetic spin of the objects, i.e. electrons, nuclei, and electron orbits. An example of such materials are ferromagnetic or paramagnetic materials such as iron, cobalt, or nickel. Such materials are particularly well suited for the modification of the specific heat capacities by the application or modification of an external magnetic field via the activation of a BFGA. As described in the previous paragraphs, the application of an external magnetic field can increase the DE of rotational potential DOF of magnetic dipoles, such as electron spins, for instance. When the external magnetic field strength is sufficiently strong, the external magnetic field can also reduce the DE of rotational potential DOF and any associated rotational kinetic DOF of objects, such as electrons, which feature a magnetic dipole. As the magnetic field is increased further, this can lead to the freezing out of affected DOF of these magnetic objects. As mentioned, the aforementioned freezing out of affected DOF by the application of a sufficiently strong magnetic field can lead to a reduction in the specific heat capacity at constant volume and constant pressure, and increase the ratio of specific heat capacities, ceteris paribus.

Note that, in general, the effect of an application of an external magnetic field need not be limited to rotational kinetic and potential DOF, but can also apply to other DOF, such as translational kinetic DOF of objects, such as electrons. The latter can be affected in scenarios in which the electron orbital angular momentum is affected by an externally applied magnetic field, as can be the case in diamagnetic materials, for example. In general, the activation of a BFGA can be employed in a subset of embodiments of the invention in order to modify the DE of at least one DOF of an object. The activation of the BFGA can comprise the modification of an intrinsic or additional magnetic field, which can facilitate the modification of the average magnitude or direction of a magnetic body force per unit mass acting on an object, which in turn can modify the DE of affected DOF, which can be employed to modify the magnetic component of the specific heat capacity of a working material, and thus modify the total specific heat capacity of a working material.

An example of the aforementioned reduction in the degree of excitation of DOF of objects in a working material as a result of a sufficiently strong externally applied magnetic field is also known as the magnetocaloric effect. This effect is employed in adiabatic demagnetization refrigeration, for example. As used herein, the "magnetocaloric effect" is used to refer to a modification of the specific heat capacity at constant pressure of a working material as a result of the modification of a magnetic field within a working material, where the modification can refer to an increase or a decrease in specific heat capacity at constant pressure as the magnetic field strength within the working material is increased. A positively signed magnetocaloric effect, as used herein, refers to a reduction in the specific heat capacity at constant pressure associated with an increase in the magnetic field strength within the working material. Correspondingly, a negatively signed magnetocaloric effect, as used herein, refers to an increase in the specific heat capacity at constant pressure associated with an increase in the magnetic field strength within the working material. Note that the magnetocaloric effect, as used in the literature, is typically associated with an effect which herein is referred to as a positively signed magnetocaloric effect.

A wide variety of working materials can be employed in embodiments of the invention in which the specific heat capacity of the working material is modified magnetically. As mentioned, the working material can comprise paramagnetic or ferromagnetic materials, as well as diamagnetic materials or ferrimagnetic materials. In general, any material in which the total or combined specific heat capacity comprises a magnetic contribution or a magnetic component can be employed as a working material or a component thereof by a subset of embodiments of the invention. Some materials in which the specific heat capacity comprises a large magnetic component are known in the field of magnetic refrigeration. For example, $Gd_5Si_2Ge_2$ as well as other materials such as $PrNi_5$ are known to exhibit a magnetocaloric effect, as described by https://en.wikipedia.org/wiki/Magnetic_refrigeration, accessed Jan. 20, 2019. As mentioned, ferromagnetic materials such as iron, cobalt, nickel, or gadolinium are also suitable working materials. Paramagnetic materials such as lithium, sodium, aluminium, gaseous and liquid oxygen, and ferromagnetic materials above the Curie temperature can also be employed as working materials. In the presence of a sufficiently strong magnetic field generating apparatus, diamagnetic materials such as water, graphite, nitrogen or carbon dioxide can also be employed as working materials. Note that the magnitude and sign of the magnetocaloric effect of a material at a given temperature is only a rough indication of the suitability of a working material for a given application.

Note that a working material need not be a solid, as in the preceding example, but can also be a fluid such as a liquid or a gas. For example, the working material can comprise gaseous lithium, or oxygen. In some embodiments, the working material can comprise an active material and a passive material. The active material is by definition a material of which the specific heat capacity can be modified by the activation of a BFGA. The passive material is a material which need not experience a change in the specific heat capacity by the activation of a BFGA. The active material can be embedded in the passive material. For instance, the active material can be a small particle, a dust particle, an aerosol, or a crystal. In a subset of passive materials, the active material can also be dissolved in the passive material. In some embodiments the active material can be iron or gadolinium, and the passive material can be air, water, or a hydrocarbon, such as oil, for example.

In some embodiments, the active material can be bonded to other materials, such as ligands, in order to maintain a separation between separate objects of the active material. This can prevent the atoms or molecules of the active material from bonding to each other, and thus separate themselves from the passive material. For instance, this can prevent the iron atoms from forming a solid, and thus become separated from the liquid or gaseous passive material. Thus a desired phase of the active material can be maintained relative to the reference scenario in which the active material is not bonded to ligands with everything else being constant. A desired phase can be a fluid phase, for example. A working material which is a fluid can be advantageous to a working material which is a solid in some embodiments. For example, the rate of heat transfer between the working material and a second material, such as an outside reservoir, can be improved in embodiments employing forced convection. In such embodiments, the working material can be pumped from an interior chamber, such as interior chamber 401, through a separate heat exchanger between stations 356 and 352 on the thermodynamic cycle shown in FIG. 6. The pumping of the working material through the heat exchanger in forced convection, the use of a specially configured heat exchanger, as well as the use of an otherwise solid active material of desirable magnetocaloric properties, can improve the rate of heat transfer between an outside environment 414 and the working material. This in turn can increase the power produced by such an embodiment compared to an embodiment in which the working material only consists of a solid active material, ceteris paribus.

The use of ligands to maintain the separation between an atom or molecule of an active material and the passive material, or adjacent atoms or molecules of an active material, can also increase the number of DOF available to the objects of the active material. For example, when compared to the baseline scenario of the active material, the bonding of ligands to the active material can provide the active material with additional rotational kinetic and potential DOF associated with the rotation of the atom or molecule and the orientation of a permanent or induced magnetic dipole of the atom or molecule in a magnetic field. This can further increase the magnitude of the change of the specific heat capacity of a working material in response to an activation of a BFGA.

Embodiments of the invention employing a positive or negative magnetocaloric effect can be configured in a wide variety of ways. For example, for embodiments configured in a similar manner as the embodiment shown in FIG. 15, a magnetic field can be generated within channel 432 by a BFGA between stations 443 and 447. The magnetic field can be configured to be sufficiently strong such that the working material exhibits a negative magnetocaloric effect, i.e. an increase in the specific heat capacity at constant pressure and a reduction in temperature with an increase in the magnetic field strength within the working material, i.e. with an increase in the level of activation of the BFGA. The magnetic field can be generated in a multitude of ways. Note that the direction of the magnetic field lines is not important in this case. The magnitude of the magnetocaloric effect being a strong function of the strength of the magnetic field. For instance, the magnetic field within channel 432 can be generated by a collection of current carrying wires. In some embodiments, the wires can be wound around channel 432 in solenoidal fashion, and generate a magnetic field which is substantially parallel to the Y-axis, i.e. the length of the channel, for a large portion of channel 432. For instance, in the cross-sectional view shown in FIG. 15, wires of the BFGA can be located at the approximate location of the first charge collection 451, and the second charge collection 455, where the wires are wound around the channel 432 in annular fashion. The current flowing through the wires of the BFGA can be directed into the page in the portion of wires at the location of the first charge collection 451, and directed out of the page in the portion of wires at the location of the second charge collection 455, for instance. As in the case of BFGA 450, the magnetic field generating BFGA in this example can be powered, and the current flowing through the wires can be regulated, by a separate electrical power supply and/or current regulator. In some embodiments the current carrying wires can be superconducting. In some embodiments, the current carrying wires can be normally conducting.

In some embodiments, the magnetic field generating BFGA can comprise permanent magnets. For instance, the permanent magnets can be arranged around channel 432 in an annular fashion. In some embodiments the poles of adjacent permanent magnets can be arranged in a Halbach array, where the majority of the magnetic field lines pass through channel 432 or through the permanent magnets contained within bulk material, and only a small fraction of magnetic field lines pass through outside surface 460. The arrangement of magnets in a Halbach array can increase the magnetic field strength within channel 432

An embodiment employing a magnetic field generating BFGA can be configured in a similar manner as the embodiment shown in FIG. 15, or any other embodiment shown in the other figures, where the electric field generating BFGA is replaced by the magnetic field generating BFGA, for example. In such an embodiment a negative magnetocaloric effect as opposed to a negative electrocaloric effect can be employed to modify the specific heat capacity of a working material. As mentioned previously, some embodiments can employ a positive electrocaloric effect. For instance, an electric field generating BFGA can be located in the vicinity of the second throat, where the electric field is configured to be sufficiently strong to reduce the DE of affected potential and associated kinetic DOF in a manner in which the specific heat capacity of the working material flowing through channel 432 can be reduced throughout at least a portion of the expansion of the working material between stations 446 and 449. Similarly to the aforementioned examples in which a positive electrocaloric effect is used, some embodiments can employ a positive magnetocaloric effect. For instance, a magnetic field generating BFGA can be located in the vicinity of the second throat, where the magnetic field is configured to be sufficiently strong to reduce the DE of affected potential and associated kinetic DOF in a manner in which the specific heat capacity of the working material flowing through channel 432 can be reduced throughout at least a portion of the expansion of the working material between stations 446 and 449. A wide variety of other configurations in which positive or negative electrocaloric effects are employed have been discussed. Similarly, there are wide variety of configurations in which positive and negative magnetocaloric effects can be employed.

In some embodiments, a BFGA can comprise both a magnetic field generating BFGA and an electric field generating BFGA. For instance, some embodiments can employ both a negative electrocaloric effect and a negative magnetocaloric effect. Note that, in some cases, the negative magnetocaloric effect can be induced or enhanced by the polarization of molecules by the electric field generating BFGA.

For example, consider the scenario in which the working material comprises diatomic molecules. The electric field generating BFGA can be configured in a similar manner as the BFGA 450 shown in FIG. 15 in this case. The magnetic field generating BFGA can be configured to generate a magnetic field, the field lines of which comprise a substantial component perpendicular to the page and directed out of the page. Due to the electric polarization of the diatomic molecules within the working material in the vicinity of the electric field generating BFGA, the negative charges within a molecule tend to be located in the positive X-direction of the positive charges within a molecule. Due to the presence of the magnetic field and the due to bulk flow of the working material through channel 432 in the positive Y-direction and there can be a Lorentz force on the positive and negative charges within a molecule, which can also, on average, act on negative charges in the positive X-direction and on positive charges in the negative X-direction. Thus the magnetic field can be employed to increase the magnitude of the body forces acting on the molecules in the working material. At low magnitudes of the net body forces and body torques or body moments, an increase in the magnitude of the body forces can increase the DE of any affected potential DOF in a negative electrocaloric and magnetocaloric effect. At large magnitudes of the net body forces and body torques, an increase in the magnitude of the body forces can decrease the DE of any affected potential DOF in a positive electrocaloric and magnetocaloric effect, due to the freezing out of affected potential DOF and associated kinetic DOF. Note that the magnetic body forces can at least partially cancel, or reduce, the electric body forces for molecules which instantaneously travel in the negative Y-direction. This illustrates the need for the direction and magnitude of the magnetic field to be configured relative to the direction and magnitude of any electric field, where the configuration is also a function of the thermodynamic properties of the working material, such as the average flow speed and temperature of the working material, as well as the polarizability and preferred polarization axis of the working material, amongst other parameters.

In some cases, at least a portion of the magnetocaloric effect can be independent of the electrocaloric effect. For instance, the magnetocaloric effect can be a result of the interaction of the magnetic field with permanent or induced magnetic dipoles within the molecules of a working material. An example of such dipoles are the electron spins within a molecule. In a subset of these cases, the direction of the magnetic field lines of the magnetic field generating BFGA and the electric field lines of the electric field generating BFGA can be configured relative to each other in a manner in which the magnetocaloric and electrocaloric effect are superimposed constructively. In other words, the magnitudes of the body forces and body torques acting on a molecule in a working material due to magnetic and electric fields applied by BFGAs can be configured to increase with an increase in the magnetic field and/or an increase in the electric field. Thus the magnetic and electric field generating BFGA can be configured relative to each other to enhance the magnitude of the change of the specific heat capacity of the working material.

FIG. 16 is a cross-sectional view of one embodiment of the invention. Some features of the apparatus shown in FIG. 16, as well as some of the principles of operation of the apparatus share similarities with the apparatus shown in the other figures, and will therefore not be described in the same detail in the context of FIG. 16, and vice versa. With the exception of BFGA 510, embodiment 490 shown is cylindrically symmetric about an axis parallel to the Y-axis and coincident with the center of embodiment 490. Outside surface 520 is therefore the shape of a revolute body, or a cylinder with variable radii along the Y-axis.

Embodiment 490 comprises a channel 492 with inside surface 522 located between a first opening 493 and a second opening 500, where the channel comprises a first contraction 494, a first expansion 495, a second contraction 496, a second expansion 497, a third contraction 498, and a third expansion 499. The cross-sectional geometry of channel 492 is circular when viewed along the Y-direction. In other embodiments the cross-sectional geometry of channel 492 or outside surface 520 can be square or rectangular. In some embodiments, the cross-sectional geometry of portions of channel 492 can change from square to circular along the length of the channel, i.e. in the positive or negative Y-direction, for example.

Bulk material 491 can comprise a metal such as aluminium, titanium, or steel. Bulk material 491 can also comprise ceramics. In some embodiments, bulk material 491 comprises composites, such as carbon fiber or fiberglass. Bulk material 491 can also comprise electrical insulators such as glass.

In FIG. 16, embodiment 490 moves with constant velocity magnitude and direction relative to a working material. The free stream velocity direction of the upstream working material relative to embodiment 490 is aligned with the Y-axis on average, i.e. directed from the left of the page to the right of the page. For clarity of description, the velocity magnitude and direction of the upstream working material relative to embodiment 490 is assumed to be constant in space and time.

A working material can be a gas, such as air, helium, or nitrogen, for example. A working material can also be a liquid such as water. In the embodiment shown in FIG. 16 the working material is treated as an ideal gas for simplicity. In FIG. 16, the working material is treated as a diatomic ideal gas for clarity of description. In the embodiments in FIG. 16, the working material can be any suitable material, where the conditions for suitability are explained below.

The working material upstream of embodiment 490, such as at station 501, is moving slower relative to embodiment 490 than the speed of sound in the working material upstream of embodiment 490 in the configuration shown in FIG. 16. The magnitude of the velocity of the working material relative to embodiment 490 can be smaller than the magnitude of the velocity of the working material relative to the embodiment shown in FIG. 6 and FIG. 15. The first contraction 494 and the first expansion 495 are configured to expand the working material flowing through channel 492 in the positive Y-direction. The first throat is defined to be the portion of channel 492 with the smallest cross-sectional area of channel 492 between first contraction 494 and first expansion 495 when viewed along the Y-direction. The average speed of the working material relative to embodiment 490 at the first throat is approximately equal to the speed of sound within the working material at that location. Upstream, such as at station 501, the average relative speed is smaller than the speed of sound, and further downstream, such as at station 503, the average relative speed is larger than the speed of sound within the working material at said locations in this particular mode of operation.

Both the second contraction 496 and the second expansion 497 of channel 492 are configured to compress the working material flowing through channel 492 in the positive Y-direction. The second throat is defined to be the portion of channel 492 with the smallest cross-sectional area of channel 492 between second contraction 496 and second expansion 497 when viewed along the Y-direction. The average speed of the working material relative to embodiment 490 at the second throat is approximately equal to the speed of sound within the working material at that location. Upstream, such as at station 503 or 504, the average relative speed is larger than the speed of sound, and further downstream, such as at station 506, the average relative speed is smaller than the speed of sound within the working material at said locations in this particular mode of operation. In some embodiments, there can be a shock wave located between the second throat and station 506, or between the second throat and station 507. In other words, the relative flow speed of the working material downstream of the second throat can be faster than the speed of sound within the working material, where the relative flow speed is reduced to a speed slower than the speed of sound throughout the shock wave prior to station 506 or station 507.

The expansion of the working material between stations 501 and 503 increases the average speed of the working material flowing through channel 492. This expansion can be described as a substantially adiabatic expansion in this simplified example. The compression of the working material between stations 504 and 506 can be described as a substantially adiabatic compression in this embodiment. In other embodiments, the compression can comprise heat transfer from or to the working material. In other embodiments, this compression can at least in part be carried out by an axial compressor, such as an axial compressor found in conventional jet engines. In other embodiments, this compression can at least in part be carried out by a centrifugal compressor, for instance. In order to reduce wave drag associated with the rotor blades of the compressor, an axial or centrifugal compressor is preferably located in a portion of subsonic fluid flow through channel 492, such as between the second throat and station 506, or between the second throat and station 507.

Both the third contraction 498 and the third expansion 499 of channel 492 are configured to expand and accelerate the working material flowing through channel 492 in the positive Y-direction. The third throat is defined to be the portion of channel 492 with the smallest cross-sectional area of channel 492 between third contraction 498 and third expansion 499 when viewed along the Y-direction. The average speed of the working material relative to embodiment 490 at the third throat is approximately equal to the speed of sound within the working material at that location. Upstream, such as at station 507, the average relative speed is smaller than the speed of sound, and downstream, such as at station 509, the average relative speed is larger than the speed of sound within the working material in this embodiment. The expansion of working material between stations 507 and 509 can be described as a substantially adiabatic expansion in this embodiment. In other embodiments, the expansion can comprise heat transfer from or to the working material. In other embodiments, this expansion can at least in part be carried out by an axial turbine, such as an axial turbine found in conventional jet engines, such as turbojet engines, turbofan engines, or turboshaft engines. In other embodiments, this expansion can at least in part be carried out by a centrifugal turbine, for instance. In order to reduce wave drag associated with the rotor blades of the turbine, an axial or centrifugal turbine is preferably located in a portion of subsonic fluid flow through channel 492, such as between station 507 and the third throat. In some such embodiments, the working material downstream of the embodiment can move relative to the embodiment at a speed slower than the speed of sound in the working material. In other words, there need not be a third expansion 499 of channel 492 for embodiments in which an axial or centrifugal turbine, or an equivalent apparatus, is located between station 507 and the third throat, such that the third throat is also the second opening 500, and such that the average flow speed downstream of the second opening is subsonic relative to apparatus 490. In effect, a portion of the thermal energy contained within the working material at station 507 can be converted into useful mechanical shaft work by a conventional axial or centrifugal turbine, resulting in a smaller average flow speed downstream of the equivalent second opening. For example, the drive shaft of an axial turbine can be used to power an electric generator configured to convert at least a portion of the shaft work into electrical energy. In another example, the drive shaft of an axial turbine can be mechanically coupled to a fan of a turbofan engine, or a propeller of a turboprop engine. In some embodiments, the mechanical coupling can comprise gear trains, such as planetary gears. The details of such configurations as well as their applications are well known in the art of conventional aircraft turbines or power turbines.

Dashed lines 518 and 519 indicate stagnation streamlines which are incident on the leading edge or originate at the trailing edge of embodiment 490. Streamlines 518 and 519 are therefore part of a streamsurface, or streamtube, which separate working material flowing around embodiment 490 from working material flowing through channel 492 of embodiment 490. In this embodiment, the steamtube is circular when viewed along the Y-direction.

A body force per unit mass generating apparatus, or "BFGA", 510 is located adjacent to channel 492. BFGA 510 is configured to be able to apply at least one body force per unit mass on objects, e.g. atoms or molecules, of the working material. The magnitude of this body force can be regulated in this embodiment. The BFGA 510 comprises a first charge collection 511 and a second charge collection 515. In the configuration shown, first charge collection 511 is positively charged, and second charge collection 515 is negatively charged. In other embodiments, the polarity of the charge in the charge collections can be reversed, i.e. a first charge collection is negatively charged, and a second charge collection is positively charged.

In the embodiment shown in FIG. 16, the amount of charge in a charge collection can be regulated by charging or discharging, or reducing the charge in a charge collection. In such embodiments, the charge collections can comprise conductors which are able to facilitate the accumulation of charge, or the reduction in the amount of charge contained within the conductor. In some instances in time the amount of charge in a charge collection can be configured to be zero in some of such embodiments. The charging process can comprise the application of a voltage difference across the first charge collection 511 and the second charge collection 515. This voltage difference can be supplied by a battery or a capacitor, for example. The first charge collection 511 and the second charge collection 515 are electrically insulated from each other as well as from portions of bulk material 491. Electrical conductors, such as insulated copper wires, connect first charge collection 511 to the voltage source, as well as second charge collection 515 to the voltage source. These electrical conductors are not shown. In between first charge collection 511 and the channel 492, as well as between second charge collection 515 and the channel 492, bulk material 491 is an electrical insulator. In effect, first charge collection 511 and second charge collection 515 can be considered to be the opposite conducting plates of a capacitor, with the dielectric in between these plates comprising the working material as well as the relevant portion of bulk material 491 between first charge collection 511 and second charge collection 515. In the embodiment shown, first charge collection 511 and second charge collection 515 are configured in a manner in which the majority of electric field lines pass through the working material within channel 492 when the first charge collection 511 and second charge collection 515 are oppositely charged. To that end, the first charge collection 511 and second charge collection 515 can comprise several insulated conductors. These conductors can be wires, for instance, and can be arranged parallel to the Y-axis within first charge collection 511. This can serve to prevent or diminish any undesirable redistribution of charge within first charge collection 511 and second charge collection 515.

In accordance with some embodiments of the invention, and as explained below, the effect of the BFGA 510 during nominal operations is the increase of the specific heat capacity at constant pressure of the working material in channel 492 in the proximity of BFGA 510. In the embodiment and method of operation shown in FIG. 16, for simplicity, the pressure of the working material is constant throughout the increase or decrease of the specific heat capacity at constant pressure of the working material. The increase in the specific heat capacity at constant pressure corresponds to a decrease in the temperature and an increase in the density of the working material. In FIG. 16, this increase in the specific heat capacity at constant pressure occurs between stations 503 and 504. Between stations 504 and 506 the specific heat capacity at constant pressure is substantially constant in this embodiment. Between stations 506 and 507 the specific heat capacity at constant pressure is reduced to the original value at station 503 or station 501. The increase of the specific heat capacity of the working material for the embodiment shown in FIG. 16 can be considered to be a negative electrocaloric effect.

In effect, the transition from station 503 to station 504 can be described as an isobaric compression, or an isobaric reduction in volume. In other embodiments, or other boundary conditions, or other methods of operation, the pressure need not be constant throughout the change in the specific heat capacities. For example, the pressure can increase or decrease during the increase or decrease of the specific heat capacity at constant pressure. For example, work can be done on the working material by a compression or expansion apparatus, such as a duct or a contraction or expansion of channel 492 or an axial turbine or compressor, or heat or mass can be added or removed from the working material. In the simplified embodiment shown in FIG. 16, no heat, or mass is exchanged between the working material within channel 492 and the remainder of embodiment 490. In another example, the increase or decrease of the specific heat capacity can occur in an isochoric process at constant volume. In another example, the increase or decrease of the specific heat capacity can occur in a polytropic process.

The magnitude of the average potential energy of an object within the working material can be regulated by the BFGA. In accordance with some embodiments of the invention, the activation level of the BFGA controls the strength of the body force per unit mass, which in turn regulates the average potential energy of the objects within the working material, which can be employed to control the specific heat capacity of the working material.

Note that, in the isobaric scenario shown in FIG. 16, work is done on the working material throughout the activation of the BFGA, and the density is increased while the temperature is decreased adiabatically, i.e. without an exchange of heat with a thermal reservoir other than the working material.

Note that, for simplicity, the change in the activation level of the BFGA is assumed to consume no work in the embodiment shown in FIG. 16. The activation of a BFGA can consume work in some embodiments. In some such embodiments, at least a portion of this work can be recovered, where the recovery can occur during the deactivation of the BFGA, or during the conversion of thermal energy into useful energy such as mechanical or electrical work.

FIG. 16 also shows a plot of the approximate values of physical parameters of the working material within channel 492 as a function of position along the Y-direction.

The horizontal axis 527, parallel to the Y-axis, indicates the position along the Y-direction at which the corresponding physical parameter is measured. The vertical axis 528, parallel to the X-axis, shows the value of the physical parameter. Note that the scale of vertical axis 528 is different for different physical parameters, i.e. different lines shown in the plot. In the free stream the working material is approximately at standard pressure and temperature, at natural specific heat capacity at constant pressure, and at free stream flow speed.

Line 529 shows the variation of the magnitude of the average velocity of the working material relative to the embodiment 490 as a function of position in the Y-direction. Line 530 shows the value of the magnitude of the average velocity of the working material relative to the embodiment 490 at station 501 for reference. Note that the magnitude of the average velocity of the working material relative to the embodiment 490 at station 509 is larger than at station 501.

Line 531 shows the variation of the specific heat capacity at constant pressure of the working material as a function of position along the Y-direction. Line 532 shows the value of the specific heat capacity at constant pressure at station 501 for reference.

Line 533 shows the variation of the temperature of the working material as a function of position in the Y-direction. Line 534 shows the value of the temperature at station 501 for reference. Note that the temperature at station 509 is lower than at station 501. Embodiment 490 can therefore be considered to cool or refrigerate the working material flowing through channel 492.

Line 535 shows the variation of the static pressure of the working material as a function of position in the Y-direction. Line 536 shows the value of the static pressure at station 501 for reference.

Some embodiments of the invention produce a net mechanical work output. In the embodiment shown, the mechanical work is used to accelerate the working material, as indicated by the larger average relative speed 529 of working material at station 509 compared to station 501. The associated thrust force can be employed to cancel at least a portion of the drag force acting on embodiment 490 and any apparatus, such as the remainder of an aircraft, connected thereto due to the motion through the working material. In such applications, embodiment 490 can be operated in a similar fashion as a conventional ramjet.

The mechanical work can also be converted into electrical energy in a wide variety of ways.

FIG. 17 is a cross-sectional view of one embodiment of the invention. Some features of the apparatus shown in FIG. 17, as well as some of the principles of operation of the apparatus share similarities with the apparatus shown in the other figures, and will therefore not be described in the same detail in the context of FIG. 17, and vice versa. With the exception of BFGA 570, embodiment 550 shown is cylindrically symmetric about an axis parallel to the Y-axis and coincident with the center of embodiment 550. Outside surface 580 is therefore the shape of a revolute body, or a cylinder with variable radii along the Y-axis.

Embodiment 550 comprises a channel 552 with inside surface 582 located between a first opening 553 and a second opening 560, where the channel comprises a first contraction 554, a first expansion 555, a second contraction 556, a second expansion 557, and a third contraction 558. The cross-sectional geometry of channel 552 is circular when viewed along the Y-direction. In other embodiments the cross-sectional geometry of channel 552 or outside surface 580 can be square or rectangular. In some embodiments, the cross-sectional geometry of portions of channel 552 can change from square to circular along the length of the channel, i.e. in the positive or negative Y-direction, for example.

Bulk material 551 can comprise a metal such as aluminium, titanium, or steel. Bulk material 551 can also comprise ceramics. In some embodiments, bulk material 551 comprises composites, such as carbon fiber or fiberglass. Bulk material 551 can also comprise electrical insulators such as glass.

In FIG. 17, embodiment 550 moves with constant velocity magnitude and direction relative to a working material. The free stream velocity direction of the upstream working material relative to embodiment 550 is aligned with the Y-axis on average, i.e. directed from the left of the page to the right of the page. For clarity of description, the velocity magnitude and direction of the upstream working material relative to embodiment 550 is assumed to be constant in space and time.

A working material can be a gas, such as air, helium, or nitrogen, for example. A working material can also be a liquid such as water. In the embodiment shown in FIG. 17 the working material is treated as an ideal gas for simplicity. In FIG. 17, the working material is treated as a diatomic ideal gas for clarity of description. In the embodiments in FIG. 17, the working material can be any suitable material, where the conditions for suitability are explained below.

The working material upstream of embodiment 550, such as at station 561, is moving slower relative to embodiment 550 than the speed of sound in the working material upstream of embodiment 550 in the configuration shown in FIG. 17. The magnitude of the velocity of the working material relative to embodiment 550 can be smaller than the magnitude of the velocity of the working material relative to the embodiment shown in FIG. 6, FIG. 15 and FIG. 16. The first contraction 554 and the first expansion 555 are configured to expand the working material flowing through channel 552 in the positive Y-direction. The first throat is defined to be the portion of channel 552 with the smallest cross-sectional area of channel 552 between first contraction 554 and first expansion 555 when viewed along the Y-direction. The average speed of the working material relative to embodiment 550 at the first throat is approximately equal to the speed of sound within the working material at that location. Upstream, such as at station 561, the average relative speed is smaller than the speed of sound, and further downstream, such as at station 563, the average relative speed is larger than the speed of sound within the working material at said locations in this particular mode of operation.

Both the second contraction 556 and the second expansion 557 of channel 552 are configured to compress the working material flowing through channel 552 in the positive Y-direction. The second throat is defined to be the portion of channel 552 with the smallest cross-sectional area of channel 552 between second contraction 556 and second expansion 557 when viewed along the Y-direction. The average speed of the working material relative to embodiment 550 at the second throat is approximately equal to the speed of sound within the working material at that location. Upstream, such as at station 563 or 564, the average relative speed is larger than the speed of sound, and further downstream, such as at station 566 or 567, the average relative speed is smaller than the speed of sound within the working material at said locations in this particular mode of operation. In some embodiments, there can be a shock wave located between the second throat and station 566, or between the second throat and station 567. In other words, the relative flow speed of the working material downstream of the second throat can be faster than the speed of sound within the working material, where the relative flow speed is reduced to a speed slower than the speed of sound throughout the shock wave prior to station 566 or station 567.

The expansion of the working material between stations 561 and 563 increases the average speed of the working material flowing through channel 552. This expansion can be described as a substantially adiabatic expansion in this simplified example. The compression of the working material between stations 564 and 566 can be described as a substantially adiabatic compression in this embodiment. In other embodiments, the compression can comprise heat transfer from or to the working material. In other embodiments, this compression can at least in part be carried out by an axial compressor, such as an axial compressor found in conventional jet engines. In other embodiments, this compression can at least in part be carried out by a centrifugal compressor, for instance. In order to reduce wave drag associated with the rotor blades of the compressor, an axial or centrifugal compressor is preferably located in a portion of subsonic fluid flow through channel 552, such as between the second throat and station 566, or between the second throat and station 567.

The third contraction 558 of channel 552 is configured to expand and accelerate the working material flowing through channel 552 in the positive Y-direction. The average speed of the working material relative to embodiment 550 at the third throat is approximately equal to the speed of sound within the working material at that location. Upstream, such as at station 567, the average relative speed is smaller than the speed of sound, and downstream, such as at station 569, the average relative speed is larger than the speed of sound within the working material in this embodiment. The expansion of working material between stations 567 and 569 can be described as a substantially adiabatic expansion in this embodiment. In other embodiments, the expansion can comprise heat transfer from or to the working material. In other embodiments, this expansion can at least in part be carried out by an axial turbine, such as an axial turbine found in conventional jet engines, such as turbojet engines, turbofan engines, or turboshaft engines. In other embodiments, this expansion can at least in part be carried out by a centrifugal turbine, for instance. In order to reduce wave drag associated with the rotor blades of the turbine, an axial or centrifugal turbine is preferably located in a portion of subsonic fluid flow through channel 552, such as between station 567 and the third throat. In some such embodiments, the working material downstream of the embodiment can move relative to the embodiment at a speed slower than the speed of sound in the working material. In other words, there need not be a third expansion 559 of channel 552 for embodiments in which an axial or centrifugal turbine, or an equivalent apparatus, is located between station 567 and the third throat, such that the third throat is also the second opening 560, and such that the average flow speed downstream of the second opening is subsonic relative to apparatus 550. In effect, a portion of the thermal energy contained within the working material at station 567 can be converted into useful mechanical shaft work by a conventional axial or centrifugal turbine, resulting in a smaller average flow speed downstream of the equivalent second opening. In this manner, the kinetic energy of the working material at station 569, or the thermal energy and pressure of the working material at station 567, can be converted into shaft work by expanding and/or decelerating the working material in a turbine, such as an axial turbine, wind turbine, open rotor propeller, or ducted rotor propeller. The turbine can be configured and operated in similar fashion as a power turbine, or free turbine, in a turboprop or turboshaft engine, for instance. For example, the drive shaft of an axial turbine can be used to power an electric generator configured to convert at least a portion of the shaft work into electrical energy. In another example, the drive shaft of an axial turbine can be mechanically coupled to a fan of a turbofan engine, or a propeller of a turboprop engine. In some embodiments, the mechanical coupling can comprise gear trains, such as planetary gears. The details of such configurations as well as their applications are well known in the art of conventional aircraft turbines or power turbines. In some embodiments, therefore, engine 550 and any associated power turbines, can be attached to a vehicle, such as an aircraft, a land vehicle such as a car, truck, or train, or a watercraft, such as a ship. In some embodiments, engine 550 and any associated power turbines can be rigidly mounted to the ground, and operated in similar manner as conventional wind turbines. The mechanical shaft work generated by any power turbines located downstream of station 567 can be converted into electrical energy by an electrical generator, for example. Engine 550 can be considered to be an artificial wind source in such embodiments. As discussed, the energy required for the change in pressure or the change in velocity of the working material is provided by the thermal energy of the working material, e.g. the air.

Engine 550 can be started by inducing a bulk flow of working material through channel 552. This bulk flow can be generated by a propeller. The propeller can be powered by an electric motor, for instance, and the propeller can be configured to pull or push working material through channel 552. This bulk flow can also be generated by a source of compressed working material. For example, a valve to a tank of compressed working material can be opened, and the working material can be released into channel 552, thus inducing a bulk flow of working material through channel 552.

Dashed lines 578 and 579 indicate stagnation streamlines which are incident on the leading edge or originate at the trailing edge of embodiment 550. Streamlines 578 and 579 are therefore part of a streamsurface, or streamtube, which separate working material flowing around embodiment 550 from working material flowing through channel 552 of embodiment 550. In this embodiment, the steamtube is circular when viewed along the Y-direction.

A body force per unit mass generating apparatus, or "BFGA", 570 is located adjacent to channel 552. BFGA 570 is configured to be able to apply at least one body force per unit mass on objects, e.g. atoms or molecules, of the working material. The magnitude of this body force can be regulated in this embodiment. The BFGA 570 comprises a first charge collection 571 and a second charge collection 575. In the configuration shown, first charge collection 571 is positively charged, and second charge collection 575 is negatively charged. In other embodiments, the polarity of the charge in the charge collections can be reversed, i.e. a first charge collection is negatively charged, and a second charge collection is positively charged.

In the embodiment shown in FIG. 17, the amount of charge in a charge collection can be regulated by charging or discharging, or reducing the charge in a charge collection. In such embodiments, the charge collections can comprise conductors which are able to facilitate the accumulation of charge, or the reduction in the amount of charge contained within the conductor. In some instances in time the amount of charge in a charge collection can be configured to be zero in some of such embodiments. The charging process can comprise the application of a voltage difference across the first charge collection 571 and the second charge collection 575. This voltage difference can be supplied by a battery or a capacitor, for example. The first charge collection 571 and the second charge collection 575 are electrically insulated from each other as well as from portions of bulk material 551. Electrical conductors, such as insulated copper wires, connect first charge collection 571 to the voltage source, as well as second charge collection 575 to the voltage source. These electrical conductors are not shown. In between first charge collection 571 and the channel 552, as well as between second charge collection 575 and the channel 552, bulk material 551 is an electrical insulator. In effect, first charge collection 571 and second charge collection 575 can be considered to be the opposite conducting plates of a capacitor, with the dielectric in between these plates comprising the working material as well as the relevant portion of bulk material 551 between first charge collection 571 and second charge collection 575. In the embodiment shown, first charge collection 571 and second charge collection 575 are configured in a manner in which the majority of electric field lines pass through the working material within channel 552 when the first charge collection 571 and second charge collection 575 are oppositely charged. To that end, the first charge collection 571 and second charge collection 575 can comprise several insulated conductors. These conductors can be wires, for instance, and can be arranged parallel to the Y-axis within first charge collection 571. This can serve to prevent or diminish any undesirable redistribution of charge within first charge collection 571 and second charge collection 575.

In accordance with some embodiments of the invention, and as explained below, the effect of the BFGA 570 during nominal operations is the increase of the specific heat capacity at constant pressure of the working material in channel 552 in the proximity of BFGA 570. In the embodiment and method of operation shown in FIG. 17, for simplicity, the pressure of the working material is constant throughout the increase or decrease of the specific heat capacity at constant pressure of the working material. The increase in the specific heat capacity at constant pressure corresponds to a decrease in the temperature and an increase in the density of the working material. In FIG. 17, this increase in the specific heat capacity at constant pressure occurs between stations 563 and 564. Between stations 564 and 566 the specific heat capacity at constant pressure is substantially constant in this embodiment. Between stations 566 and 567 the specific heat capacity at constant pressure is reduced to the original value at station 563 or station 561. The increase of the specific heat capacity of the working material for the embodiment shown in FIG. 17 can be considered to be a negative electrocaloric effect.

In effect, the transition from station 563 to station 564 can be described as an isobaric compression, or an isobaric reduction in volume. In other embodiments, or other boundary conditions, or other methods of operation, the pressure need not be constant throughout the change in the specific heat capacities. For example, the pressure can increase or decrease during the increase or decrease of the specific heat capacity at constant pressure. For example, work can be done on the working material by a compression or expansion apparatus, such as a duct or a contraction or expansion of channel 552 or an axial turbine or compressor, or heat or mass can be added or removed from the working material. In the simplified embodiment shown in FIG. 17, no heat, or mass is exchanged between the working material within channel 552 and the remainder of embodiment 550. In another example, the increase or decrease of the specific heat capacity can occur in an isochoric process at constant volume. In another example, the increase or decrease of the specific heat capacity can occur in a polytropic process.

The magnitude of the average potential energy of an object within the working material can be regulated by the BFGA. In accordance with some embodiments of the invention, the activation level of the BFGA controls the strength of the body force per unit mass, which in turn regulates the average potential energy of the objects within the working material, which can be employed to control the specific heat capacity of the working material.

Note that, in the isobaric scenario shown in FIG. 17, work is done on the working material throughout the activation of the BFGA, and the density is increased while the temperature is decreased adiabatically, i.e. without an exchange of heat with a thermal reservoir other than the working material.

Note that, for simplicity, the change in the activation level of the BFGA is assumed to consume no work in the embodiment shown in FIG. 17. The activation of a BFGA can consume work in some embodiments. In some such embodiments, at least a portion of this work can be recovered, where the recovery can occur during the deactivation of the BFGA, or during the conversion of thermal energy into useful energy such as mechanical or electrical work.

FIG. 17 also shows a plot of the approximate values of physical parameters of the working material within channel 552 as a function of position along the Y-direction.

The horizontal axis 587, parallel to the Y-axis, indicates the position along the Y-direction at which the corresponding physical parameter is measured. The vertical axis 588, parallel to the X-axis, shows the value of the physical parameter. Note that the scale of vertical axis 588 is different for different physical parameters, i.e. different lines shown in the plot. In the free stream the working material is approximately at standard pressure and temperature, at natural specific heat capacity at constant pressure, and at free stream flow speed.

Line 589 shows the variation of the magnitude of the average velocity of the working material relative to the embodiment 550 as a function of position in the Y-direction. Line 590 shows the value of the magnitude of the average velocity of the working material relative to the embodiment 550 at station 561 for reference. Note that the magnitude of the average velocity of the working material relative to the embodiment 550 at station 569 is larger than at station 561.

Line 591 shows the variation of the specific heat capacity at constant pressure of the working material as a function of position along the Y-direction. Line 592 shows the value of the specific heat capacity at constant pressure at station 561 for reference.

Line 593 shows the variation of the temperature of the working material as a function of position in the Y-direction. Line 594 shows the value of the temperature at station 561 for reference. Note that the temperature at station 569 is lower than at station 561. Embodiment 550 can therefore be considered to cool or refrigerate the working material flowing through channel 552.

Line 595 shows the variation of the static pressure of the working material as a function of position in the Y-direction. Line 596 shows the value of the static pressure at station 561 for reference.

Some embodiments of the invention produce a net mechanical work output. In the embodiment shown, the mechanical work is used to accelerate the working material, as indicated by the larger average relative speed 589 of working material at station 569 compared to station 561. The associated thrust force can be employed to cancel at least a portion of the drag force acting on embodiment 550 and any apparatus, such as the remainder of an aircraft, connected thereto due to the motion through the working material. In such applications, embodiment 550 can be operated in a similar fashion as a conventional ramjet.

The mechanical work can also be converted into electrical energy in a wide variety of ways.

FIG. 6, FIG. 15, FIG. 16, and FIG. 17 show different embodiments configured to operate at different free stream flow velocities. In some embodiments, a single embodiment can be configured to operate at different free stream flow velocities. To that end, the configuration of the channel of the single embodiment can be modified or morphed in order to adapt the shape of the channel to different free stream flow velocities. A wide variety of morphing methods can be employed to facilitate this.

In the case in which the cross-sectional geometry of a channel is circular, a variable geometry nozzles can be employed to modify the cross-sectional areas of the channel at the first, second or third throat, as well as at the first opening or the second openings. Such variable geometry nozzles are found at the exhausts of conventional high performance jet engines. Nozzles of similar architecture can be mounted at the first opening, at the first contraction, and at the second opening of a single embodiment of the invention.

In other embodiments in which the cross-sectional geometry of a channel is circular or annular, a translating spike can be employed to modify the cross-sectional areas of a channel at the first, second or third throat. In such embodiments, the cross-sectional area of the first opening and the second opening can be modified using conventional variable geometry nozzles.

In the case in which the cross-sectional geometry of a channel is square or rectangular, ramps can be employed to modify the cross-sectional areas of the channel along the length of the channel.

The ramps, translating spikes, or nozzles can be actuated by hydraulic and/or electric actuators, for example.

The configuration of the single embodiment can be modified depending on the free stream flow velocity magnitude, as illustrated in the following example. FIG. 17 can correspond to a configuration of the single embodiment at Mach numbers below approximately Mach 0.5. FIG. 16 can correspond to a configuration below Mach 1. FIG. 15 can correspond to a configuration below approximately Mach 1.5. FIG. 6 can correspond to a configuration above Mach 1.5. Other suitable modes of operation can be established for other types of working material, or other types of embodiments.

Figure 18:
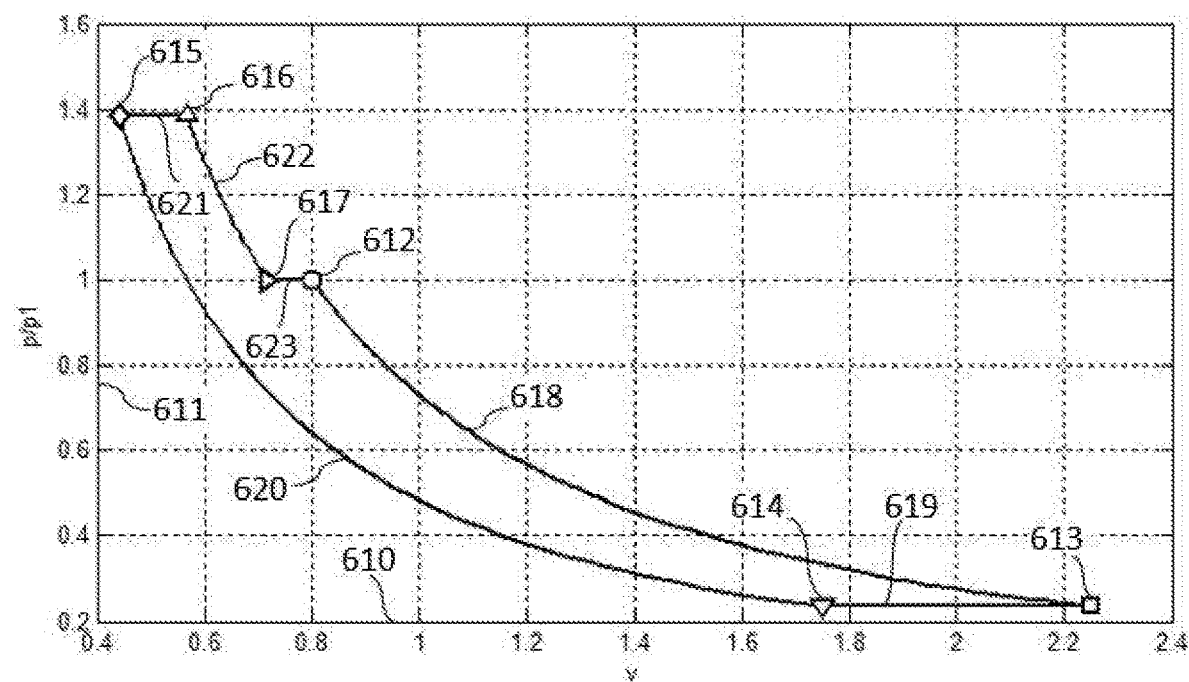
FIG. 18 shows a plot of pressure versus specific volume for a subset of embodiments of the invention for an example method of operation.

FIG. 18 shows a plot of normalized pressure 611 versus specific volume 610 for a subset of embodiments of the invention for an example method of operation. The pressure is normalized by the value of the pressure at station 612. For instance, FIG. 18 can describe an example method of operation of an embodiment similar to embodiment 550 shown in FIG. 17. Embodiment 550 will thus be used to explain the method of operation shown in FIG. 18, and vice versa.

In the free stream the thermodynamic properties of the working material are described by station 612. Station 613 describes the properties of the working material following an adiabatic expansion 618 of the working material. The adiabatic expansion can occur in an axial or centrifugal turbine, for example. The expansion can also occur in a converging diverging duct, such as a first contraction 554 and a first expansion 555 of a channel 552.

As objects of the working material are subjected to an electric field of the BFGA of sufficient strength, the specific heat capacity at constant pressure of the working material is increased in this embodiment. As a consequence of the increase in the specific heat capacity at constant pressure, the temperature and specific volume of the working material is reduced. Due to the geometry of the channel 552, the pressure remains constant throughout this process in embodiment 550 for this method of operation. Accordingly, the transition from station 613 to station 614 is an isobaric compression 619. As mentioned, the transition from station 614 to station 615 is an adiabatic compression 620. This compression can be carried out by a centrifugal or axial compressor, for example. The compression can also be carried out by a converging diverging duct, such as second contraction 556 and second expansion 557 of channel 552. Note that the specific heat capacity at constant pressure remains substantially constant throughout the adiabatic compressions or expansions shown in FIG. 18. As objects of the working material move from station 615 to station 616, they are no longer subjected to an electric field strength of sufficient magnitude. As a result, the specific heat capacity at constant pressure of the working material is decreased throughout the isobaric expansion 621 from station 615 to station 616. At station 616 the specific heat capacity at constant pressure is substantially equal to the specific heat capacity at constant pressure at station 612. In other embodiments, the transition from station 615 to station 616 or from station 613 to station 614 need not be isobaric. For example, said transitions can be isochoric or polytropic in some embodiments. The transition from station 616 to station 617 is an adiabatic expansion 622, which can be carried out in a conventional axial or centrifugal compressor, for example. The expansion can also occur in a converging duct, such as a third contraction 558 of a channel 552. The expansion can also occur in a converging diverging duct, such as a third contraction 498 and a third expansion 499 of a channel 492. Station 617 describes the properties of the working material downstream of the second opening of a channel. In some embodiments, the working material at station 617 returns substantially isobarically 623 to station 612. When the thermodynamic cycle is run in reverse, with the initial station being similar to station 617, the following station being similar to station 616, and the penultimate station being similar to station 612, an embodiment of the invention can be used to convert mechanical work into heat.

Note that the values along the axes of FIG. 18 are arbitrary, and are not intended to limit the invention to a specific working material or method of operation. Other thermodynamic cycles employing the artificial and deliberate modification of the specific heat capacities at constant volume or pressure are within the scope of the invention.

In general, the principles and methods described herein can also be applied to other types of boundary conditions or other types of thermodynamic compression or expansion apparatuses. For example, the speed of the working material upstream of an embodiment of the invention can be slower than the speed of sound in a working material at that location for some embodiments. The aforementioned adiabatic expansion or compression processes can also be carried out by axial or centrifugal turbines or compressors, or by reciprocal piston engines. As mentioned, these compressions or expansions need not be adiabatic in some embodiments. For example, a compression or expansion can be isothermal, or otherwise polytropic.

In other embodiments, or for other methods of operation, or for other levels of activation of the BFGA, the working material can be configured in a manner in which the activation of the BFGA relative to the working material decreases the specific heat capacity at constant pressure and the specific heat capacity at constant volume. In these embodiments, the activation of a BFGA can be considered to freeze out, or reduce the DE of, at least one EDOF, resulting in a decrease of the heat capacities. In such embodiments, the BFGA can be activated following a compression of the working material and prior to, and during the expansion of the working material, and deactivated following said expansion. The aforementioned expansion and compression can be adiabatic, for instance. In general, some of the embodiments of the invention are configured in a manner in which the specific heat capacities during a compression of the working material are larger than the specific heat capacities during an expansion of the working material. For example, for embodiments similar to the embodiment shown in FIG. 6, such a BFGA can be located between, or positioned coincident with, the second contraction 66 and the second expansion 67 of channel 62, as opposed to being located between, or positioned coincident with, the first contraction 64 and the first expansion 65 of channel 62, as shown in FIG. 6. Recall that the working material is expanded throughout both the second contraction 66 and the second expansion 67 of channel 62.

Embodiments of the invention can be employed to precool working material before it enters conventional turbomachinery, such as a turbojet engine, a turbofan engine, or a conventional internal combustion engine with reciprocating pistons. This can reduce the peak temperature or improve the efficiency of such combustion engines.

Aspects of the Invention

The invention is further defined by the following aspects.

Aspect 1. An apparatus for interacting with a working material, wherein the apparatus comprises: a body force generating apparatus configured to artificially modify an specific heat capacity of the working material; and a work exchange apparatus Aspect 2. The apparatus of aspect 1, wherein the work exchange apparatus comprises a compression apparatus, where a compression apparatus is configured to do work on the working material Aspect 3. The apparatus of aspect 1, wherein the work exchange apparatus comprises an expansion apparatus, where an expansion apparatus is configured to allow the working material to do work on the expansion apparatus Aspect 4. The apparatus of aspect 1, wherein the body force generating apparatus is configured to increase a specific heat capacity of the working material Aspect 5. The apparatus of aspect 1, wherein the body force generating apparatus is configured to decrease a specific heat capacity of the working material Aspect 6. The apparatus of aspect 1, wherein the working material comprises solid particles, or a solid object Aspect 7. The apparatus of aspect 1, wherein the working material comprises of a fluid, such as a liquid, a gas, or a colloid Aspect 8. The apparatus of aspect 1, wherein the working material comprises electrons Aspect 9. The apparatus of aspect 8, wherein a specific heat capacity of electrons is modified by the body force generating apparatus Aspect 10. The apparatus of aspect 1, wherein the body force of the body force generating apparatus is electromagnetic in nature Aspect 11. The apparatus of aspect 1, wherein the body force of the body force generating apparatus is gravitational in nature Aspect 12. The apparatus of aspect 1, wherein the body force of the body force generating apparatus is inertial in nature Aspect 13. The apparatus of aspect 10, wherein the body force of the body force generating apparatus is electrical in nature Aspect 14. The apparatus of aspect 10, wherein the body force of the body force generating apparatus is magnetic in nature Aspect 15. The apparatus of aspect 10, wherein the body force generating apparatus comprises a magnetic field generating apparatus Aspect 16. The apparatus of aspect 15, wherein at least a portion of the magnetic field is generated by current flowing through a conductor Aspect 17. The apparatus of aspect 16, wherein at least a portion of the conductor is superconducting Aspect 18. The apparatus of aspect 16, wherein at least a portion of the conductor is arranged around or within at least a portion of the working material in solenoidal fashion Aspect 19. The apparatus of aspect 15, wherein at least a portion of the magnetic field is generated by a permanent magnet Aspect 20. The apparatus of aspect 10, wherein the body force generating apparatus comprises an electric field generating apparatus Aspect 21. The apparatus of aspect 20, wherein the electric field generating apparatus comprises electrical conductors configured to accumulate positive or negative charge Aspect 22. The apparatus of aspect 20, wherein the electric field generating apparatus comprises collections of positive or negative charge Aspect 23. The apparatus of aspect 10, wherein the body force generating apparatus comprises an ionization apparatus configured to ionize at least a portion of the working material Aspect 24. The apparatus of aspect 23, wherein at least a portion of the energy consumed in an ionization process can be recovered Aspect 25. The apparatus of aspect 24, wherein at least a portion of the energy is recovered by a work exchange apparatus configured to allow the working material to do work on the work exchange apparatus Aspect 26. The apparatus of aspect 25, wherein the work exchange apparatus comprises an electrical generator Aspect 27. The apparatus of aspect 25, wherein the work exchange apparatus comprises an axial or centrifugal turbine Aspect 28. The apparatus of aspect 25, wherein the work exchange apparatus comprises a reciprocating piston Aspect 29. The apparatus of aspect 24, wherein at least a portion of the energy is recovered by a thermoelectric energy conversion apparatus Aspect 30. The apparatus of aspect 24, wherein at least a portion of the energy is recovered via a photoelectric effect Aspect 31. The apparatus of aspect 24, wherein at least a portion of the energy is recovered by an energy conversion apparatus configured to convert thermal energy into useful energy Aspect 32. The apparatus of aspect 31, wherein the useful energy is in the form of electrical energy Aspect 33. The apparatus of aspect 31, wherein the useful energy is in the form of mechanical energy Aspect 34. The apparatus of aspect 23, wherein the ionization apparatus is configured to ionize the working material via dielectric barrier discharge Aspect 35. The apparatus of aspect 23, wherein the ionization apparatus is configured to ionize the working material via electromagnetic radiation Aspect 36. The apparatus of aspect 35, wherein electromagnetic radiation is generated by a laser Aspect 37. The apparatus of aspect 35, wherein electromagnetic radiation is generated by an antenna Aspect 38. The apparatus of aspect 23, wherein the ionization apparatus is configured to ionize the working material via a sufficiently strong spatial or temporal gradient in the electric field within at least a portion of the working material Aspect 39. The apparatus of aspect 38, wherein a spatial gradient in the electric field is provided by a charged electrical conductor with small protrusions into the working material Aspect 40. The apparatus of aspect 38, wherein at least a portion of the working material is ionized via field desorption ionization Aspect 41. The apparatus of aspect 23, wherein the ionized portion of the working material comprises a non-thermal plasma Aspect 42. The apparatus of aspect 23, wherein the ionized portion of the working material can comprise a net electric charge Aspect 43. The apparatus of aspect 23, wherein the ionized portion of the working material is a solid material Aspect 44. The apparatus of aspect 12, wherein the body force of the body force generating apparatus is configured to induce inertial body forces within the working material by accelerating the working material Aspect 45. The apparatus of aspect 44, wherein the body force of the body force generating apparatus is configured to induce inertial body forces within the working material by rotating the working material about an axis Aspect 46. The apparatus of aspect 44, wherein the acceleration comprises an acceleration associated with a translation of the working material Aspect 47. The apparatus of aspect 44, wherein the acceleration comprises an acceleration associated with a rotation of the working material Aspect 48. The apparatus of aspect 10, wherein the body force generating apparatus is configured to electrically polarize at least a portion of the working material Aspect 49. The apparatus of aspect 10, wherein the body force generating apparatus is configured to induce a magnetic dipole on at least a portion of objects within a working material Aspect 50. The apparatus of aspect 1, wherein a specific heat capacity of objects within a working material is modified Aspect 51. The apparatus of aspect 1, wherein a specific heat capacity of a collection of objects within the working material is modified Aspect 52. The apparatus of aspect 1, wherein a specific heat capacity of the working material is modified Aspect 53. The apparatus of aspect 10, wherein a specific heat capacity of a working material is modified by a positive or negative magnetocaloric effect Aspect 54. The apparatus of aspect 10, wherein a specific heat capacity of a working material is modified by a positive or negative electrocaloric effect Aspect 55. The apparatus of aspect 2, wherein the compression apparatus comprises an axial or centrifugal compressor Aspect 56. The apparatus of aspect 2, wherein the compression apparatus comprises a reciprocating piston Aspect 57. The apparatus of aspect 2, wherein the compression apparatus comprises a body force generating apparatus Aspect 58. The apparatus of aspect 57, wherein the body force generating apparatus comprises an electric field generating apparatus Aspect 59. The apparatus of aspect 57, wherein the body force generating apparatus comprises a magnetic field generating apparatus Aspect 60. The apparatus of aspect 57, wherein the body force generating apparatus comprises a gravitational field generating apparatus Aspect 61. The apparatus of aspect 57, wherein the body force generating apparatus comprises an inertial body force generating apparatus Aspect 62. The apparatus of aspect 2, wherein the compression apparatus comprises a duct through which a fluid working material is configured to flow Aspect 63. The apparatus of aspect 62, wherein the duct is a converging diverging duct Aspect 64. The apparatus of aspect 62, wherein the duct is a diverging duct Aspect 65. The apparatus of aspect 62, wherein the duct is a converging duct Aspect 66. The apparatus of aspect 62, wherein the cross-sectional area of the duct, viewed in the direction of the flow of the working material through the duct, is circular in shape Aspect 67. The apparatus of aspect 62, wherein the cross-sectional area of the duct, viewed in the direction of the flow of the working material through the duct, is annular in shape Aspect 68. The apparatus of aspect 62, wherein the cross-sectional area of the duct, viewed in the direction of the flow of the working material through the duct, is elliptical in shape Aspect 69. The apparatus of aspect 62, wherein the cross-sectional area of the duct, viewed in the direction of the flow of the working material through the duct, is rectangular in shape Aspect 70. The apparatus of aspect 3, wherein the expansion apparatus comprises an axial or centrifugal turbine Aspect 71. The apparatus of aspect 3, wherein the expansion apparatus comprises a reciprocating piston Aspect 72. The apparatus of aspect 3, wherein the expansion apparatus comprises a body force generating apparatus Aspect 73. The apparatus of aspect 72, wherein the body force generating apparatus comprises an electric field generating apparatus Aspect 74. The apparatus of aspect 72, wherein the body force generating apparatus comprises a magnetic field generating apparatus Aspect 75. The apparatus of aspect 72, wherein the body force generating apparatus comprises a gravitational field generating apparatus Aspect 76. The apparatus of aspect 72, wherein the body force generating apparatus comprises an inertial body force generating apparatus Aspect 77. The apparatus of aspect 3, wherein the expansion apparatus comprises a duct through which a fluid working material is configured to flow Aspect 78. The apparatus of aspect 77, wherein the duct is a converging diverging duct Aspect 79. The apparatus of aspect 77, wherein the duct is a diverging duct Aspect 80. The apparatus of aspect 77, wherein the duct is a converging duct Aspect 81. The apparatus of aspect 77, wherein the cross-sectional area of the duct, viewed in the direction of the flow of the working material through the duct, is circular in shape Aspect 82. The apparatus of aspect 77, wherein the cross-sectional area of the duct, viewed in the direction of the flow of the working material through the duct, is annular in shape Aspect 83. The apparatus of aspect 77, wherein the cross-sectional area of the duct, viewed in the direction of the flow of the working material through the duct, is elliptical in shape Aspect 84. The apparatus of aspect 77, wherein the cross-sectional area of the duct, viewed in the direction of the flow of the working material through the duct, is rectangular in shape Aspect 85. The apparatus of aspect 1, wherein the work exchange apparatus comprises: a compression apparatus, where a compression apparatus is configured to do work on the working material; and an expansion apparatus, where the expansion apparatus is configured to allow the working material to do work on the expansion apparatus Aspect 86. The apparatus of aspect 85, wherein the apparatus is configured to be able to compress the working material prior to expanding the working material Aspect 87. The apparatus of aspect 85, wherein the apparatus is configured to be able to expand the working material prior to compressing the working material Aspect 88. The apparatus of aspect 85, wherein the expansion apparatus and compression apparatus are the same apparatus Aspect 89. The apparatus of aspect 85, wherein the apparatus also comprises at least one heat exchanger configured to exchange heat between the working material and another thermal reservoir Aspect 90. The apparatus of aspect 86, wherein the body force generating apparatus is configured to be able to artificially increase a specific heat capacity of the working material for at least a portion of the compression, where the artificial increase is an increase above the corresponding natural specific heat capacity Aspect 91. The apparatus of aspect 86, wherein the body force generating apparatus is configured to be able to artificially decrease a specific heat capacity of the working material for at least a portion of the expansion, where the artificial decrease is a decrease below the corresponding natural specific heat capacity Aspect 92. The apparatus of aspect 86, wherein the body force generating apparatus is configured to be able to artificially decrease a specific heat capacity of the working material for at least a portion of the compression Aspect 93. The apparatus of aspect 86, wherein the body force generating apparatus is configured to be able to artificially increase a specific heat capacity of the working material for at least a portion of the expansion Aspect 94. The apparatus of aspect 87, wherein the body force generating apparatus is configured to be able to artificially increase a specific heat capacity of the working material for at least a portion of the compression, where the artificial increase is an increase above the corresponding natural specific heat capacity Aspect 95. The apparatus of aspect 87, wherein the body force generating apparatus is configured to be able to artificially decrease a specific heat capacity of the working material for at least a portion of the expansion, where the artificial decrease is a decrease below the corresponding natural specific heat capacity Aspect 96. The apparatus of aspect 87, wherein the body force generating apparatus is configured to be able to artificially decrease a specific heat capacity of the working material for at least a portion of the compression Aspect 97. The apparatus of aspect 87, wherein the body force generating apparatus is configured to be able to artificially increase a specific heat capacity of the working material for at least a portion of the expansion Aspect 98. The apparatus of aspect 1, wherein the working material is air Aspect 99. The apparatus of aspect 1, wherein the working material is water Aspect 100. The apparatus of aspect 1, wherein the working material is a mobile charge carrier Aspect 101. The apparatus of aspect 100, wherein the working material is an electron Aspect 102. The apparatus of aspect 100, wherein the working material is an ion Aspect 103. The apparatus of aspect 100, wherein the working material is a proton Aspect 104. The apparatus of aspect 85, wherein the expansion apparatus comprises a first expander and a second expander Aspect 105. The apparatus of aspect 85, wherein the compression apparatus comprises a first compressor and a second compressor Aspect 106. The apparatus of aspect 104, wherein the compression apparatus comprises a single compressor Aspect 107. The apparatus of aspect 105, wherein the expansion apparatus comprises a single expander Aspect 108. The apparatus of aspect 85, wherein the expansion apparatus comprises a single expander Aspect 109. The apparatus of aspect 85, wherein the compression apparatus comprises a single compressor Aspect 110. The apparatus of aspect 106, wherein the apparatus is configured to be able to expand the working material in the first expander prior to compressing the working material in the compressor, and configured to be able to compress the working material in the compressor prior to expanding the working material in the second expander Aspect 111. The apparatus of aspect 110, wherein the apparatus also comprises at least one heat exchanger configured to exchange heat between the working material and another thermal reservoir Aspect 112. The apparatus of aspect 110, wherein the body force generating apparatus is configured to be able to artificially increase a specific heat capacity of the working material for at least a portion of the compression, where the artificial increase is an increase above the corresponding natural specific heat capacity Aspect 113. The apparatus of aspect 110, wherein the body force generating apparatus is configured to be able to artificially decrease a specific heat capacity of the working material for at least a portion of an expansion, where the artificial decrease is a decrease below the corresponding natural specific heat capacity Aspect 114. The apparatus of aspect 110, wherein the body force generating apparatus is configured to be able to artificially decrease a specific heat capacity of the working material for at least a portion of the compression Aspect 115. The apparatus of aspect 110, wherein the body force generating apparatus is configured to be able to artificially increase a specific heat capacity of the working material for at least a portion of an expansion Aspect 116. The apparatus of aspect 107, wherein the apparatus is configured to be able to compress the working material in the first compressor prior to expanding the working material in the expander, and configured to be able to expand the working material in the expander prior to compressing the working material in the second compressor Aspect 117. The apparatus of aspect 116, wherein the apparatus also comprises at least one heat exchanger configured to exchange heat between the working material and another thermal reservoir Aspect 118. The apparatus of aspect 116, wherein the body force generating apparatus is configured to be able to artificially increase a specific heat capacity of the working material for at least a portion of a compression, where the artificial increase is an increase above the corresponding natural specific heat capacity Aspect 119. The apparatus of aspect 116, wherein the body force generating apparatus is configured to be able to artificially decrease a specific heat capacity of the working material for at least a portion of the expansion, where the artificial decrease is a decrease below the corresponding natural specific heat capacity Aspect 120. The apparatus of aspect 116, wherein the body force generating apparatus is configured to be able to artificially decrease a specific heat capacity of the working material for at least a portion of a compression Aspect 121. The apparatus of aspect 116, wherein the body force generating apparatus is configured to be able to artificially increase a specific heat capacity of the working material for at least a portion of the expansion Aspect 122. The apparatus of aspect 85, wherein the expansion apparatus comprises a single expander and the compression apparatus comprises a single compressor, wherein the working material interacts with the compressor and expander sequentially in time Aspect 123. A system comprising two or more of the apparatuses of aspect 122, wherein the apparatuses are configured to interact with the working material sequentially in time Aspect 124. A system comprising two or more of the apparatuses of aspect 86, wherein the apparatuses are configured to interact with the working material sequentially in time Aspect 125. A system comprising two or more of the apparatuses of aspect 87, wherein the apparatuses are configured to interact with the working material sequentially in time Aspect 126. A system comprising two or more of the apparatuses of aspect 85, wherein the apparatuses are configured to interact with the working material sequentially in time Aspect 127. A system comprising one or more of the apparatuses of aspect 86 and one apparatus of aspect 110, wherein the one or more of the apparatuses of aspect 86 are configured to interact with the working material sequentially in time, and wherein the one or more of the apparatuses of aspect 86 are configured to interact with the working material subsequently to the interaction of the working material with the first expander of the apparatus of aspect 110, and prior to the interaction of the working material with the compressor of the apparatus of aspect 110

Aspect 128. A system comprising one or more of the apparatuses of aspect 87 and one apparatus of aspect 116, wherein the one or more of the apparatuses of aspect 87 are configured to interact with the working material sequentially in time, and wherein the one or more of the apparatuses of aspect 87 are configured to interact with the working material subsequently to the interaction of the working material with the first compressor of the apparatus of aspect 116, and prior to the interaction of the working material with the expander of the apparatus of aspect 116

Aspect 129. The apparatus of aspect 1, wherein the apparatus also comprises at least one heat exchanger configured to exchange heat between the working material and another thermal reservoir Aspect 130. The apparatus of aspect 1, wherein heat can be exchanged between the working material and another thermal reservoir Aspect 131. The apparatus of aspect 130, wherein the other thermal reservoir also comprises material of the same type as the working material Aspect 132. The apparatus of aspect 86, wherein heat can be removed from the working material and transferred to another thermal reservoir, wherein the heat can be removed subsequently to the compression of the working material and prior to the expansion of the working material Aspect 133. The apparatus of aspect 86, wherein heat can be delivered to the working material from another thermal reservoir, wherein the heat can be delivered subsequently to the compression of the working material and prior to the expansion of the working material Aspect 134. The apparatus of aspect 87, wherein heat can be removed from the working material and transferred to another thermal reservoir, wherein the heat can be removed subsequently to the expansion of the working material and prior to the compression of the working material Aspect 135. The apparatus of aspect 87, wherein heat can be delivered to the working material from another thermal reservoir, wherein the heat can be delivered subsequently to the expansion of the working material and prior to the compression of the working material Aspect 136. The apparatus of aspect 132, wherein heat can also be delivered to the working material from another thermal reservoir, wherein the heat can be delivered subsequently to the expansion of the working material Aspect 137. The apparatus of aspect 132, wherein heat can also be delivered to the working material from another thermal reservoir, wherein the heat can be delivered prior to the compression of the working material Aspect 138. The apparatus of aspect 133, wherein heat can also be removed from the working material and transferred to another thermal reservoir, wherein the heat can be removed subsequently to the expansion of the working material Aspect 139. The apparatus of aspect 133, wherein heat can be removed to the working material from another thermal reservoir, wherein the heat can be removed prior to the compression of the working material Aspect 140. The apparatus of aspect 134, wherein heat can also be delivered to the working material from another thermal reservoir, wherein the heat can be delivered subsequently to the compression of the working material Aspect 141. The apparatus of aspect 134, wherein heat can also be delivered to the working material from another thermal reservoir, wherein the heat can be delivered prior to the expansion of the working material Aspect 142. The apparatus of aspect 135, wherein heat can also be removed from the working material and transferred to another thermal reservoir, wherein the heat can be removed subsequently to the compression of the working material Aspect 143. The apparatus of aspect 135, wherein heat can be removed to the working material from another thermal reservoir, wherein the heat can be removed prior to the expansion of the working material Aspect 144. The apparatus of aspect 130, wherein heat can be exchanged via thermal conduction Aspect 145. The apparatus of aspect 130, wherein heat can be exchanged via natural or forced convection Aspect 146. The apparatus of aspect 130, wherein heat can be exchanged via thermal radiation Aspect 147. The apparatus of aspect 130, wherein heat can be exchanged via a heat transfer apparatus Aspect 148. The apparatus of aspect 130, wherein heat can be exchanged via a temperature amplification apparatus Aspect 149. The apparatus of aspect 1, wherein the work exchange apparatus is configured to compress or expand the working material adiabatically Aspect 150. The apparatus of aspect 1, wherein the work exchange apparatus is configured to compress or expand the working material isothermally Aspect 151. The apparatus of aspect 1, wherein the work exchange apparatus is configured to compress or expand the working material polytropically Aspect 152. The apparatus of aspect 1, wherein the work exchange apparatus is configured to compress or expand the working material isobarically Aspect 153. The apparatus of aspect 1, wherein the work exchange apparatus is configured to compress or expand the working material isochorically Aspect 154. The apparatus of aspect 85, wherein a specific heat capacity during at least a portion of the expansion of the working material is smaller than a specific heat capacity during at least a portion of the compression of the working material for a given incremental change in a specific volume of the working material Aspect 155. The apparatus of aspect 85, wherein a specific heat capacity during at least a portion of the expansion of the working material is larger than a specific heat capacity during at least a portion of the compression of the working material for a given incremental change in a specific volume of the working material Aspect 156. The apparatus of aspect 154, wherein the apparatus comprises at least one heat exchanging apparatus Aspect 157. The apparatus of aspect 156, wherein the heat exchanging apparatus is configured to remove heat from the working material after or during the compression of the working material Aspect 158. The apparatus of aspect 157, wherein the heat exchanging apparatus is configured to deliver heat to the working material after or during the expansion of the working material Aspect 159. The apparatus of aspect 157, wherein the magnitude of the heat removed from the working material can be substantially equal to the magnitude of the heat delivered to the working material by the heat exchanging apparatus after or during the expansion of the working material Aspect 160. The apparatus of aspect 1, wherein a specific heat capacity is the specific heat capacity at constant pressure.

Aspect 161. The apparatus of aspect 1, wherein a specific heat capacity is the specific heat capacity at constant volume.

Aspect 162. The apparatus of aspect 1, wherein thermal energy of the working material is converted into work via a work exchange apparatus Aspect 163. The apparatus of aspect 1, wherein work of the work exchange apparatus is converted into thermal energy of the working material Aspect 164. The apparatus of aspect 1, wherein the apparatus comprises at least one heat exchange apparatus configured to allow thermal energy to be transferred via the working material from a first thermal reservoir to a second thermal reservoir Aspect 165. The apparatus of aspect 164, wherein the first thermal reservoir is at a lower temperature than the second thermal reservoir Aspect 166. The apparatus of aspect 164, wherein the first thermal reservoir is at a higher temperature than the second thermal reservoir Aspect 167. The apparatus of aspect 164, wherein the heat exchange apparatus can comprise a thermal contact between the first or second thermal reservoir and the working material Aspect 168. The apparatus of aspect 167, wherein the heat can be transferred through the thermal contact via thermal conduction Aspect 169. The apparatus of aspect 167, wherein the heat can be transferred through the thermal contact via natural or forced convection Aspect 170. The apparatus of aspect 167, wherein the heat can be transferred through the thermal contact via thermal radiation Aspect 171. The apparatus of aspect 167, wherein the heat can be transferred through the thermal contact via a heat transfer apparatus Aspect 172. The apparatus of aspect 162, wherein the work exchange apparatus can generate thrust Aspect 173. The apparatus of aspect 162, wherein the work exchange apparatus can generate electricity Aspect 174. The apparatus of aspect 162, wherein the work exchange apparatus can generate torque Aspect 175. The apparatus of aspect 162, wherein the work exchange apparatus can propel an aircraft, or a spacecraft Aspect 176. The apparatus of aspect 162, wherein the work exchange apparatus can propel a land vehicle, or a watercraft Aspect 177. A method of manipulating a working material, the method comprising: modifying a specific heat capacity of a working material; and interacting with the working material, wherein the interaction can comprise doing work on the working material, or allowing the working material to do work Aspect 178. A method of manipulating a working material, the method comprising: providing one or more of an apparatus of any one of aspects 1 to 176, operating one or more of an apparatus of any one of aspects 1 to 176.

Aspect 179. A method of manipulating a working material, the method comprising: providing one or more of an apparatus of any one of aspects 1 to 176, modifying a specific heat capacity of a working material; and interacting with the working material with the work exchange apparatus, wherein the interaction can comprise doing work on the working material with the work exchange apparatus, or allowing the working material to do work on the work exchange apparatus Aspect 180. A method of interacting with a working material, the method comprising: artificially modifying the value of a specific heat capacity of a working material relative to the natural value; and employing a work exchange apparatus to do work on the working material, or employing a work exchange apparatus to allow the working material to do work on the work exchange apparatus Aspect 181. The method of aspect 180, wherein the method further comprises providing a body force generating apparatus, where the body force generating apparatus is configured to artificially modify a specific heat capacity of a working material Aspect 182. The method of aspect 181, wherein the method further comprises employing the body force generating apparatus to artificially modify a specific heat capacity of a working material Aspect 183. The method of aspect 180, wherein the method further comprises providing the work exchange apparatus Aspect 184. The method of aspect 183, wherein the method further comprises employing the work exchange apparatus to do work on the working material Aspect 185. The method of aspect 183, wherein the method further comprises employing the work exchange apparatus allow the working material to do work on the work exchange apparatus Aspect 186. The method of aspect 180, wherein a specific heat capacity is the specific heat capacity at constant pressure.

Aspect 187. The method of aspect 180, wherein a specific heat capacity is the specific heat capacity at constant volume.

Aspect 188. The method of aspect 180, wherein the method comprises converting thermal energy of the working material into work via the work exchange apparatus Aspect 189. The method of aspect 180, wherein the method comprises converting work of the work exchange apparatus into thermal energy of the working material Aspect 190. The method of aspect 180, wherein the method comprises providing at least one heat exchange apparatus configured to allow thermal energy to be transferred via the working material from a first thermal reservoir to a second thermal reservoir Aspect 191. The method of aspect 190, wherein the first thermal reservoir is at a lower temperature than the second thermal reservoir Aspect 192. The method of aspect 190, wherein the first thermal reservoir is at a higher temperature than the second thermal reservoir Aspect 193. The method of aspect 180, wherein the modifying of a specific heat capacity of a working material comprises increasing a specific heat capacity of a working material Aspect 194. The method of aspect 180, wherein the modifying of a specific heat capacity of a working material comprises decreasing the specific heat capacity of a working material Aspect 195. The method of aspect 180, wherein the modifying of a specific heat capacity of a working material comprises both increasing and decreasing a specific heat capacity of a working material Aspect 196. The method of aspect 180, wherein the modifying of a specific heat capacity of a working material comprises ionizing at least a portion of a working material Aspect 197. The method of aspect 180, wherein the modifying of a specific heat capacity of a working material comprises subjecting the working material to an electric field Aspect 198. The method of aspect 180, wherein the modifying of a specific heat capacity of a working material comprises subjecting the working material to a spatial or temporal electric field gradient Aspect 199. The method of aspect 180, wherein the modifying of a specific heat capacity of a working material comprises subjecting the working material to a magnetic field Aspect 200. The method of aspect 180, wherein the modifying of a specific heat capacity of a working material comprises subjecting the working material to a spatially or temporally non-uniform magnetic field Aspect 201. The method of aspect 180, wherein the modifying of a specific heat capacity of a working material comprises subjecting the working material to a gravitational field Aspect 202. The method of aspect 180, wherein the modifying of a specific heat capacity of a working material comprises subjecting the working material to an acceleration in an inertial frame Aspect 203. The method of aspect 180, wherein the modifying of a specific heat capacity of a working material comprises employing a positive or negative magnetocaloric effect Aspect 204. The method of aspect 180, wherein the modifying of a specific heat capacity of a working material comprises employing a positive or negative electrocaloric effect Aspect 205. The method of aspect 180, wherein employing a work exchange apparatus to do work on a working material comprises compressing the working material Aspect 206. The method of aspect 180, wherein employing a work exchange apparatus to allow the working material to do work on the work exchange apparatus comprises expanding the working material Aspect 207. The method of aspect 180, wherein modifying a specific heat capacity of the working material comprises changing or altering a specific heat capacity of the working material relative to the value of the specific heat capacity in a natural scenario Aspect 208. The method of aspect 180, wherein the method further comprises maintaining the value of a specific heat capacity at any value different to the natural value of the specific heat capacity during an employing of a work exchange apparatus to do work on the working material, or an employing of a work exchange apparatus to allow the working material to do work on the work exchange apparatus Aspect 209. The method of aspect 208, wherein the method further comprises maintaining the value of a specific heat capacity at the natural value of the specific heat capacity during an employing of a work exchange apparatus to do work on the working material, or an employing of a work exchange apparatus to allow the working material to do work on the work exchange apparatus Unless specified or clear from context, the term "or" is equivalent to "and/or" throughout this paper.

The embodiments and methods described in this paper are only meant to exemplify and illustrate the principles of the invention. This invention can be carried out in several different ways and is not limited to the examples, embodiments, arrangements, configurations, or methods of operation described in this paper or depicted in the drawings. This also applies to cases where just one embodiments is described or depicted. Those skilled in the art will be able to devise numerous alternative examples, embodiments, arrangements, configurations, or methods of operation, that, while not shown or described herein, embody the principles of the invention and thus are within its spirit and scope.

What is claimed is:

1. An apparatus for interacting with a working material, wherein the apparatus comprises:
    a first body force generating apparatus configured to modify a specific heat capacity of the working material, wherein the working material comprises a caloric material, wherein the caloric material is a collection of all objects of interest of which the specific heat capacity is modifiable by the action of the first body force generating apparatus, wherein the modification can be to a value above or below the natural specific heat capacity of the objects of interest, wherein the modification can comprise a change in the degree of excitation of a degree of freedom of the objects of interest, and/or wherein the modification can comprise a change in the number of excited degrees of freedom of an object of interest, and wherein a modification of the specific heat capacity comprises a positive or negative electrocaloric effect or a positive or negative magnetocaloric effect, the caloric material being an electrocaloric or magnetocaloric material; and
    a work exchange apparatus, wherein the work exchange apparatus comprises a compression apparatus, wherein the compression apparatus is an apparatus configured to perform work on at least a portion of the caloric material at least when the specific heat capacity of the at least a portion of the caloric material deviates from its natural value, or wherein the work exchange apparatus comprises an expansion apparatus, wherein the expansion apparatus is an apparatus configured to allow at least a portion of the caloric material to perform work on the expansion apparatus at least when the specific heat capacity of the at least a portion of the caloric material deviates from its natural value.

2. The apparatus of claim 1, wherein the first body force generating apparatus is configured to increase the specific heat capacity of the caloric material.

3. The apparatus of claim 1, wherein the first body force generating apparatus is configured to decrease the specific heat capacity of the caloric material.

4. The apparatus of claim 1, wherein the caloric material comprises solid particles, or a solid object.

5. The apparatus of claim 1, wherein the caloric material comprises of a liquid, a gas, or a colloid.

6. The apparatus of claim 1, wherein an object of interest in the caloric material is an electron.

7. The apparatus of claim 6, wherein the specific heat capacity of the electrons is modified by the first body force generating apparatus.

8. The apparatus of claim 1, wherein the first body force of the body force generating apparatus is gravitational.

9. The apparatus of claim 1, wherein the first body force of the body force generating apparatus is inertial.

10. The apparatus of claim 1, wherein the first body force generating apparatus comprises a magnetic field generating apparatus configured to generate a magnetic field.

11. The apparatus of claim 10, wherein at least a portion of e magnetic field is generated by current flowing through a conductor.

12. The apparatus of claim 11, wherein at least a portion of the conductor is superconducting.

13. The apparatus of claim 11, wherein at least a portion of the conductor is arranged around or within at least a portion of the caloric material in solenoidal fashion.

14. The apparatus of claim 10, wherein at least a portion of the magnetic field is generated by a permanent magnet.

15. The apparatus of claim 10, wherein the first body force generating apparatus comprises an electric field generating apparatus.

16. The apparatus of claim 15, wherein the electric field generating apparatus comprises electrical conductors configured to accumulate positive or negative charge.

17. The apparatus of claim 15, wherein the electric field generating apparatus comprises collections of positive or negative charge.

18. The apparatus of claim 1, wherein the first body force generating apparatus comprises an ionization apparatus configured to ionize at least a portion of the caloric material.

19. The apparatus of claim 18, wherein at least a portion of the energy consumed in an ionization process can be recovered.

20. The apparatus of claim 19, wherein at least a portion of the energy is recovered by a work exchange apparatus configured to allow the caloric material to perform work on the work exchange apparatus.

21. The apparatus of claim 20, wherein the work exchange apparatus comprises an electrical generator.

22. The apparatus of claim 1, wherein the specific heat capacity of the caloric material is modified by a positive or negative magnetocaloric effect.

23. The apparatus of claim 1, wherein the specific heat capacity of the caloric material is modified by a positive or negative electrocaloric effect.

24. The apparatus of claim 1, wherein the work exchange apparatus comprises an axial or centrifugal compressor or turbine.

25. The apparatus of claim 1, wherein the work exchange apparatus comprises a piston.

26. The apparatus of claim 1, wherein the work exchange apparatus comprises a second body force generating apparatus.

27. The apparatus of claim 26, wherein the second body force generating apparatus comprises an electric field generating apparatus.

28. The apparatus of claim 26, wherein the second body force generating apparatus comprises a magnetic field generating apparatus.

29. The apparatus of claim 26, wherein the second body force generating apparatus comprises a gravitational field generating apparatus.

30. The apparatus of claim 26, wherein the second body force generating apparatus comprises an inertial body force generating apparatus.

31. The apparatus of claim 1, wherein the work exchange apparatus comprises a duct through which a fluid caloric material is configured to flow.

32. The apparatus of claim 31, wherein the duct is a converging diverging duct.

33. The apparatus of claim 31, wherein the duct is a diverging duct.

34. The apparatus of claim 31, wherein the duct is a converging duct.

35. The apparatus of claim 1, wherein an object of interest in the caloric material is a nucleus, an atom, or a molecule.

36. The apparatus of claim 26, wherein the first body force apparatus comprises the second body force generating apparatus.

37. The apparatus of claim 9, wherein the body force of the first body force generating apparatus is centrifugal.

38. The apparatus of claim 30, wherein the body force of the second body force generating apparatus is centrifugal.

39. The apparatus of claim 1, wherein the working material comprises a non-caloric material, wherein the non-caloric material consists of the portion of the working material which does not consist of the caloric material, wherein the work exchange apparatus is configured to perform work on at least a portion of a non-caloric material, or allow at least a portion of a non-caloric material to perform work on the work exchange apparatus.

40. The apparatus of claim 39, wherein the non-caloric material comprises solid particles, or a solid object.

41. The apparatus of claim 39, wherein the non-caloric material comprises electrons, atoms, or molecules.

42. The apparatus of claim 39, wherein the non-caloric material comprises a liquid, a gas, plasma, or a colloid.

43. The apparatus of claim 1, wherein the work exchange of the work exchange apparatus with the caloric material comprises an adiabatic process.

44. The apparatus of claim 1, wherein the work exchange of the work exchange apparatus with the caloric material comprises an isothermal process.

45. The apparatus of claim 1, wherein the work exchange of the work exchange apparatus with the caloric material comprises a polytropic process.

46. The apparatus of claim 1, herein the specific heat capacity is the specific heat capacity at constant pressure.

47. The apparatus of claim 1, wherein the specific heat capacity is the specific heat capacity at constant volume.

48. The apparatus of claim 25, wherein the working material is a solid, wherein the piston is configured to do work on the working material at least when the specific heat capacity of the working material is smaller or larger than the natural specific heat capacity, or wherein the piston is configured to allow the working material to do work on the piston at least when the specific heat capacity of the working material is smaller or larger than the natural specific heat capacity.

49. The apparatus of claim 25, wherein the piston is mechanically coupled to an electricity generator configured to convert mechanical work into electrical energy.

50. The apparatus of claim 1, wherein the apparatus comprises a heat exchanger configured to deliver heat to the working material, or remove heat from the working material.

51. The apparatus of claim 1, wherein the work exchange apparatus is configured to interact with the working material in a thermodynamic cycle.

52. The apparatus of claim 51, wherein the complete thermodynamic cycle absorbs thermal energy from a single thermal reservoir and produces mechanical work.

53. The apparatus of claim 51, wherein the complete thermodynamic cycle delivers heat from a first thermal reservoir to a second thermal reservoir, wherein the temperature of the second thermal reservoir exceeds the temperature of the first thermal reservoir.

54. The apparatus of claim 53, wherein the complete thermodynamic cycle also produces mechanical work.

55. The apparatus of claim 1, wherein the working material comprises a non-caloric material, wherein the non-caloric material consists of the portion of the working material which does not consist of the caloric material, and wherein at least a portion of the non-caloric material is in thermal contact with at least a portion of the caloric material.

56. The apparatus of claim 55, wherein the at least a portion of the non-caloric material and the at least a portion of the caloric material are in the same state of matter.

57. The apparatus of claim 56, wherein the state of matter is a solid state of matter.

58. The apparatus of claim 55, wherein the working material is a solid.

* * * * *

UNITED STATES PATENT AND TRADEMARK OFFICE
CERTIFICATE OF CORRECTION

PATENT NO. : 11,293,311 B2
APPLICATION NO. : 16/509491
DATED : April 5, 2022
INVENTOR(S) : Paul Neiser It is certified that error appears in the above-identified patent and that said Letters Patent is hereby corrected as shown below:

On the Title Page

On page 2, in Column 1, Item (56) under "U.S. Patent Documents", Line 3, delete "2012/0011101" and insert --2012/0111010-- therefor In the Claims In Column 127, Line 24, in Claim 11, delete "e" and insert --the-- therefor In Column 128, Line 55, in Claim 46, delete "herein" and insert --wherein-- therefor Signed and Sealed this
Nineteenth Day of July, 2022

Katherine Kelly Vidal
*Director of the United States Patent and Trademark Office*